(12) United States Patent
Charnock et al.

(10) Patent No.: US 8,135,711 B2
(45) Date of Patent: *Mar. 13, 2012

(54) METHOD AND APPARATUS FOR SOCIOLOGICAL DATA ANALYSIS

(75) Inventors: Elizabeth Charnock, Foster City, CA (US); Curtis Thompson, Tucson, AZ (US); Steven Roberts, Foster City, CA (US); Jonathan D Nystrom, Chantilly, VA (US); Keith Schon, San Francisco, CA (US); Arpit Bothra, San Mateo, CA (US); Joanes C Espanol, Fremont, CA (US); Roman Brouk, San Jose, CA (US)

(73) Assignee: Cataphora, Inc., Redwood City, CA (US)

( * ) Notice: Subject to any disclaimer, the term of this patent is extended or adjusted under 35 U.S.C. 154(b) by 295 days.

This patent is subject to a terminal disclaimer.

(21) Appl. No.: 12/422,902

(22) Filed: Apr. 13, 2009

(65) Prior Publication Data

US 2009/0287685 A1    Nov. 19, 2009

Related U.S. Application Data

(63) Continuation of application No. 11/497,199, filed on Jul. 31, 2006, now Pat. No. 7,519,589, which is a continuation-in-part of application No. 10/358,759, filed on Feb. 4, 2003, now Pat. No. 7,143,091.

(60) Provisional application No. 60/354,403, filed on Feb. 4, 2002.

(51) Int. Cl.
*G06F 17/30* (2006.01)

(52) U.S. Cl. ...................................... 707/728

(58) Field of Classification Search .................. 707/728
See application file for complete search history.

(56) References Cited

U.S. PATENT DOCUMENTS

| | | | |
|---|---|---|---|
| 5,579,466 | A | 11/1996 | Habib et al. |
| 6,311,194 | B1 | 10/2001 | Sheth et al. |
| 6,469,711 | B2 | 10/2002 | Foreman et al. |
| 6,567,830 | B1 | 5/2003 | Madduri |
| 6,598,046 | B1 | 7/2003 | Goldberg et al. |
| 6,699,125 | B2 | 3/2004 | Kirmse et al. |
| 7,143,091 | B2 | 11/2006 | Charnock et al. |
| 7,146,416 | B1 | 12/2006 | Yoo et al. |

(Continued)

FOREIGN PATENT DOCUMENTS

WO    WO 00/67159    11/2000

(Continued)

OTHER PUBLICATIONS

Song, W.W. et al., A semantic similarity approach to electronic document modeling and integration, WEB Information Systems Engineeering, 2000 Proceedings of the 1st international conference on Hong Kong, China, Jun. 19, 2000, pp. 116-124, vol. 1, IEEE Comopu. Soc., Los Alamitos, CA, USA.

(Continued)

*Primary Examiner* — Cheryl Lewis
(74) *Attorney, Agent, or Firm* — Paul Davis; Goodwin Procter LLP

(57) ABSTRACT

A method to enable improved analysis and use of sociological data, the method comprising identifying causal relationships between a plurality of documents, identifying a plurality of characteristics of a communication, including a modality used, actors involved, proximate events of relevance, and enabling a user to query based on available characteristics.

20 Claims, 112 Drawing Sheets

U.S. PATENT DOCUMENTS

| | | |
|---|---|---|
| 7,188,143 B2 | 3/2007 | Szeto |
| 7,200,590 B2 | 4/2007 | Everett-Church et al. |
| 7,412,422 B2 | 8/2008 | Shiloh |
| 2001/0018698 A1 | 8/2001 | Uchino |
| 2002/0103792 A1 | 8/2002 | Blank et al. |
| 2002/0178225 A1 | 11/2002 | Madenberg et al. |

FOREIGN PATENT DOCUMENTS

| | | |
|---|---|---|
| WO | WO 01/53995 | 7/2001 |
| WO | WO 01/57633 | 8/2001 |
| WO | WO 01/69428 | 9/2001 |

OTHER PUBLICATIONS

Varlamis, I., et al., Wed document searching using enhanced flyperlink semantics based on xml, Database Engineering & Applications, 2001 Int'l Symposium, Jul. 16-18, 2001. pp. 34-44, IEEE, Piscataway, NJ, USA.

Dunkel, B., et al., Customized metadata for Internet information, Knowledge-Based Intelligent Electronic Systems, KES'97 Proceedings, 1997 1st Int'l Conference on Adelaide, SA Australia, May 21-23, 1997, pp. 508-516. vol. 2, IEEE, New York, USA.

Katashi Nagao ED. et al, Discussing mining: knowledge discovery from semantically annodated discussion content, New frontries in Artificial Intelligence, Lecture notes in Computer Science; pp. 158-168, vol. 3609, 1900, Springer Berlin Heidelberg, DE, 2007.

Smith, M.A., et al., Visualization components for persistent conversations, Chi 2001 Conference Proceedings, Mar. 31, 2001, pp. 136-143, IEEE, New York, USA.

Warren Sack, Conversation map: a content-based newsgroup browser, Proceedinmgs of the 5th int'l conference on intelligent user interfaces, 2000, pp. 233-240, New Orleans, USA.

Donath J., et al., Visualizing conversation, Systems Sciences, Jan. 5, 1999, pp. 1-9, IEEE, USA.

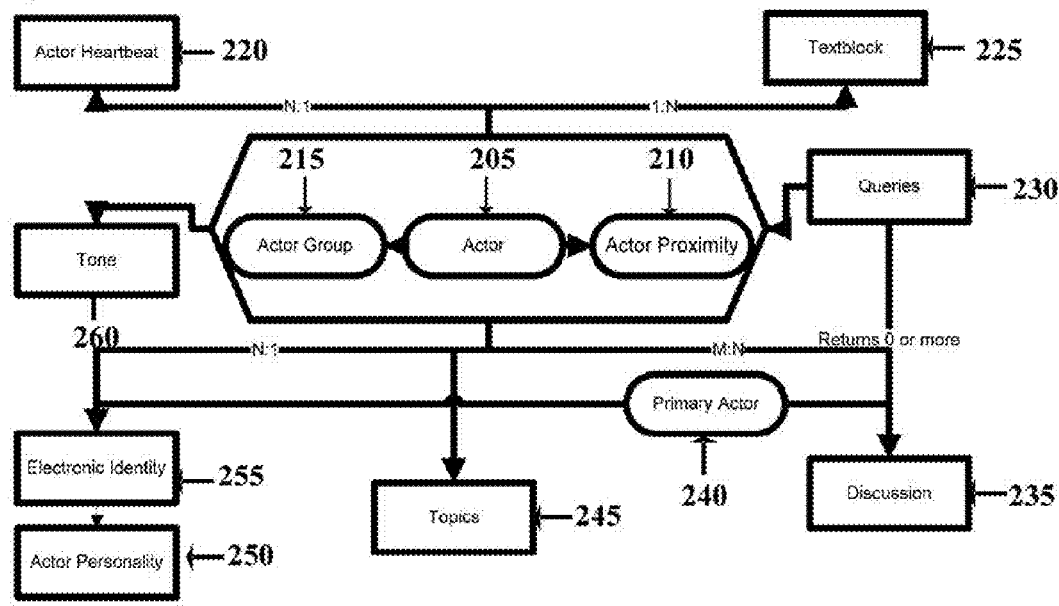

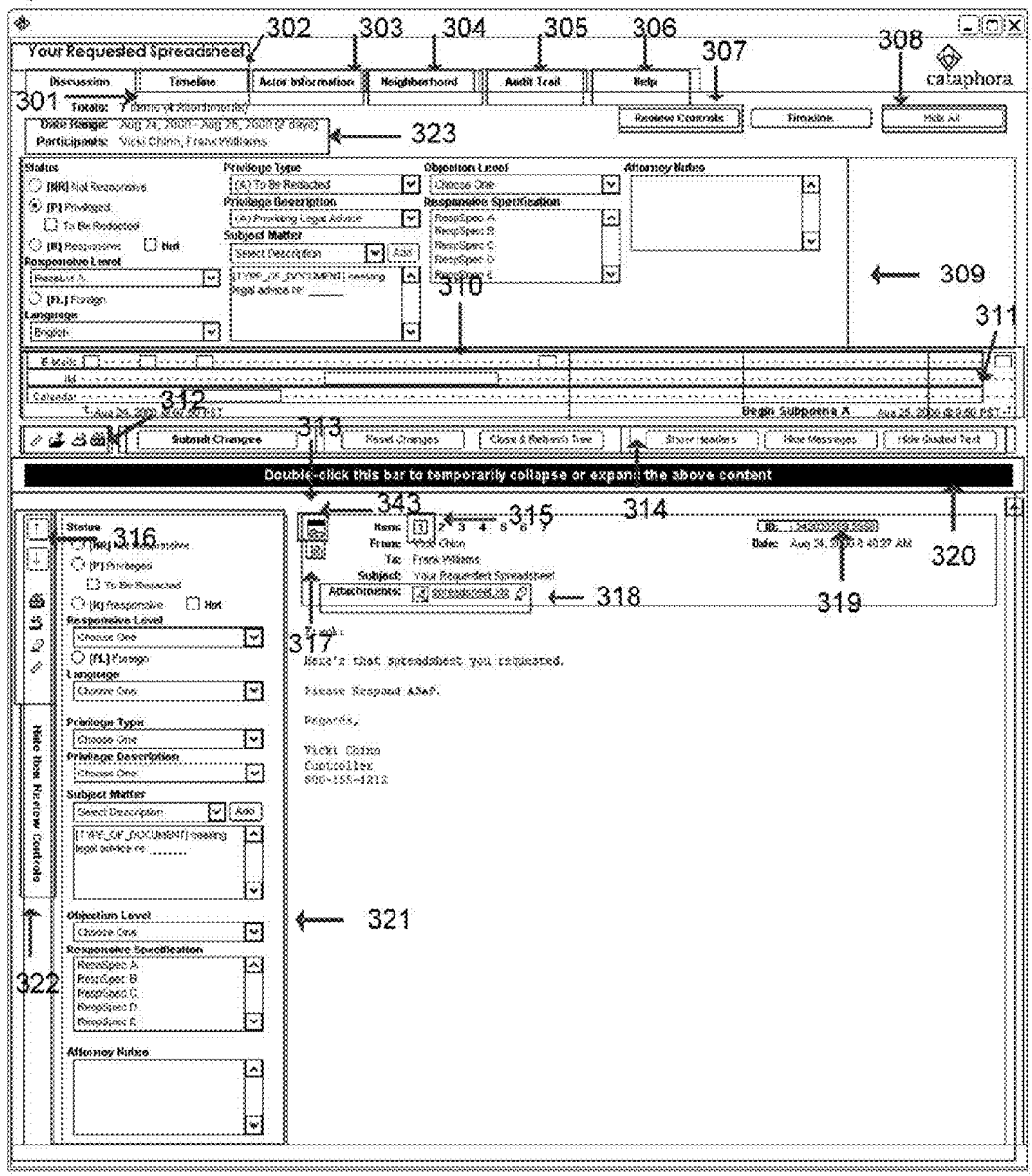

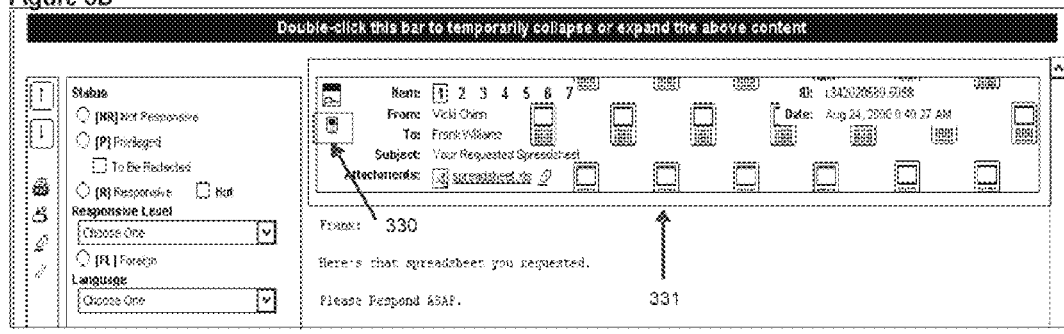

Figure 3E

Audit Trail

Tabs: Current Locations | Event History | Cataphora | Merged Summary

Current Workflow Location
| | |
|---|---|
| Stage | Reviewed |
| Folder Name | Unbatched |
| Assigned To | |

Current Categories (3 instance(s))
Name
- Responsive - Raw Results
- Straight Review Medias - Raw Results
- 7. Promo Materials

Custom Folders (0 instance(s))
Sub Folder
This item is not currently in any Custom Folders.

Cataphora Tracking Locations (0 instance(s))
Sub Folder
This item is not currently in any Tracking Locations.

Note: The following table shows a combination of all events shown in the Event History and Cataphora tabs

Event History

| ID | Date | User | Action | Notes |
|---|---|---|---|---|
| 1 | Jul 09, 2004 01:12:09 PM | ◆ | Site maintenance | Website setup |
| 2 | Jul 09, 2004 01:17:13 PM | ◆ | Site maintenance | Execution of ontologies |
| 3 | Jul 09, 2004 01:22:34 PM | ◆ | Site maintenance | Batch creation |
| 41 | Jul 15, 2004 07:24:13 AM | Milan, Marino | Batch assignment | Assigned to: McMary, Garry |
| 211 | Jul 20, 2004 06:46:37 AM | McMary, Garry | Review coding | — |
| 248 | Jul 20, 2004 11:47:18 AM | McMary, Garry | Review coding | — |

◆ = Events performed by Cataphora staff or automated processes

Figure 4A

| Mary.Olin@parke-davis.com ▼ | Load Actor | | Download This Information |
|---|---|---|---|

| Basic Actor Information | |
|---|---|
| Actor Name | Charles Berber |
| Actor Job Title | Chief Marketing Officer |
| Primary Affiliation | ABC Corp |
| Office Information | 212 Broadway, Greenville USA |
| Home Information | 88 Chestnut Lane, Holloway |

| Actor Interaction Information | |
|---|---|
| Electronic Identities Found by System | charles_berber@abccorp.com, charlesb@uialumni.ui.edu, charles96@yahoo.com |
| Human-identified Identities | busybee234@aol.com, chuck_outside@yahoo.com |
| Further Possible Unconfirmed Identities | happylover@yahoo.com |
| Primary Email Account | charles_berber@abccorp.com |
| Primary IM handle & account | Cberber96, on yahoo! IM |
| Top 30 closest actors report, showing for each | Click here for report |
| Top 30 Actors Sent To | Vicki Chinn, Juanita Hernandez, Ted Johnson |
| Top 30 Actors Received From | Vicki Chinn, Ted Johnson, Alfred Jones |
| Top 30 Actors Who Received Email from this actor via mobile device | Click here for report |
| Top 30 outside domains sent to | xyzcorp.com, yahoo.com |
| Languages Spoken: | English, French |

| Speed Report | |
|---|---|
| Whose e-mail did this actor tend to open the most quickly? | Vicki Chinn |
| Whose e-mail did this actor tend to delete without opening? | Alfred Jones |
| What is this actor's typical response time | 2 hours, 14 minutes<br>Click here for Full Actor Heartbeat Report |
|     TOD (time of day)<br>    DOW (day of week) | Click for graph<br>Click for graph |
| What count and percentage of this Actors outbound messages are:<br><br>    Originated<br>    Replies<br>    Forwards<br>    Include one BCC<br>    Include more than one BCC | <br><br>2%<br>78%<br>20%<br>3%<br>1% |
| Count and percentage of messages sent inside company/outside company<br><br>    Originated<br>    Replied<br>    Received | <br><br>12%<br>87%<br>1% |

Figure 4B

| Return Receipt / BCC | |
|---|---|
| How frequently does this Actor request return receipts? With whom? | 100% of the time with Ted Williams<br><br>22% of the time with Bob Pak<br><br>3% overall |
| Return Receipt Response: How often does this Actor allow return receipts to be sent? | 24% |
| To whom does this Actor forward the most messages? | Vicki Chinn |
| Whom does this Actor BCC most frequently? | Vicki Chinn |
| For whom is this Actor most frequently a BCC recipient? | Vicki Chinn |

| Daily Behavior | |
|---|---|
| Typical "first e-mail of day" received | Vicki Chinn |
| Typical "first e-mail of day" originated | Vicki Chinn |
| Typical "first e-mail of day" response | Vicki Chinn |
| Typical "last e-mail of day" received | Ted Johnson |
| Tyical "last e-mail of day" originated | Ted Johnson |
| Typical "last e-mail of day" response | Vicki Chinn |
| Who does this actor give instructions to? What type are they? | Mary Popper: average of 23 explicit instructions per day |
| Who does this actor get instructions from? What type are they? | Ted Robbins; average of 10 explicit instructions a day<br><br>Jane Koss; average of 3 implicit instructions a day |
| Does this person tend to batch read all overnight e-mails then respond, or to read and respond rapid fire? | Rapid Fire |

| Actor Attachment Report | |
|---|---|
| Count and percentage of e-mails received with attachments | 3,745 (15%) |
| Count, percentage and IDENTITY of e-mails with attachments NOT found anywhere else in the data set | 148 (2%) - Click here for list of related items |
| Top 10 attachments in total data set, and which of those this actor possesses | Click here for list of related items |
| For each attachment, list who else in data set possesses it | Click here for list of related items |
| For situations where hard drive was imaged, report on | correlation between files found on hard drive and attachments found in e-mail |
|     Files originated on hard drive and to whom they were sent | Click here for list of related items |
|     Files detached FROM inbound e-mails and from whom they originated | Click here for list of related items |

Figure 4D

| Meeting Report | |
|---|---|
| List of regularly scheduled meetings attended | Click here for report |
| List of instances of each of these meetings missed | Click here for list |
| Where each of these meetings were held | Click here for details |
| How often these meetings were rescheduled | Click here for report |
| Are there meeting minutes or other documents typically associated with it | Click here for details |
| List of meeting requests received that were rejected | Click here for report |
| List of meeting requests made that were rejected | Click here for report |
| Actors met with individually the most | Click here for report |
| Actors met with the most (all meetings) | Click here for report |

| Actor Proximity Report    Click here for visualization | |
|---|---|
| List of 10 Most Proximate Actors – Professional | Vicki Chinn, Bob Colton, Bill Kwok<br><br>Click here for full report |
| List of 10 Most Proximate Actors Personal | Vicki Chinn, Grant Mackey, Gina Kiley, Jane Berber<br><br>Click here for full report |
| Most Proximate Actors Both Personal & Professional | Vicki Chinn, Grant Mackey, Bob Colton, Gina Kiley<br><br>Click here for full report |
| 10 most frequently discussed topics within this group | Click here for report |
| Languages used | English, French |
| Media used to communicate | Click here for report |
| Identities/Aliases used | Click here for report |
| Tones most frequently appearing | Click here for report |

| Events & Appointments Report | |
|---|---|
| List of social events invited to | Click here for report |
| Attended? | Click here for report |
| List of recurring personal appointments | Click here for report |

| Travel Report | |
|---|---|
| List of work-related trips taken | Click here for report |
| Link to expense and/or trip reports | Click here for list |
| List of other actors on the trip | Click here for report |
| List of vacations taken | Click here for report |

| Mindshare Report    Click here for visualization | |
|---|---|
| Percentage breakdown of inbound correspondence by topic | Click here for visualization |
| Percentage breakdown of outbound correspondence by topic | Click here for visualization |
| With closest actors only | Click here for visualization |

| Document Report | |
|---|---|
| Types of reports and other documents that this actor creates | Click here for report<br>Click here for document lifecycle views |

For each individual control for the item...

*Items or pieces may be allowed to reconstitute into discussions in workflow if their workflow state becomes compatible again, for example, if review decisions that caused the discussion to have to be exploded are later reversed.*

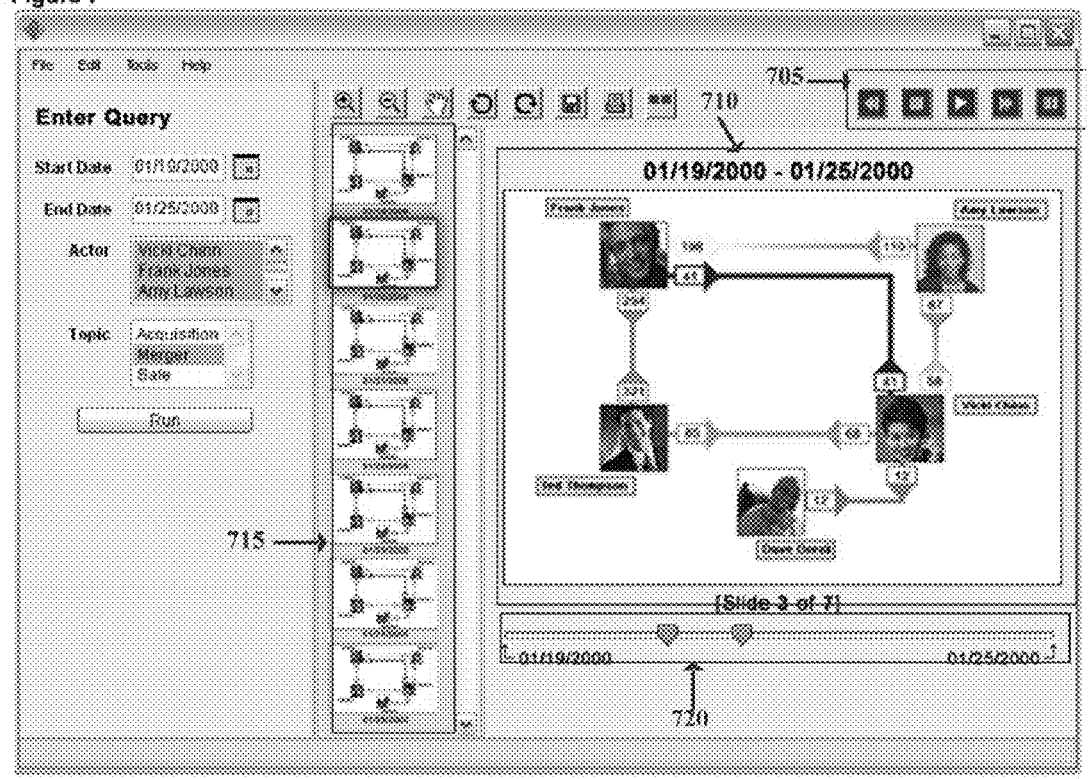

Figure 10

| Event & Attendees Report | |
|---|---|
| Name of event | RP meeting |
| Location | Mainzer Landstrasse 213<br>60314 Frankfurt am Main<br>Germany |
| Date | 05/10/2001 |
| Description | monthly resources planning meeting |
| Sponsors | Kotalek GmbH, Beiermeier AG |
| Periodic event? | every month |
| Documents which preceded the event | Agenda, Reminder, |
| Documents which followed the event | Meeting Minutes |
| Actors who were invited and certainly attended the event | Thomas Meier, Susan McArthur,<br>Kelly Burton, Andy Powell, Lew Dolin |
| Actors who were invited and probably attended the event | Jason Meyers, Keith Scottson, Sophia Lim |
| Actors who declined the invitation | Aaron Thies, Hector Cook, Steve Barne |
| Actors who were invited but whose status cannot be assessed at all | Lee Sparks, Mark Beals |
| Actors who were not invited, but who had demonstrable knowledge of the existence of the event | Laura Siegler, Sonya Sloan |
| Actors who were not invited but could have been expected to be | Ian Patton, Scott Patterson |

Options for Display of Quoted Text

METHOD AND APPARATUS FOR SOCIOLOGICAL DATA ANALYSIS

RELATED CASES

This application is a continuation of U.S. patent application Ser. No. 11/497,199, U.S. Pat. No. 7,519,589, filed Jul. 31, 2006, the full disclosure of which is herein incorporated by reference for all purposes.

U.S. patent application Ser. No. 11/497,199, U.S. Pat. No. 7,519,589, filed Jul. 31, 2006, is a continuation-in-part of U.S. patent application Ser. No. 10/358,759, filed Feb. 4, 2003, now U.S. Pat. No. 7,143,091, which claims priority to Provisional Patent Application Ser. No. 60/354,403, filed Feb. 4, 2002, the full disclosures of which are herein incorporated by reference for all purposes.

FIELD OF THE INVENTION

This application relates to data analysis, and more particularly to a sociological data analysis.

BACKGROUND

This application addresses an invention to substantially improve the complex effort of responding to a discovery request, and the demands of performing an investigation. The two halves, which are often performed in parallel we will call review and investigation respectively.

Common legal practice in responding to a discovery request often requires that data pertinent to a matter should be reviewed for relevance and privilege. A common review method is when reviewers annotate items with one or more tags indicating how the content should be categorized. Based on these reviewer categorizations, each item either produced to the counter party, or noted in a privilege log but (generally) not produced, or nor produces because of irrelevance to the discovery request. The traditional process of handling a discovery request is time and labor intensive, and as a result has a high cost. Furthermore, it is extremely difficult to obtain consistent and accurate results amongst reviewers which is a significant problem in itself, but especially when there are a large number of reviewers working to meet a discovery request.

The continuing increase in the amount of corporate data that is necessary to reasonably meet a discovery request is creating an extra burden on the existing art. Therefore it has become common practice to use "keyword culling" to reduce the number of items reviewed. However, keyword culling is extremely inaccurate and other well-known automated categorization techniques have therefore been attempted. Unfortunately, these automated categorization methods are usually overly simplistic and can introduce real risks. Relevance to a discovery request cannot be judged only by the presence of keywords or simple analyses of the data. For example, consider the simple case of an email that in its entirety reads: "Yes, let's proceed", which could be an authorization to commit fraud or something that is completely innocuous. Nor can relevance be adjudged accurately by statistical categorization methods, since very slight differences in content can make the difference on whether an item is produced or not produced; matters hinging on jurisdictional issues are one of many excellent examples of this.

To improve upon the existing art in a realistic and comprehensive manner, many factors must be taken into account, including:

Requirements for accuracy and completeness are very strict. The consequences of failing to remove material containing confidential or privileged material may be severe. The courts also frown upon "dumping" large numbers documents that are non-responsive to the original request, and can even impose sanctions on this basis.

The categorization requirements are varied and can include "hard" constraints such as conformance to relevant date ranges or custodial ownership, as well as broad references to a general topic—and all points on the continuum in between.

Corpora very often contain multiple foreign languages.

It is very difficult, and sometimes nearly impossible, to quickly and effectively train large numbers of document reviewers on how to interpret detailed and often highly industry specific data.

The task of document review is an extraordinarily tedious one, and reviewers can easily become bored and have their attention drift.

It is therefore necessary to have an objective and rapid means of assessing reviewer accuracy and providing feedback.

Large data files such as spreadsheets or dumps of database contents can confound most automated categorization techniques.

"Short format" items such as email responses or IMs can be sufficiently lacking in content that they require other related items—such as those identified by discussions, in order to accurately assign any meaning to them.

Large corpora are heterogeneous and distributed over items of many different types, from emails and different kinds of short message formats, to typical office and business documents to very large data files.

The invention document herein, and in the parent application accounts for all of these factors in order to help users meet the stringent requirements of a discovery request as efficiently and effectively as possible.

A first step of handling a discovery request often involves an investigative effort where the party served with a discovery request is interested in making its own conclusions about the matter at hand. It is often important for both review and investigation tasks to be done in parallel for the simple reason that the investigation effort may in some instances dictate that a case should simply be dropped, or that an attempt should be made to settle it based on "bad fact patterns." While review and categorization of individual items is necessary in order to determine which items must ultimately be produced, it is a much different task than trying to analyze the collective meaning of the data.

Analyzing corporate data for its meaning can quickly provide information about exactly what happened, and who might be important to an investigation effort. In order to support the investigative task, the present invention provides visualization, analysis, and a powerful query engine for many dimensions of actor behavior, with special attention given to how these different dimensions change over time, and may be correlated to one another. In addition, factors such as the emotive tones present in communication, and the apparent avoidance of written communication media are analyzed and visualized.

SUMMARY OF THE INVENTION

A method to enable improved analysis and use of sociological data, the method comprising identifying causal relationships between a plurality of documents, identifying a plurality of characteristics of a communication, including a modality used, actors involved, proximate events of relevance, and enabling a user to query based on the available characteristics.

BRIEF DESCRIPTION OF THE DRAWINGS

FIG. 2 is a diagram of one embodiment displaying key concepts related to sociological data mining.

FIG. 3A is a screenshot of one embodiment of a user interface design to represent discussions.

FIG. 3D is a screenshot of one embodiment of a discussion showing a PDA icon.

FIG. 3E is a screenshot of one embodiment of an audit trail.

FIG. 4A is a screenshot of one embodiment of an Actor Information Report.

FIG. 4B is a screenshot of one embodiment of an Actor Information Report.

FIG. 4C is a screenshot of one embodiment of an Actor Information Report.

FIG. 4D is a screenshot of one embodiment of an Actor Information Report.

FIG. 7 is a screenshot of one embodiment of a time-lapsed presentation.

FIG. 10 is a screenshot of one embodiment of an Item Report.

FIG. 54 is a screenshot of one embodiment of an Actor Information Report.

FIG. 62 is a screenshot of one embodiment of illustrating how to correct custodial information.

DETAILED DESCRIPTION OF THE INVENTION

The following key concepts, which are illustrated in FIG. 2, are used in the present application:

Actor [205]: The human being associated with one or more distinct electronic identities [255]; for example, different email accounts, IM handles, system logins, etc. An actor [205] may be deemed to have more than one personality [250] if the content created or received by at least one of the different electronic identities [255] varies significantly from that of the others.

Actor Heartbeat [220]: A base line of the set of electronically recorded actions that an actor [205] typically performs when working. Among other things, this is used to determine when specific actors [205] were not working, or not working as they normally do.

Discussion [235]: A possibly heterogeneous partially ordered set of electronic record items for which it is presumed that any item is causally related to all items immediately following it. By "partially ordered", we mean that there is a relationship "<" between items with the property that, if L<M and M<N then L<N. If M<N, we say that N follows M. When we say that N immediately follows M, we mean that M<N, and that there is no item L such that M<L<N. A simple linear example of a discussion [235] would be that an instant message (IM) that was motivated by an email which was motivated by a phone call between the same two or more actors [205].

Figure 1A:
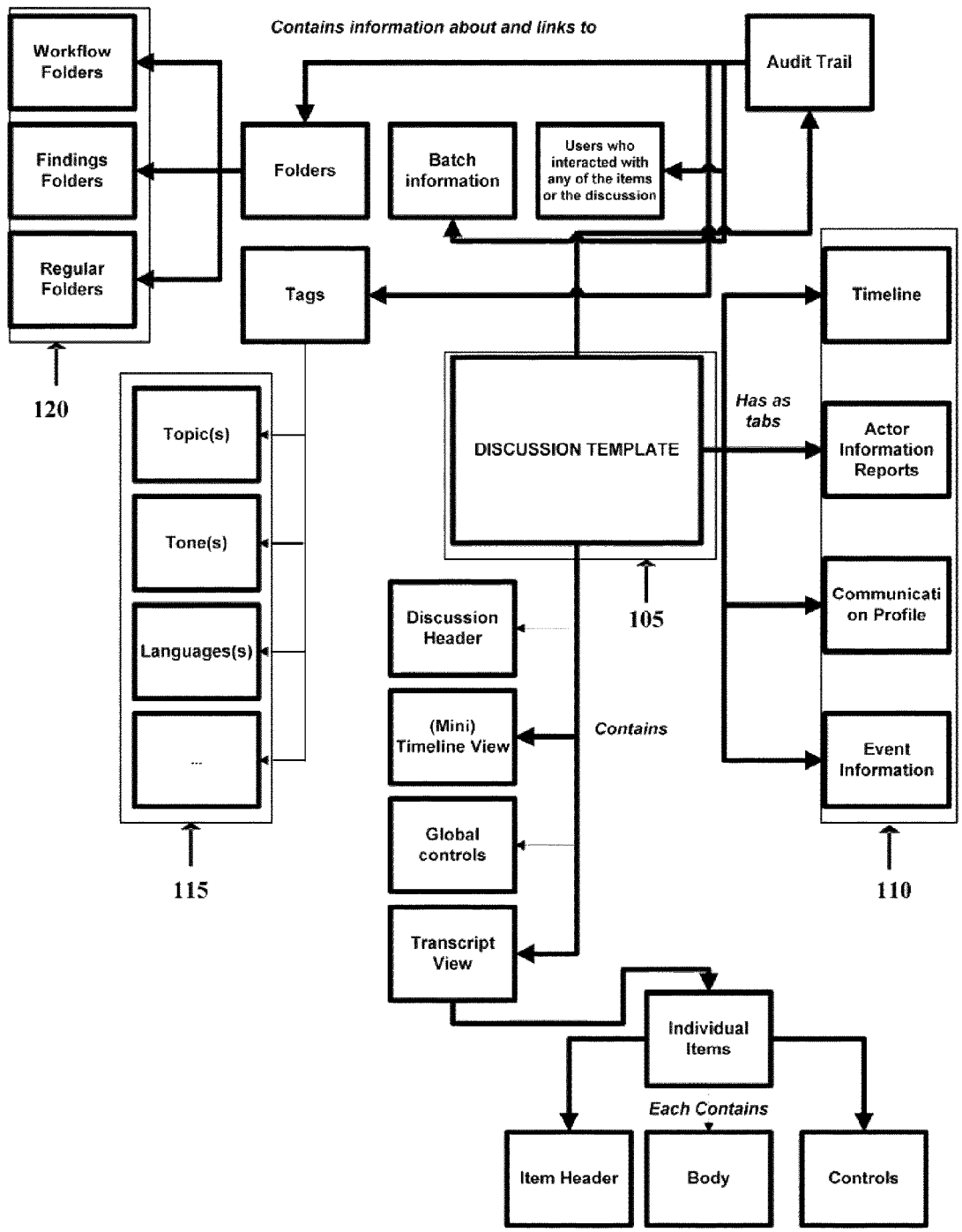
FIG. 1A is a flowchart displaying one embodiment of a high-level system overview.

Text blocks [225]: A contiguous block of text that is associated with one author, and is substantive enough to be treated potentially as an independent object in the system. User Interface Overview In most embodiments, the user interface features object-centric views of the most important types of data. The most complex of these is the discussion template [105] which allows the different items [125] of the discussion to be viewed and coded (that is, tagged with appropriate values) by the user. This is illustrated in FIG. 1A. The discussion template [105] also provides controls and displays attributes for the container object of the discussion itself. From the discussion template [105], the user may navigate to views of most of the other types of objects in the system. These objects may include, but are not limited to: Actor Information Reports, Communication Graphs that interrelate actors to one another, Event & Attendee Reports. In addition, in one embodiment, an Audit Trail screen provides a fully integrated view of all knowledge the system has about a discussion and each of its constituent objects. This includes, but is not limited to; its current state in the workflow system, which users have moved, foldered, flagged, annotated or reviewed the item and when, which types and instances of folders it currently exists in, tags assigned by the system such as the topic(s) or emotive tone(s) or foreign languages that are contained within each item, and different presumed versions of the item. Each of these elements which may be associated with a discussion is described in more detail below.

In some embodiments, the user interface is presented with conventions common to internet browsers. In most of these embodiments, central navigation is provided through a navigation bar which is always present. Its location varies with embodiment, but in most embodiments it appears either horizontally on the top of page or vertically on the left-hand side of the page.

Figure 1B:
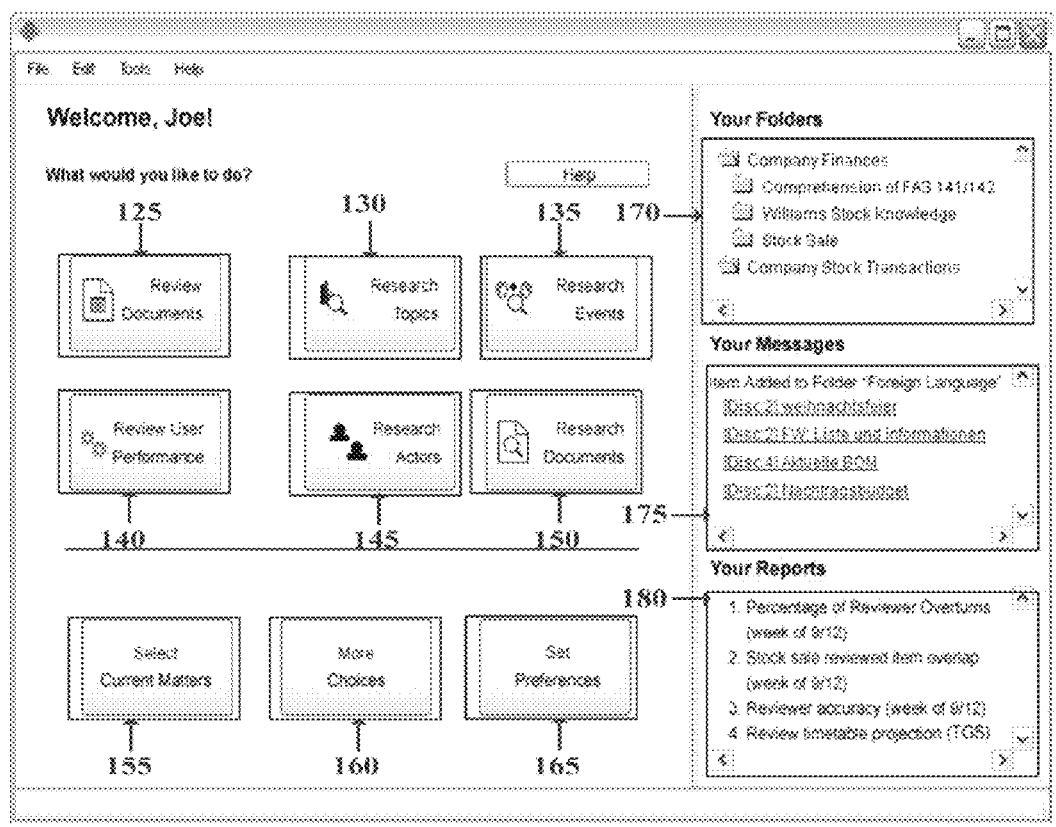
FIG. 1B is a screenshot of one embodiment of the main navigation window.

However, other embodiments are implemented according to full desktop or "thick client" GUI conventions. In many of these embodiments, when the user launches the application and has authenticated, a main navigation window is provided as illustrated in FIG. 1B. As pictured in FIG. 1B, in one embodiment, the main function of this window is to facilitate the user making an initial selection from the many task areas provided by the system. Because of the large number of visualizations and reports provided by the system, for most types of objects a default view type can be configured, in most embodiments. In some of these embodiments, these defaults may be attached to specific matters, for example, a specific investigation, rather than being global in nature. This is because what aspects of the data are most important to understand may vary greatly with the specific scenario at hand. The user may select the "Set Preferences" button [165] in order to display, select and scope the available preferences. Note that although two interfaces are shown, one of skill in the art would understand that alternative conventions—such as radio buttons, pull-down menus, floating menus, command-line interfaces, or other methods of displaying and selecting options—may be used. Furthermore, data may be presented in windows, frames, or alternative display mechanisms may be used.

The "Review Documents" button [125] if selected will take the user to either a set of batches of documents that she has been assigned to review, or to controls that allow her to assign batches, either to herself or to other users of the system. Configured preferences, and whether the user in question has administrative privileges determines which.

The "Review User Performance" button [140] if selected will, depending on configured preferences, bring up reports on reviewer performance. In some embodiments, it may instead bring up a panel with a list of links to reports. In most embodiments, if the user does not have administrative privileges, this button will not appear or will not be available for selection.

The research-oriented buttons [130, 135, 145, 150] can be configured to bring up a particular window of the user's choosing. As will be discussed in subsequent sections, in most embodiments the system can generate many varieties of windows which are divided between a specified set of query controls and a resulting visualization once a query has been executed. If the user decides that she wishes to research actors, clicking on the "Research Actors" button [145] can bring up a window with query controls featuring a list of the actors of greatest interest for her to choose from and which will return results in the user's preferred visualization. Examples of the many variations available will be provided in subsequent sections.

In some embodiments, some of these buttons do have default views that they are associated with. For example, the "Research Actors" button [145] may bring up a panel that allows the user to select one or more actors, or actor groups. Once he has done so, the Actor Information Reports for these actors will be generated and displayed. Similarly, the "Research Events" [135] may bring up the "Events & Attendees" report, and the "Research Documents" button [150], the Document Lifecycle View.

The "Your Folders" section [170] of the screen displays the user's personal folders of different types. "Your Messages" [175] contains any notifications sent by the system, as well as messages broadcast by other users of the system. "Your Reports" [180] contains a list of reports that were generated at specified intervals as requested by this user.

The "Select Matter" button [155] allows the user to limit the current session to one or more particular matters, for example a specific investigation or other project. Selecting a particular matter will have the effect in most embodiments of limiting the information available for display. For example, if one or more particular matters are selected, actors who are not relevant to these matters will not be available in the system, and will not be visible in any way to the user. Note that since distinct investigations may often overlap with one another, there may be instances where selecting more than one matter is highly useful. If all of the projects that a given user is working on are interrelated in some fashion, by not selecting a matter, in most embodiments, the user will see all data related to the different matters as if it were a single collection of data. The ability to combine information from different matters—and in some embodiments—even automatically recalculate actor identities and discussions accordingly—is also highly advantageous in order to quickly determine how much interrelationship there is between actors, documents, discussions, etc in matters that are ostensibly different from one another.

New Discussion Template

The screenshots illustrated in FIGS. 3A-G represent one embodiment of a discussion template. Some of the features available in the discussion template in one embodiment include: a timeline view [310], a special toggle [308] will open or hide the global controls [309], and a "duplicate" indicator [333].

The timeline view [310] is one way of viewing a discussion. As pictured here in one embodiment, the timeline view [310] is displayed in the top frame of the window. The timeline view [310] depicts in parallel different kinds of activities which include but are not limited to email, IM, SMS, phone call activity, journal entries, notes and calendar entries. Most of these activities correspond to individual items in the discussion, in most embodiments. However, not all. For example, key external events of importance that transpired during the lifespan of the discussion may also be rendered in this view in some embodiments. Other embodiments will include additional types of communications, such as faxes or pages from pagers as well, and other types of time-related entries including but not limited to meetings, and the travel of different actors [205] participating in the discussion [235]. In one embodiment, each of these different kinds of activities is represented by a box [326] which upon mousing over, or in some embodiments, clicking, provides more information on the activity. In some embodiments, each kind of activity is depicted on its own display line [311] in order to be able to display concurrent events, such as IM's that are being sent during the course of a meeting. In some embodiments, different shapes or visual representations could be used to indicate the presence and relative length/strength/significance of an item. In some embodiments, clicking on the shape causes the frame to make the selected item the topmost one.

The width of the boxes [326], in one embodiment, depicts the length of time over which the activity took place. For example, in FIG. 3A one can see that the IM activity lasted for about an hour out of total of four hours for the entire timeline [310]. In one embodiment, there is a control [301] that causes the view to be popped out and displayed in a separate window (not shown). This is especially useful when the timespan covered by the discussion is long, and/or when the number of items is large. In one embodiment, there is a control which allows the user to toggle to see all traffic among the parties in question during the timespan of the discussion.

Figure 3B:
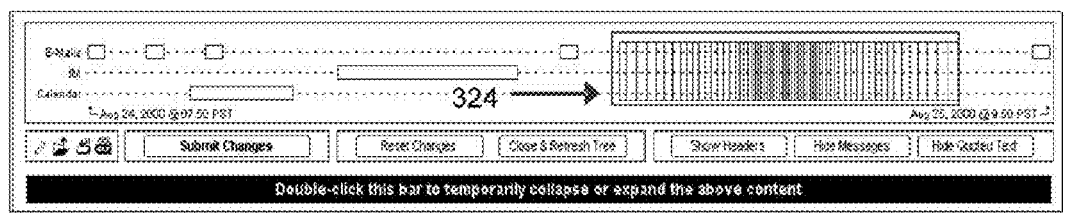
FIG. 3B is a screenshot of one embodiment of timeline shaded in vertical sections by color to indicate nights and days.

In most embodiments, the time zone used in the timeline view [310] will default to that of the majority of primary actors in the discussion. In some embodiments, if primary actors are in different time zones, an indicator will appear in the timeline view [310] to call this fact to the user's attention. In some embodiments, the timeline is shaded [324] in vertical sections by color to indicate days, nights, and weekends and holidays, as illustrated in FIG. 3B. In some of these embodiments, weekends are drawn in a different color than are holidays. In some embodiments, other visual indicators including, but not limited to patterns, shapes, backgrounds tiled with images and animated effects are used to indicate days, nights, weekends and holidays in the timeline view. In many of these embodiments, the concept of "day", "night", "weekend" or "holiday" are calculated on the basis of characteristics of the primary actors in the discussion. These include, but are not limited to: what time zone and country they are in, their standard hours of work as can be determined by the relevant statistics from the Actor Information Report, and their standard days of working. In other embodiments, the computation may be done for all actors in the discussion, or all actors in the corpus, or may be defined by the user.

Figure 3C:
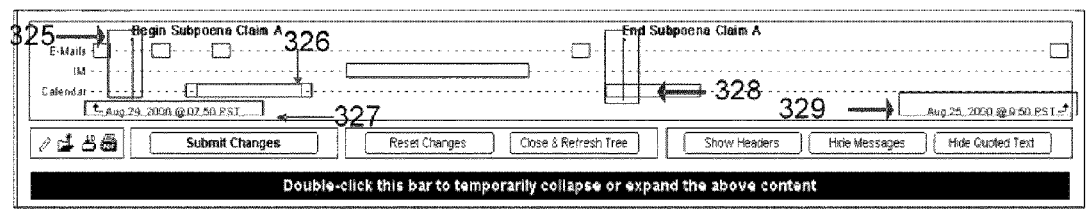
FIG. 3C is a screenshot of one embodiment of a vertical timeline color display indicating start and end of relevant time interval.

Optionally, vertical lines may be displayed to indicate the start and stop of intervals of interest with respect to the document review effort, for example, for different claims in a subpoena, or of the subpoena itself. This is illustrated in FIG. 3C. By way of example, investigations are often limited to a specific interval of time. If a document lies outside of this interval of time, it may not need to be looked at all, or reviewed against as many different criteria. Multiple pairs, or even unpaired and start and stop lines [325], [328] are therefore permitted in most embodiments. In many embodiments, the start lines [325] are green which indicates the starting date [327] and optionally, time; the ending lines [328] are red which indicates the ending date [329] and again optionally, time. Both may be labeled with brief labels, and/or have more descriptive labels that may be seen via mouseover. Further, in some embodiments of the invention, these subpoena cut-off indicators [325, 328] are used in conjunction with workflow rules that provide a warning to the user that a review decision may be inappropriate on the basis of timeline. In one embodiment, the system may then bring the timeline view [310] into focus. Attention may be called to the relevant timeline [310] cut-offs [325, 328] by animating the line, highlighting it, circling it, or otherwise visually calling attention to it. In some embodiments, an arrow or other vertical divider could be used instead of a line.

This timeline [310] representation provides various advantages. It shows how different types of time spanning objects overlap with one another. For example, if a meeting lasted for 4 hours, during which time 3 emails were sent, and 10 rounds of 1M were exchanged among the relevant actors, this fact could very easily be seen by a quick look at this view. By contrast, a view that showed each object as a box of approximately fixed width provides much less information. In that view, a meeting that was scheduled to last a week does not visually appear longer than a five minute IM conversation. Furthermore, it is difficult to see what else occurred over the weeklong meeting, since the object representing the meeting would not visually appear to span a week.

This view helps reviewers assess the different items with respect to subpoena cut-off dates [325, 328], which is very useful in increasing both the accuracy and speed of review decisions.

This view is visually compact enough that it can reasonably be displayed in the same window as the rest of the transcript view [313] so that it is immediately present to provide guidance. Note that in an alternate embodiment, the timeline view [310] may be presented in a separate window, or frame.

Some embodiments of the discussion template may feature slightly different embodiments of the timeline view [310]. Further, in many embodiments of the system, the timeline view [310] is widely used in different kinds of query results, both to support graphical querying, and to more vividly illustrate the time intervals in which the relevant communication events were occurring.

In some embodiments, individual item controls [316] may be hidden or viewed via a special toggle button [322] on an item by item basis, or globally. In one embodiment, item controls [321] will be displayed for any item whose state is in some way different with respect to the settings of these controls [321] from the parent discussion. By hiding controls in general, a significant amount of screen real estate is saved, and it removes some visual distortion of the data from how the original viewers of the item saw it (because the content would be more horizontally compressed than it would normally be in a full screen view without the controls.) If the controls are displayed for some individual items but not others, this provides an important visual cue to the user that, for example, item #17 in the discussion has a different review state than the 21 other items in the discussion. In some embodiments, the individual controls [321] include a control that allows the setting of an individual item to be used for all items; in other embodiments, the same control promotes the current item's state to that of the discussion as a whole (from which other current and future members will inherit.) This is useful because often a reviewer may be tempted to use the global controls [309] at the top of the screen to code the whole discussion, based on what she initially sees of the first item or two. However, especially in the case of long discussions, there may be some information much further down that retroactively changes the reviewer's impression of all that has gone before. With the promotion control, the reviewer no longer needs to go back and change the global controls [309], or those of other items, once having done so for the item in question. The location of the controls to code individual items may be located anywhere visually apparent to the user—in one embodiment, the controls [321] are located to the left of the content.

Note that some embodiments will support document type-specific controls. This may be necessary, for example, because a subpoena might not include a requirement to produce certain types of items, which may nevertheless end up in a discussion [235]. In such an instance, there might be no controls [321] made available for these items. Conversely, there could be additional controls [321] for certain types of items which might be desirable, but which would not have further applicability—for example, a checkbox to indicate whether a speech-to-text transcript of a phone call was decipherable. In most embodiments, in this latter case, the discussion cannot be moved along in workflow until all additional required item controls [321] have been set. In some embodiments, if a discussion contains multiple items of a type that require additional control(s), the control(s) in question will be dynamically added to the global controls [309].

In one embodiment, the user is allowed to select different blocks of text from within the transcript view [313]. The selection brings up a panel where the user may indicate that the presence of this particular text causes any item that contains it to be coded in a certain way. For example, as responsive to specification 1 of a particular subpoena. As a result of such coding, all documents which contain the relevant text are coded as responsive. In some embodiments, the scope of this action is restricted to the current discussion, but others may allow different scopes, including related discussions, all items pertinent to particular matters, or even the whole corpus.

Note that while in some embodiments, discussions are the default type of collection in which items are presented, other types of collections may be used as well. These include, but are not limited to: clusters of different kinds, different presumed versions of the same document, and different editions of the same kind document—for example, a report that is created once a month.

A special toggle [308] will open or hide the global controls [309] for the parent discussion. This is done to conserve space, as these controls could in some cases consume a considerable amount of screen real estate. In some embodiments, these controls are collapsed automatically if there are items in the discussion that have, or are inferred by the system to have, heterogeneous review properties.

Presentation of Duplicate-Related Information

Figure 3F:
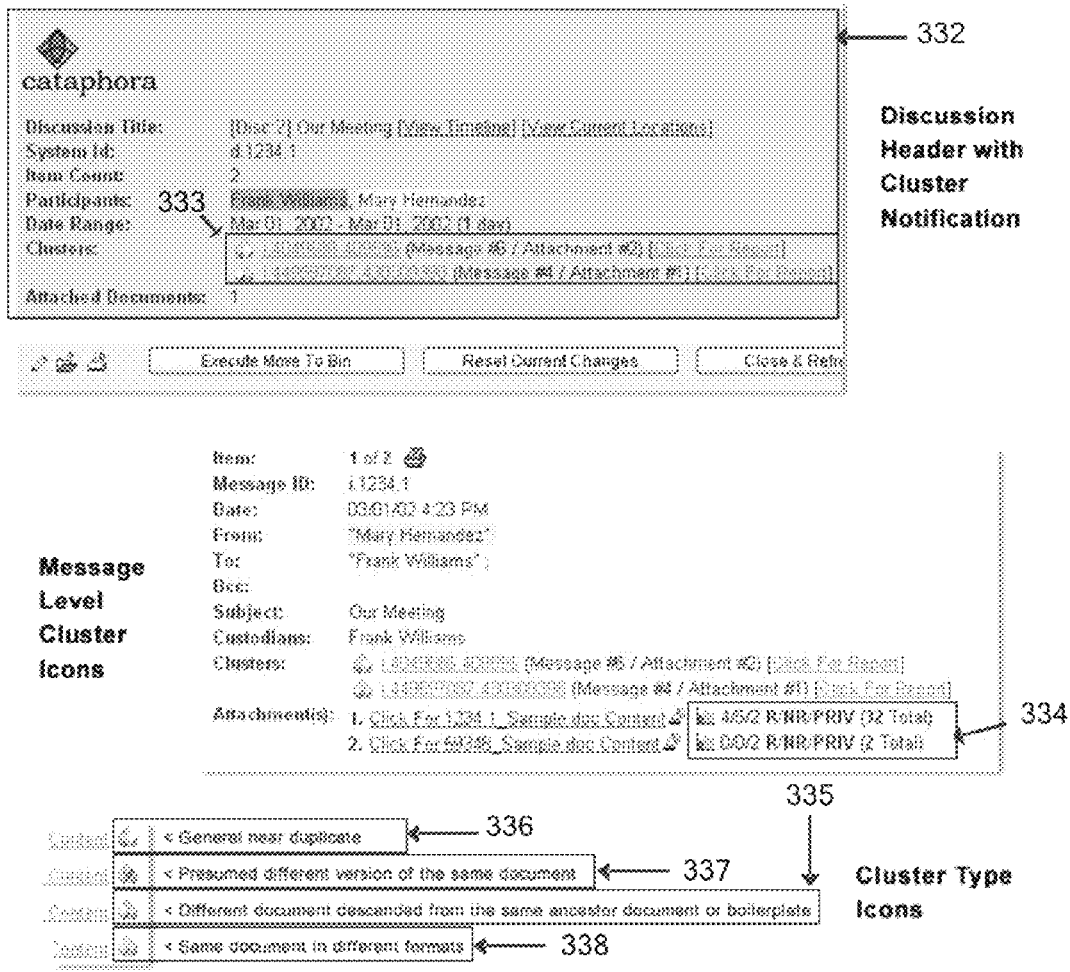
FIG. 3F a screenshot of one embodiment of a cluster header at the discussion and message levels.

A "duplicate" indicator [333] is added to show which attachments—or other discussion members—are duplicates, near duplicates, or prior or subsequent versions of one another. In one embodiment, the following variations are provided for with their own icons; other embodiments could have additional ones as illustrated in FIG. 3F. The term "duplicate" in one embodiment includes one or more of the following:

a true duplicate a general near duplicate [336] (In some embodiments, this is used as a catch all category to capture cluster-based relationships that are not of one of the more specific defined types, while in other embodiments it is used to refer to all such relationships inclusively.)

a presumed different version of the same document [337], different documents descended from the same ancestor document or boilerplate [335], and the same document in different format [338], such as a Word document versus a PDF document.

Figure 3G:
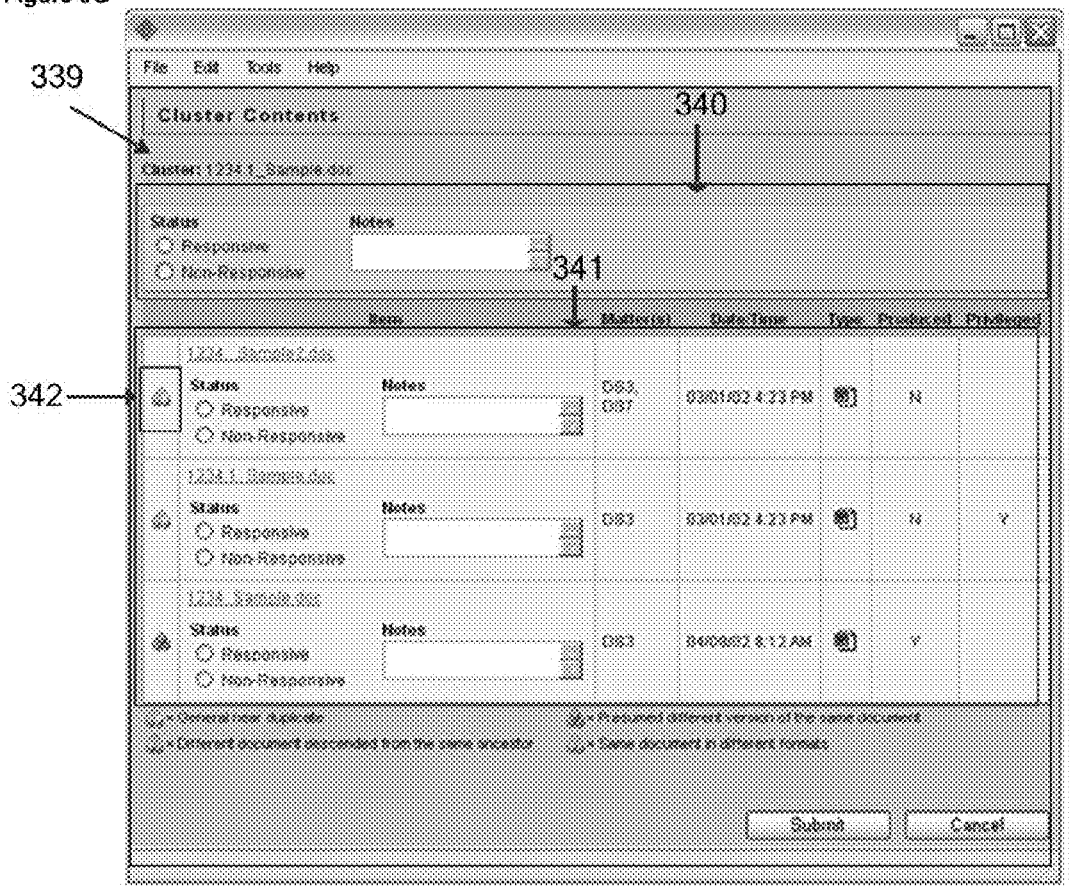
FIG. 3G is a screenshot of one embodiment of displaying Cluster contents.

In some embodiments, this "duplicate" information also is displayed in the header information [332] for the discussion. This may include a visual indicator [333] as indicated in FIG. 3F, which may be clicked, in one embodiment, in order to navigate to other related items. In some embodiments, clicking on this control [333] brings up a panel [339] which contains information about the applicable category of related documents, and controls to code them. As shown in FIG. 3G, in one embodiment, this includes a tabular view [341] with links to all related documents, such as different versions of the same document, or items that are for whatever reason in the same cluster(s). In some embodiments, there is an icon [342] associated with each document that indicates the more exact nature of its relationship to the parent document, for example that it is a "general near duplicate." In one embodiment, global coding controls [309] allow the bulk coding [340] of all items in the cluster. This is pictured in FIG. 3G. In one embodiment, each item in the cluster also has individual coding controls. In some embodiments, items are designated by a different color and/or visual indicator based on the nature of their relationship to the selected item, as shown in the legend [342]. In some embodiments, related items that also belong to the current discussion are also designated by some type of different color and/or visual indicator. In one embodiment, this panel [339] provides links to one or document lifecycle views that are associated with the displayed items. This is a view which displays the different iterations and versions of an item that came into existence over the course of time. One embodiment of the document lifecycle view is shown in FIG. 5I.

This collection of features provides a huge time savings advantage for the user, because, for example, if the same 200-page document shows up 4 times in the same discussion [235], she needs now only review it once. In addition, this feature allows different kinds of near-duplicate items to be reviewed at the same time, thereby saving time. In one embodiment, the system may perform a "diff" (showing differences between items) of these near duplicate items against one another, in order to further facilitate this task.

Figure 3H:
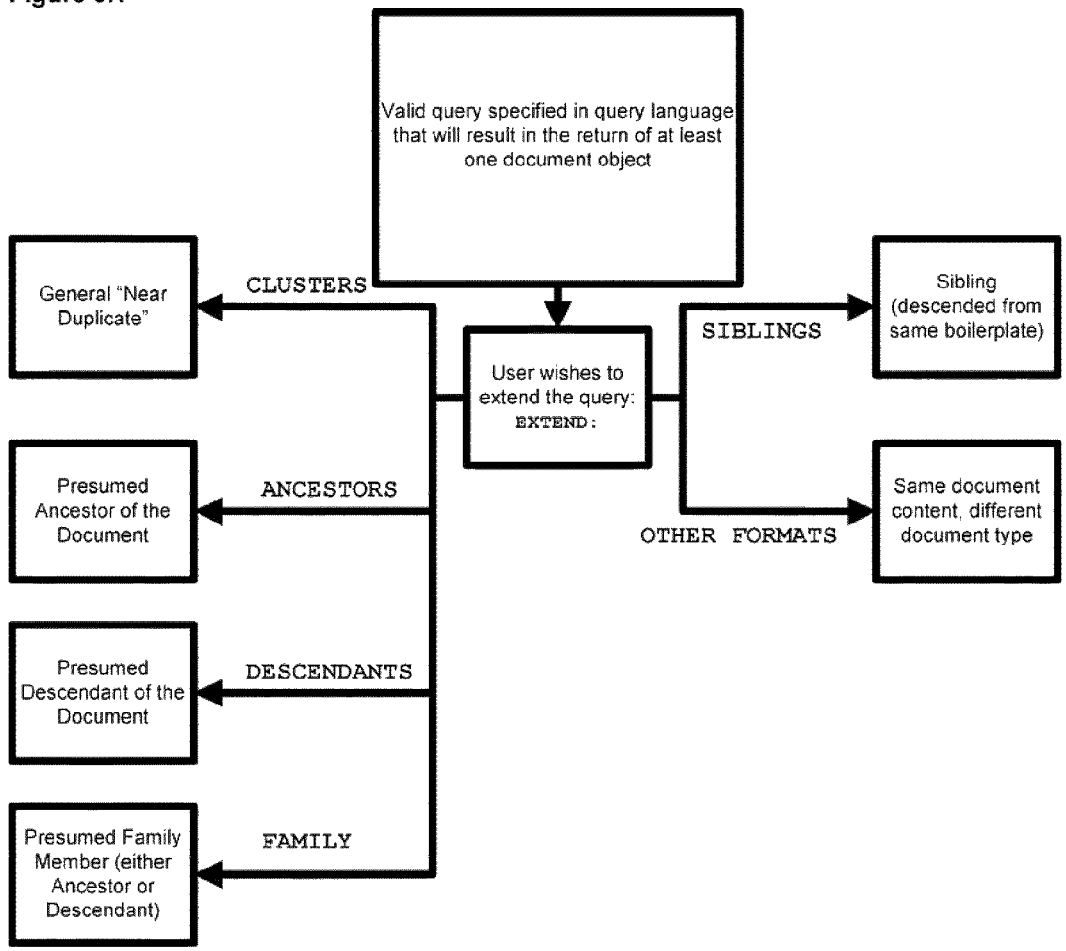
FIG. 3H is a diagram of one embodiment of how a user can extend the query to search for any potential variance of a document.

In one embodiment, each of the types of indicators noted above has corresponding operators in the query language. In some embodiments, additional related operators exist. For example, in one embodiment there are separate operators for prior presumed version versus subsequent one, and descendants from true widely used boilerplate versus the case in which different branches from the same document develop over time. This enables a user to select a document, and search for any of the potential variants of the document, collectively, individually, or by any categorization. One embodiment of the query operators is pictured in FIG. 3H.

In one embodiment, an evidence type indicator [317], and a day/night indicator [343] are added to the transcript view [313]. Clicking on the day/night indicator [343] brings up a panel that provides information as to the normal working day of the primary actors in the discussion when the indicator is in the discussion header [332], and the actors associated with the particular item when the indicator [343] appears in an item header. In some embodiments, this information is obtained by averaging the start and end times of business-related communication on working days. In other embodiments, this information is obtained using other techniques including, but not limited to, median of start and end times of business related communications, or other metrics that are captured in different embodiments of the Actor Information Report. In other embodiments, the system uses information from human resources database to determine a particular actor's working day, which may include when the employee timed in, entered their physical place of work with a security card, or logged into a particular system. As will be noted in a subsequent section, this is often very important perspective to have in an investigation, in which deviations from established standard behavior of an individual or larger entity may be of great interest. Clicking on the evidence type indicator [317] brings up an explanation as to why that particular item was brought into the discussion, for example, that it made reference to a document that was attached to a prior email, and also involved the same actors. This is useful because under certain circumstances, attorneys might have to testify as to how specific conclusions were drawn. In the prior art, no such controls were available in the transcript view [313].

Additional layout features that may be included in different embodiments of the invention include:

A navigation control [315] which provides a means of navigating from one item to the next with a single click, thereby enabling directed navigation which is both faster and less stressful than using scrolling;

A display control [308] which provides the ability to collapse or hide the global controls [309].

The inclusion of the global controls [309] in their own individual frame. The use of a separate frame enables the user to always see the state of all of the global controls. Note that in some embodiments, these global controls [309] could appear at the bottom of the window as well as the top, or in both positions. Commonly used controls such as print, redaction, and annotation are available in most embodiments for the whole discussion as well as for individual items.

Display of Actor Information

An additional display is shown in a separate Actor Information tab [303] in FIG. 3A, to provide statistical information for primary actors in the discussion. (Some embodiments may provide this information for all actors, not just the primary ones.) This is known as the Actor Information Report. An exemplary embodiment of this report is pictured in FIGS. 4A-C. This screen may be reached, in one embodiment, by clicking on any occurrence of an actor's name, in which case the window will automatically move to the information for that actor, or the report may be navigated to directly by clicking on the Actor Information tab [303].

In some embodiments, the neighborhood graph,—which may be reached via the Neighborhood tab [304]—includes a neighborhood graph [1105] for each primary actor. The neighborhood graph [1105] is a communication graph [1120] depicting the communication from one or more selected actor (s)—in this case, those in the current discussion—to those closest to these selected actor(s). "Closeness" may be defined by a metric selected by the user, for example, N handshakes out from the selected actor(s). Otherwise put, a neighborhood of radius r around a specified set of actors includes all actors that can be reached by following no more than r links.

In one embodiment, any other type of communication graph [1120] may appear as well, or may be specified as a preference on the part of the user. One embodiment provides the user with user interface controls that allow her to select the style and characteristics of communication graph [1120] that she wishes to see. (Communication graphs are explored in greater depth in a following section.)

In yet another embodiment, these two actor-related tabs [303, 304] are combined into one tab. These additions are primarily useful in an investigation context, where it is advantageous to be able to quickly get a quick appraisal of the basic status and general behaviors of each primary actor in a discussion, so as to easily determine whether the currently examined interaction falls within normal behavior patterns or not.

In one embodiment illustrated in FIG. 3A, the discussion template includes but is not limited to these features: a name associated with a discussion [302], special toggles [314] to display (or not) different portions of the individual discussion items. These include, but are not limited to: "show/hide message content", "show/hide header information", "show/hide quoted text." Other important information about the discussion and its constituent items are included in the discussion header [332] an exemplary implementation of which is shown in FIG. 3F. This includes, but is not limited to: primary actor identification, participants, the different item types present, the number of attached items, and the date range covered by the discussion. The header information for individual items contains item-level information, including but not limited to the item's name and unique ID within the system, information about any attachments and their document type and size, their item number within the discussion, the actor(s) related to the item, a time/date stamp, the evidence type indicator [317] and the day/night indicator [343]. The window in one embodiment also contains buttons that allow users to perform basic operations, such "submit", "reset" or "close" In some embodiments, indicators may appear in the item header to indicate the media used for the communication. FIG. 3D illustrates such an indicator for a PDA [330].

In most embodiments, all changes to the status of any discussion or individual item are recorded and may be viewed in the audit trail log as illustrated in FIG. 3E. This includes but is not limited to: all workflow-related changes, all queries that retrieved the item, all folders of any kind (including but not limited to user-created folders, system-created folders, and findings folders) that the object has ever been placed in, all annotations of the item, and its batch history.

Global Coding Controls for Discussions

Figure 5:
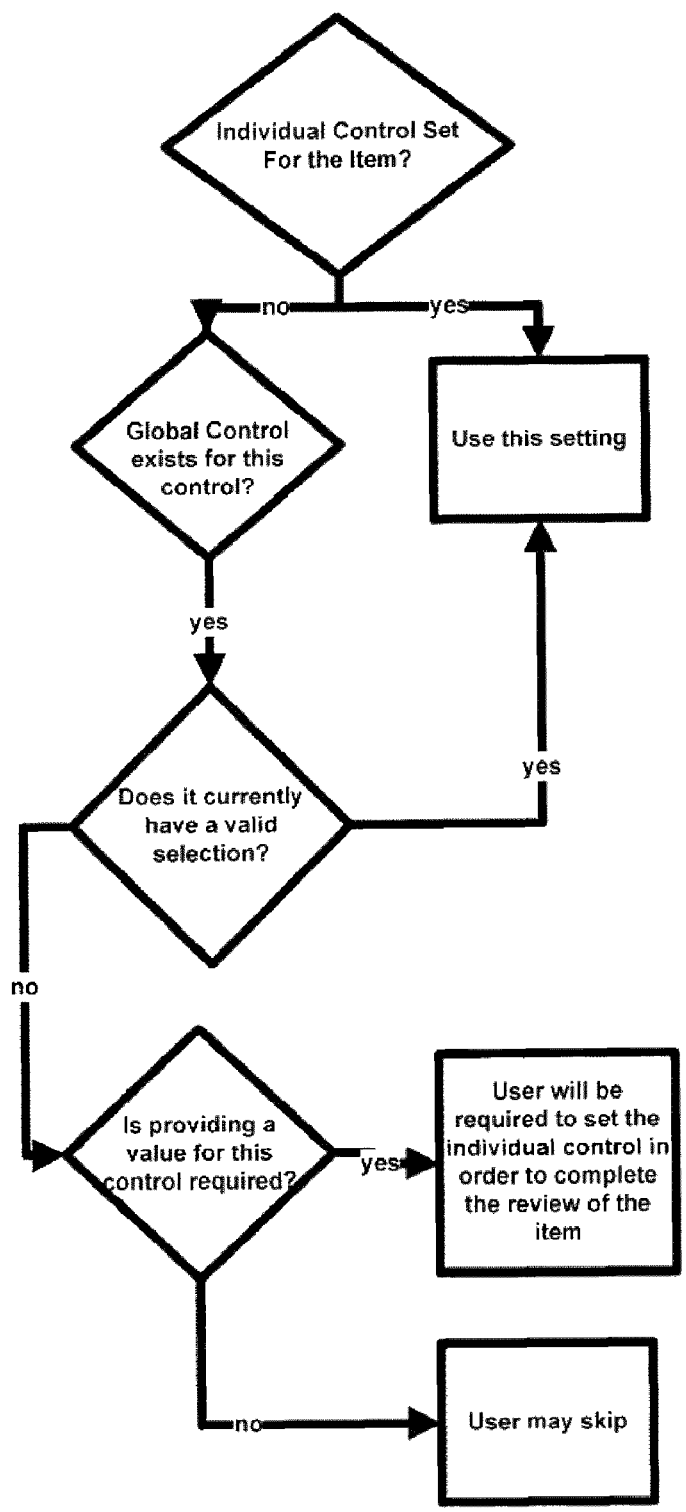
FIG. 5 is a flow chart of one embodiment of the mechanism used to determine whether an individual control is set for an item.

In the context of a review such as in the domains of litigation, investigation, or compliance assessment, in one embodiment discussions may be globally coded by using user interface controls [309]. One embodiment of the user interface controls [309] is shown in FIG. 3A. In one embodiment, these user interface controls [309] are positioned at the bottom and/or top of the window. Using these controls [309], a user can indicate that all N items in a discussion are to be treated in the same way, for example, as all non-responsive. This makes for vastly faster review, because in most cases it greatly reduces the number of user actions that are needed to complete review of the documents in a discussion. If one or more member items in the discussion require a different treatment in some respect, the global settings for the discussion can be overridden on an individual item by using controls specifically for the item. In one embodiment, these per-item-level controls [321] are hidden until made visible by the user so as to provide as much screen real estate as possible for the display of content. However, in one embodiment, as previously noted, in cases where the state of individual items differs from that of the discussion in some way, these controls, or alternative indicators of the difference in state, would be made visible automatically so that user can readily see the differences. FIG. 5 is a flowchart of one embodiment of determining whether individual controls should be displayed. These differences could include decisions made by other users as well as by the system. Some embodiments visually distinguish between the case when the user has made the decision, and the case in which the system has. For example if the system were to determine that some items were likely privileged and others not, the individual controls/indicators [321] would appear for the items that did not share the setting of the parent discussion, as a visual cue to the user. Other embodiments may include other visual indicators instead of, or in addition to this. Generally the global setting is determined by the state of the majority of items in the discussion. However, it is important to note that generally speaking discussion membership is determined by the system's assessment that items are sequentially, probabilistically, and causally related to one another and not by any other constraints, such as whether the coding (for example, in the case of subpoena response, the responsiveness or privilege settings) responsiveness or privilege settings of the items vary.

Quoted Text Display

The system allows users to display or hide the quoted text in emails, either throughout a discussion or in an individual item. Especially for users who choose to display the quoted text, there is often an advantage to displaying the items in reverse chronological order, since the first message will likely provide an overview of at least some of the other messages. For all other uses, a chronological rolling out of all exchanges between the parties, irrespective of whether the text came from the original email, or only from a quoted textblock in another email, may be more advantageous. Note that most embodiments actually are displaying discussions via a topological sort; rather than a full ordering of matters if the discussion has different branches.

In some embodiments, this display is further augmented by allowing the content from each actor, including quoted text, to be individually displayed or hidden by clicking on a show/hide toggle control. In one embodiment, the show/hide toggle control is of the same color used to represent that actor in that discussion (see section on "Configurable Highlighting of Actor Names.") In some embodiments, all textblocks from the same author, including quoted text will be displayed with the background color designated for that actor in the discussion, perhaps at a reduced saturation in order to promote readability. In some embodiments, the font color could be used instead for this purpose. This kind of display is easy to integrate with instant messages; however, it may not be ideal for situations in which an item-by-item decision on responsiveness must be made.

In some embodiments, quoted text for which the originating email no longer exists will still be displayed even if quoted text is hidden. In most of these embodiments however, such text is rendered in a different color, or with some other visual indicator to indicate its special status. In most of these embodiments, the first instance (if there is more than one) of this quoted text will be the one that gets rendered. In other embodiments, as described in Sociological Data Mining Application the system may attempt to reconstruct the missing original message.

New Actor Information Report

The screenshots illustrated in FIGS. 4A-D present embodiments of a report format for actor information. However, different embodiments may present somewhat different information. The information itemized in FIGS. 4A-D can be thought of as a detailed workup of measurable aspects of communication for an actor. The system, in one embodiment, provides the maximum possible number of dimensions in order to better detect aberrations (if any) from the standard behavior of the particular actor. This is because aberrations from standard behavior, even subtle ones, can indicate guilty knowledge, or other things of great interest from an investigation standpoint.

Figure 4E:
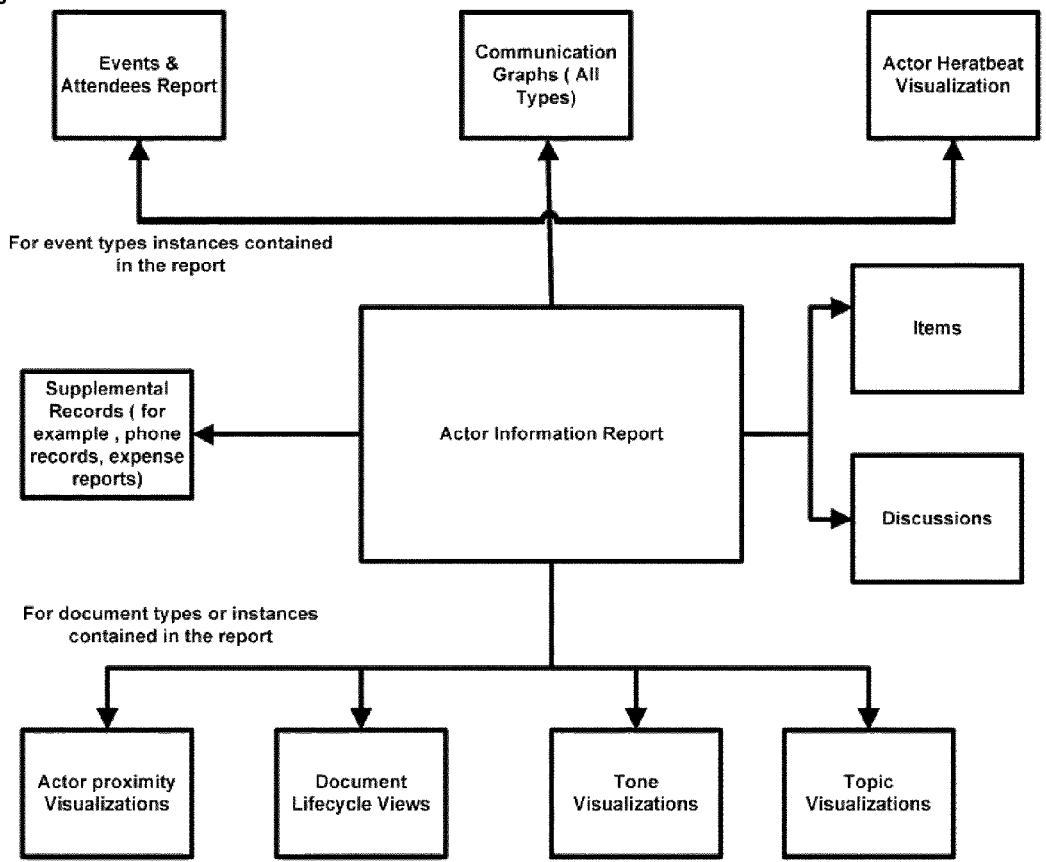
FIG. 4E is a diagram of one embodiment of the different components available in an Actor Information Report.

In most embodiments of the Actor Information Report, the user can navigate with a single click to a large number of views for other types of objects that are related to the actor(s) featured in the report. An exemplary set of data available from the Actor Information report are illustrated by FIG. 4E. The closer integration in the user interface of this information helps users to more easily understand individual discussions in the context of the broader behavior patterns of the relevant actors.

In many embodiments, actor information reports for relevant actors appear in the actor tab in the discussion template. In most embodiments, the report also is accessible from most query result views that contain actor object results. In many embodiments, the Actor Information Report is the default view type configured for the actor object.

Points of Clarification for Actor Information Report

The system will endeavor to correctly associate human actors with their various electronic identities. The Sociological Data Mining Application describes an embodiment of creating such associations. As noted elsewhere in this application, this task cannot always be done correctly by either human or machine. For this reason, different embodiments will vary in their presentation of actor identity information. For example, some will require that identity assignments be confirmed by a human administrator, while others will utilize, but enable correction, of the system assigned identity. Still others will list partial matches—that is cases in which the system has identified the possibility, but not the certainty, of the match of an identity to an actor—and optionally await user feedback.

"Primary email account" in most embodiments refers to the email account that is associated with the actor's employer. However in other embodiments, it may simply refer to the email account from which the greatest amount of content emanates over the period of time of interest. In other embodiments, other metrics, including but not limited to number of e-mail sent or received, topics and content discussed in e-mail sent or received could be used to determine a "primary e-mail account"

"Fastest response" response behavior in one embodiment is used to track normal user behavior. In some embodiments, the basis of the metric for fastest response to email is not literally based on the average interval of time taken to respond, but rather the order in which the response occurs. For example, if when Jane comes into work in the morning, she often finds that she has received 100 emails from assorted actors since she last checked, the order in which she generally opens, and then responds to these emails can be used to adduce the relative importance of the actor to her. In some embodiments therefore, the number of emails from known actors that are skipped over in order to first answer an email from a particular actor is the basis for the metric of speed.

Note however that there are some specific exceptions that must be considered. These include, but are not limited to: cases in which the sender of the message is in a different time zone, or on a different work schedule (and hence will not get the message immediately anyway), in which the language of the email is not the primary one of the recipient, and messages that require longer and/or more complex responses. This last can be captured by different embodiments in different ways, including but not limited to: assessing the number of different topics in the message, the presence of any negative emotive tones in the message, the number and organization rank of the other recipients of the message, and analysis of the length and other characteristics of the response, if it is still present to be analyzed.

"Rapid fire" response behavior can be determined by evaluating the behavior of the actor over a sufficient period of time to observe whether or not she responds to multiple messages after she has missed a few turns, or whether instead, she provides a summary response to only the most recent. For example, if three email messages are sent on a given topic while the actor is absent, if he responds to more than the last of these messages, it is considered "rapid fire" behavior. Note however that the same logic can be applied to any type of message, including but not limited to IM's and voice mails.

In some embodiments (not shown), the Actor Information Report contains a sub-report breaking down all topically categorizable content that was generated and/or received by the actor in question over user-selected period(s) of time. Most of these contain pie or other charts. Such "mindshare" reports may be useful in the construction of what some attorneys call a "good heart, empty head" defense; otherwise put, that the actor in question demonstrably paid so little attention to particular topic(s) that he could not reasonably be expected to have substantive knowledge of them. In some of these embodiments, any references by other actors to the selected actor having knowledge of the relevant topics are also included in the "mindshare report."

Some embodiments may perform and display correlations of the different dimensions of behavior that are being analyzed. As pictured, for example, a topic "FAS131" is associated with a predominantly negative tone.

Information about how actor proximity is determined and how instructions are categorized may be found in the relevant sections in this application.

Discussion in a Workflow Context/Addition of New Items

Figure 6A:
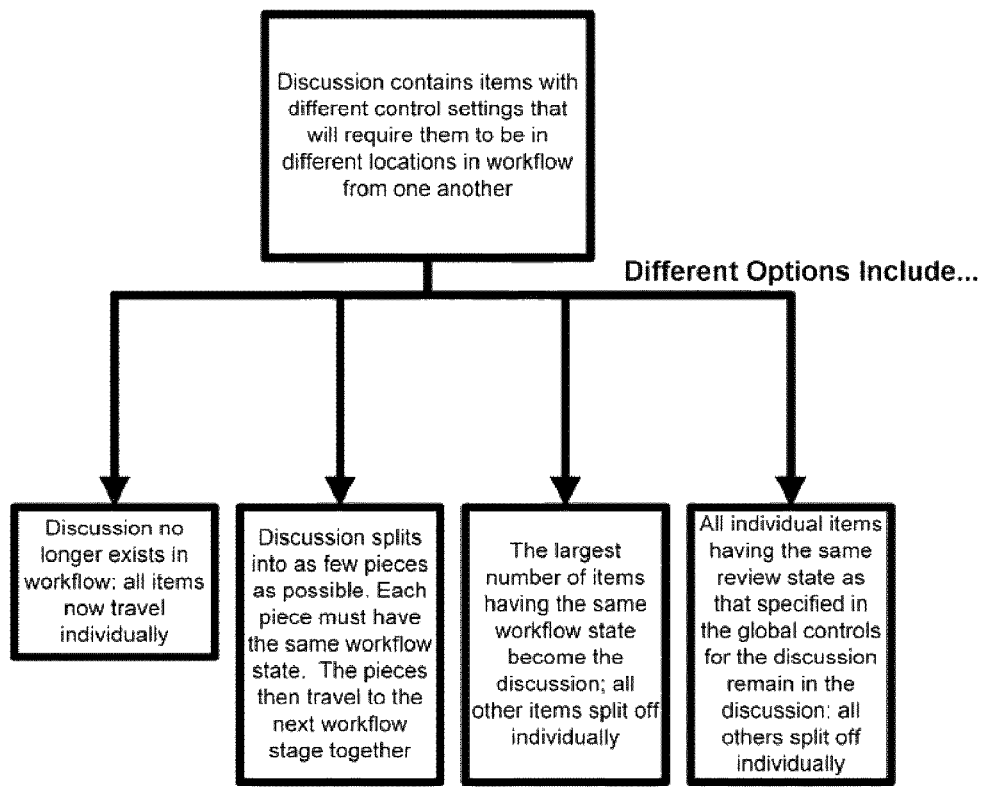
FIG. 6A is a diagram of one embodiment of the behavior of a discussion when it contains items with different control settings.

When utilized in the context of a workflow system, in some circumstances, a discussion may be "exploded." In other words, some items of a discussion may end up in different stages in a workflow. One embodiment of these different options can be seen in FIG. 6A. This occurs for example when some of the items in a discussion are determined to be responsive while others are not, and the responsive items move to a subsequent review stage whereas the non-responsive ones go to a final bin. In one embodiment at this point, in the user interface the discussion is broken down into as many separate chunks, or individual pieces, as are needed so that each individual item ends up in the correct spot in workflow for the settings that the user has assigned to it; from a workflow perspective, the discussion ceases to exist. However, in another embodiment, if a majority of the items remain together, the discussion remains intact even within the workflow. In one embodiment, in this situation those items that have been moved down a different path from the parent as a result of their individual coding are displayed as partially grayed out, with their coding controls [321] disabled.

In one embodiment, a visual indicator appears in the header area that may be selected to view the entire logical discussion, regardless of where its various parts currently are in the workflow. In another embodiment, items always remain displayed in their discussions, but depending on which location in workflow the discussion is currently being viewed in, the controls for certain items (those that are not currently in this particular location in workflow) will be disabled. In one embodiment, a visual indicator appears that can be selected to see—and code—the item in its current location in the workflow. In one embodiment, the controls for each item are displayed according to where each item currently resides in workflow. Since different workflow stages may have different controls associated with them, this means that the available coding controls [321] may be heterogeneous within a single discussion. In some embodiments, there is a control that allows previously "exploded" items to be pulled back into their original parent discussion.

Figure 6B:
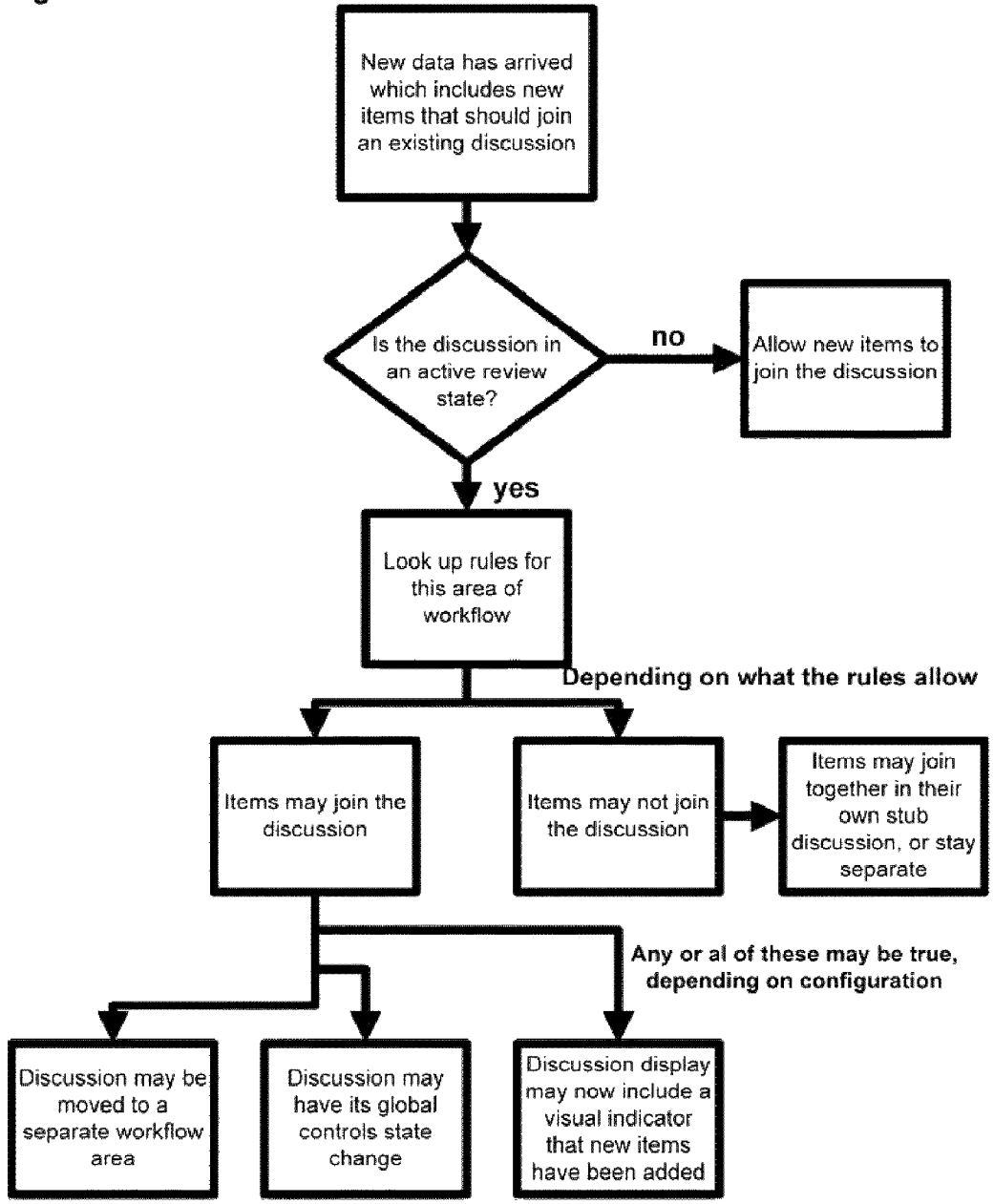
FIG. 6B is a flow chart of one embodiment of how adding new data affects existing discussions.

Further, as a review effort progresses, it is quite common that additional data is added to the system. Some of this data will almost certainly augment existing discussions. This leaves open the important question of what to do with discussions that have already been fully (or partially) reviewed, but have now been augmented by additional items. There may not be time to re-review all such discussions, however, allowing potentially sensitive data to be produced without first being reviewed is perhaps even more problematic. The best approach to take depends on the particular circumstances. Therefore, the system allows multiple options. One set of options is shown in FIG. 6B. Some, or all, of these options may be provided in different embodiments:

Do not allow new items to join existing discussions that have already started the review process in the context of workflow. Note though that in some embodiments, the full logical discussion can still be viewed outside of the context of workflow such as in a query results set. The newly added items are reviewed either individually, in some other group configuration, such as a cluster, or in sub-discussions built from within the newly added data, or from data that has not yet reviewed. In one embodiment, a visual notification is added to the discussion to which the new items belong in order to indicate that new items have been added. In one embodiment, depending on the configuration, after the new items have been reviewed in their current grouping, they may be allowed to join their logical discussion.

Allow new items to join existing discussions, but isolate the new items within separate workflow bins so that they can be easily examined, without re-examining the entire discussion. In some embodiments, the whole discussion will be moved into a separate workflow area for review. In one embodiment, this is done only for discussions residing in user-specified locations in workflow. For example, users might wish to re-review augmented discussions that are currently in the "responsive" area but not in the "non-responsive" one.

Allow new items to join existing discussions, but designate the augmented discussions and individual new items with appropriate visual indicators. If the user takes no specific action, the settings of the global controls for the discussion will be automatically applied to the new items. In one embodiment, this will not occur in cases in which the system has determined that the new item(s) may have settings that are different from those of the parent discussion. For example, the parent discussion could be responsive, but a new item just added could be clearly and unambiguously identified as non-responsive, for example, a joke email. In another embodiment, the system would only allow the automated application of the global settings if, and only if, the existing items in the discussion were all homogeneous with respect to workflow-related attributes.

In another embodiment, more than one of these techniques can be used, depending on the specific attributes of either or both the particular item(s) being added and the discussion that the items are being added onto. That is, for example, certain types of items may be added into the existing workflow, while others of potentially greater importance would be isolated.

Visualization Presentation Methods

Figure 8:
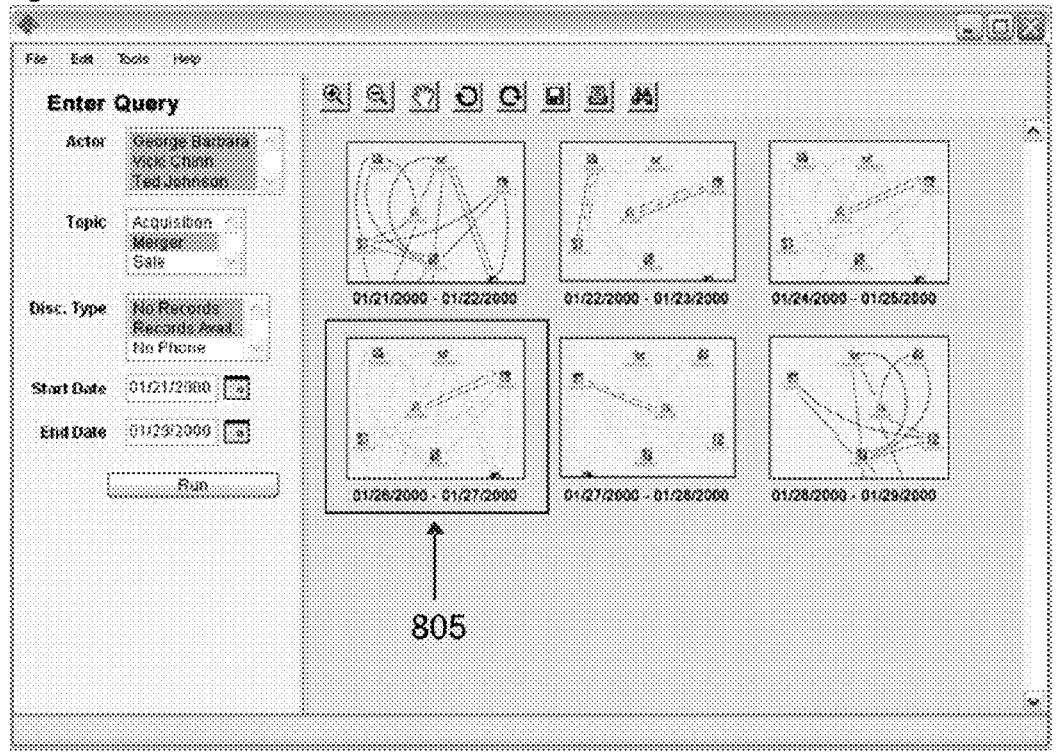
FIG. 8 is a screenshot of one embodiment of a thumbnail presentation options.

Because actor behavior will often change over the course of time, it is often the case that there is value in time slicing many of the visualizations that will be described in the following sections. By "time slicing," we mean creating equal increments of time within the time interval of interest specified by the user, and creating a snapshot image for each time increment. FIG. 7 depicts a thumbnail gallery [715] which provides a full-size snapshot [710] of the currently selected view in the main view. FIG. 8 depicts a thumbnail gallery implementation in which the thumbnail images [805] for different time slices are arrayed in a matrix configuration. In some embodiments, the user may specify the length of time covered per thumbnail image; in some embodiments the user may specify the number of slices to create. In the former case, if there is extra time, in some embodiments, the last time slice will simply be longer; in other embodiments, the "extra" is equally divided among the different snapshots, while in still other embodiments, a partial timeslice will be created at the beginning or end that is especially marked.

Many embodiments of the invention will also find it useful to show many of the following visualizations as N distinct snapshots in a rapid sequential fashion, much like a movie. In one embodiment, the speed of display (or "play") and the length of time increments are user configurable. The advantage to this type of visualization is that it allows the user to very quickly spot changes in patterns over time, in a manner that is much easier than scrolling or dragging a slider. In some embodiments, a slide sorter [715] metaphor may be utilized in conjunction with this type of presentation. In one embodiment, a slider [720] is available for manual navigation; the slider also moves automatically, displaying the current time interval while the view is "playing." In one embodiment, VCR-like controls [705] are provided as the primary means of navigation, however the user may also click on a thumbnail in the slide sorter [715] to restart the "movie" playing from that point (or to bring up that timeslice in the main view [710] when the window is not in "play" mode.) Some embodiments may choose to augment portions of the view of greatest interest—such as detected anomalies—with additional visual effects. These may include, but are not limited to: flashing, pulsing, change of color or brightness, jiggling, moving, or being surrounded by a colored frame—or are otherwise brought to the user's attention.

In some embodiments, these movie-like presentations are created by the system itself by shrinking or "thumbnailing" regular views of the desired timeslices of information, and then "playing" them sequentially. In other embodiments however, this may be achieved through the use of a third party application.

Special Handling of Phone Calls & In-Person Meetings

Figure 9:
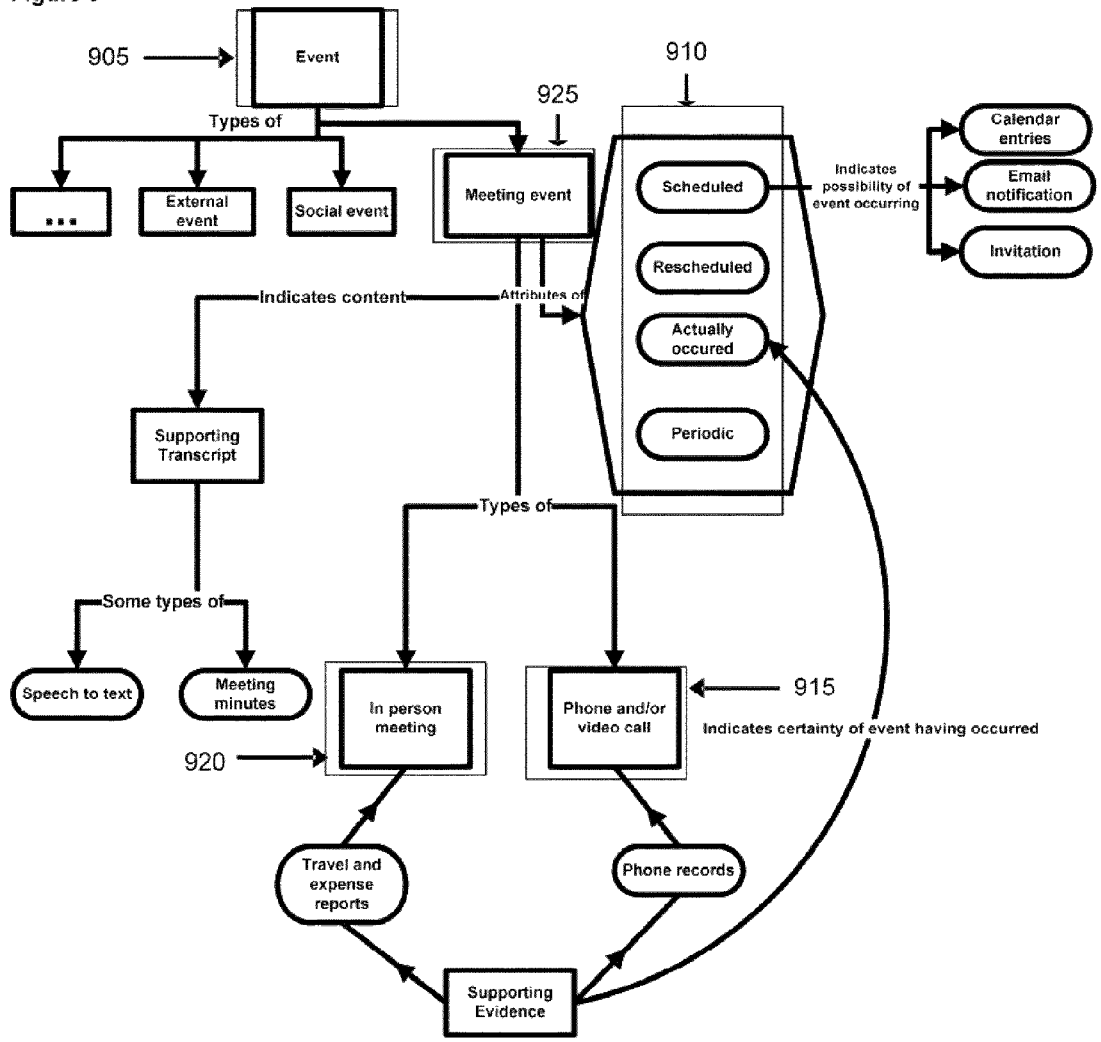
FIG. 9 is a diagram of one embodiment of different event types.

In investigative contexts, it is often the case that, despite the extreme pervasiveness of email and IM, the most interesting—or incriminating—things are not committed to written form. However, by analyzing discussion content in certain ways, we may at least hope to identify meeting events—such as specific telephonic conversations and/or in-person meetings—that occurred, or which may have occurred. This can be very useful, even when there is no accompanying text for such events, as it helps in deposing witnesses. In-person meetings have many of the same properties as phone calls, which is to say that if there is a record of their occurrence, it most likely does not include a transcript of what transpired. We will define the notion of a meeting event object [925] which, as can be seen in FIG. 9, has a number of attributes as detailed below.

Attributes of a meeting event [925] may include but are not limited to:

Whether or not there is a calendar event for it; more generally, whether or not it has been scheduled, or appears to be ad hoc in nature. In some instances, it is useful to make a distinction between ad-hoc meetings, such as a request to "discuss it over lunch" versus regularly scheduled periodic meetings for which a change in schedule can be easily observed, and may be of interest to observe—for example, an emergency board meeting that is scheduled 3 weeks earlier than normal.)

Whether or not there is some kind of accompanying text or document for it including but not limited to: meeting minutes for a meeting, a speech to text transcript of a phone call, and/or other accompanying material to a meeting such as presentations, a packet of information, or action items list. If such documents do exist, in some embodiments, their properties become attached to the meeting object—for example the presence of negative tonal content.

Whether or not it is something that occurs periodically, such as a weekly staff meeting.

And if periodic, whether it has been rescheduled from its usual time; in some embodiments, there is special emphasis on meetings that are moved earlier in time Has it been cancelled?

Was its duration noticeably longer—or shorter—than other instances of the same type of meeting?

Whether or not there is any indication that the phone call or in-person meeting ever actually transpired. In the case of phone calls, this can include phone records, or a message object in any kind of application—or written references to the phone call having occurred. In the case of in-person meetings, meeting minutes, or written references to the meeting after the fact, or in some instances trip or expense reports are among the sources of definitive information as to whether or not the meeting actually took place.

Similarly, for meetings involving more than 2 actors, the same data with respect to the individual actors, since the fact that the meeting transpired does not necessarily mean that all invitees were present, or were present for the entirety.

Of specific interest are those discussions which contain:

Actual and/or requested ad hoc meetings, whether in person [920] or telephonic [915]; that is meetings which were not previously scheduled—there is no calendar event or similar thing to be found for them.

Actual and/or requested periodic meetings of either type which have been rescheduled Actual and/or requested non-periodic meetings of either type since these may represent a deliberate moving away from written communication. Discussions which end in such meetings are therefore often of the greatest interest. The subsequent sections describe in detail how such discussions may be best analyzed and visualized.

Event & Attendees Report

Information about which actors were invited to and/or attended specific real world events as diverse as cocktail parties, exclusive meetings or fishing trips can be highly useful in investigations, where it may be difficult to determine well after the fact who was indeed present at a particular meeting in which critical events transpired. To this end, the system endeavors to capture as much of this data as possible in the Event & Attendees Report, an exemplary embodiment of which is illustrated in FIG. 10. The information available in this report will vary somewhat by embodiment. Data captured in this report typically includes, but is not limited to:

Properties of the event itself: including but not limited to its name or names, its location, date, duration, description, tag line, sponsors, whether it is periodic in nature (and if so, at what intervals it occurs.)

Any invitations, advertisements, reminders, agendas, programs or packets related to the event and created prior to it.

Any related documents that were created after it, such as meeting minutes, thank you letters or acknowledgments, or contracts.

Actors who:

Were invited, and certainly attended the event, as evidenced by trip reports or related expenses incurred by the actor, after the fact references to the actor having attended the event, or other indications.

Were invited, and probably attended, as indicated by any record of a positive RSVP, or a before the fact reference to planning to attend.

Declined the invitation, as indicated by any record of a negative RSVP or some other indication of not planning to attend.

Were invited, but whose status with respect to attending the event cannot be assessed at all with the available information.

Were not invited, but who had demonstrable knowledge of its existence because there is a record of either they themselves making reference to it, or to another actor referring to them being aware of it.

Were not invited but somehow attended.

Were present only remotely via dialing in or any other remote connection.

Were present for a part of the event only.

Were not invited but could have been expected to have been based on their organizational role or historical participation in such events. (In different embodiments, this may be determined in varying ways, including but not limited to: whether other actors at the same strata of management in the same organization were invited, whether or not, if the event is of a periodic nature, the actor in question had previously been invited—presuming no job title change in the intervening time—or whether both people above them and below them in the organizational structure were invited.)

In some embodiments, this information also is made available as part of the Actor Information Report. In some embodiments, it will appear in its own tab in the templates for those discussions which contain such an event, which to say an event that has actor attendees within the universe of the corpus. In some embodiments, this report exists as a subset of the actor information tab in the discussion template. In most embodiments, it is accessible by double clicking on any component of the graphic representation of such event objects, such as that which appears in a timeline view. In most embodiments, the query interface allows the user to specify that only event objects should be retrieved; in most embodiments whenever event objects are retrieved as part of a query result, they are decorated with a report icon that if clicked on will display this report. Note that in most embodiments, event objects that have supporting transcript documents can be retrieved in searches that hit keywords or other search terms in the supporting transcript document.

Communication Graphs

The present system provides communication graphs [1120] in order to visualize further dimensions of communication behavior that are of value, particularly in an investigative context. These are graphs that depict actors as nodes that are linked together by arcs of different styles in order to indicate communication that has occurred between the actors, or related relationships. Some of these variations are focus-related. That is, they exist primarily to filter out less relevant information, for example by allowing the user to set a bi-directional threshold for the number or type of communications that must have been exchanged in a given time period in order to connect two actors together. We call this a threshold graph [1115]. Or allowing the user to select a target set of actors, and then rendering the links and nodes to the actors closest to these actors according to the parameters set by the user, which we call a neighborhood graph [1105]. Or a "grapevine graph" [1110] which given a set of actors, renders nodes and arcs for only the social hubs of the network.

Figure 11:
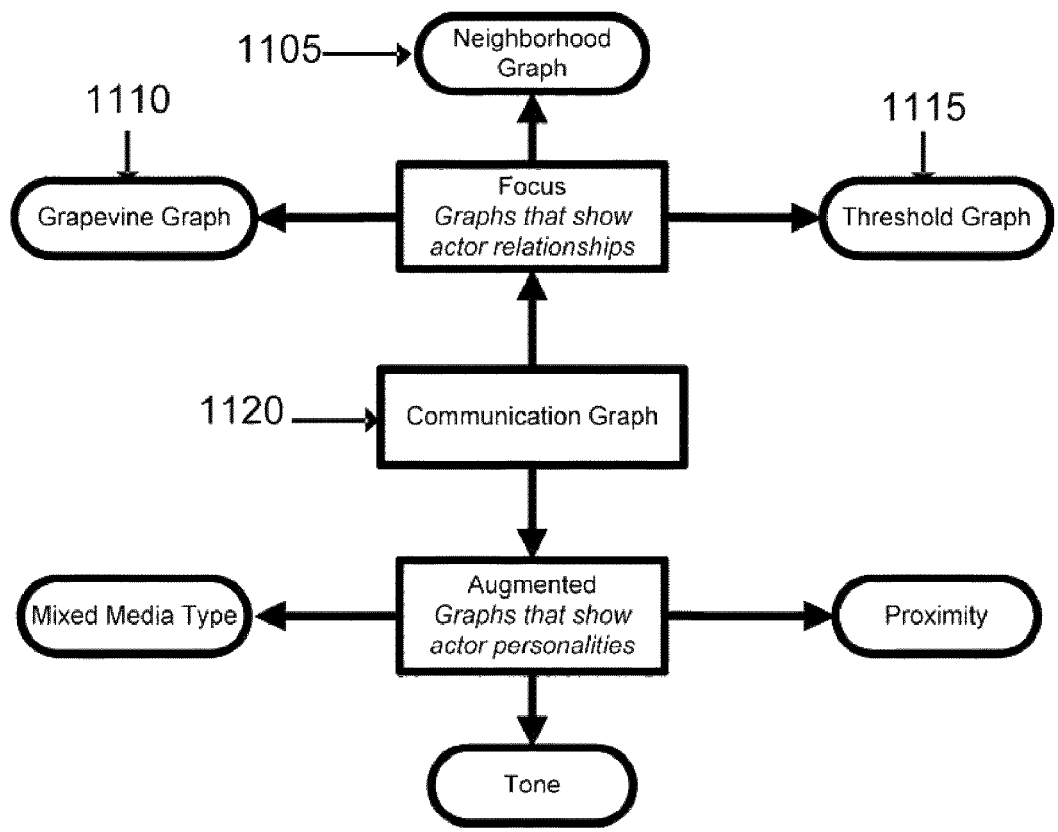
FIG. 11 is a diagram of different types of communication graphs.

The rest of this section will generally discuss graphs [1120] that are augmented to display (or to filter) different aspects of the actor communication. These will include, but are not limited to displays of tone, topic, medium, and actor proximity. FIG. 11 illustrates one embodiment of some of the basic variations.

Figure 12:
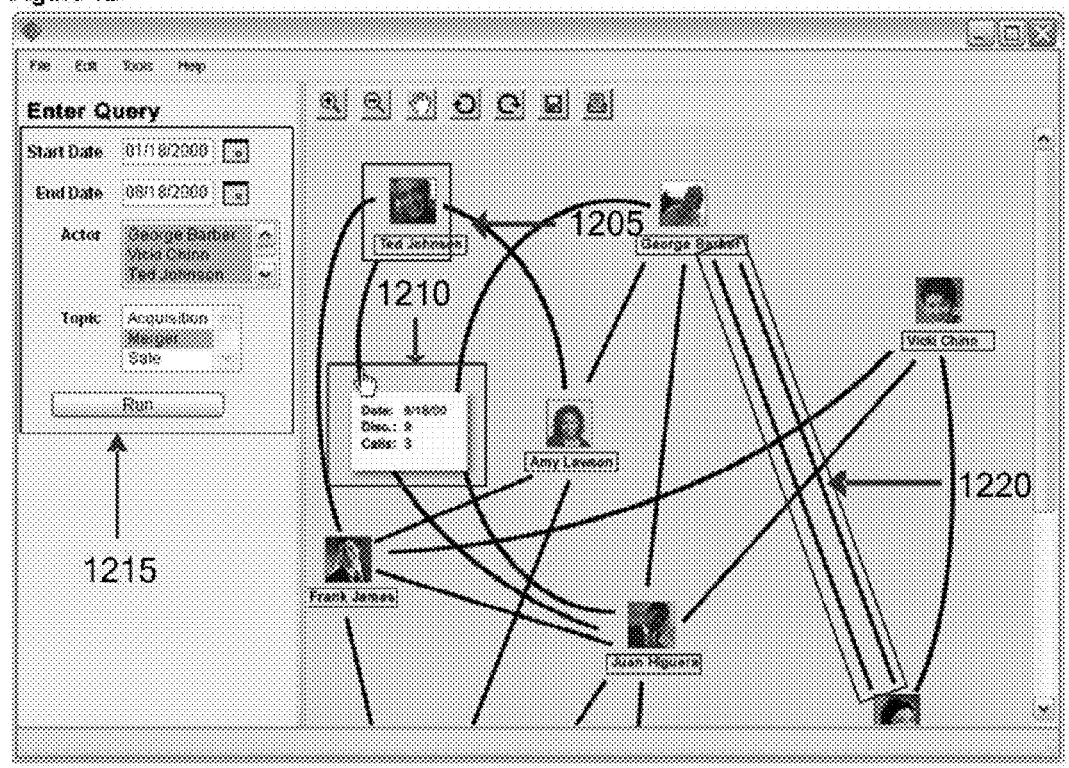
FIG. 12 is a screenshot of one embodiment of a communication graph displaying discussions.

Some embodiments contain communication graphs which display actors connected by lines based on mutual participation in the same discussion. An example of this is shown in U.S. patent application Ser. No. 10/358,786, entitled "A METHOD AND APPARATUS TO VISUALLY PRESENT DISCUSSIONS FOR DATA MINING PURPOSES," and assigned to the assignee of the present application. The system described extends this to include phone calls and in-person meetings. Different embodiments may support somewhat varying behaviors for mouseover and clicking, such as a simple pop-up on mouseover [1210] which displays the number of phone calls in the discussion. In the embodiment illustrated in FIG. 12, actors are depicted by an image [1205], often a photograph of the actor. In other embodiments, the actors are depicted by other rendered images as selected by the user. This might include, but is not limited to, arbitrary icons, the names of different electronic identities used by the actor, an identifier used by the investigator for the actor, or various fields in the Actor information report. In this embodiment, each discussion is depicted by an individual line [1220].

In some embodiments, the canvas tools include a connector tool, which the user can use to indicate to the system that she believes that there is a relationship that exists between the actors. Such feedback from the user can be used by the system as a hint to connect "mystery" electronic identities to the right actor, or depending on the exact visualization, to indicate that there is evidence of a social relationship, or that there was a reporting relationship that for some reason was not entered into the system.

Figure 13:
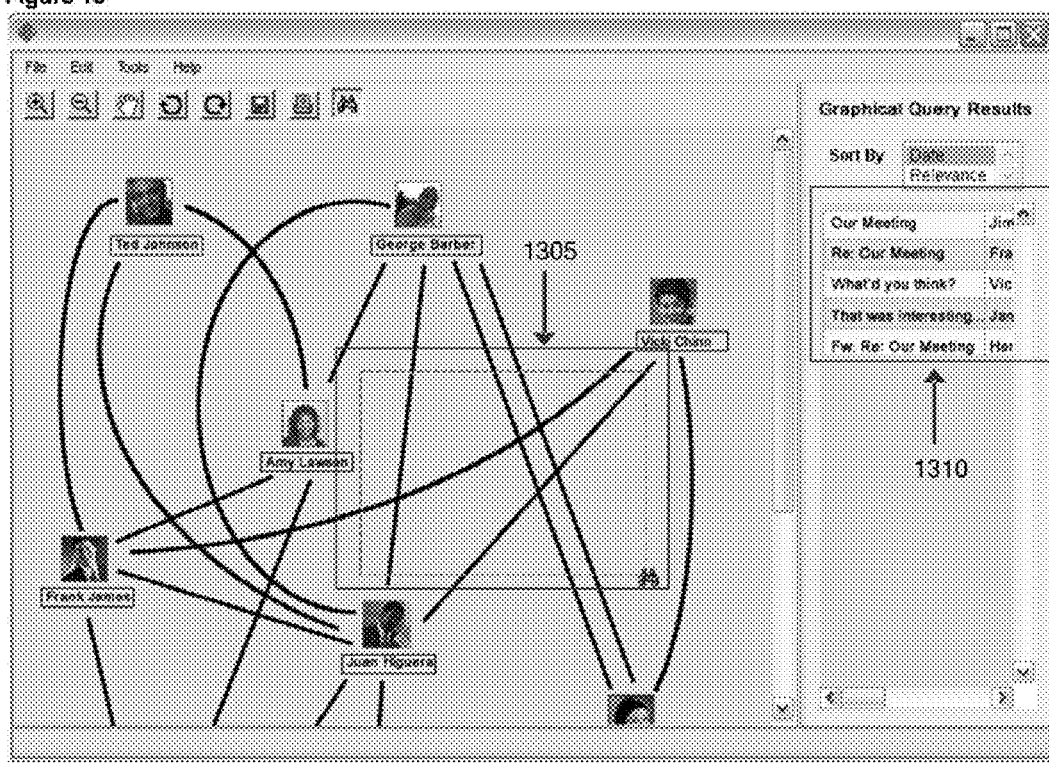
FIG. 13 is a screenshot of one embodiment of a communication graph displaying the capability of performing graphical querying.
Figure 14:
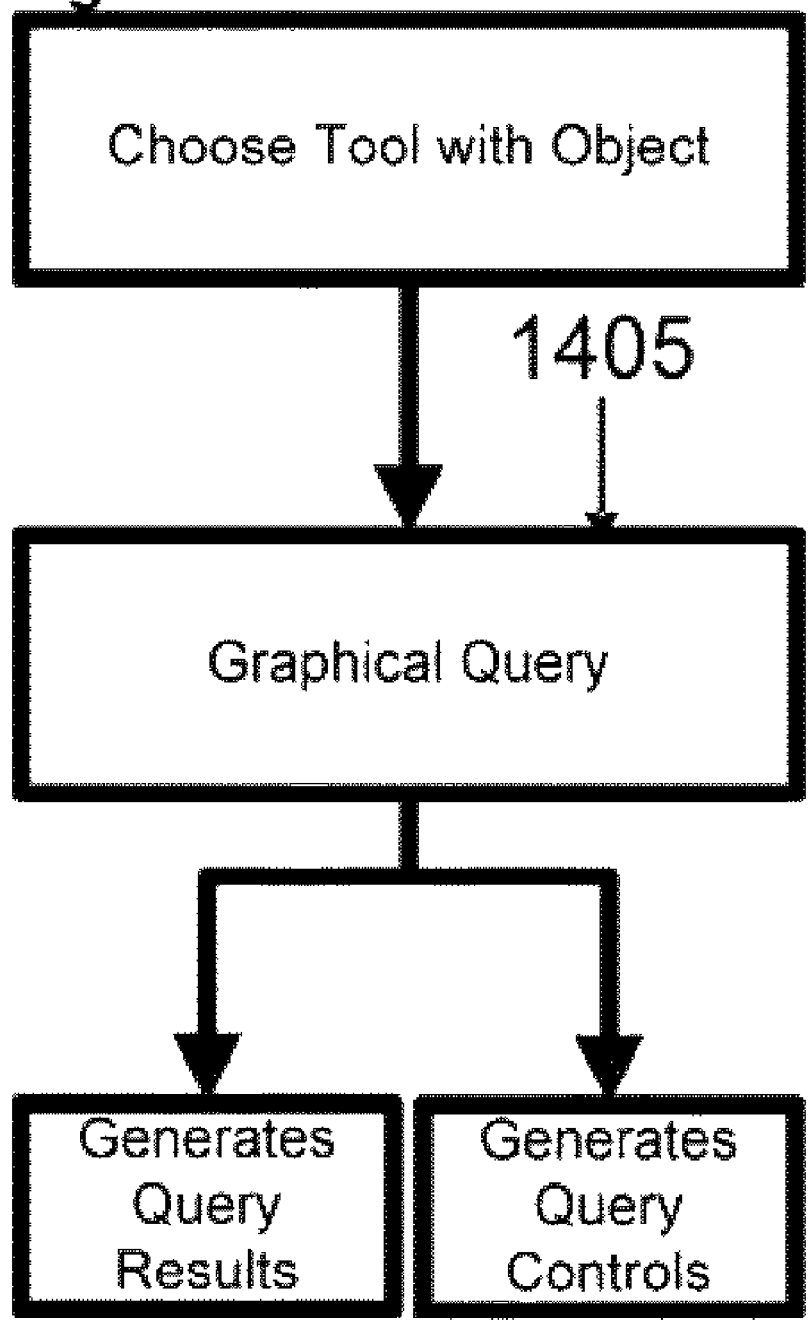
FIG. 14 is a flowchart of one embodiment of the use of graphical query to get query results or query controls.

FIG. 13 illustrates the idea of graphical query support; selecting a number of discussions by partially or fully including them in the marquee [1305] will specify a query whose results [1310] are indicated on the right-hand side of the window. As noted in FIG. 14, in some embodiments, graphical querying also may fill in query controls in addition to, or instead of displaying results.

Figure 15:
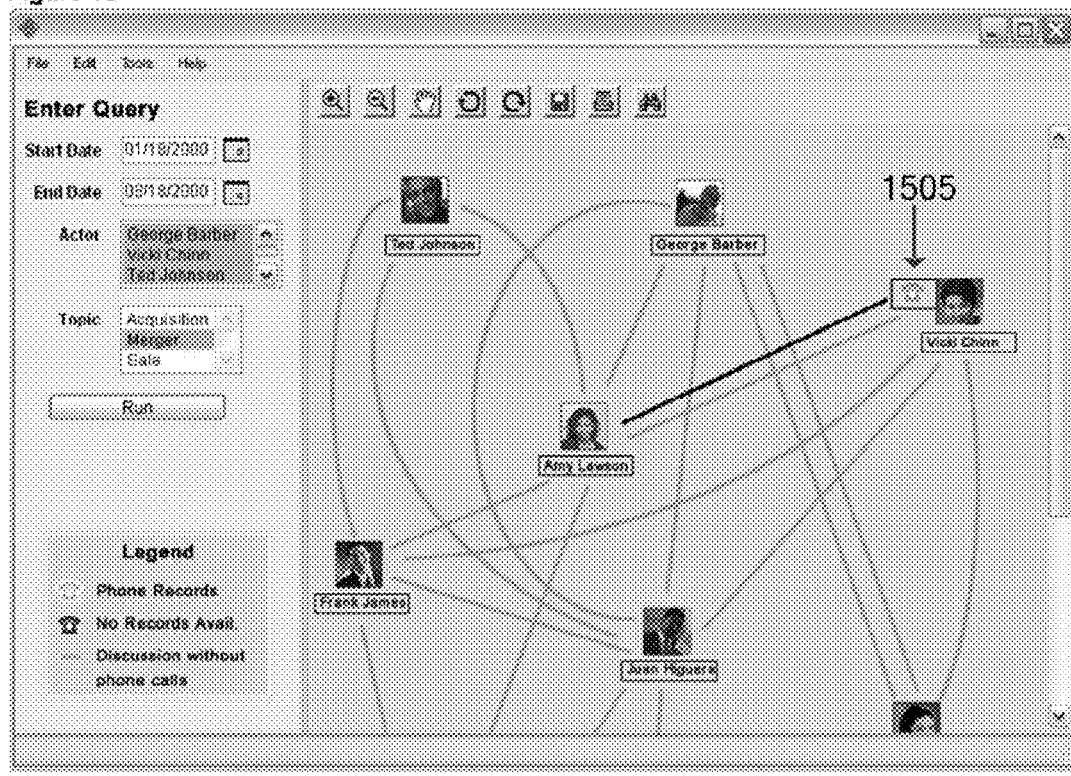
FIG. 15 is a screenshot of one embodiment of a communication graph displaying discussions annotated with a phone icon to represent a phone call.

If the discussion terminated with, or contained an actual phone call, in some embodiments a small phone icon [1505] will appear at the base of the line, on the side of the actor who placed the call. One embodiment of this is depicted in FIG. 15.

Figure 16:
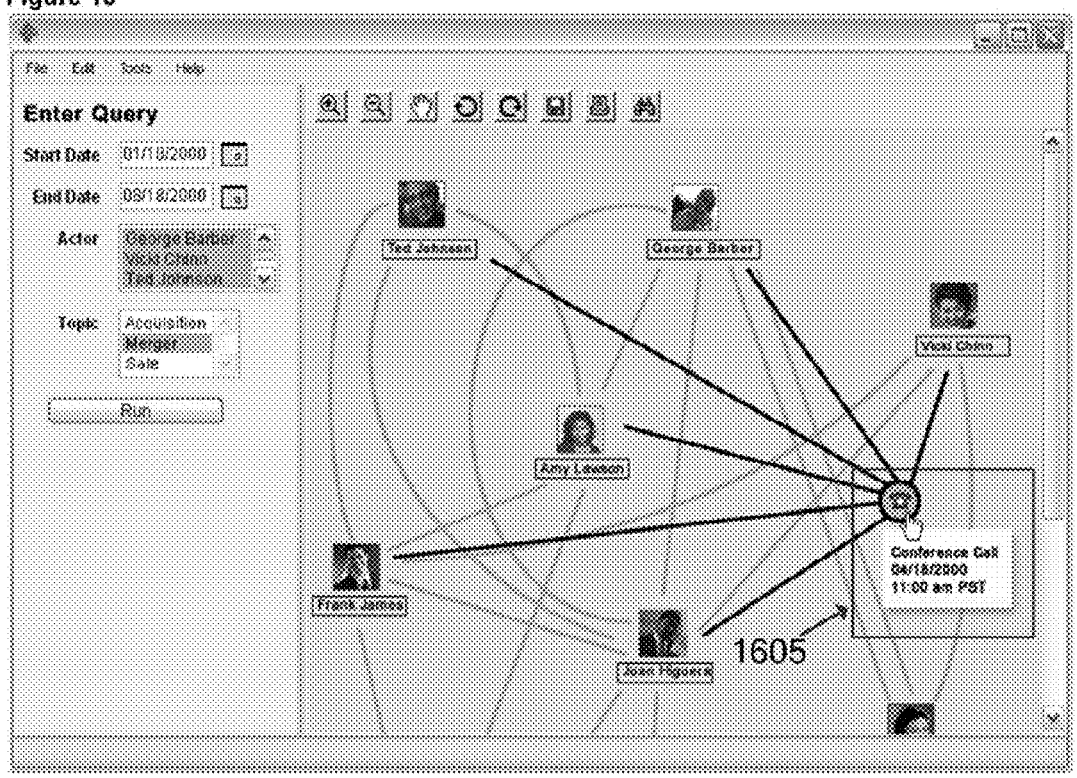
FIG. 16 is a screenshot of one embodiment of a communication graph displaying an icon for a N way phone call.
Figure 17:
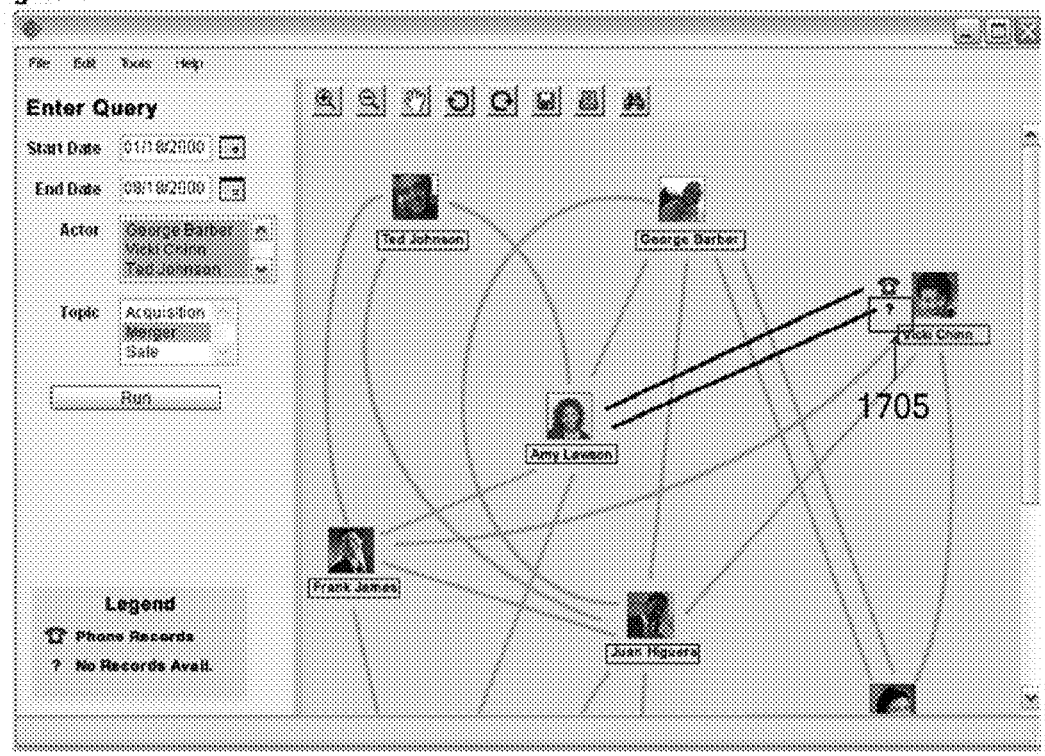
FIG. 17 is a screenshot of one embodiment of a communication graph displaying discussions annotated with phone icons that designate whether phone records are available for the phone event or not.
Figure 18:
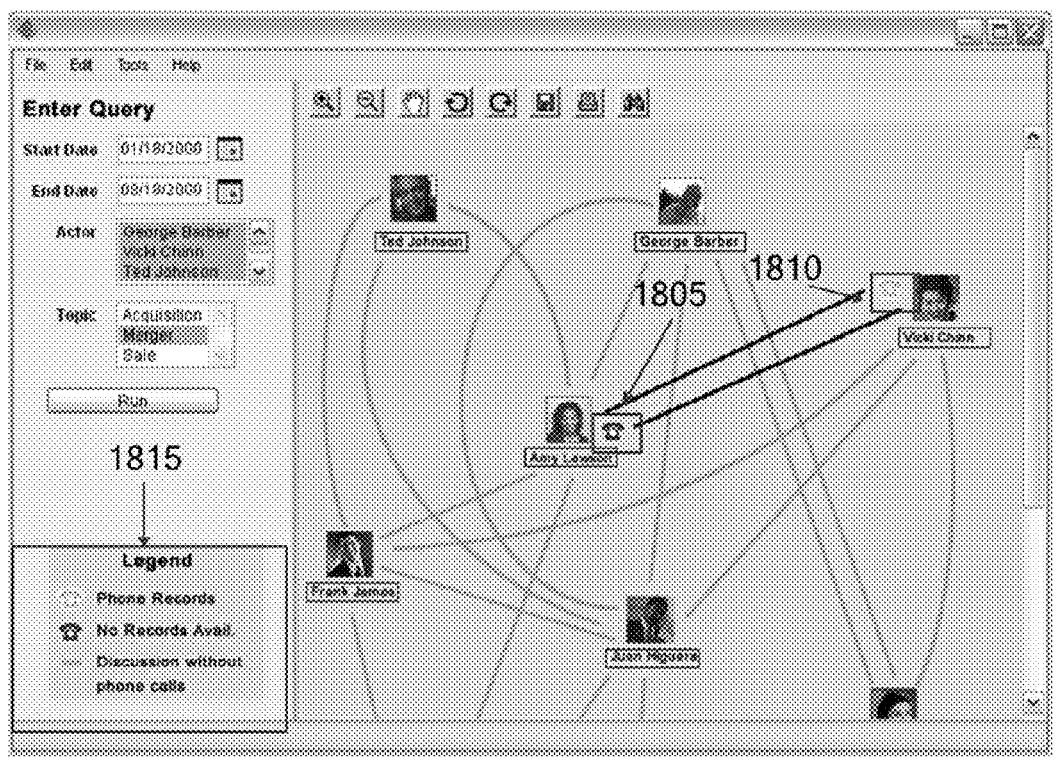
FIG. 18 is a screenshot of another embodiment of a communication graph displaying discussions annotated with phone icons that designate whether phone records are available for the phone event or not.

If both actors placed calls to each other, in some embodiments, both would be annotated with a phone icon [1505]. In some embodiments, for an N-way call was placed—that is, a conference call of any sort—the lines will connect all the actors involved to a separate icon [1605]. One embodiment of this is shown in FIG. 16. In some embodiments, clicking on phone icon will bring up all that is known about the call, including any wav or similar files (including speech-to-text output) that might be available, and any references to it, such as in an online calendar. Note that most embodiments will similarly treat multiple person meetings, but use a different choice of icon. If the discussion appears to involve a phone call or an N-way call, but without phone records available or other clear supporting evidence (as opposed to inline references to requested or actual phone calls) in some embodiments, a small phone icon [1705], in one embodiment a question mark (not shown), will be similarly placed. Other embodiments may just use a "?". This is illustrated in FIG. 17. Other embodiments may similarly separately designate presumed or possible phone events, but with slightly different visual effects, as illustrated in FIG. 18. Different embodiments may provide different visual representations for each attribute of a meeting object. Some embodiments allow the user to select which attributes they wish to visualize, as well as how she wishes to visualize them.

Figure 19:
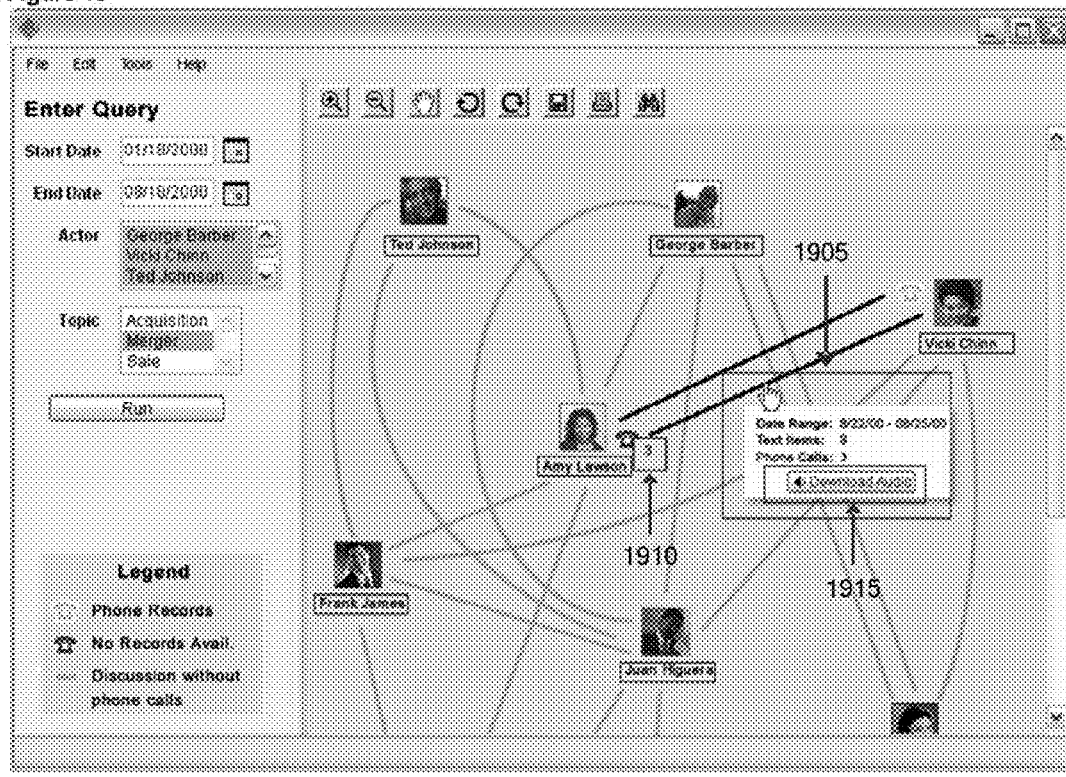
FIG. 19 is a screenshot of another embodiment of a communication graph displaying discussions annotated with phone icons and mouse over capability that provides relevant additional information about the phone call.

In the event that multiple discussions connect the same actors in the same period of time, and each discussion is visualized by its own line, the line can be annotated with a phone icon to indicate that the discussion contains at least one phone call. In some embodiments of this type of view, the phone icon may be further annotated with a number that indicates the number [1910] of phone call items in the discussion. In some embodiments, upon mouseover there is a floating box [1905] that contains a button [1915] which if clicked will download any files that may be associated with any meeting objects in the discussion. One embodiment of this is illustrated in FIG. 19.

While some visualizations render each discussion as a separate line; others may condense similar discussions (that is, those that share relevant attributes) into the same line, but then annotate that line with a number, or adjust the width of the line to indicate the number of individual discussions which are represented by the line. Similarly for singleton items. Some visualization may zoom out to condense all discussions involving the same actors into one line. In one embodiment, clicking on or mousing on or near the line will bring up a floating box with the breakdown itemizing the different discussions and/or singleton items represented by the selected line.

Figure 20:
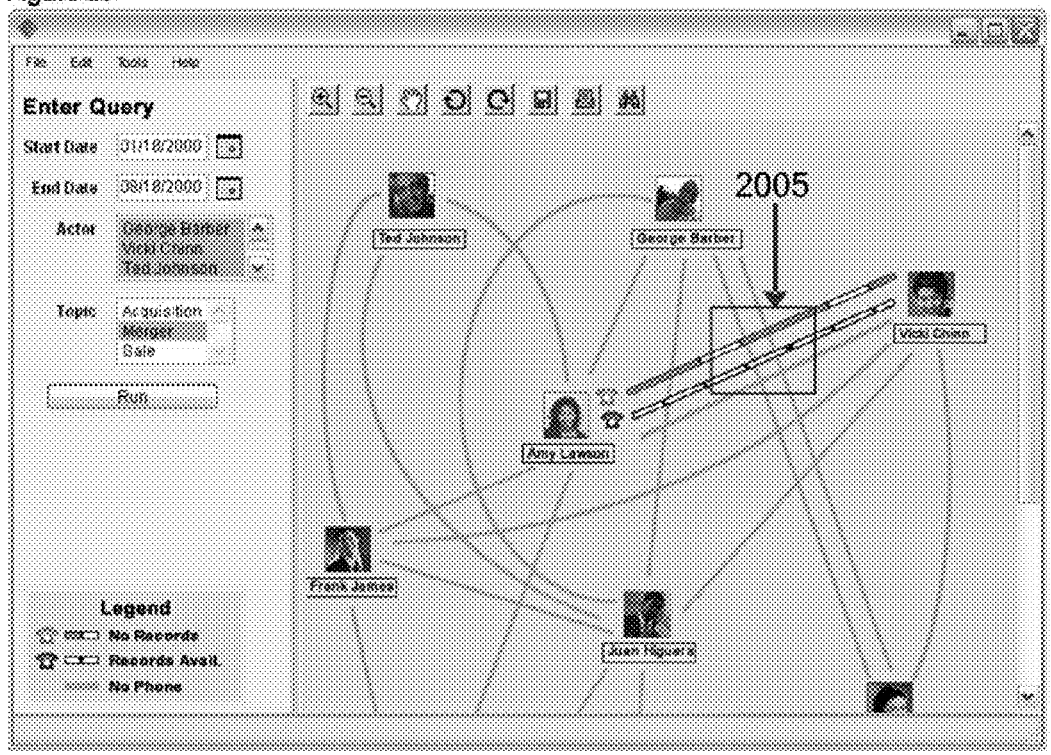
FIG. 20 is a screenshot of one embodiment of a communication graph displaying discussions using different line styles and phone icons to designate whether a particular discussion has a phone event and whether phone records are available for the event.

In other embodiments, discussions of each of the phone call-related types are indicated by different line colors or types [2005] connecting the actors in question. This is illustrated in FIG. 20.

Note that many embodiments will handle in-person-meetings in a very similar fashion to phone calls, but often with a different choice of icon. This is because the "no content" presumption—which of course may not always be true—is the key attribute of both types of objects. In those instances where such objects do happen to have accompanying text documents, for example, meeting minutes or speech-to-text transcripts, in most embodiments the meeting object is decorated with an icon wherever it appears in the user interface, and by clicking on the icon or some other control, the relevant text document may be brought up. In most embodiments, the meeting object will be returned in user queries if a search term is found in the accompanying text document.

Figure 21:
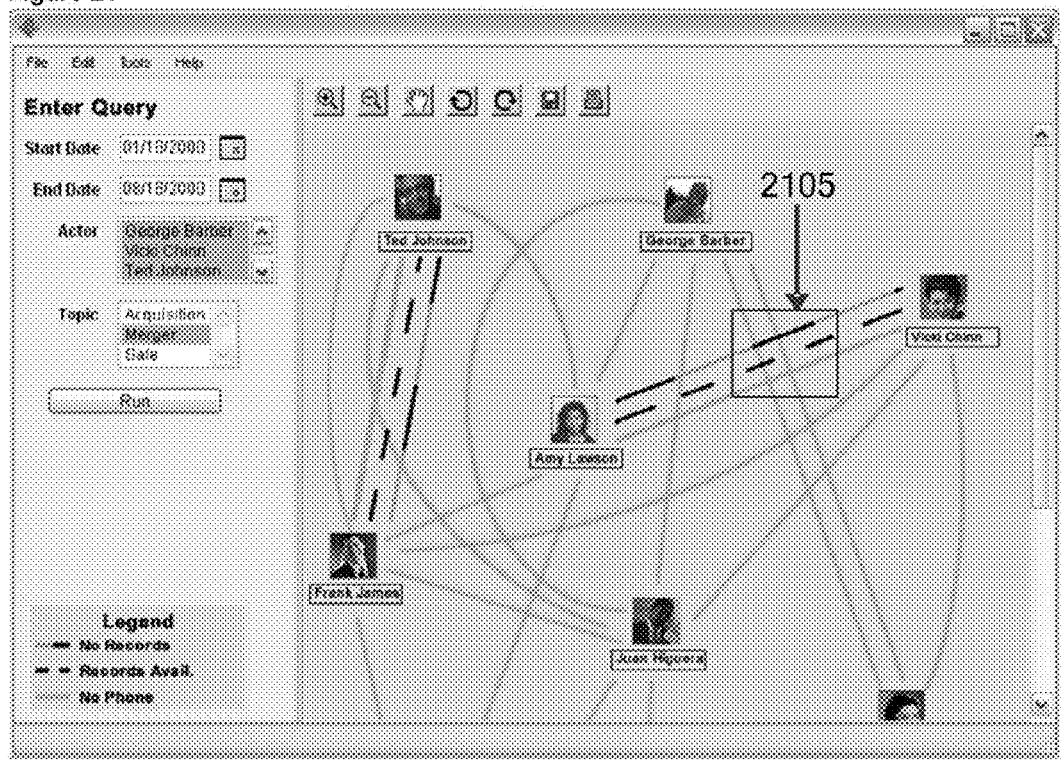
FIG. 21 is a screenshot of another embodiment of a communication graph displaying discussions using different line styles and to designate whether a particular discussion has a phone event and whether phone records are available for the event.
Figure 22:
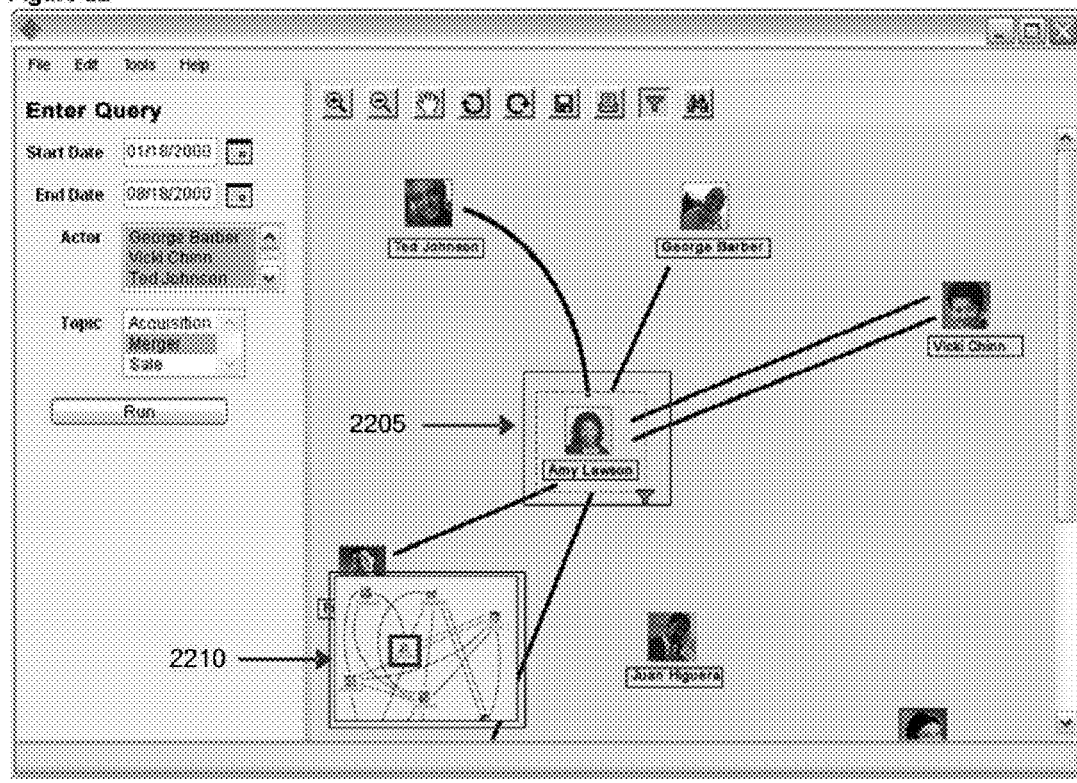
FIG. 22 is a screenshot of another embodiment of a communication graph displaying only the communications involving an actor selected by the user.

In some embodiments, the user interface allows the user to determine which of these types of discussions or relationships she wishes to see displayed at once. In some embodiments, if different types of discussions (including those with no meeting object items) exist between the same 2 actors, then separate lines [2105] for each different style would be drawn next to one another. An example of this is illustrated in FIG. 21. In some embodiments, as shown in FIG. 22, the user can click on an actor icon [2205] to get a thumbnail image [2210] which visualizes only the discussion(s) involving the selected actor. In most embodiments, this thumbnail image [2210] may be expanded by clicking on it.

Graph of Instruction Relaying

Figure 23:
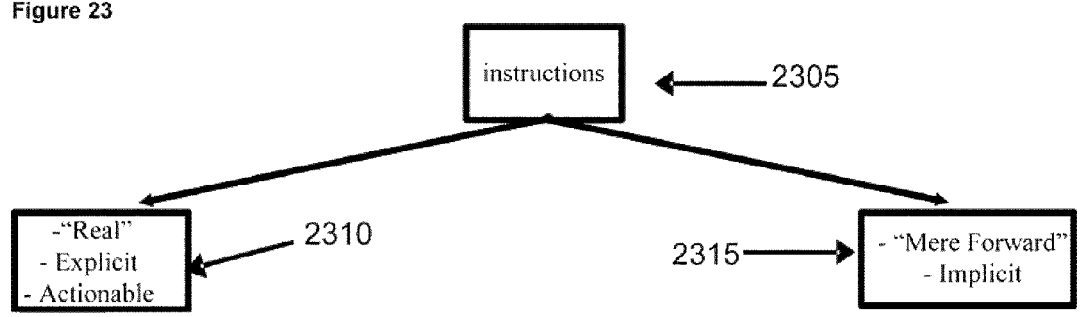
FIG. 23 is a flow chart of one embodiment of different instruction types.

As shown in FIG. 23, in one embodiment a communication graph can be constructed that indicates each time that an instruction [2305] was provided by the sender to the receiver. In one embodiment, the system determines whether the instruction [2305] was a "real" instruction [2310], that is, one in which actionable instructions were provided, or a mere forwarding [2315] of information which leaves the recipient to determine the action that should be taken in response.

In one embodiment, well known linguistic techniques are used to distinguish pleasantries that are arguably instructions, but very vague ones, such as "please take care of this" from imperative forms that provides substantive and specific instructions—for example "Call Joe and ask him to hold the shipment of component X." In most embodiments, the specific or directly actionable (and hence meaningful) instructions [2310] can be identified on the basis of various techniques, including but not limited to, the presence of proper nouns, more complex sentence structures, and verbs that are statistically uncommon with respect to the current corpus.

Constructing communication graphs for instruction relaying has significant application in determining how an organization is really being run, who is giving instructions—and who is unable or unwilling to provide real instructions [2310] in writing—and who is carrying them out or interpreting them. This in turn is often of importance in complex white collar crime investigations, since the "interpreters" of the instructions often prove to be the most powerful and hence interesting people. For this reason, visualizations often focus on those "instructions" that are not actionable or "mere forwards" [2315], and which require significant interpretation.

Some embodiments will require a distinct, identifiable block of content within the parent communication (such as an email) against which the instructions are to be applied (and against which any additional content is to be measured.). These include, but are not limited to: a forwarded email, an attached email or any kind of attached document, a hyperlink of any kind, a text block, or an embedded OLE object.

Other embodiments do not require such a distinct object, but will rely on pragmatic tagging and ontologies to determine the presence of imperative statements. In one embodiment, the system identifies specific kinds of instruction language, which may be determined as needed for different industries.

Figure 24:
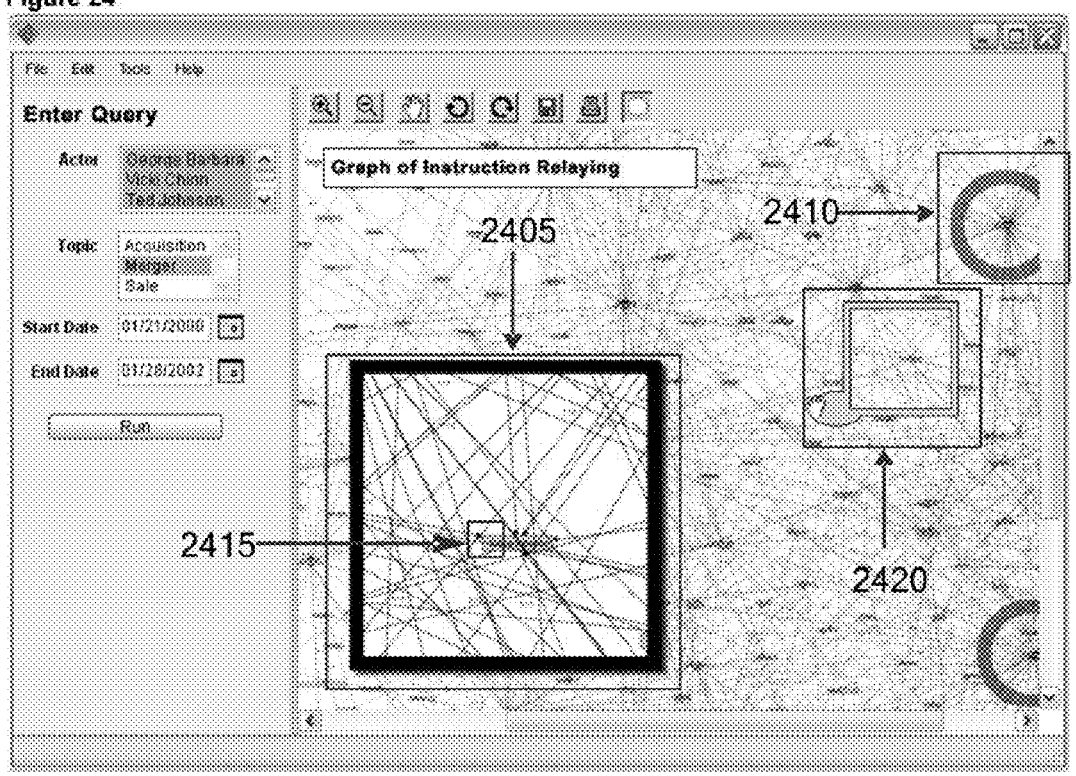
FIG. 24 is a screenshot of one embodiment of the graph of instruction relaying.

FIGS. 24 through 27 depict embodiments of a visualization of instruction graphs. FIG. 24 depicts one embodiment of a graph of "mere forward" instruction relaying. The user interface features a panning widget [2420] that results in the magnification of the screen area under it [2405]. Arrows [2415] point in the direction of the actor to whom the not-quite-instructions or "mere forwards" are being relayed.

Figure 25:
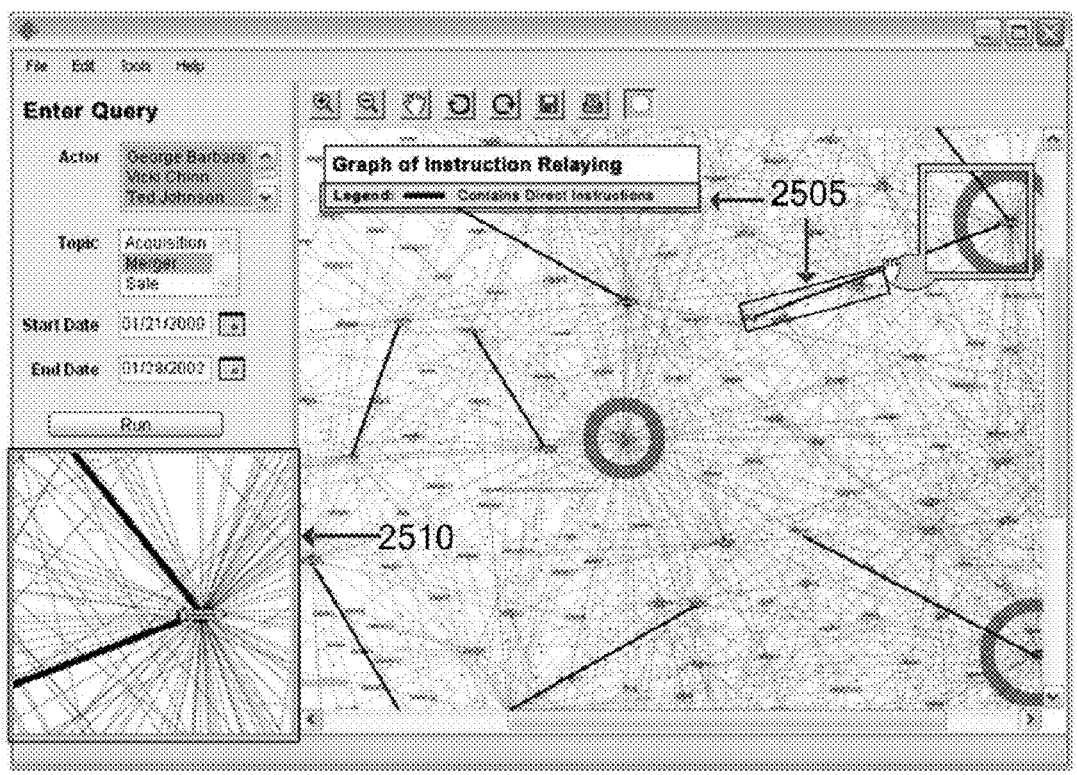
FIG. 25 is a screenshot of another embodiment of the graph of instruction relaying displaying one embodiment of highlighting direct instructions by the use of a darker line.

As pictured in FIG. 25, in some embodiments the magnified portion of the graph appears in a separate panel [2510] that may be contained within the current parent window, or which in some embodiments may be spawned in a new window. Different embodiments may use different colored or otherwise indicated lines [2505] in order to distinguish messages that contain actionable instructions, from "mere forwards", and those for which this type of analysis is not relevant. In one embodiment, this is determined based on the type of object—for example, the item is an email sent to a jokes list—as determined by ontological or statistical means.

Figure 26:
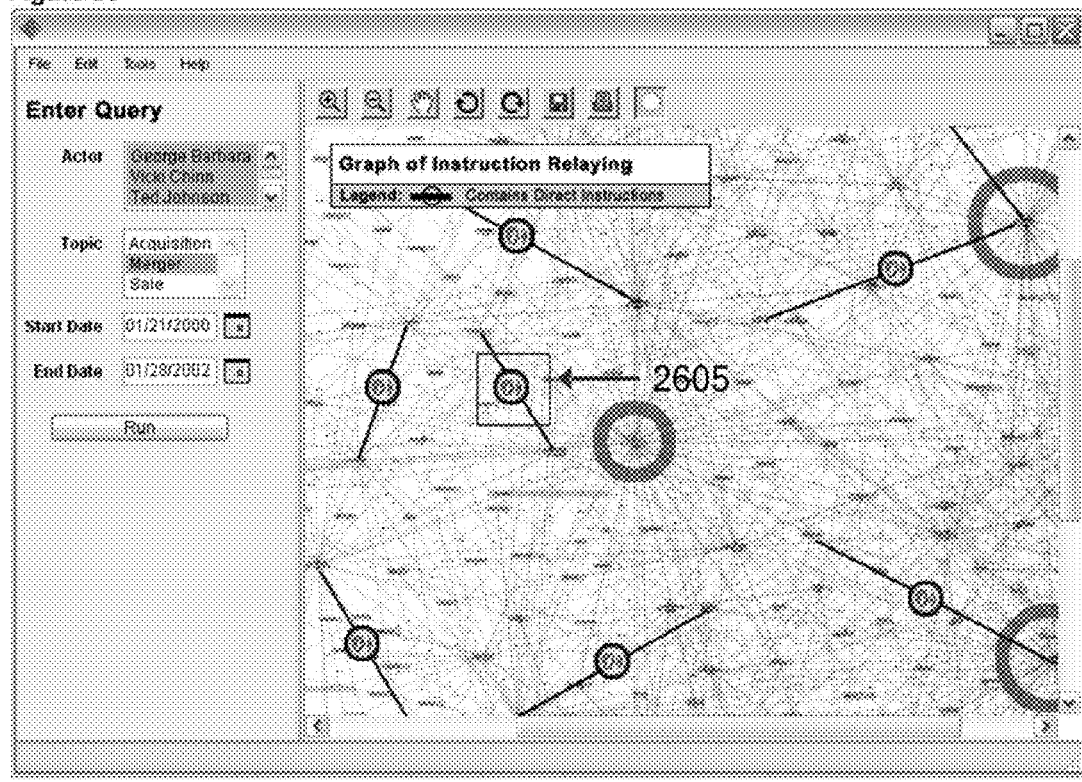
FIG. 26 is a screenshot of another embodiment of the graph of instruction relaying displaying another embodiment of highlighting direct instructions by the use of an icon.
Figure 27:
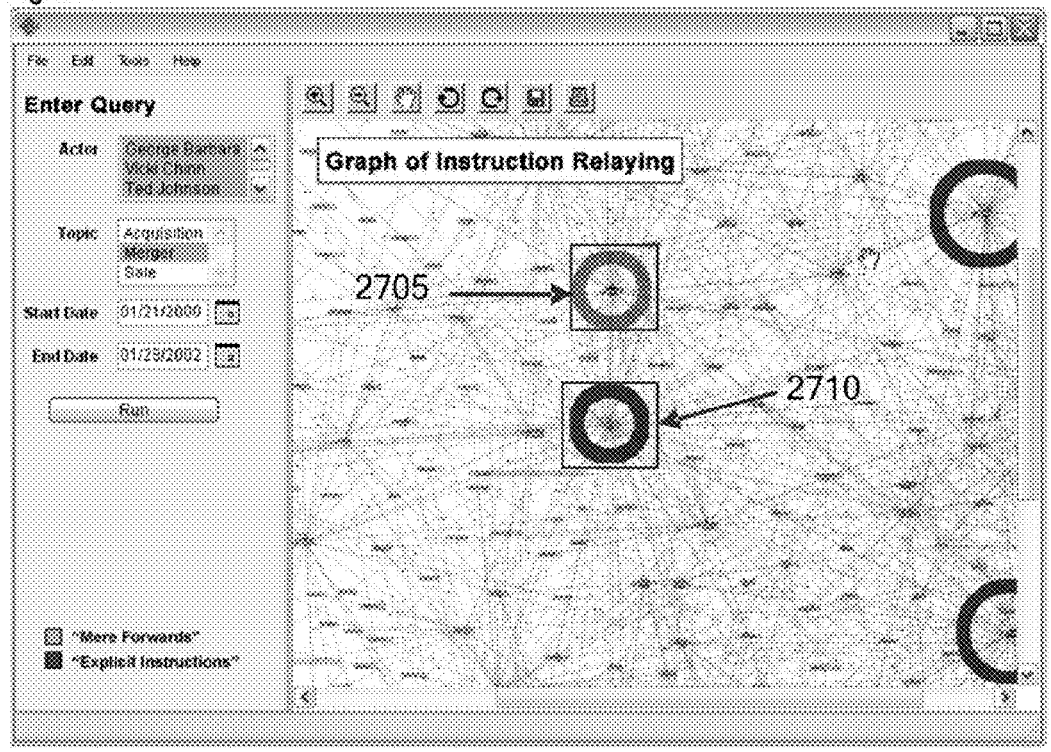
FIG. 27 is a screenshot of another embodiment of the graph of instruction relaying displaying rings for mere forwards and explicit instructions.

Other embodiments may employ only one line color, but be annotated by an icon [2605] selected by the user. This is illustrated in FIG. 26.

In some embodiments, any actor who receives or sends a determined (absolute or relative) amount of instruction (of either or both types, but generally one or the other as requested by the user) will automatically have a ring of the appropriate line color(s) [2705, 2710] or other visual adornment drawn around them. In some embodiments if both kinds of rings are specified, and should be rendered for the same actor, both rings will draw, one inside the other. In one embodiment, the action (sending or receiving) which is more prevalent will be the external ring. In one embodiment, a user may select the amount of instruction that triggers this display. Many embodiments will also distinguish, or allow the user to distinguish, between implicit and explicit instructions by rendering them in different colors [2510], and/or setting separate visualization thresholds for each. Some embodiments will combine both sender/receiver information and instruction type, thus requiring 4 colors or styles of rings or other visual adornment. Alternatively, the user may choose any one or more of these aspects to display at one time. The rendering of rings or other visual highlighting mechanisms is to make the communication patterns more visible in a thumbnail-size image, which in turn allows the user to visually compare many images that represent different time slices at once.

Analysis and Visualization of Actor Proximity

The notion of actor proximity is defined as the measurement of the closeness of social and/or professional relationship of two or more people. In one embodiment, proximity is measured according to the time and frequency of communication, the percentage of communication that is a discussion rather than a singleton communication, as well as whether or not collaborative editing of content is involved. This definition may be extended to include further analysis of the content of the communications. Specifically, the system increases the weight of communications that contain reference to more than one distinct topic as identified by any topic detection mechanism including but not limited to ontologies or topic clustering. This is due to the fact that inclusion of multiple distinct topics, whether within one email or within an IM "conversation"—or within the same discussion—is both indicative of a degree of informality as well as indicative in a professional context that the people in question are concurrently working on multiple different things together. When the actors in question are working within the framework of a professional relationship (as can be identified by topical analysis, organizational membership of the actors or any other method) this can be considered to be a measure of professional relationship proximity. Similarly, actors who significantly commingle professional and personal content are considered to have a greater degree of proximity to one another. Mutual references to attending social events (again as determined by any topic detection mechanism, or pragmatic tagging or any other method), are, in one embodiment, considered evidence of a social relationship, and hence personal proximity.

Similarly, the sending or receiving over time of communications that collectively contain a large range of different tones relative to the actor's communications generally makes it clear that there is a close emotional or personal relationship between the actors in question. From a visualization standpoint, divergences of behavior from an actor's established norms are the focus. Therefore it is interesting to compare the tone-topic-timing of the communications between any two actors to all other communications of these actors. In this way, the actor's "true" feelings about a particular event or topic may be separated from what she expressed more publicly, which of course has value independent from analyzing the proximity of the actors. Some embodiments therefore provide a report on all divergences, which is to say all occurrences where the tone expressed by an actor in regards to a particular topic or event vary with her proximity to the actor she is addressing. In some embodiments, the time interval to use is user-specified, while in others it is determined by the system via the use of clustering with time as a vector.

Figure 28:
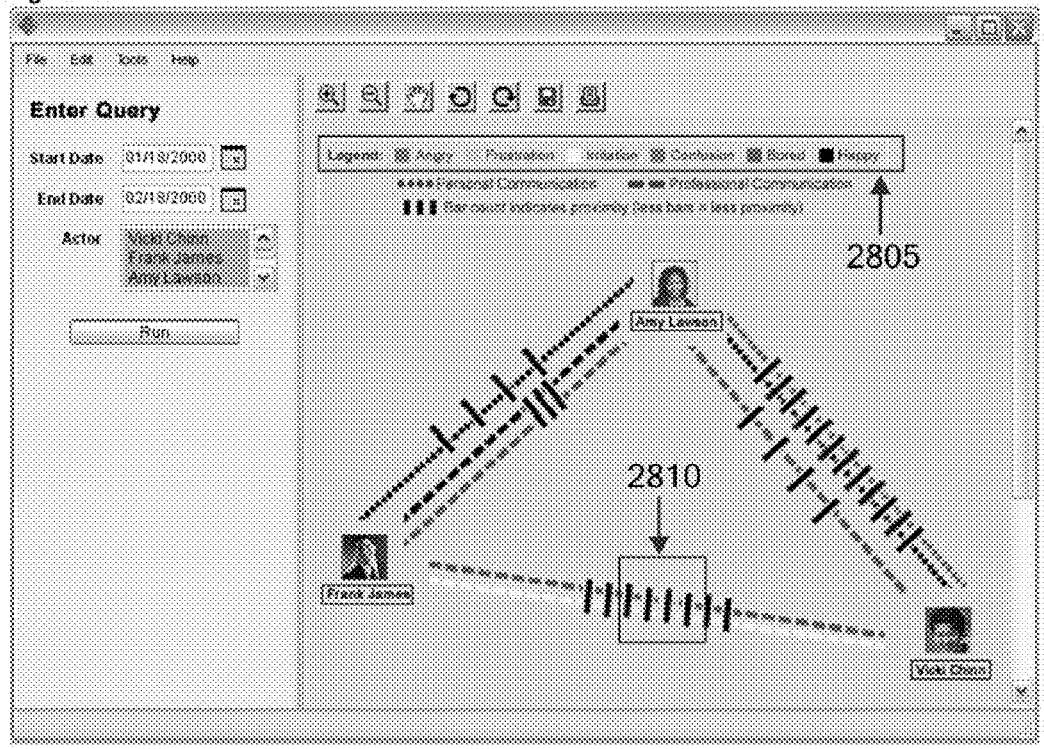
FIG. 28 is a screenshot of one embodiment of displaying actor proximity for both professional and personal communications.

FIG. 28 depicts one embodiment of the display of a set of actors who share both professional and personal relationships, some with augmented weights due to proximity analysis. Note that different tones are designated in most embodiments with different colors as depicted in the legend [2805] so as to optimally facilitate the creation of readable scaled down images or "thumbnails," to in turn facilitate useful side-by-side comparisons of different slices of data. The embodiment illustrated in FIG. 28 uses cross hatch marks [2810] to indicate the degree of proximity. Other embodiments may use different visual indicators including, but not limited to, different colors or fills of lines, different styles of lines, or lines that are adorned with various patterns and shapes in order to indicate the degree of proximity.

Figure 29:
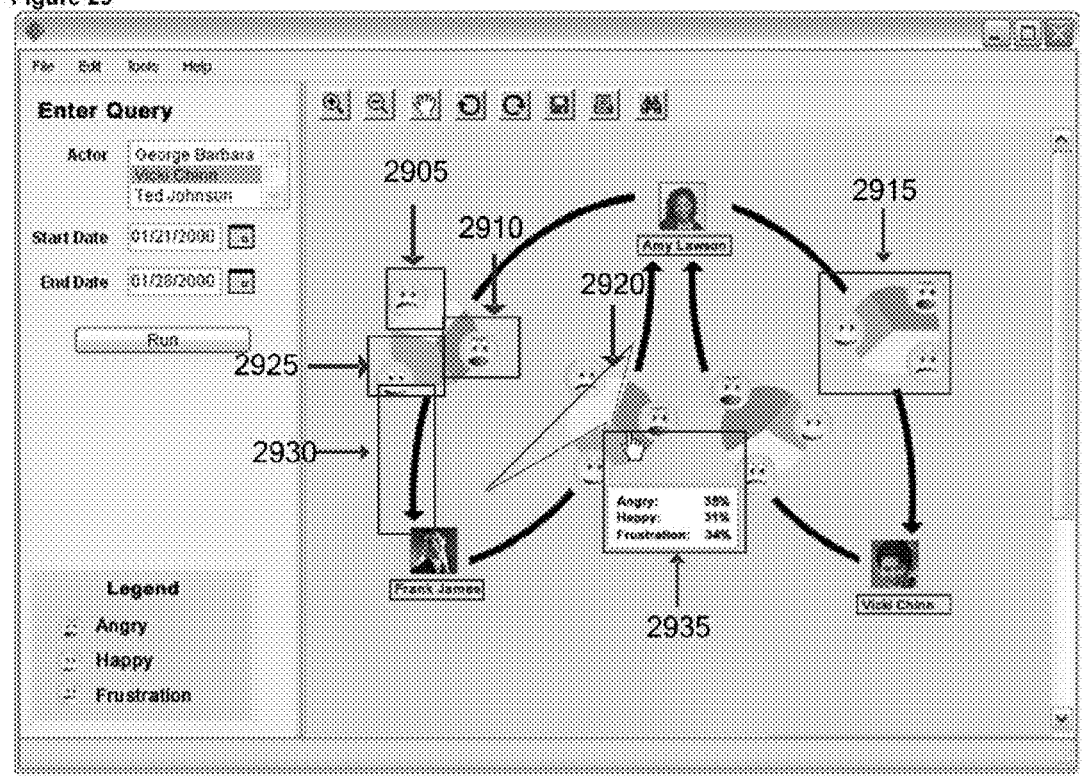
FIG. 29 is a screenshot of one embodiment of displaying emotive content for communications between actors.
Figure 30:
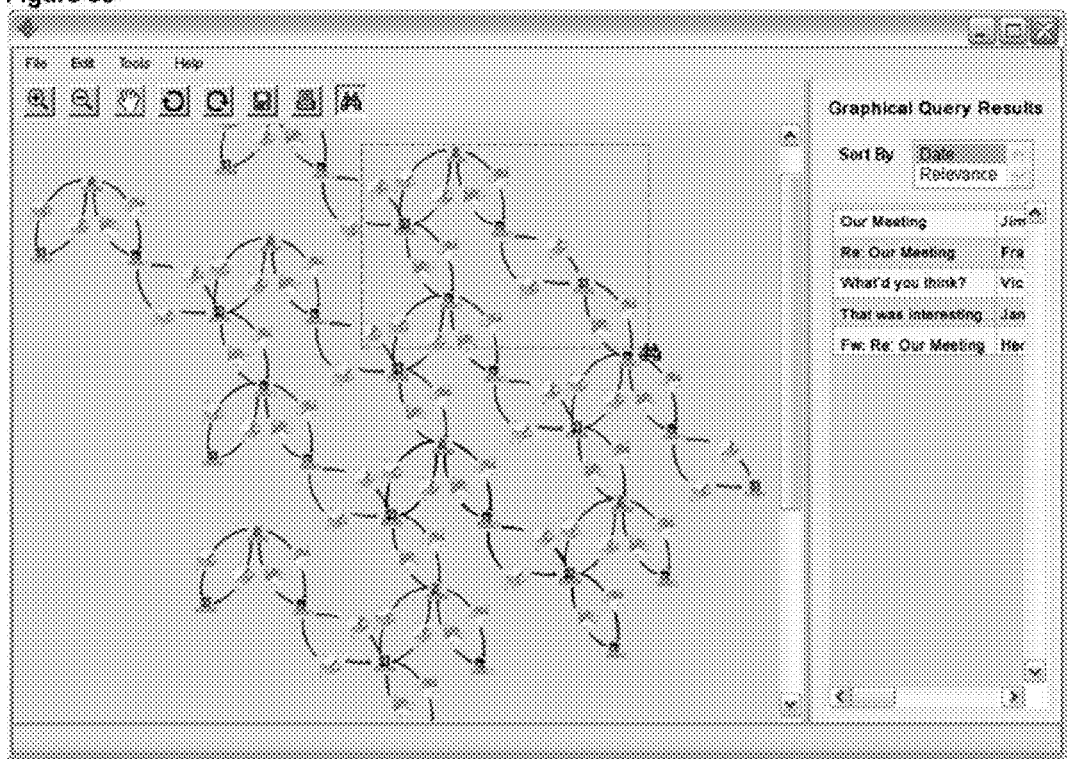
FIG. 30 is a screenshot of another embodiment illustrating the capability of graphical query.

FIG. 29 illustrates one embodiment of a visual comparison of the range of tones that an actor has used over time with different actors. Arcs [2930] connect images which represent different actors. In one embodiment, the pie images [2915] indicate the approximate relative proportions of the occurrences of different tones in the communications between the two actors in question. (It is "approximate" since in some instances, the same communication can be tagged with more than one tone.) In some embodiments, and as shown in FIG. 29, the pie wedges [2920] are embellished with the emotive icon [2905, 2910, 2925] for each tone that is present. In some embodiments, a mouseover [2935] with detailed related information is available. FIG. 30 illustrates a graphical query view based on FIG. 29. In some embodiments, clicking on the graphical selection tool, and selecting some objects in the canvas will cause a transition between the type of view illustrated in FIG. 29, and that illustrated in FIG. 30.

Figure 31:
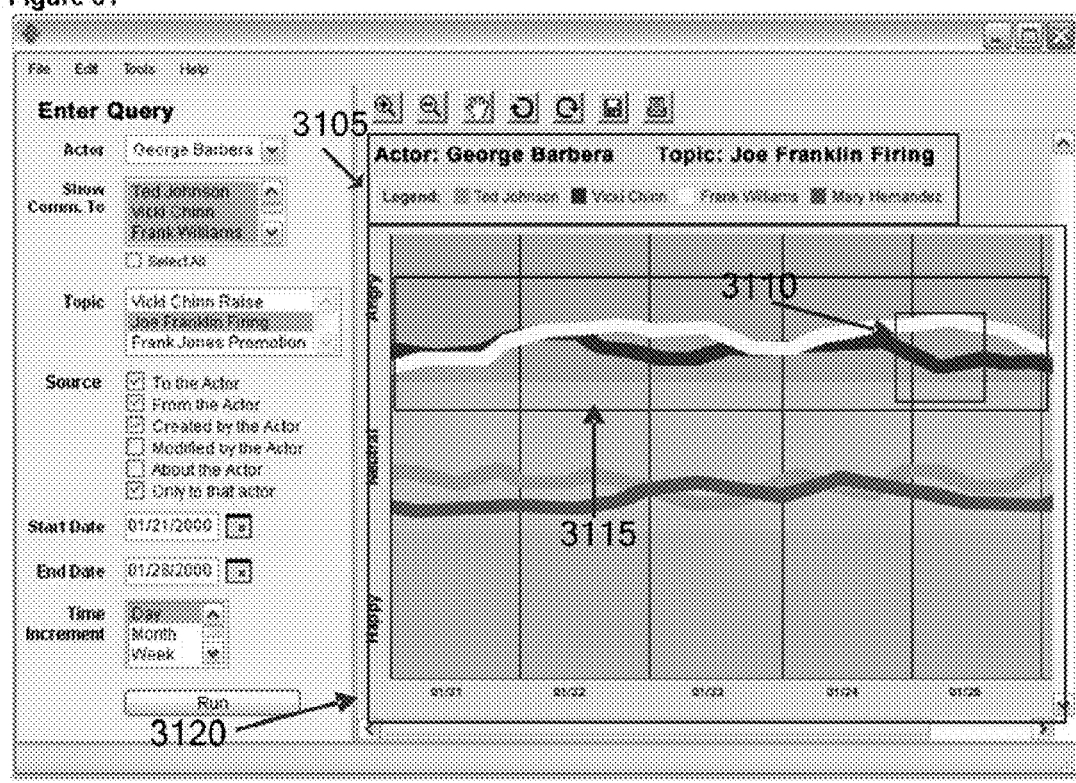
FIG. 31 is a screenshot of one embodiment of showing changes in tone over time.

FIG. 31 depicts a chart that illustrates the divergence of tone [3110] in the communication of an actor when speaking to different actors about the same topic(s) within a specified timeframe. The timeframe may be specified by the user, or may be determined by applying clustering or other statistically oriented techniques in order to determine the time intervals of greatest interest to examine given the selected actors. As depicted here, each tone selected by the user is assigned along the Y-axis of the chart [3115] and time is shown along the X-axis. Each selected actor is then indicated by a separate line.

Other indicators of actor proximity that are often interesting to analyze and visualize in this framework include but are not limited to:

In the case of emails specifically, whether the email starts off with some sort of salutation, such as "Dear Bob" when the email is addressed to only that person; or in some embodiments, only to others who are identified by any social networking technique as being in the same clique as both "Bob" and the author of the email. This assists with distinguishing the case where a more formal tone is being used due to the wide distribution list, or the inclusion of one socially distant recipient, and the case when the tone is indicative of nature of the relationship between email author and primary recipient. The degree of formality of the communication may be assessed by any accepted linguistic technique for doing it, including simplistic ones such as the use of words like "dear" or "regards."

Figure 32:
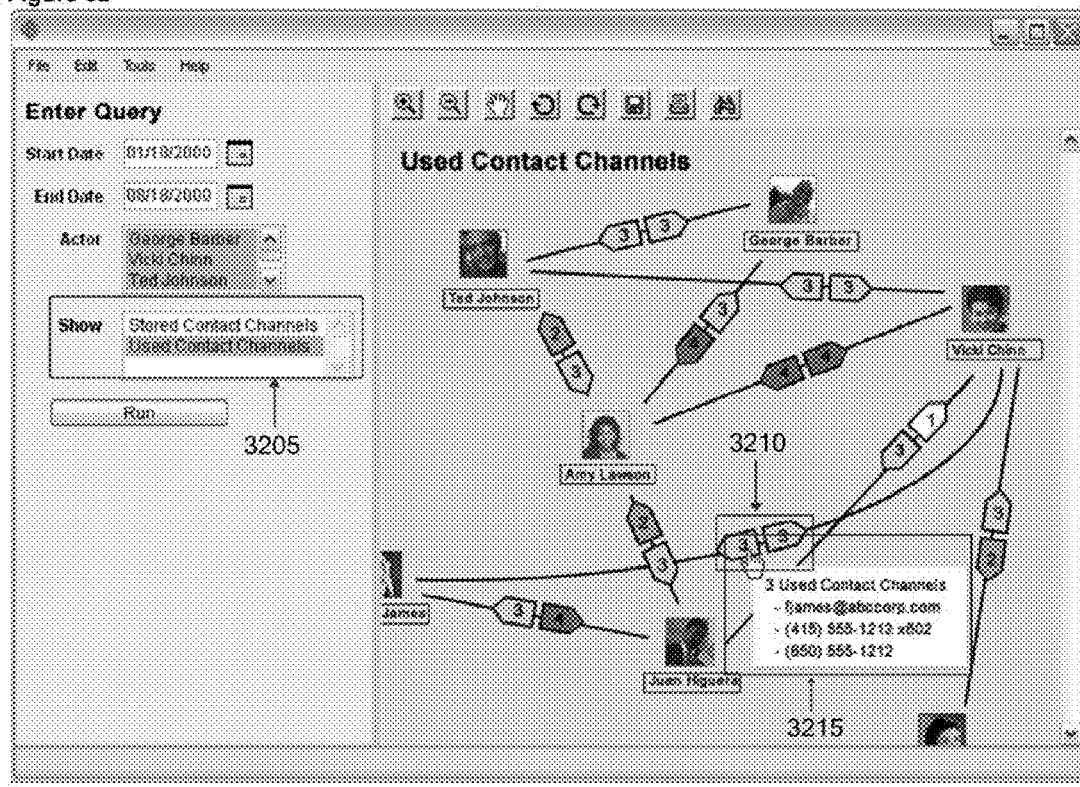
FIG. 32 is a screenshot of one embodiment of displaying actor proximity by the number of used contact channels.

The number of different communication channels that two actors use to communicate with one another is a good indicator of proximity. For example an actor who is frequently using different types of channels of communication such as personal e-mail address, IM, SMS, cellular phone, home phone, and work phone numbers to communicate with another particular actor is likely to have a close proximity to this actor. In some embodiments, as shown in FIG. 32, the number of communication channels can be displayed in a separate communications graph. In one embodiment, mousing over an icon [3210] which represents the number of different communication channels used for communication between the two actors will display basic information about each channel [3215]. In one embodiment, the number is color-coded, so that differences in the number of channels available between users is immediately apparent. In some embodiments, the user can use a control [3205] to select whether she wishes to see only those channels that were actually used within the constraints of the query as opposed to all of the different channels that the actors had used in all communications with each other. For example, different phone numbers, email accounts, IM identities and electronic identities, and whether one is using text messaging all add up to indicate the level of closeness that exists. Note, however, that this is not a bi-directional measure, as Joe may have every bit of available contact data for Bob—including personal ones—but that the reverse may not be true. A common scenario in which this would occur is when Bob works for Joe. Otherwise put, actor proximity, especially professional proximity is not necessarily symmetric.

An ongoing pattern of mutually consistent tonal communications; that is, in which both of the actors are generally creating and/or exchanging a significant amount of emotive content of a certain kind.

The percentage of all communications that are "short format", that is short, very low content messages that clearly presume a mutually understood context.

The frequency of receipt or sending of either type of instructions; in most embodiments, "mere forwards" are assigned a greater proximity weight, as they are implicitly presuming either or both a high level of trust (that is, blind delegation) and/or familiarity with how to correctly interpret the sender's wishes.

Note that many embodiments will provide and visualize separate measures for professional proximity, personal proximity, and overall proximity. Further, since changes in professional proximity are generally more easily linked to events that are discoverable by the system (for example, an actor transferring to another department) than is often the case with pure personal proximity, some embodiments may use different measures to measure each. Graphs Based on Discussions In one embodiment, communication graphs can use discussion metrics as their basis instead, or in addition to, of the flow of individual messages. Variations of this idea exploited in different embodiments include:

Only show links where M discussions of length N>1 exist between two actors as primary actors in the discussions, where the values of M and N are determined by the user [3305].

Similarly, but only indicate discussions that have meaningful content as determined by any means of analysis, including the use of ontologies [3310, 3315, 3320]. Other restrictions, include but are not limited to discussions that are in a certain area of workflow, discussions that happen over a particular medium, are of a certain raw data size or greater, occurred in a specified time-frame, involve certain actors, etc.

Figure 33:
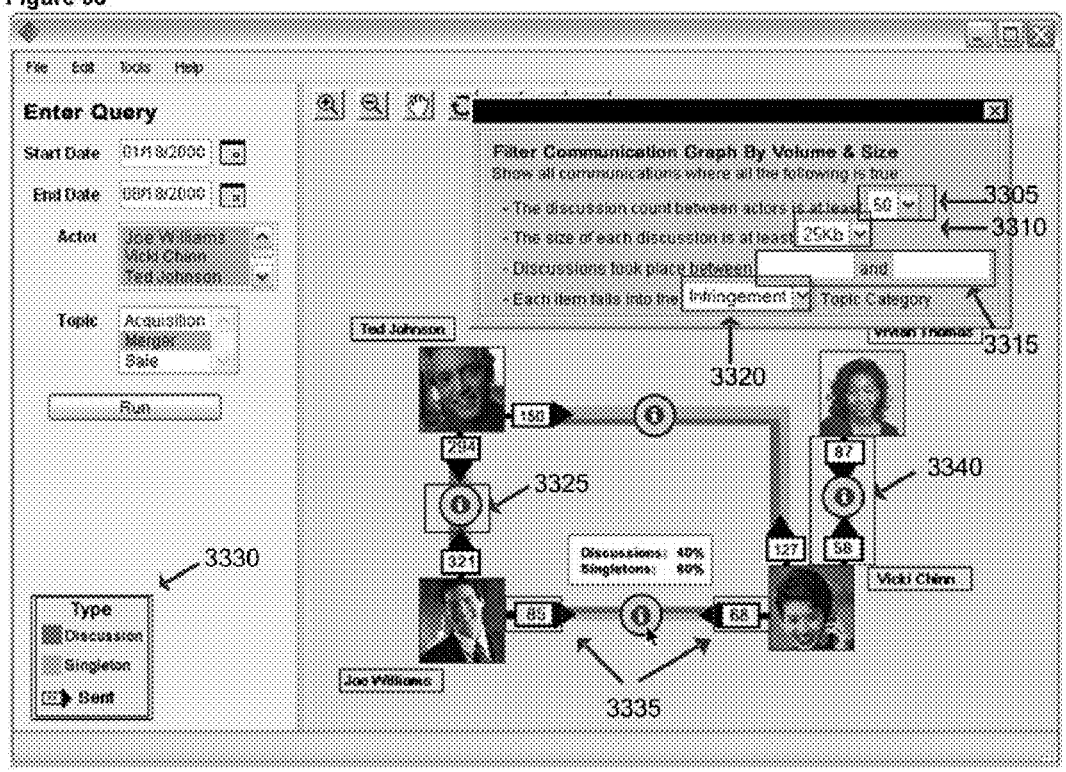
FIG. 33 is a screenshot of one embodiment of a graph based on discussions.

Show links in a different color to indicate the flow of discussions versus individual emails or other individual items. In one embodiment, the user may set thresholds for "flow of discussion." FIG. 33 illustrates one embodiment of a graph based on discussion-related thresholds with a set of related controls. In one embodiment, the system may divide a thicker line [3340] in two, in order to be able to simultaneously display both discussion and singleton communication. For example, if only one third of communication initiated ended up generating a discussion, and green were used to designate one-off communications and red those belonging to discussions, the red portion of the line would be a third of the total width of the line [3340]. In addition, in one embodiment, each line may have an icon [3325] at its midpoint that is a cue to the user that a mouseover with detailed related information is available. In one embodiment, the number of total communications [3335] meeting the current display criteria are indicated on each line. In other embodiments, the system uses different visual indicators including but not limited to line thickness, style, patterned fill, and end shapes in addition, or instead of, line color to visualize different aspects of the communication.

This approach of visualizing discussions rather than just individual communications is vastly more scalable for large corpora, which often have tens of thousands of actors, virtually all of whom are users at least of email. One actor may send email to a huge number of other actors over the course of time, and indeed to many actors whom she may not even know via the use of email groups or aliases. Further some emails may seem to come from a particular actor, but are in fact automatically generated. Co-participation in a discussion, on the other hand, requires at least some degree of real interaction among the actors, and is therefore a much more accurate way of capturing meaningful communication behavior, and separating it out from the noise. Further, and importantly, discussions are an excellent measure of the closeness proximity of two actors, and therefore can be used as a metric to evaluate changes in actor behavior over time. As noted elsewhere in this application, identifying such changes is often critical to the success of an investigation. For example, one actor suddenly trying to distance herself from another could be construed as evidence of guilty knowledge.

Communication Graphs & Organization Charts

Figure 34:
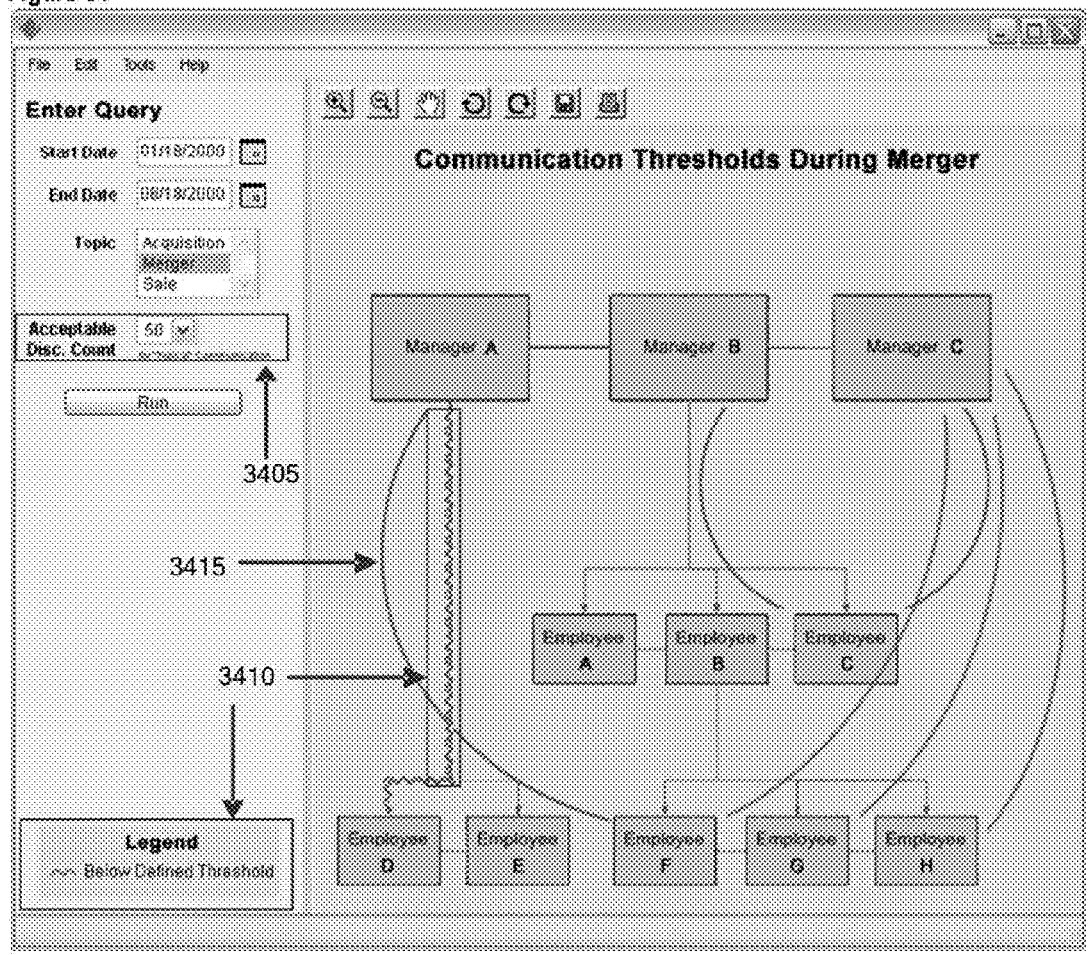
FIG. 34 is a screenshot of one embodiment of communication in the context of the organization chart displaying a missing link and communication around the organization chart.
Figure 35:
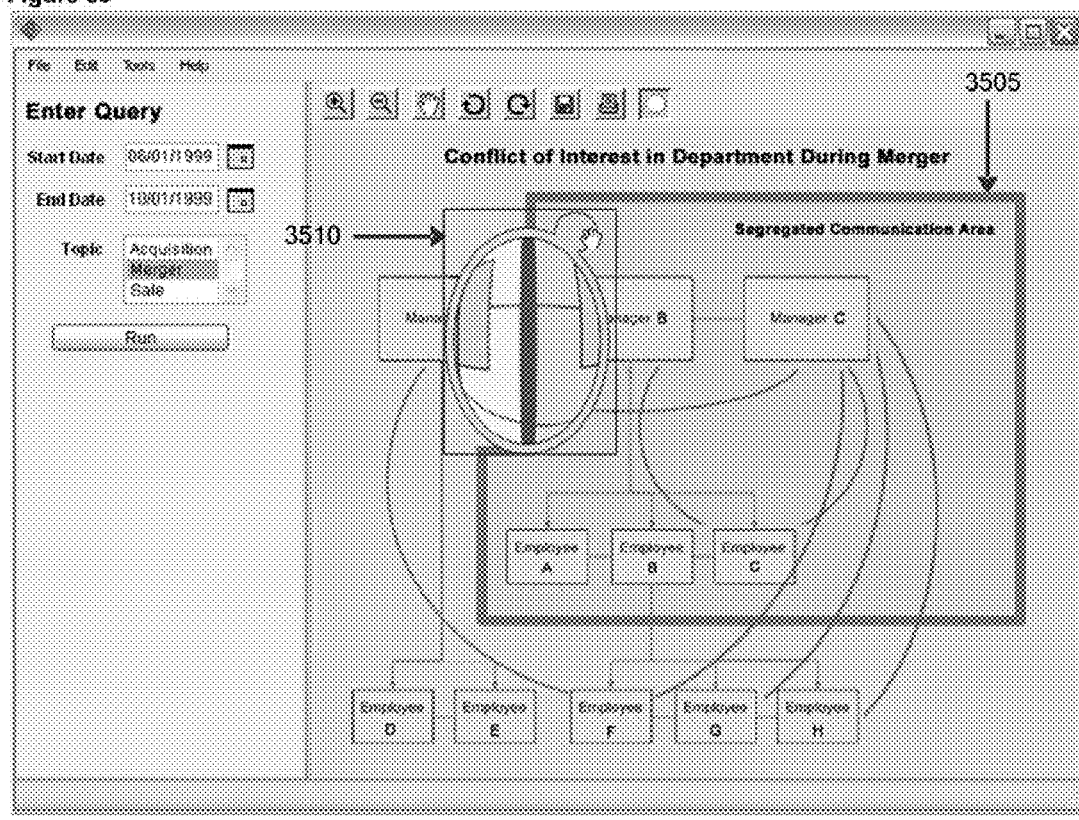
FIG. 35 is a screenshot of one embodiment of communication in the context of the organization chart displaying communication boundaries.

It is often useful to visually overlay communication pattern information over an organization chart, so as to see where actual communication did or did not follow the lines defined by an organization chart. FIGS. 34 and 35 illustrate related embodiments of such an overlay showing discussions. Other embodiments may depict individual messages. It also is often important to visualize the boundaries [3505] that exist within sub-organizations or between organizations. For example, in large brokerage houses, there may be groups within the organization that are forbidden for some period of time from sharing information on specific topics. Detecting violations of these policies is, therefore, of great interest. In some embodiments, content that is determined to be of a personal nature will be removed from consideration in this view unless otherwise instructed by the user.

In one embodiment, such boundaries [3505] may be marked with brightly colored and highly visible lines, or other indicators. In one embodiment, the colors used to designate the organization chart differ on opposing sides of such a boundary [3505]. In another embodiment, these boundary areas [3505] are automatically rendered with a spider-eye or wide-widget effect, so as to make relatively larger and more noticeable (relevant) communications that are crossing the boundary [3505] as illustrated in FIG. 35. In some embodiments, all communication is treated in this fashion—not just communication that is deemed to be relevant. In other embodiments however, the user may select the topic(s) that she wishes to see displayed in the graph. In some embodiments, the user may create her own label for the graph so as to facilitate the use of the graphs as trial art. In some embodiments, controls [3405] are provided which allow the user to change certain parameters of the graph, which include but are not limited to: threshold number of messages or discussions, tones, and topics involved. In yet another embodiment, the "decorated" view of the organization chart is placed next to the plain one rather than being overlaid.

FIG. 34 depicts one instance of communication "around" the organization chart [3415], and one "missing" link [3410]—a link connecting a pair of actors organizationally which is associated with an abnormally small amount of communication relative to other similarly placed actors in the organization. For example, if a Vice President has six people reporting to him, and there is substantially more communication—either generally, or with specific characteristics such as certain topical content—with the first five as opposed to the sixth, this would qualify as unusual, unless the sixth actor had only been present for a fraction of the relevant time. In one embodiment, a "heavy" link—a link depicting a pair of actors organizationally which are associated an abnormally large amount of communication is also highlighted. In one embodiment, communication "around" or "outside of" the organization chart (that is, communication that traverses different levels of the organization but where there is not a reporting relationship of some kind) is highlighted with a "heavy" link or other differentiated visualization. In some of these embodiments, the user determines whether all such communication should be so highlighted, or specify parameters for what should be visualized, such as a threshold for the number of communications, specific properties required of the communications, or limit it to specific organizations.

In this example, the "missing" link is depicted with the red zigzag line [3410]. In other embodiments, the highlighting may be with an eye-catching zigzagged or jagged line in a bright color, a blinking effect, or another representation used to draw attention to the abnormal behavior. The purpose of such techniques is to highlight anomalies that might otherwise be very difficult to spot in a very large and intertwined organization chart. In one embodiment, this chart may be displayed for overall communications, for a particular segment of time, for a particular topic, or constrained in other ways as defined by the user.

In addition, in some embodiments, the system identifies connections which exist in the organization chart but which would not be rendered according to the requirements of the current communication graph (for example, which are below certain user-defined thresholds for communication to be sufficient to be visualized.)

These same techniques for recognizing unusual communications can be applied on the basis of user-identified or user-defined characteristics of the actors, or departments. These characteristics may range from membership in a protected class to length of time at the company, to manager, or any other characteristic which may be determined based on the available information. For example, a user could decide that gender was an important employee characteristic, and wish to see whether there was less communication to employees of a particular gender from certain actors or departments. Although FIG. 34 illustrates actor-communications, in one embodiment the communication of a group of actors may be displayed collectively by organizational structure or other characteristic.

It also can be applied to structures similar to organization charts, but which are not strictly organization charts; for example, workflow processes such as approval processes. Similarly, this approach also can be applied to communications traveling between completely distinct organizations, for example, two competitors engaged in communication that is questionable under the Sherman Antitrust Act. These groups are collectively referred to as "structural relationship charts." Analytics on the Spread of Information Inside Organizations One aspect of the system is the use of ontologies and named entity extraction (i.e., the identification of proper noun phrases or acronyms in the text), in order to perform a number of different functions such as the identification of topical content. In one embodiment, "new" named entities may be identified by analyzing the custom dictionaries, address book information, auto-correction settings, and other types of metadata that may be retained by certain applications, such as MICROSOFT OUTLOOK, MICROSOFT WORD, and trying to assess which entries correspond to named entities. By "new" we mean that may not exist elsewhere in the corpus to be extracted. This assessment may utilize a variety of data and techniques, including but not limited to:

Token match with common names in the languages present in any form in the corpus Considering other entries in the custom dictionaries of other actors in the same organization and noting the date of the entry in the custom dictionary (if available)

Considering the application context—for example a string that appears in an address book is quite likely to be a person.

Note that the scan of custom dictionaries and auto-correction settings also can be used to capture misspellings of named entities that can be automatically added to the representation of that named entity as an acceptable variant. A similar technique may be used with respect to any form of electronic address book or contact list.

Figure 36:
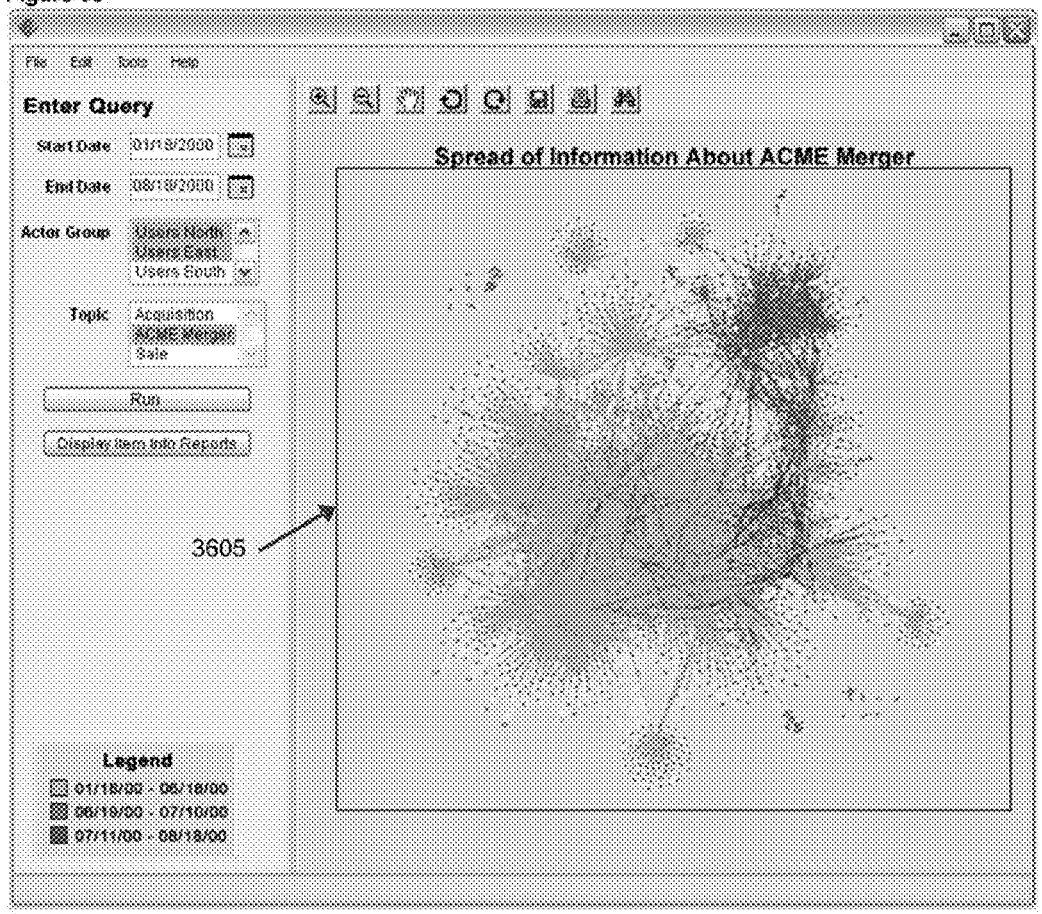
FIG. 36 is a screenshot of one embodiment of a graph displaying the spread of information.

These techniques enable the graphing of the spread of awareness of or interaction with a particular thing or issue—which may be a specific named entity or topic—throughout an organization, thereby possibly proving or disproving a contention that a person or entity was unaware of the existence of a particular issue or thing prior to a given date. In addition, using commercially available graphing tools, the spread of references to a named entity can be presented in graph form. One embodiment of such a graph is illustrated in FIG. 36. In one embodiment, each communication that includes a reference to the named entity is depicted as a link; all other communications are filtered out. The color of the link is associated with the timeframe in which the communication occurred. In one embodiment, this may be utilized to determine how the information spread—i.e. identify the actor or actors who originated or disseminated the issue. In some of these embodiments, the representations of actors connected by colored links also take on the same color, either as fill or border, if an image. In another embodiment, different colors are used to designate the certain awareness of different actors of the named entity based on the interval of time that they first generated content involving the named entity (whether or not the content was shared with others.) In some embodiments, a date extracted for metadata, such as the date when a contact was entered in an address book, will be considered evidence of awareness. In some embodiments, the links and nodes are rendered against an x-axis representing time; in some of these embodiments, different colors or icons may be used to indicate the medium of communication; for example, email vs. IM. In another embodiment, the time slice presentation technique described in this application may be used. In some embodiments, VCR-like controls are provided along with slide sorter metaphor such as those used in common slide presentation tools. Still other embodiments will make use of thumbnail image-based representations.

Other Visualizations of Discussions

While communication style arc-node graphs have many excellent applications, they are not optimal for every use case. For example, they are not particular good at helping to visualize certain types of differences in the properties of the discussion such as when in the discussion some type of meeting event occurred, or if the discussion were abnormally short relative to the normal size of discussions for the particular pairing of topic and actors. Therefore, in most embodiments, the system provides alternate visualizations of discussions.

Figure 37:
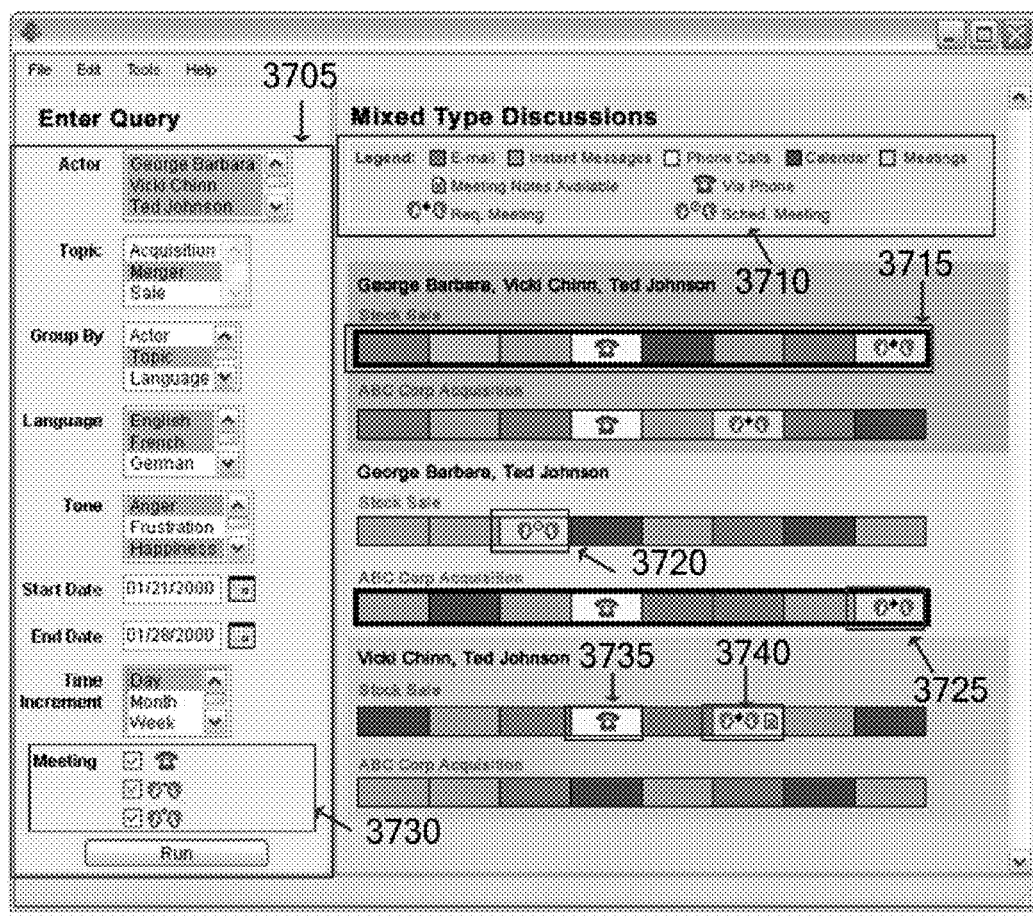
FIG. 37 is a screenshot one embodiment of sequentially displaying mixed type discussions.

One style of non-communication-graph visualization of discussions that contain meeting object content is shown in FIG. 37. Note that different visualizations may divide these meeting concepts somewhat differently. For example, the embodiment shown in FIG. 37 shows all calendar events as the same color, regardless of whether the calendar event was referring to a phone meeting or an in-person one (unless there is also a phone record present, in which case the calendar event is a subobject of the actual phone call.)

As pictured in FIG. 37, in one embodiment, each discussion meeting the criteria specified by the user via the query controls [3705] is displayed as a horizontal bar [3715]. As shown in the legend [3710], the different mediums associated with the sequential items in the discussion are displayed with different coloration and/or icons [3735,3725]. As pictured here, in one embodiment, discussions which end (or "truncate") in a meeting event are rendered with a thicker border. However other embodiments may use different visual alerts to designate such discussions. Meeting objects that do have associated text documents are decorated with an icon [3740] to indicate this fact. Some configurations provide sorting and grouping controls.

In most embodiments, the system allows the user to query for "mixed type" discussions, that is, those which contain— or are presumed to contain—meetings for which no written record may exist. In some of these embodiments, the query language contains operators, and the user interface corresponding controls which allow the user to query for various properties of such discussions. These include, but are not limited to: discussions which end with a meeting object, discussions that appear to contain a pivotal meeting event (discussed in a following paragraph), and discussions which contain meeting objects of specific types.

Such "mixed" content discussions are by definition instances in which the participants have chosen—at least for some part of the discourse—to move away from written forms of communication. While many of these may be innocent, calculating and noting changes in behavior around key events in the matter (as specified by the user, or as derived by the system,) or simply over time, can be very suggestive. Additionally, to focus analysis or improve visualization, the user may further limit the set of discussions of interest by any number of other means, including but not limited to: the presence of specific topics, as determined by ontological or statistical means, the presence of specific languages, and any method for determining tone.

In one embodiment, requests for a phone call is of a very specific kind in order to be considered an actual request. For example, they must not be conditional in nature (e.g., "if you have any questions, please feel free to call me.") nor a business formality or pleasantry (e.g., "you may always call me if needed.") Rather, in most embodiments, such references are limited to imperative forms (e.g., "call me to discuss." or "let's discuss further off-line"), Otherwise put, most embodiments require that the author be clearly instructing or requesting the recipient(s) of the message to call, rather than merely suggesting that they are there to answer questions or the like.

Figure 38:
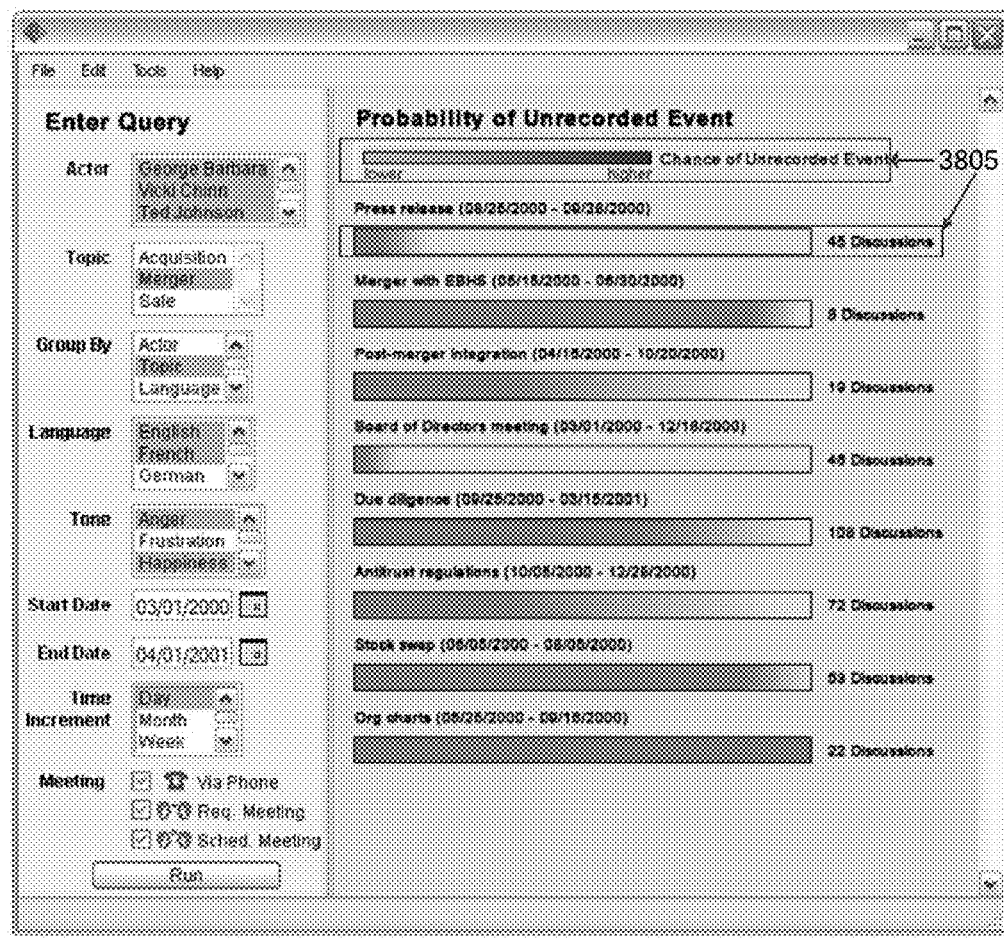
FIG. 38 is a screenshot of one embodiment of displaying probability of unrecorded event.

We may compute and visualize probabilities of the conversation moving away from written form based on any of a number of properties. FIG. 38 illustrates one embodiment of displaying these probabilities. FIG. 38 uses shaded bars to depict the probability that different clusters of discussions (that is, discussions that share a certain number of attributes in common) that meet the query criteria will contain a meeting event.

Figure 39:
FIG. 39 is a screenshot of one embodiment of displaying relevant comparative data about discussions including discussion length and the number of discussions that ended in a "call me" event.

FIG. 39 displays comparative data of discussions of different properties as selected by the user with the available query controls. This particular example depicts the average length and the total number of discussions for each topic selected by the user, as well as the number that ended in a meeting or phone call. (This last is sometimes referred to as a meeting event or a "call me" truncation.) For example, perhaps the average size of discussions amongst a specific set of actors involving a customer contract is eight, but for a particular contract it is never more than three, with the last message generally containing an imperative form of "call me.", otherwise put, a "call me" truncation. This would be a red flag that would suggest that there was something unusual with respect to the handling of this particular contract. Other embodiments may alternatively use pie charts to illustrate percentages, show bars for total number of discussions, etc. In some embodiments, statistical analysis for significance of the variance in size can be automatically run. Reports may be generated as to both the absolute and relative number of such discussions over any desired time interval, as well as graphing changes over time.

In some embodiments, each discussion that corresponds to the user-specified query is drawn in sequential chronological order that is generally faithful to a timeline. In some embodiments each item in the discussion is colored by media type, for example, email vs. IM vs. phone call. As noted in prior section some embodiments may represent each media type on a different line rather than color-coding different types of objects. This is more appropriate in situations where there could be concurrent events that require depiction, for example, IMs sent during a meeting.

Figure 40:
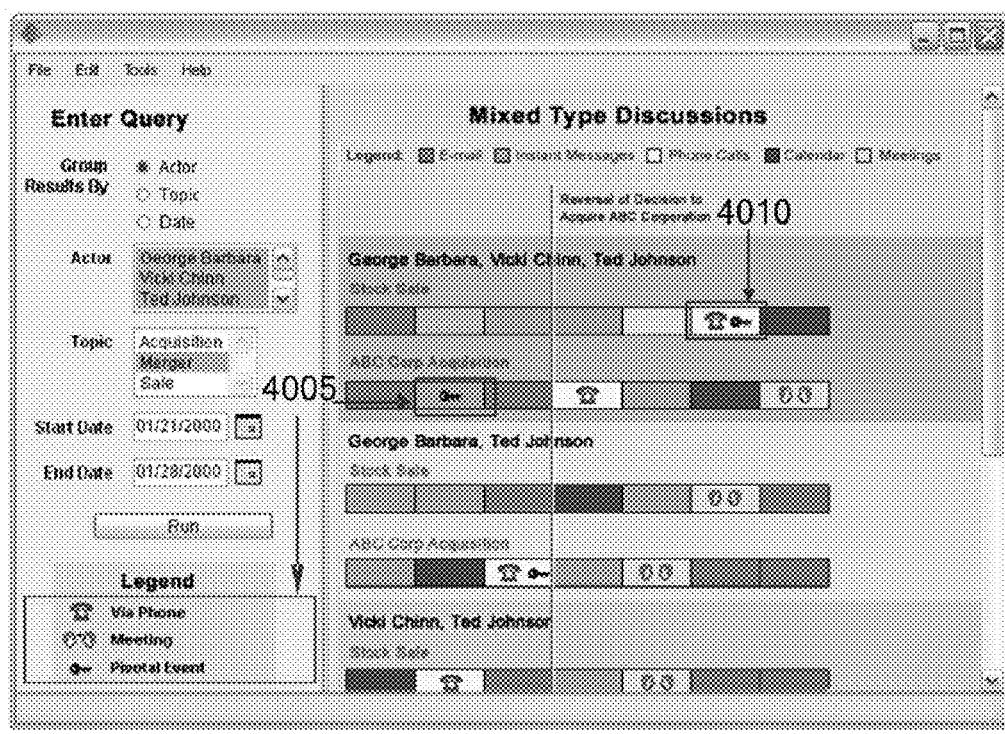
FIG. 40 is a screenshot of one embodiment of sequentially displaying mixed type discussions along with pivotal events.

Some embodiments may attempt to identify phone calls as pivotal events based on pragmatic tagging of any written messages that occurred both just before, and just after, the phone call. FIG. 40 depicts an instance of this; meeting events that the system has tagged as pivotal are decorated with an icon [4010]. In some embodiments, discussions that the system deems do contain pivotal meeting events and which lack supporting transcript documents are especially flagged for the user's attention. In some embodiments this is done through additional visual highlighting of the discussion or annotation with an icon. Pivotal events and pragmatic tagging are described in more detail in the SOCIOLOGICAL DATA MINING APPLICATION.

In some embodiments, there may also be similar views that visualize singleton emails rather than discussions, or just discussions.

Other Visual Analytics
Analysis of Tone in Actor Communications

In one embodiment, items that were created on a small format device such as a PDA are identified by the system. In one embodiment, footers attached by such devices, or the actual statements within the content, may be used to identify such devices.

In one embodiment, such items are considered to be a different modality compared to email or IM, even if the communications medium is email or IM. Since most people have difficulty typing on the small keyboard, such items should not be assessed for tonal content on the basis of shortened sentence structure, since doing so would yield false positive results for certain types of tonal content or for "mere forward" analysis. Similarly, a reply to a message sent from such a device must be deemed less likely to be a complete response to a longer message (or a message with attachments), since scrolling to read a large amount of content on such devices is often cumbersome. Some embodiments may consider this dimension when, for example, determining when (or whether) an actor became aware of a particular thing.

General Correlation

Ontologies and other approaches may be utilized in order to detect the tone of a message or document. Other approaches include, but are not limited to: the use of tropes, lexical selection, emotional syntax, analysis of syntactic construction, analysis of contrasting conceptual structure, use of deception theory, and other techniques from computational linguistics. For example, exclamation points and curse words can generally be taken as an indicator of anger or frustration on the part of the author. Other tones include, but are not limited to, confusion, concern, sarcasm, etc. This has obvious utility in determining when actors are under emotional stress relative to certain people, or certain topics, which may have a direct bearing on the investigation or litigation.

In one embodiment, each such occurrence of a specific tone is automatically correlated separately and jointly with:

The presence of specific topics, as identified by ontologies, human reviewers or any other method.

Events of importance as entered into the system

Pairs or tuples of actors

Sharp changes in communication patterns among actors

Various visual displays of these tones may be used. The visual displays may include Venn diagram visualizations, line graphs, and tabular reports of statistically significant correlations.

In some embodiments, "emoticon" style iconic indicators are present in discussion and item headers and in different display views which indicate use of emotional tone. In some embodiments, different styles of icon may be used to represent different tones. The user also may query for content on the basis of tone or determine that the presence of emotional content either in general or of particular types including but not limited to angry, happy, or frustrated should be considered a criterion to consider the document "hot" for example (which in the parlance of attorneys signifies that an item is both important and interesting), and/or place such items in a special stage in workflow.

Some embodiments make use of the system's ability to associate quoted text with the actor that originated it. One embodiment of creating such an association is described in the SOCIOLOGICAL DATA MINING APPLICATION. In one embodiment, the association is used to assess not just that there was "angry" language content in the document, but that actor "Joe Smith" was the angry speaker. In some embodiments, the query language is extended to support queries such as "find all documents in which Joe Smith used angry language."

Analysis of Changes Over Time

In complex investigations, changes in attitude of the major players who are under investigation towards one another—or towards others—may be of critical importance in evaluating, amongst other things, the veracity of witness statements and the likely motivations that underlie them.

While there are many existing techniques in linguistics to identify the tone of written communication, these do not help to determine the significance of the tone(s) used by different actors in the corpus, and any variations in them that occur over time. For example, a hostile email from Jane Smith to Bob Jones, may simply be indicative of the fact that Jane is having a bad day, or it may indicate that Jane is angry at Bob specifically, or about a specific topic that relates to Bob—or it may be part of a pattern of many people being angry at Bob. It could be the case that there is something going on at Janet's and Bob's company that is causing some group of people to be generally unhappy, and as a result, the steam is being let off that may be directed at someone almost randomly.

Figure 41:
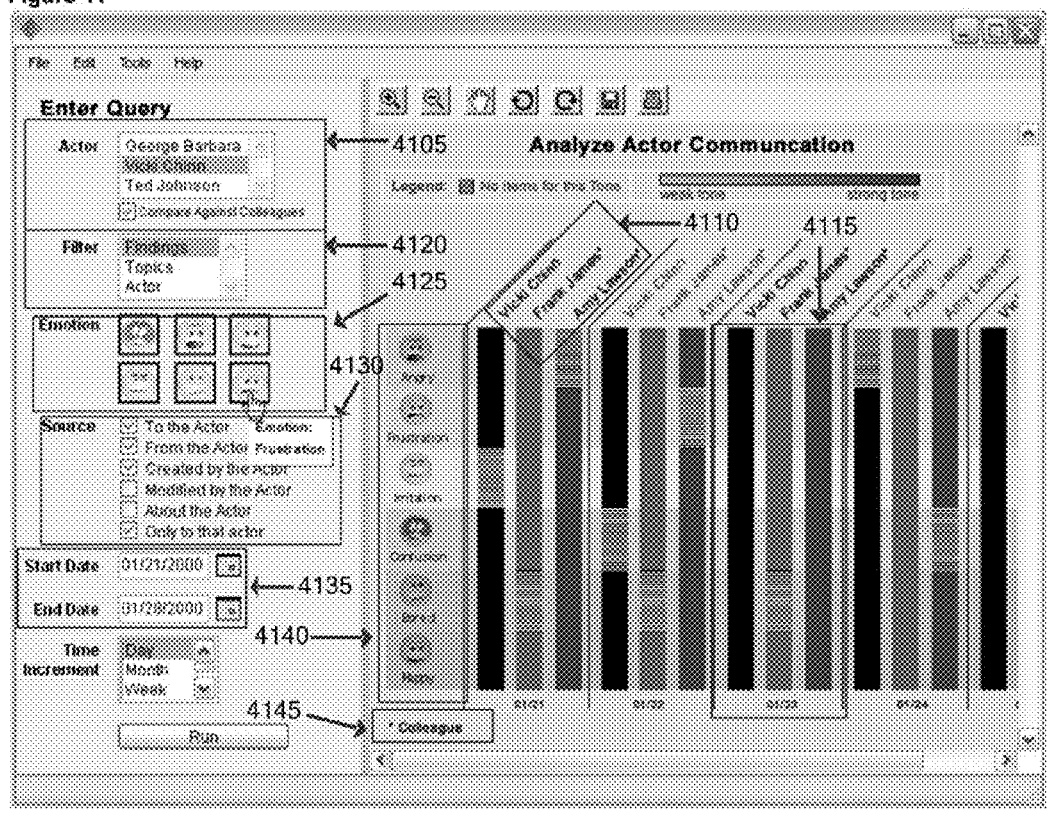
FIG. 41 is a screenshot of one embodiment of a tonal analysis of Actor communication.

Each of these different possibilities will have different implications in an investigatory context, so identifying them correctly is important. To do this, as illustrated in FIG. 41, the communications of user-selected actors are analyzed for the presence of different kinds of tonal content. Different types of tonal content may include, but are not limited to: angry, depressed, upset, sarcastic, defensive, worried, confused, happy, friendly, and threatening. Each individual item is tagged with whatever tones are determined to exist in it. Once this tagging has been completed, in one embodiment, the results are correlated and clustered by other key variables including but not limited to: other actors, time (both calendar, and in relationship to specific events of interest) and topic (as analyzed by any topic detection method). This allows the system to identify the pattern of tonal usage on the part of each individual actor with respect to other actors with whom she interacts, and whether deviations from their own particular norms seem to be triggered by particular other actors, topics, events, etc.

FIG. 41 depicts one exemplary visualization of tonal content used in communication among user-selected actors. Using the query controls [4105, 4120, 4125, 4130, 4135] the user may select specific actors, or groups of actors, or, by specifying none, indicate that all actors are to be analyzed. In one embodiment, the user may specify actor-relative groups of actors, for example "Bob Jones and all others in same department." In some embodiments, when actors groups are selected by the user, data for all actors in the group is combined. The user also may narrow the results by topic, time, or specific tones. In some embodiments, the user also may specify the granularity of the time axis.

As depicted in FIG. 41, in one embodiment each tone is displayed on the vertical axis of a matrix. As shown, each tone is labeled with its own emotive icon. The name of each selected actor appears as a label once per time increment as labeled on the horizontal axis. For each tone, for each actor, and for each time increment, there is in one embodiment a rectangular area that may be filled in different ways. In the embodiment presented in FIG. 41, the degree of saturation of the fill indicates the extent of material content of that tone present. Different embodiments may measure this in different ways; for example, as the percentage of all qualifying items that contain that tone, or relative to the normal behavior for that actor. As shown here, in one embodiment if the particular tone is completely absent for that actor in the given time increment, a different fill is used so as to highlight the fact. Some embodiments also may denote specific co-workers (members of the same organization, however configured in the specific instance). In some embodiments, the different tones are displayed against the backdrop of a color spectrum, such that, for example, an "angry" tone would have a reddish background and its fill would likewise be red, while a "happy" tone might be depicted as violet in hue, as it is the opposite end of the spectrum. In one embodiment, the fill may be adjusted based on the norm for interactions between those users. That is, an angry interaction between two users who always interact in an angry tone is less emphasized than an angry interaction between two users whose interactions are normally neutral or happy.

Figure 42:
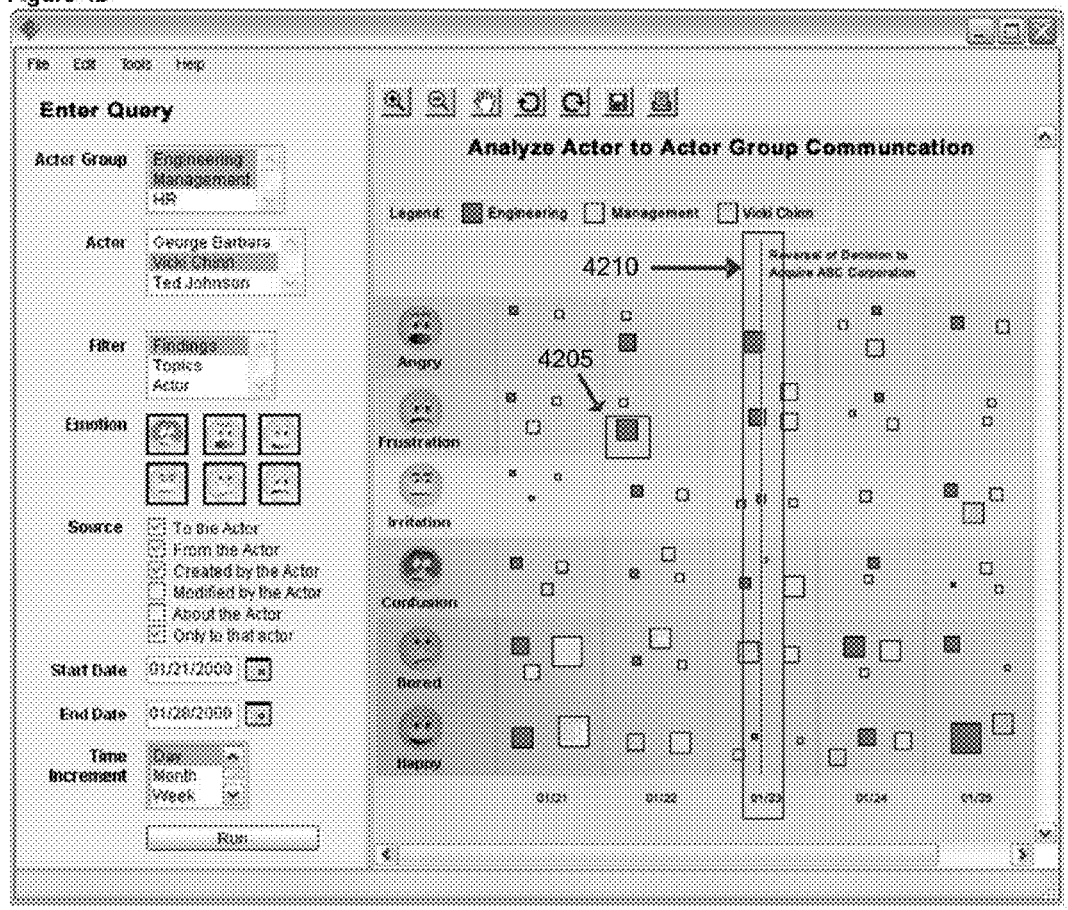
FIG. 42 is a screenshot of one embodiment of a tonal analysis of actor to actor group communication.

FIG. 42 depicts a somewhat different embodiment with respect to the visualization component. In this embodiment, the presentation matrix is the same, but the area of each block that represents the intersection of actor and time increment is subdivided among all of the actors (or actor groups) currently being visualized. If the actor has some of the appropriate kind of tonal content in that time increment, a block [4205] representing that content will appear. The relative size of the block [4205] is determined by the relative amount of content that exists for that tone. In one embodiment, the color of the block [4205] corresponds to the color used to depict that particular actor in the legend. Note that events [4210] may also be displayed in this view. Note that the exact query controls available vary by embodiment and configuration.

The example pictured in FIG. 42 is comparing the tonal communication behavior of an individual actor to two groups of actors. Some embodiments will also go the reverse direction, which is to say, given one or more actors, identify actors or groups of actors who share like patterns of tonal usage activity with the selected actors.

Figure 43:
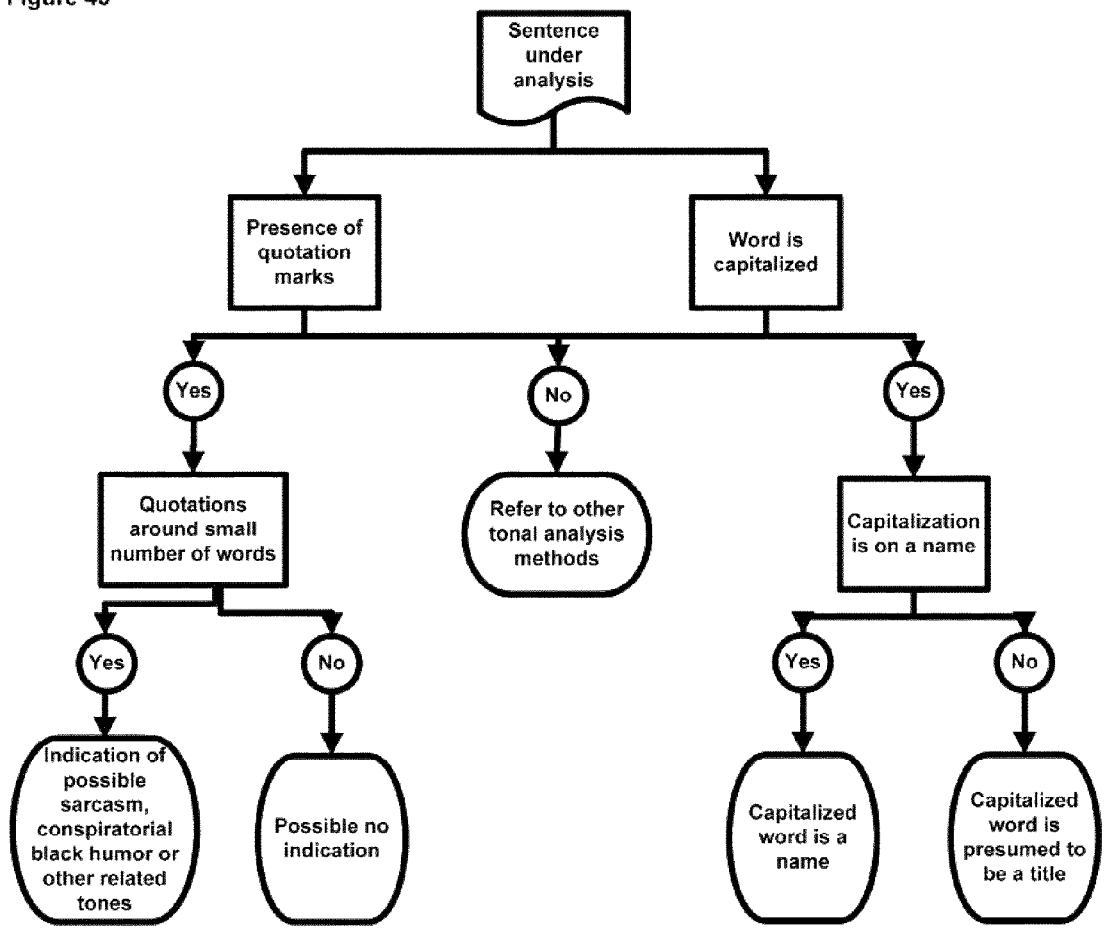
FIG. 43 is a diagram of one embodiment of how a sentence is analyzed for tonal content.

The presence of quotations marks in unusual places is often an indicator of either sarcasm or related conspiratorial black humor. For example, consider the sentence, 'does he understand the "rules"?' In one embodiment, quotation marks around a small number of words are considered to be an indication of both tone and social proximity. In some embodiments, if any word is capitalized that is not apparently the name of a person (as determined by named entity techniques, look-up tables of common names or any other established method) or another known term that requires capitalization, the text in quotes is presumed to be the title of something. In most embodiments, the maximum number of words is user-configurable. The reason that the number of words is limited is that if the number of words appearing in quotes is small, it is much less likely to be an instance of the author actually quoting someone or something else. A flowchart of one embodiment of this analysis is illustrated in FIG. 43

Figure 44:
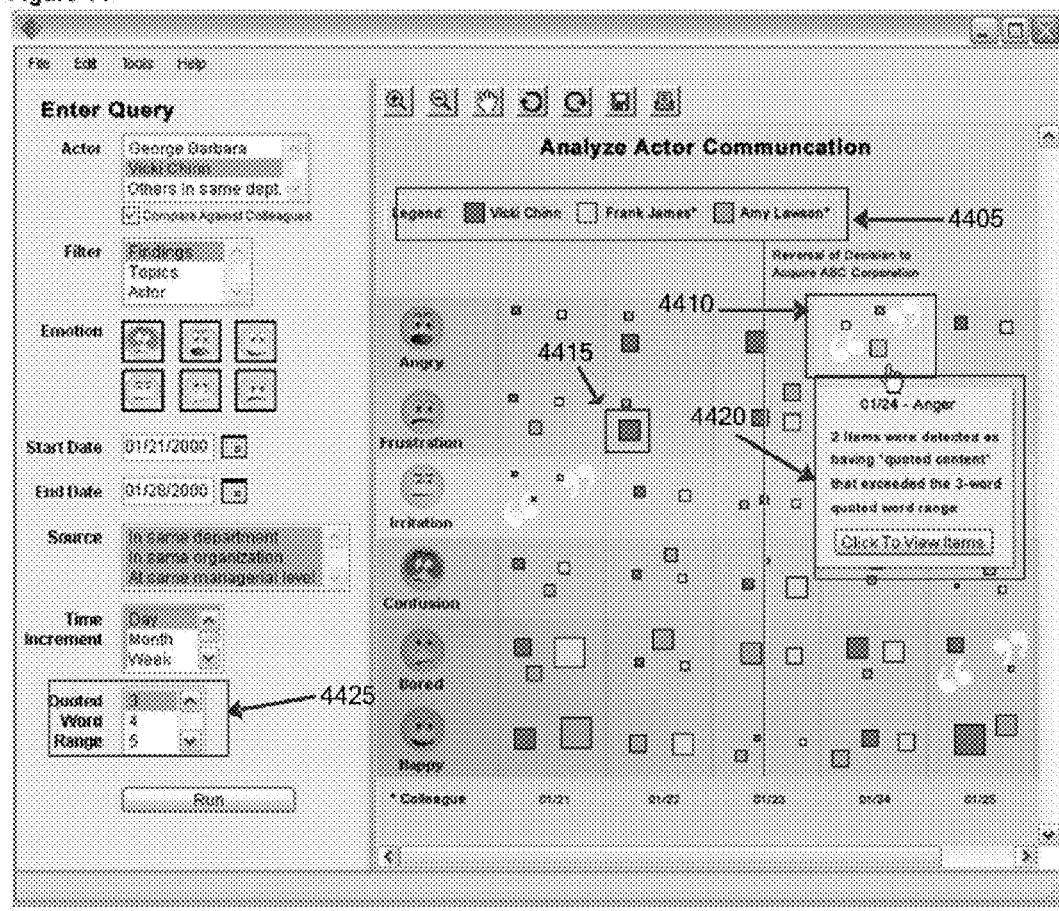
FIG. 44 is a screenshot of one embodiment of a tonal analysis of actor communication illustrating an icon for quoted content.

FIG. 44 visually indicates quote marks [4410] if there were one or more instances of presumed "sarcastic" use of quotes. Other embodiments may provide the number of such instances or scale the size of the quotes depending on the number of instances. In some embodiments a mouseover may be provided which displays some basic information [4420].

In some embodiments, all communications that are to the actor, from the actor, that were created or modified by the actor, or which were about the actor, are considered to be associated with that actor. In one embodiment, the user may determine which of these associations she wishes to invoke [4510].

Figure 45:
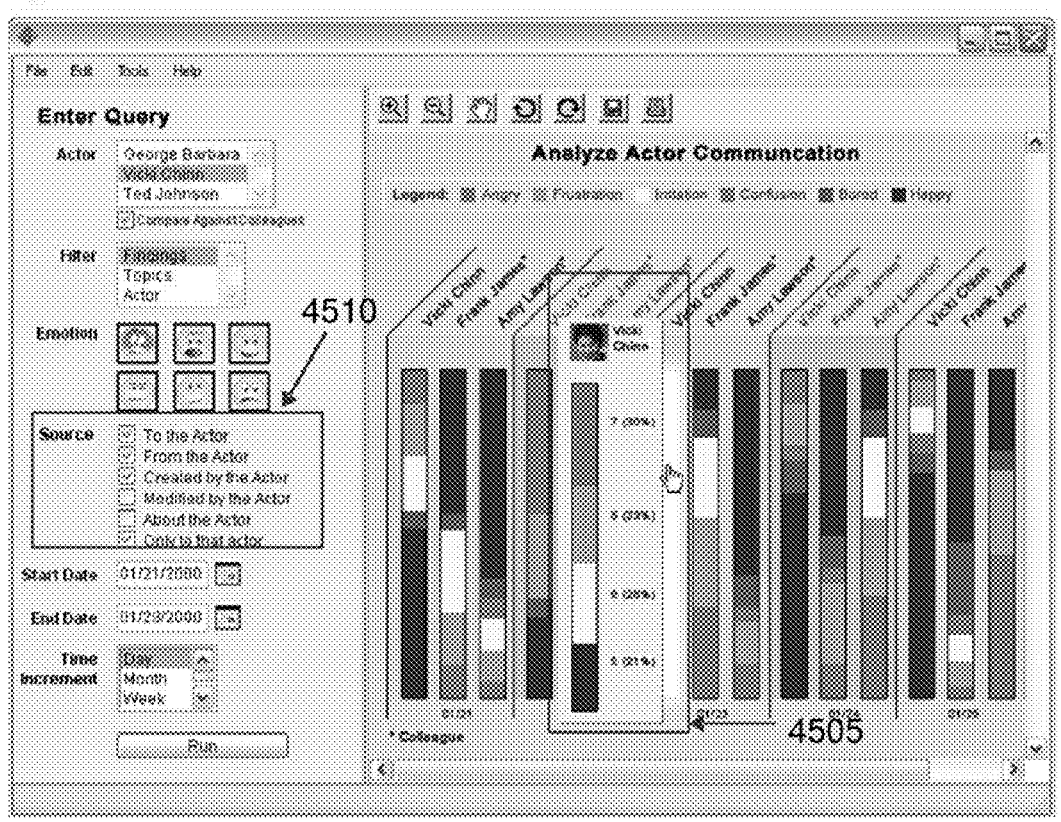
FIG. 45 is a screenshot of one embodiment of an analysis of actor communication illustrating emotive content.

In some embodiments, as shown in FIG. 45, a stacked bar representation [4505] that utilizes a different color for each tone such that, for example, an "angry" tone would have a reddish background would be used. The bar illustration also may indicate number and percentage of each tone within the communications. In some embodiments the bars will display number count and percentage information upon mouseover as illustrated in FIG. 45.

Figure 46:
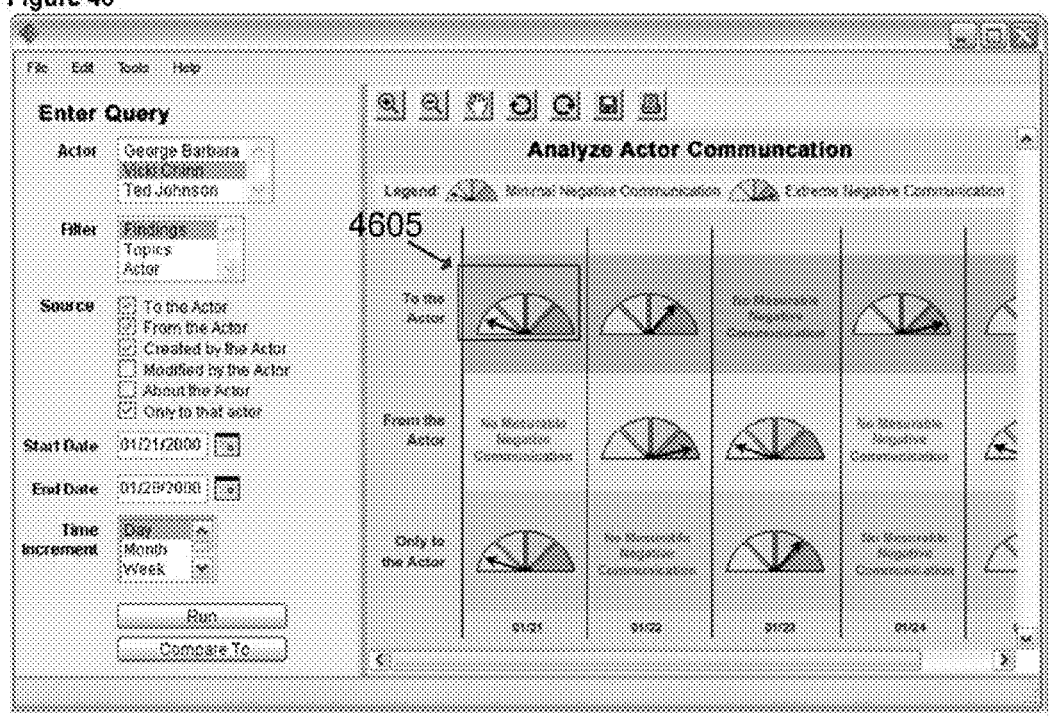
FIG. 46 is a screenshot of one embodiment of an analysis of actor communication illustrating the gauge for negative tonal content.

As shown in FIG. 46, in other embodiments, snapshots over time of a meter visualization [4605] is used, with a dial that can be pointed anywhere from red to violet, depending on the amount of "negative" communication directed at an actor, relative to either all actors, or a user-designated group of actors. In some embodiments, the user can filter whether all actors, or only some actors are to be considered as input. Similarly, different kinds of content—such as various personal content—could be specified for exclusion in some embodiments. Further, the user may decide to restrict the items being evaluated to, for example, only items received by the selected actor(s), or which referred to the actor, or which is in connection with a particular event or topic. If this, or other restrictions on data are selected by the user, in some embodiments, and as shown in FIG. 46, each restricted category is assigned its own row. The meter visualization [4605] can also be used with a thumbnail style display or a time elapsed presentation. Key events may be depicted in any of these views with indicators. In one embodiment, the indicators may be shown in the same manner as previously described. Note that some embodiments may forego the use of color in the meter [4605] but color is helpful for effective use in presentation methods which reduce the image size.

Figure 47:
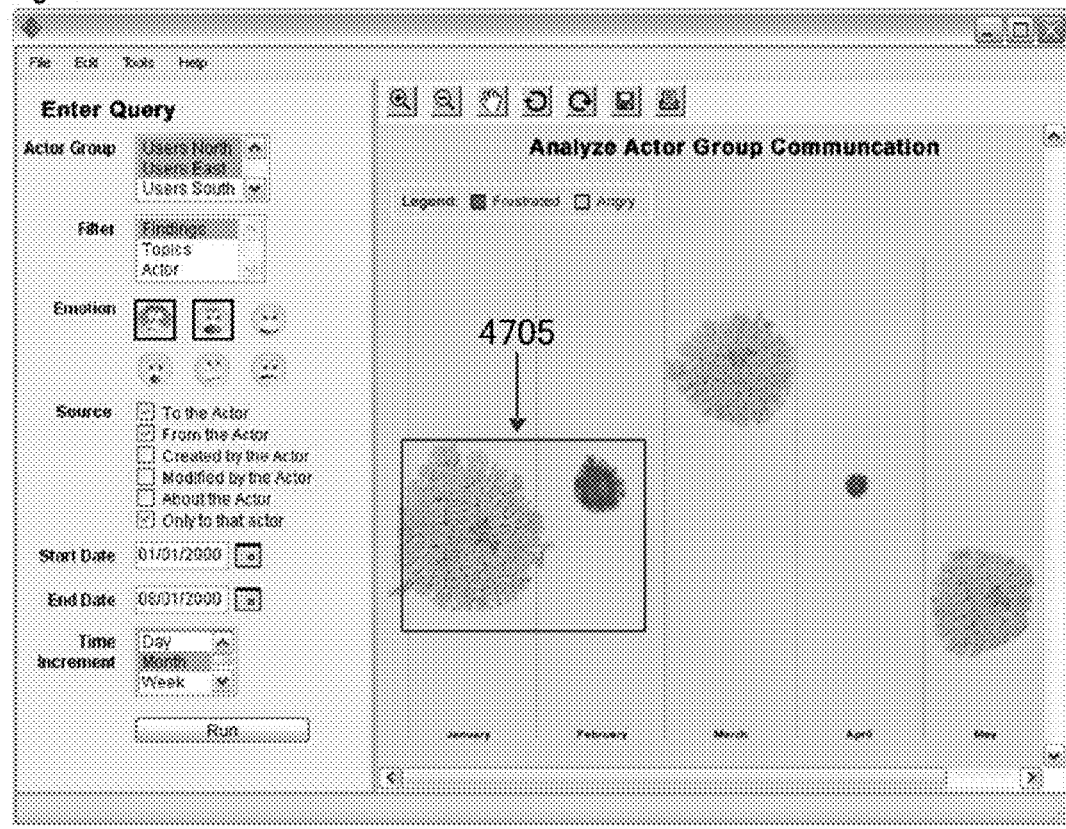
FIG. 47 is a screenshot of one embodiment of an analysis of actor communication illustrating the clustering presentation method.

Some embodiments will visualize clusters of emotive content activity over time, while, in some embodiments, will suppress smaller amounts of such activity for purposes of visual clarity. An example of this is illustrated in FIG. 47.

All of the metrics described herein are, in one embodiment, baselined to provide the greatest value and accuracy in determining anomalies. For example, if the period of time of interest for an investigation is the calendar year 2005, it is useful to measure the years 2004 and 2006, to provide a baseline for comparison. While the passage of time will cause some changes in the baseline; for example, an actor may change departments, such differences usually can be easily accounted for, and except in situations of extreme upheaval, are very likely to be the anomaly. Baselines also can be performed on the basis of job title or function as well as on the basis of the individual person—adjusted on this basis. What is important is to be able to isolate unusual behavior, and unusual behavior almost by definition is behavior that deviates from the norm for the set of people in question. As noted in the SOCIOLOGICAL DATA MINING APPLICATION, normal behavior should at least generally correspond to established workflows and other processes as well as the contemporaneously defined organizational structure.

In some embodiments, the system enables users to visually superimpose data for like periods of time in different years, or for example, to compare data on a quarter by quarter basis, since certain activities always happen at the end of each quarter.

Figure 48:
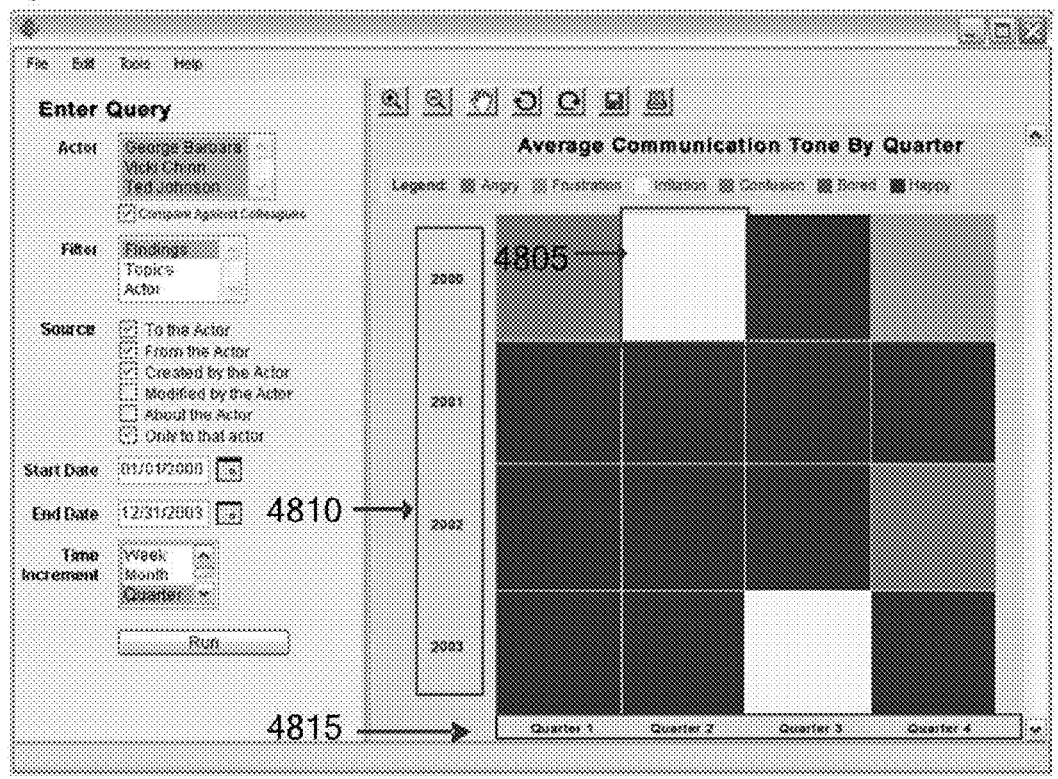
FIG. 48 is a screenshot of one embodiment of emotive content.

FIG. 48 illustrates one embodiment of visualizing tonal content. In this particular embodiment, tonal content presence is assessed for either individually selected actors or groups of actors. Any acceptable method, or combination of methods for assessing tone may be used. In one embodiment, the display is a matrix showing years in comparison to each other, to allow for seasonal variations in behavior. Once the degree of emotive content has been determined, in some embodiments it is visualized collectively for all selected actors in a single block [4805] for that the given time increment. The degree of saturation of the fill of the block [4805] indicates the relative or absolute degree of the amount of emotive content for that time increment. The greater the saturation, the more generally emotive the content. This embodiment differs from some others in that it is juxtaposing data from the same period [4815], (as depicted in FIG. 48, the same quarter from different years) for the purposes of comparing stress and other factors on a seasonal basis.

Multiple Component Actor Heartbeat

In the SOCIOLOGICAL DATA MINING APPLICATION, the notion of an actor heartbeat is introduced for the purpose of understanding which dates that actor was active as opposed to inactive, in terms of performing any action(s) for which there is a record. As noted in the SOCIOLOGICAL DATA MINING APPLICATION, evidence of an actor heartbeat can come from a variety of sources, including but not limited to: sending emails, sending IMs, sending SMS messages, making phone calls, logging into a system, creating or editing documents, creating any kind of application record instance, or creating calendar events or attending a meeting.

When averaged over the normal working hours/days of an individual over a period of months or years, the relative frequency of the different types of actions performed by a particular actor is likely to stay relatively constant, except in exceptional circumstances, such as the individual being away on vacation, out on sick leave, or traveling on business. Identifying such anomalies may be important in an, investigative context, since often, after a few years, people do not remember exactly when they were traveling, or were ill, etc. But such details can prove to be important; for example, in order to establish that George Jones could not have attended a meeting in person because he was out of the country—or conversely, that he was in the area, and could have physically attended the meeting.

The relative amount of different types of actions as defined in the previous section per actor can also be critically important for a related reason. While deleting emails is a simple matter (apart from the backup issue and the fact that relevant others may still have copies of them), deleting other types of items may not be as simple, and in many circumstances, is nearly impossible. Therefore, this information represents an important means of detecting deletion patterns. For example, if one type of activity is missing, or is abnormally low in a period in which other types of activity occurred at a normal rate, it may be suggestive of mass deletions having occurred.

Figure 49:
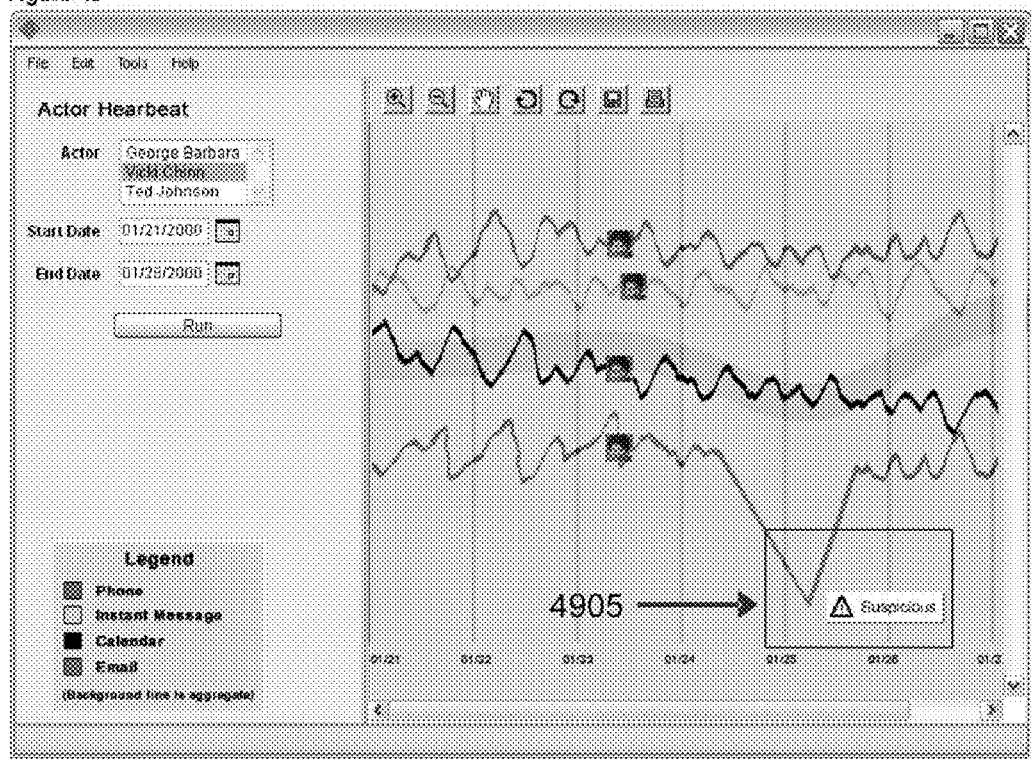
FIG. 49 is a screenshot of one embodiment of Actor Heartbeat.

In some embodiments, the frequency of different types of actions associated with a particular actor are visually represented in chart form, as illustrated in FIG. 49. In other embodiments, icons reflective of the item type designated by the line are affixed to the line instead of the image representing the individual actor. In other embodiments, the lines are completely unadorned.

In addition, in many embodiments, statistical significance tests are run in order to detect any anomalies, such as sharp unexplained drops in a particular component of the heartbeat. If such anomalies are detected, in most embodiments, they will be annotated [4905] explicitly in the visual display. In some embodiments, this is reflected in a report format containing content similar to what is illustrated in FIG. 49. In some embodiments, the extent and type of the deviation from normal behavior that is annotated in the report is user configurable. Types include but are not limited to sharp drops or increases, and high frequency of increasing and decreasing of activity. Types of statistical tests that may be run include, but are not limited to, the amount of deviation from the median line of each activity type.

Visual Comparison of Non-Incremental Archival Formats

Figure 50:
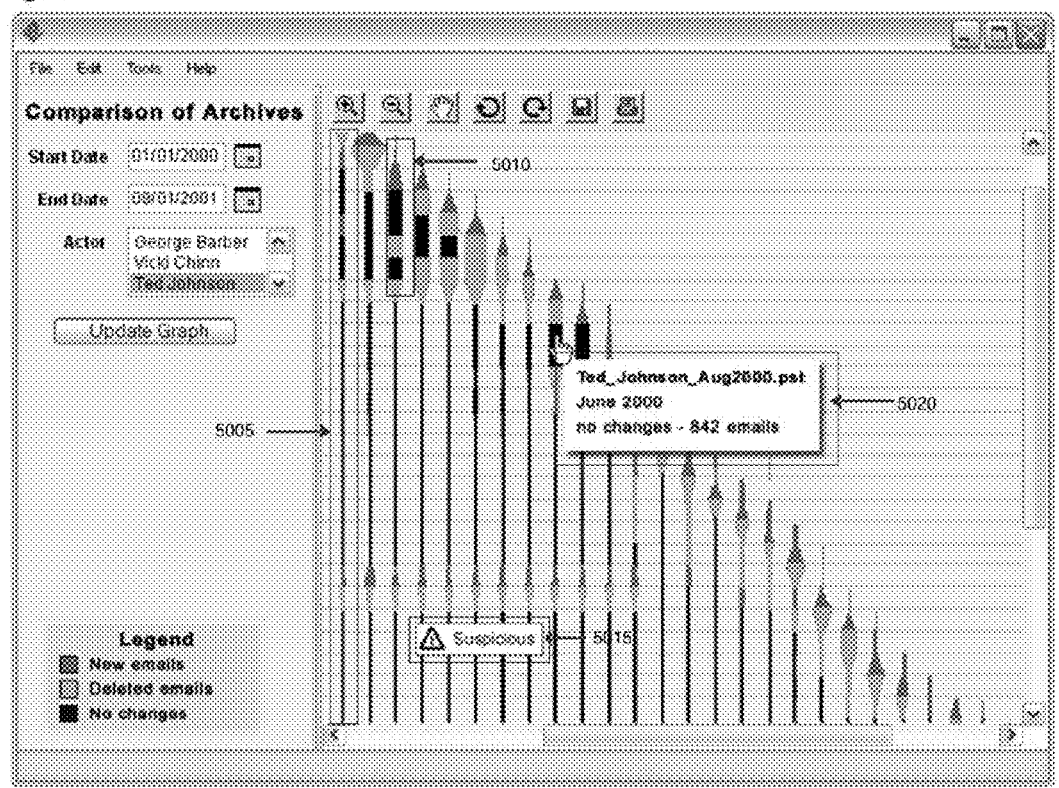
FIG. 50 is a screenshot of one embodiment of potential tampering with backups of archival formats.

FIG. 50 depicts one embodiment of detecting and visualizing potential tampering with backups of an archival format, such as PSTs, the format used by MICROSOFT OUTLOOK. A column (line [5005]) in the chart represents a visualization of the frequency of mail for a particular month from (non-incremental) sequential backup to backup. In one embodiment, the system visually segments the line into categories, including, but not limited to, when new emails appear, old emails disappear and when there is no change by the use of different colors [5010]. Other embodiments may use different color schemes or indications—including different kinds of patterns or other types of visual representation for additions and deletions other than solid color fill, or allow the user to determine a display differentiation scheme.

Generally, a month's non-incremental backup should have everything that the prior month's backup included, plus new email. However, this need not be strictly speaking true, as there are non-sinister situations in which one might be deleting old emails long after the fact—for example, to conserve space, or to do "housekeeping." For this reason, some embodiments will proactively look for patterns of periodic housekeeping, as some corporate IT policies may encourage this sort of user behavior. But what would typically be sinister is the case in which, for example, a backup for April does not include certain messages with a send/receive date in April but these messages then mysteriously appear in a backup for the following month. In this event, the most probable conclusion is that the April backup was tampered with after the fact, but that the May backup remained intact. In some embodiments, the system visually indicates [5015] backups that should be scrutinized further as a result of possible tampering. In some embodiments, a mouseover [5020] with detailed related information about each backup is available. Some embodiments also will generate a report format listing any usual occurrences, such as this scenario.

Using the color scheme adopted here, a "normal" set of backups would have a band of red on the leading edge with a band of green just inside that and possibly, some other patches of green here and there but otherwise black. Internal red lines suggest tampering may have occurred.

In some embodiments (not shown,) the X-axis depicts calendar time at whatever level of resolution is set by the user, while the Y-axis depicts the individual non-incremental backup files.

Document Lifecycle Views

Just as the system has the concept of "normal" or "baselined" behavior for actors, it likewise has one for other types of objects, including documents of different kinds, specifically those that are of a commonly recurring type. This is because the system needs a number of instances to compare in order to be able to determine abnormal from normal. Some common examples of recurring document types include, but are not limited to: reports that are issued on a regular basis, HR reviews, any type of document that has any type of workflow associated with it, and press releases.

For such documents, we may say that the document has a document lifecycle associated with it. This is a set of stages that documents of the given type typically move through, from initial creation to ultimate abandonment. The stages may be highly formal, such as an approval entered via a commercial workflow system, or informal such as someone sending their manager a copy of a report they are working on to edit—or even additional sessions of editing the document by its original author. Some stages may be required, while others may occur either not at all, or more than once.

For example, in one embodiment, any email that was saved to the "drafts" or similar folder, and any document that was sent out as a draft can be considered to be a stage in the lifecycle of that document. In one embodiment, draft documents are identified based on the inclusion of the word "draft" in a title, in a header, or in some embodiments in the first paragraph or page. Of course, other data formats, such as images or faxes, may be deemed drafts, if the associated metadata provides such an indication. In one embodiment, a reference to the document being a draft in the parent email of an attachment also is deemed sufficient. This is because the notion of a "draft" suggests a multiple step process of review that is often associated with more important documents.

In some embodiments, each sending out, checking in, publishing, or posting of a document is considered a lifecycle event, whether or not it corresponds to an ad hoc or structured workflow that might exist for that type of document. In some of these embodiments, the relationship of the recipient(s) to the sender may modify the type of lifecycle event, and whether or not it is considered a major or minor one. For example, sending a document to a subordinate in one embodiment is a different event from sending to a peer, to a supervisor, or to higher organizational levels—or out of the company. In some embodiments, either or both the number, and number of different types of recipients also may impact the category of the lifecycle event. In many embodiments, this behavior is user-configurable.

While many types of divergence from the document lifecycle are very normal and probably very uninteresting, certain categories of divergence can be exceedingly interesting, especially if they involve key types of documents in a litigation or investigation. The purpose of the Document Lifecycle View, one embodiment of which is illustrated in FIG. 51, is to help the user isolate any important divergences.

Figure 53:
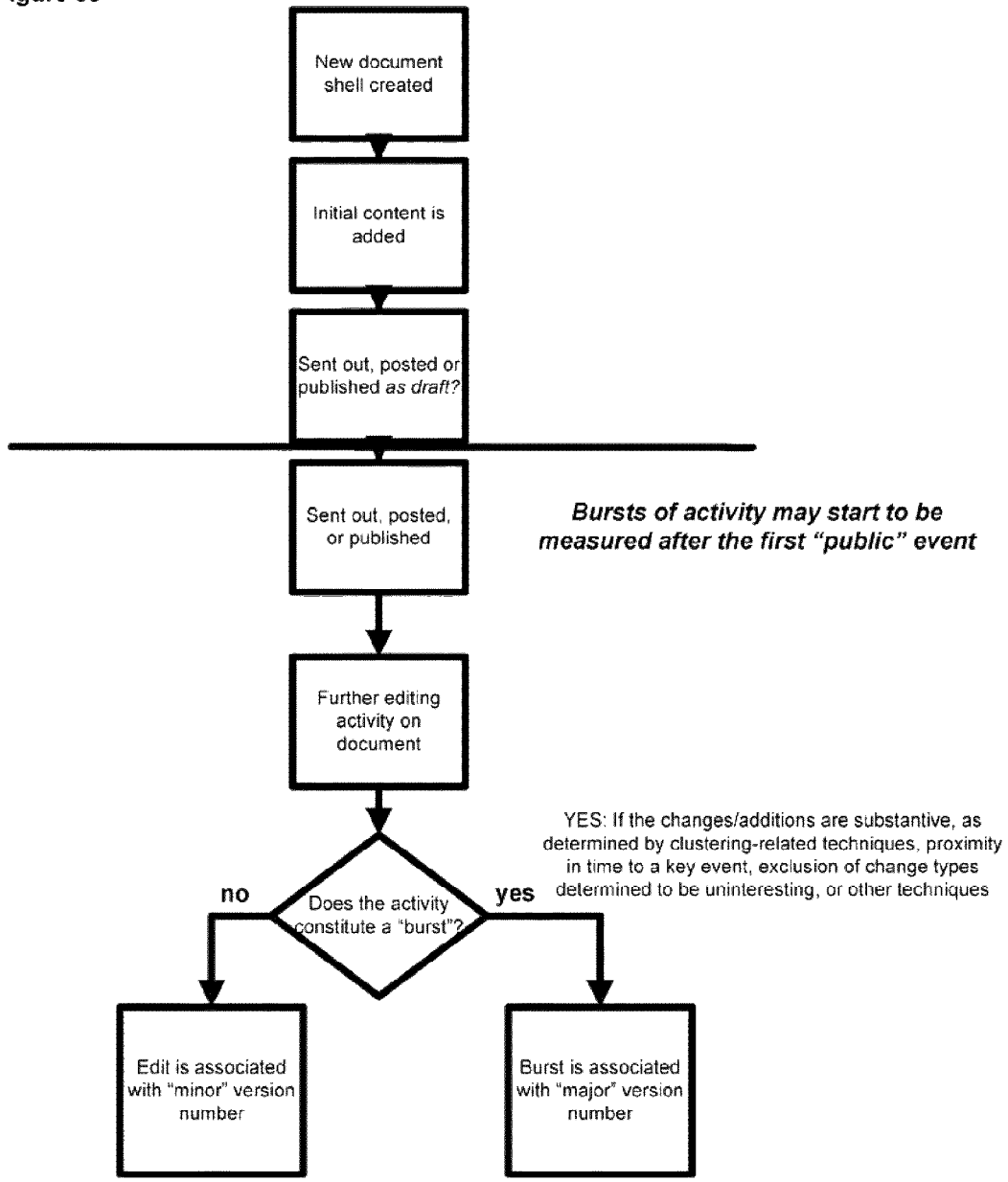
FIG. 53 is a diagram of one embodiment of how a burst of activity is determined for a document lifecycle.

We will define a "burst of activity" as a bounded period of time in which a large number of edits are made to a document after its initial creation. In some embodiments, bursts of activity are colored or otherwise indicated so that they can be more easily detected when the view is zoomed out. Documents may start with an official "draft" stage as above, or may simply go through a large number of modifications or edits in a relatively short, or at least bounded period of time, may be get sent to several people, may be edited several times again, then may sit dormant for a spell, and so on. Different embodiments may use data clustering algorithms (including agglomerative techniques, since bursts of activity may be hierarchical) and other similar techniques in order to assign to the bursts of activity, in some embodiments, both major and minor version numbers. These are used both for general reference, and for labeling of the burst or other editing activity in the document lifecycle view. In one embodiment, major numbers are assigned by burst of activity, minor numbers by sequential non-auto-saved (that is, only those changes explicitly saved by the user, rather than those which are automatically saved at short intervals by the application) changes. Note that these minor numbered changes may fall within a burst of activity. In a related embodiment, every change is sequentially minor versioned. A flowchart illustrating one embodiment of versioning is depicted in FIG. 53. Singleton changes—that is, those that are not substantive enough to qualify as bursts—may be given a major number or continue as a minor number from the last burst of activity, depending on the embodiment.

Figure 51:
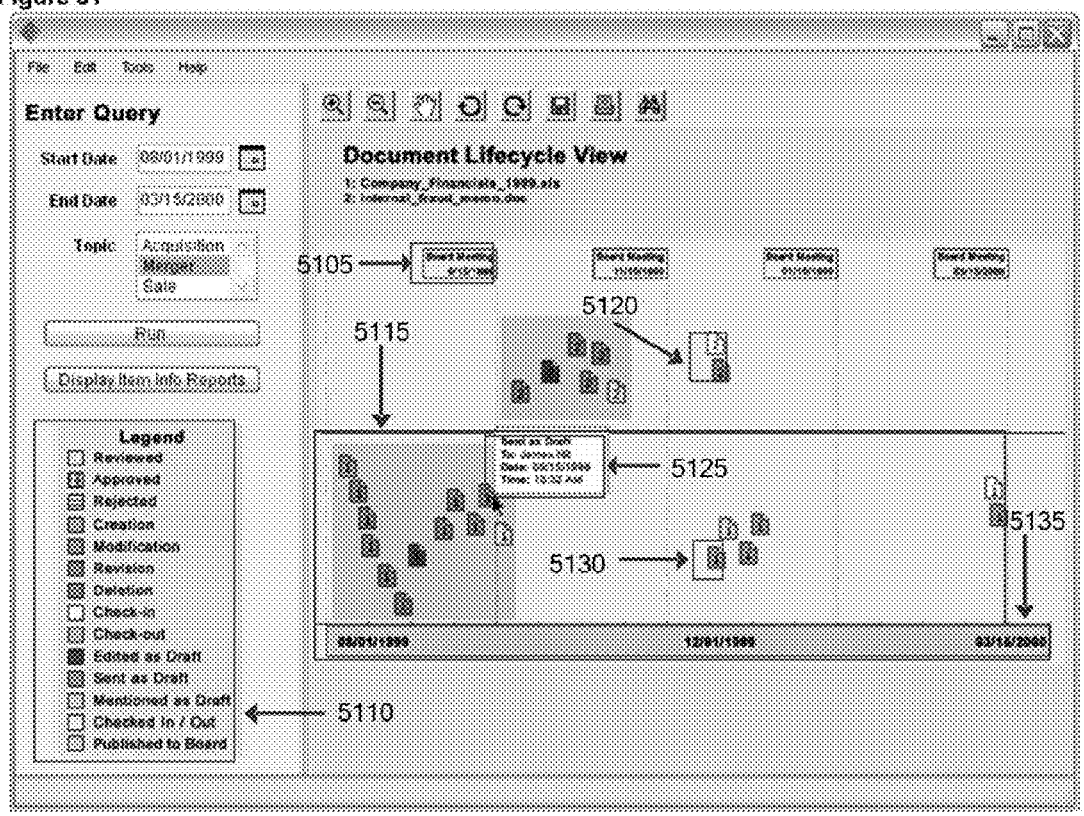
FIG. 51 is a screenshot of one embodiment of document lifecycle view.

FIG. 51 illustrates an example of one embodiment of a document lifecycle view in which two document lifecycles are depicted along with a related periodic event, in this example a board meeting [5105]. As depicted in the specific embodiment here, the lifecycle view displays changes to a document which include but are not limited to creation, modification, revision, deletion, check in of a revised version, check out of a revised version, edited as draft, sent as draft, or mentioned as a draft, reviewed, approved, or rejected, as may be seen in the legend [5110]. In some embodiments, upon mouseover information including but not limited to the actor responsible for the lifecycle event, the exact time and date, and other detailed information about the given lifecycle event will be displayed. In some embodiments, what gets displayed is user-configurable.

In some embodiments, and as pictured in FIG. 51, multiple document lifecycles can be displayed in a single view. Most embodiments provide different options for doing this, including but not limited to:

All document lifecycles are lined up to all start at time t=0, regardless of when they actually started. This facilitates comparing the length of different stages across document lifecycles.

Start or end with either specific dates or events such as board meetings, or the nearest occurrence of an event of a specified type to the selected date range. As depicted in FIG. 51, such events can be directly shown in the visualization. In these embodiments, the different individual lifecycles are shown as starting on whatever date they first started, rather than being artificially synchronized to start at the same time. Some embodiments provide a menu option which allows users to toggle between artificially synchronizing the start date and showing start dates as they actually occurred.

In most embodiments, workflows (whether ad hoc or structured) are considered to be just another type of document lifecycle. Some embodiments may visually designate workflow-related document lifecycle stages separately. In some embodiments, and as will be pictured in FIG. 52, the time interval between two workflow-related lifecycle events may be labeled with a line with arrows on both ends, and which indicates its length at the midpoint of the arrow [5210].

As depicted in FIG. 51, in one embodiment each document lifecycle event is depicted with a small icon [5130], the color of which is determined by the type of lifecycle event the icon is representing. A legend [5110] provides a mapping of available lifecycle event types, colors, and/or fill types that are being used to represent them. The icon's [5130] position on the X axis indicates when the lifecycle event it is representing occurred. If more than one document lifecycle is being displayed in the same view, in some embodiments, each lifecycle is assigned a horizontal slab of the view to occupy. In other embodiments, each icon [5130] is numbered to indicate which document instance it is associated with. Some embodiments may do both, and/or use other techniques to indicate association. In some embodiments, those icons [5130] which represent portions of bursts of activity will have the background area around them darkened. This is to help make the view more readable when shrunken to thumbnail size.

Lining up workflows of the same type so that the relative duration of each step, and the gap between steps can be easily detected is very helpful for spotting anomalies. For example, let's say someone may be afraid to grant approval to something that she believes may be illegal. This may be reflected by an unusually large gap between request for approval and response, and/or by a non-standard person providing the needed approval. In some embodiments, obvious anomalies of these sorts will be flagged with a visual indicator in the document lifecycle view.

In some embodiments, if there is a large enough number of instances of document lifecycles for a particular type of document content, statistical variance tests will be automatically run, and any statistically significant deviations will be annotated in the document lifecycle view. Since a potentially arbitrary number of document lifecycles may be placed inside the same view, these views can become quite large and complex. In some embodiments therefore, an extensive set of manipulation tools are provided, including but not limited to: panning widget, spider-eye panning widget, zoom, find in canvas, and drawing tools so that the user can annotate and save the view.

Figure 52:
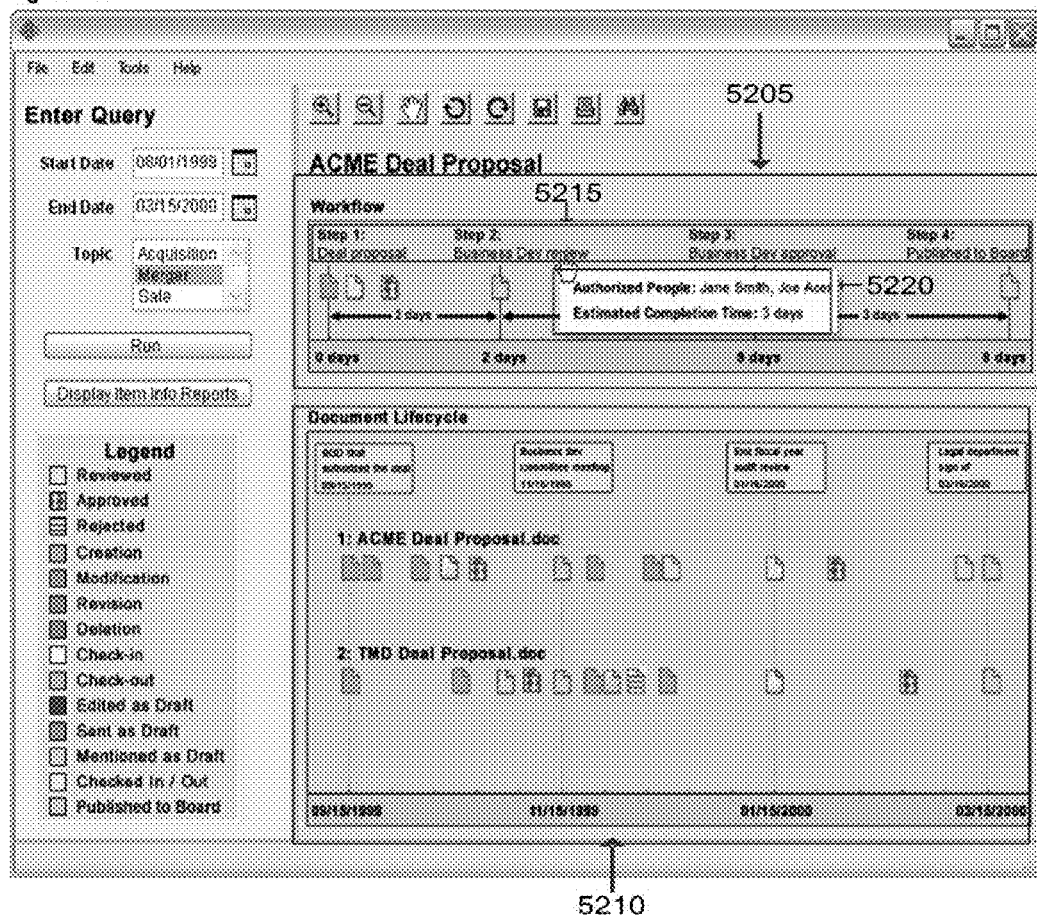
FIG. 52 is a screenshot of one embodiment of document lifecycle view in comparison to ad hoc workflow.

The system, in one embodiment, has the ability to line up ad hoc—that is, empirically observable—and/or structured workflows with the same or similar types of documents within the same window so as to more quickly detect anomalies in behavior. One embodiment of this is illustrated in FIG. 52. A separate view [5205] which depicts an abstract workflow has been added above the one displaying different document lifecycle instances [5210]. The abstract definition of the workflow may be extracted from a workflow system. We call this a structured workflow. Alternately, if provided a sufficiently large number of instances of a given type of document content, the system may adduce an ad hoc workflow as described in The Sociological Data Mining Application. As shown in FIG. 52, the abstract workflow view [5205] starts at time t=0 rather than on a specific date, since it is an abstract definition rather than an instance of workflow. In most embodiments, each step in the workflow is titled [5215.] (In the case of structured workflows, the title of each step is part of the information extracted from the workflow system. In the case of ad hoc workflows, the system will attempt to assign a title in some embodiments, while others will simply not provide one.) In some embodiments, mousing over the title will provide information about the step, including but not limited to who is responsible for the step, and the expected or required completion time for the step. Note that in most embodiments, the abstract workflow view [5205] will only show steps that are required by the workflow.

More on Calculating Bursts of Activity

It can safely be presumed that most documents will have the majority of change activity during the initial period of their creation that is, prior to their author colloquially stating that the document is "done" or even ready to review. However in most cases, this stage of the document lifecycle clearly ends at some point, as can be evidenced when the changes slow, and at least for some period of time, stop. From an analytic point of view, each burst of activity subsequent to the creation is of interest. However the "bursts of activity" may, in one embodiment, exclude ancillary changes which do not affect the substance of the document. Such changes may include but are not limited to the following:

Automated dynamic token updating, such as a date field automatically updating when someone opens the document.

Changes which result in the correction of spelling, grammatical, or syntactic errors which may be recognized by the application itself, or through other means. In one embodiment, spelling corrections may be evidenced by a word that was not in the standard dictionary or known list of specific terms, such as actor names, being replaced with one that is. Other embodiments may exclude changes to header or footer content, changes to dynamic updating token behavior, addition of new records to existing ones of the same type already in the document, and other generally ancillary changes.

In one embodiment, changes that are made in two editing sessions or less (where in one embodiment, a session is defined by opening and closing the document, and in another embodiment it is determined in other ways, such as bursts of activity) and which all changes are contiguous AND which are not proximate to any event of interest. An event of interest could include a specific event defined by the user or an event type. In one embodiment, all of these parameters are user configurable. Proximity to an event of interest can be critically important insofar as even a minor change, such as hiding a column in Excel may take on a much greater significance if it was done just prior to the sending out of the document as part of a board of directors' information packet.

Bursts of activity can also be queried as a property of a document instance, family of document versions, or of actors. Reports that correlate bursts of activity with events, as broken down by different document types, documents with specific types of content, and by actor/actor group are provided in some embodiments. In some of these embodiments, the system may create inferences for the user based on such historical correlations that the presence of a particular burst of activity suggests the proximate occurrence of a related key event that the system currently does not have knowledge of.

The concept and visualization of "bursts of activity" is a useful to identify real world meaningful changes to documents. Without this or a similar construct, the number of distinct individual changes to many documents would be so large as to bury the changes of real interest—specifically cases where the user opened up the document to perform an edit for a specific reason.

New Item Information Reports

The purpose of an "Item Information Report" is to capture the detailed history of events for that item. In some embodiments, this is further extended to include related items, such as ancestors and descendants.

While the types of information available vary by document type and the surrounding application environment, in most embodiments generally the information provided includes, but is certainly not limited to:

List of custodians (in the legal sense of the word) with whom copies of the item are associated in the collection. Also, custodians with whom different kinds of near-duplicates of the item are associated including ancestors and descendants.

In some embodiments, actors who deleted the item, but who appear at one time or another to have had it—for example, because there is an existing record indicating that it had been sent to them—are separately listed. In some embodiments, this is further extended to list all actors who may have had the item at one time (but no longer do) based on either or both organizational affiliation during the time in question, or close proximity to other actors such as the authors of the document.

Chronologically sequential list of all dates and times that are in any way associated with the item. These include, but are not limited to:

Creation date

All check-in and check-out dates (from a document management system or repository)

Posting on a website

Distributing to other actors

Edit dates

Latest modification date

Last backup date

Date received/replied to

List of document lifecycle events, which are likely to be a subset of the events detailed in the Item Information Report.

List of actors who at one time or another contributed content to the item.

List of actors who sent and who received the document, in some embodiments sorted by organization, to help highlight actors outside the authors' department or company who received the item.

Log of comments made by different actors about the item, if such exist, including but not limited to: comments that are extracted from check in logs of document management systems, forwarded content in emails, and "user comments" entered in a text editing application amongst other things.

Listing of any actors whose absence in relation to all surviving records for this item could be considered unusual. This includes, but is not limited to: actors who did not participate in an ad hoc or structured workflow related to the item that were expected to have done so, actors who were dropped from discussions by other actors, or who were not invited to meetings in which this item was discussed despite either or both an organizational relationship that suggests that they should have been; for periodic meetings, regular attendance at or invitation to other instances of the meetings.

List of all official versions that ever existed of the item, and how many copies of each are in the collection.

Links to each actual version of the item in the collection, whether or not corresponding to any official or informal concept of versioning. That is, each slightly different copy of the document is sorted by last changed date, and presented. (In some embodiments, and as noted in the document lifecycle section, copies of the item that differ only in certain specific respects, like an automatically updating date token do not count as truly different versions for this purpose.) Some embodiments may in fact provide the "diffs" between different versions of the document.

Links to the Document Lifecycle View [for example, as shown in FIG. 51] and related views for this item.

Its presence in any other litigation or investigation related collections.

Any form of links or relations to the item apart from those derived from data clustering, for example, other items that share text blocks with this item, but which have no other cluster-related relationship.

Its complete history within the system, including but not limited to: user annotations, which folders it has been placed in, who has looked at it, its current location in workflow and which topics and tones the system has tagged it with.

References to all items that are members of the same cluster(s) as the item, along with the presumed type of relationship to the item, for example "same content, different document type."

Figure 54:
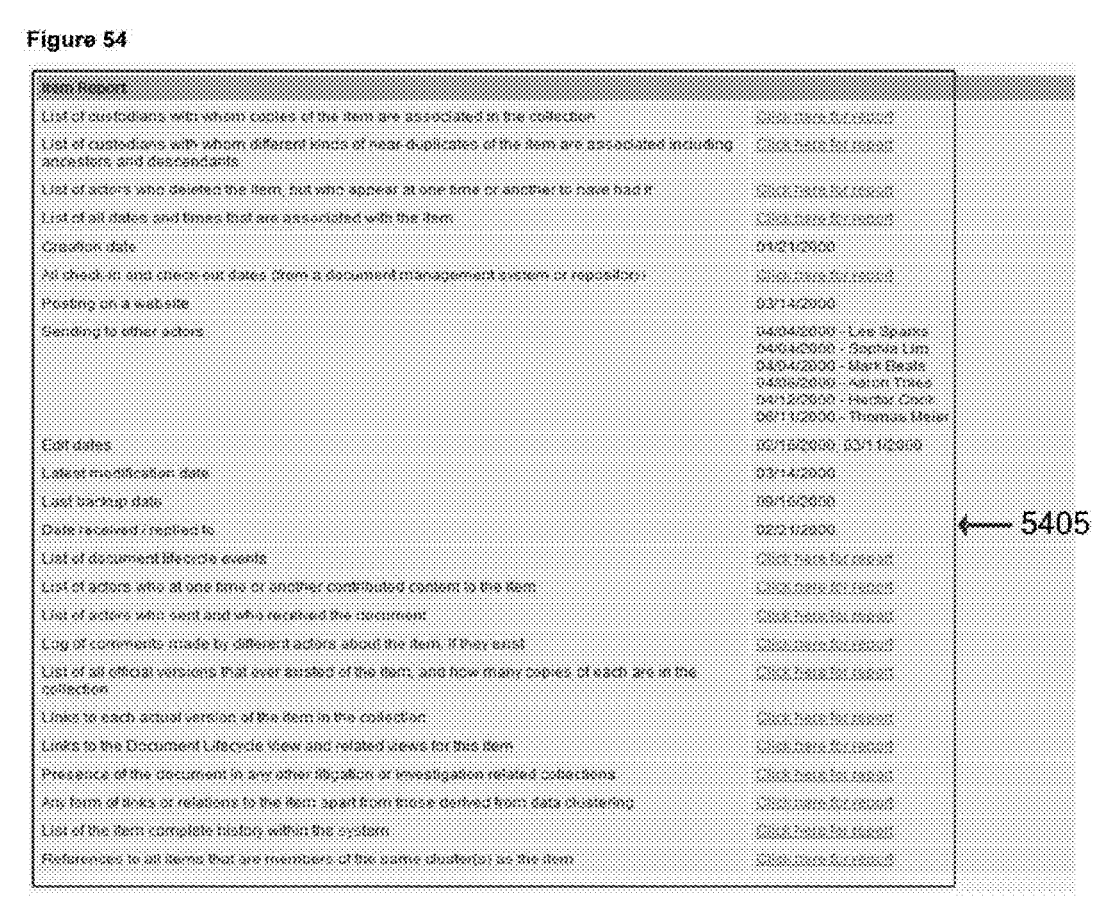

The Item Information Report, one embodiment of which is illustrated in FIG. 54, is a more detailed, textual companion to the Document Lifecycle View, from which it may be directly accessed—in some embodiments by clicking on a button. In some embodiments, it may also be accessed by clicking or double clicking on the individual document icons or on the appropriate item title at the top of the view. In some embodiments, the user also may access the report directly from an icon in the item header in the discussion transcript view.

Diffing of Spreadsheets and Other Document Types

Figure 55:
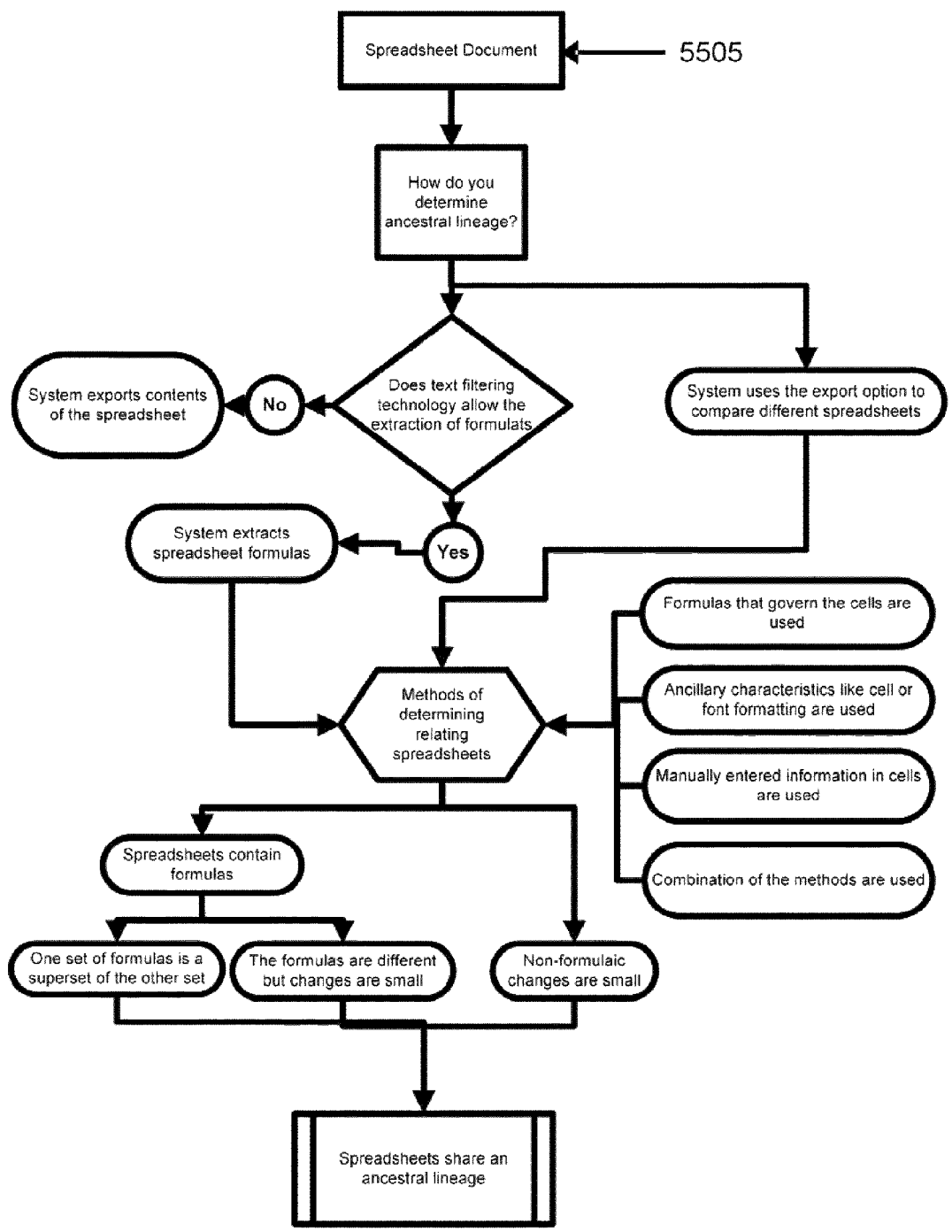
FIG. 55 is a diagram of one embodiment of how a document's ancestral lineage is determined.

Spreadsheets and other fielded or structured documents are particularly difficult to apply standard information retrieval techniques to, because much of their content is numerical, or consist of common words such as the names of different months. A small change to a formula that affects a large number of cells may well make two versions of the same spreadsheet that look quite dissimilar, when in fact there is only one small difference, or may obscure the fact that someone is reusing a boilerplate or template spreadsheet. This poses a significant problem when one is trying to determine the ancestral lineage of such documents, as well as assessing what it logically should mean to say that two spreadsheets are "similar." The following text and FIG. 55 present a flowchart of one embodiment for identifying these cases of close ancestral relationship for spreadsheets.

To this end, in one embodiment, the system extracts all spreadsheet formulas. In one embodiment, if text filtering technology does not extract the formulas, alternative methods may be used, such as any type of exporting of the contents of the spreadsheet. With this information, the system can determine whether two spreadsheets differ by dint of manually entered information in cells, formulas that govern these cells, a combination of both, or by ancillary characteristics like cell or font formatting. In cases where there is reason to believe that two spreadsheets might be related to one another, in one embodiment, the system first checks to see whether either spreadsheet has formulas, and if so whether they are the same, or if one is a superset of the formulas of the other. Spreadsheets may be determined to be related to each other as a result of lexical similarity, the same actor's involvement, a clear record of transport between different actors associated with the different spreadsheets, application meta-data as to version or change-tracking content, or other reasons. If the formulas are the same, or supersets, this is treated as positive evidence of a relationship. If the formulas are different—even if similar—the system can identify the number of cells that differ because of governing formulas versus manual entry, by applying the formulas from spreadsheet A to spreadsheet B and vice versa. If the number of non-formulaic changes is small, this is evidence of a version relationship. In some embodiments, the user may determine the threshold for determining a "family match."

This same process can be applied to any document type in which a high-level change may have a very large number of ripple effects.

The export option also allows us to grab other potentially contextually important properties of a spreadsheet or other related document type, such as the hiding of a column, cell or font format information. Once such information is extracted, it may then be compared against other likely versions of the document in order to determine when exactly the changes were effected, or in one embodiment, to ascertain that the change(s) in question occurred between two specific points in time. This can be useful in litigation. For example, hiding a column or changing some visual characteristics so as to de-emphasize certain information right before it went out in an SEC filing or other key event can be used as evidence of fraud.

User Tools for Managing, Correcting, and Organizing their Work

Correcting Privilege Logs

In complex or multi-subpoena litigation, especially those spanning multiple jurisdictions, it is not unusual for reviewers to confound different privilege claims with one another. Therefore, in one embodiment, the system may include a tool that allows for both the display and editing of the on-line privilege log, which allows queries to be done on any of the fields, and allows both the individual editing and global search and replace of privilege claims or other user-designated fields accordingly. So for example, let us say that Jane Reviewer has consistently inappropriately used the privilege claim of "attorney client communication" instead of "attorney client work product." An administrative user may globally correct the errors with a single find and replace operation. In this way, a large number of changes can be made with only a few keystrokes and mouse actions.

Figure 56:
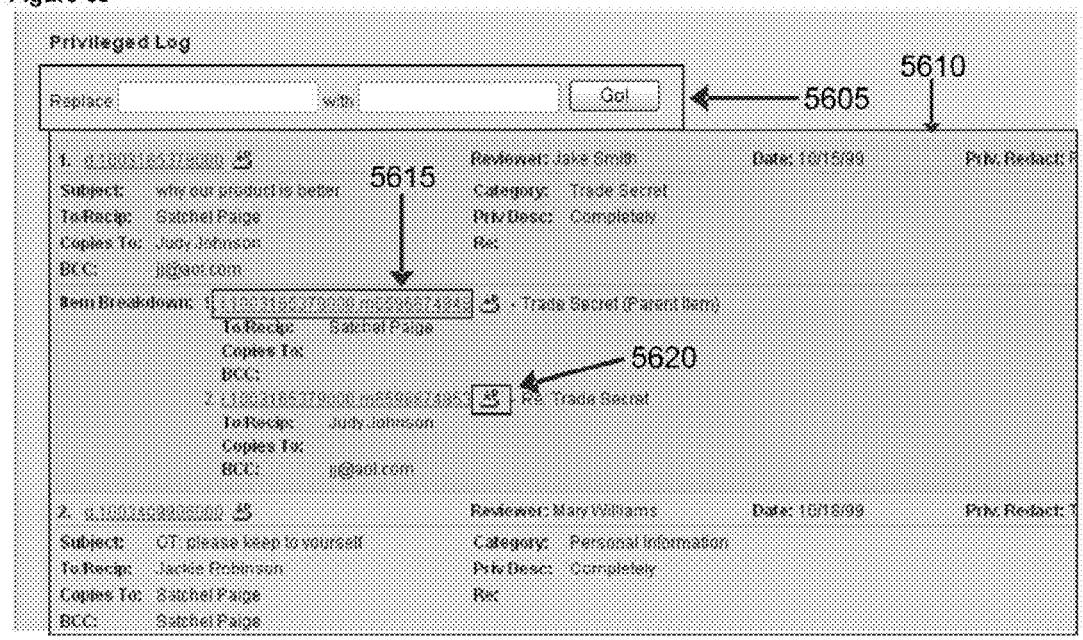
FIG. 56 is a screenshot of one embodiment of privilege log.

FIG. 56 illustrates one possible example of an editable privilege log. As depicted in FIG. 56, it features a global "find and replace" widget [5605] and provides a tabular display [5610] of all documents that are currently designated as privileged. Different embodiments may display somewhat different controls and data for each document. In the example provided here, controls are present to download the item [5620], and to view the document by clicking on a link [5615]. Most embodiments also feature print and sort buttons. In most embodiments, when the privilege log is printed, it is printed without any of the controls. In some embodiments, the privilege log itself can be downloaded in addition to the individual items.

Some embodiments may also provide user interface functionality that allows the user to input rules into the system for automated assignment of privilege claims, for example based on actor, topic, or medium. In most embodiments, the user may use the editable privilege log or bring up the item in any view offered by the system that provides coding controls in order to correct any errors made by the system.

Correcting for "Bad" Clusters (or Other Types of Collections)

Figure 57:
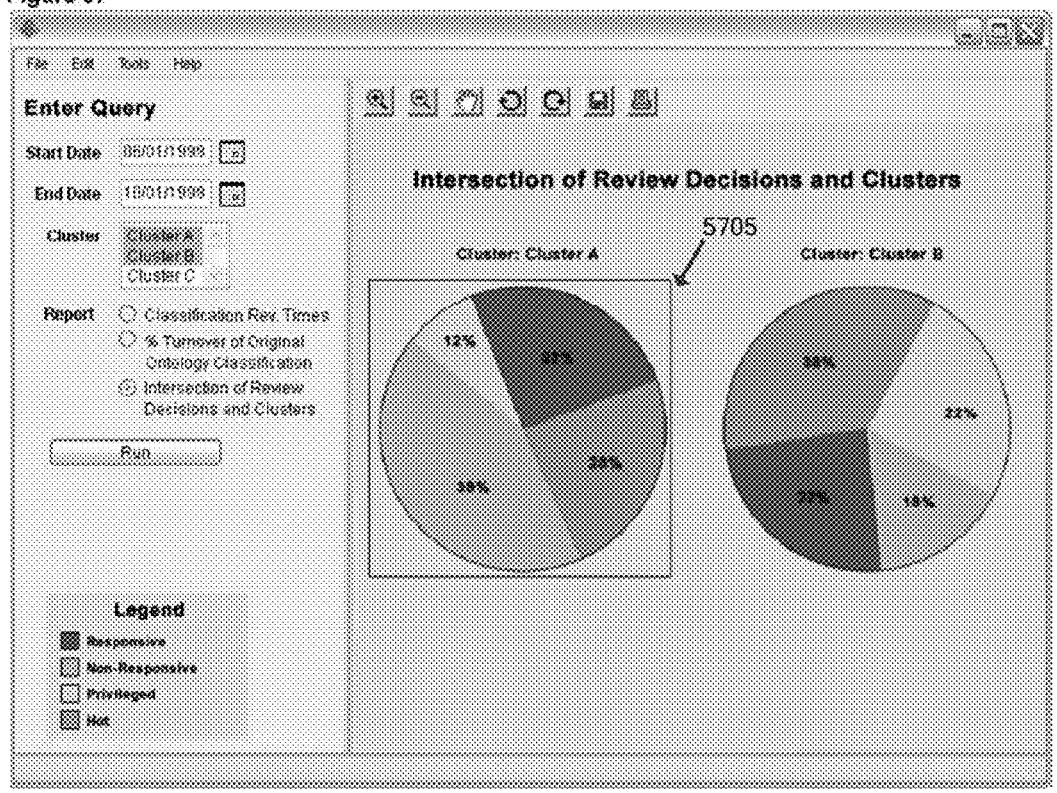
FIG. 57 is a screenshot of one embodiment of intersection of review decisions and clusters.
Figure 58:
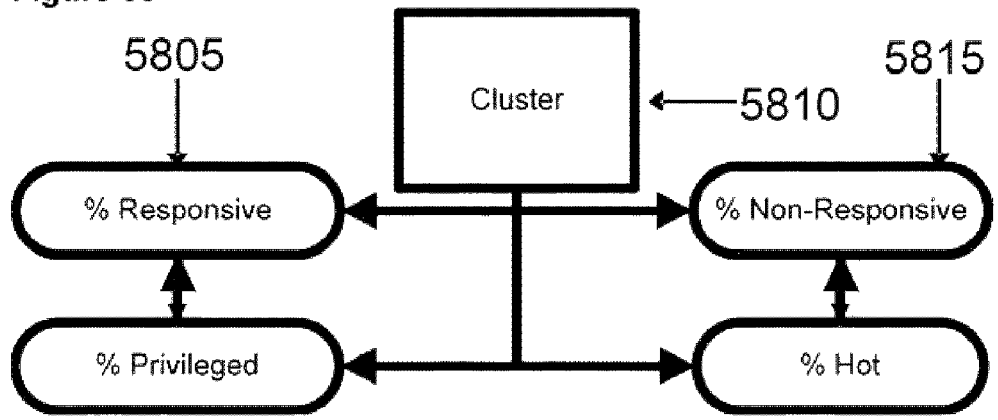
FIG. 58 is a diagram of one embodiment characterizing clusters into subsets.

While clustering and other statistically related techniques are increasingly used in litigation support as a means of content categorization, and by extension, determining responsiveness or non-responsiveness to particular claims in a subpoena, there is a significant danger in this approach. This is due to the fact that two documents may be very similar in content, but even one slight difference between them can cause one to be responsive, and the other, not. To this end, in one embodiment the present system may provide a visualization of all clusters that were used for content categorization purposes, in which each cluster [5705] is proportionally colored by what percentage of the items in it were found to be responsive, non-responsive, or privileged by human reviewers. One embodiment of this is illustrated in FIG. 57. FIG. 58 illustrates a common logical partitioning of the decision space for the litigation use case.

In most embodiments, any cluster that is significantly heterogeneous—i.e., does not have overwhelmingly responsive or non-responsive data—gets added to a report. In cases where the clusters overlap, the interaction, in one embodiment, is divided into colors as if it were another cluster. This visualization is highly useful in that it helps pinpoint those clusters which will likely require individual review of each document in order, for example, to completely comply with a subpoena. In some embodiments, graphical querying is supported in this view.

Correcting for Corruption Problems in Email and Similar Document Formats

Corruption of email archives is a relatively common problem. It is obviously desirable to both be aware of and recover from these situations, if possible. When collecting a large corpus of data from an organization, many emails will exist in more than one location. By creating a hash based on a combination of header information, and thus bypassing content, corrupted content need not interfere with the correct identification of two items as having (originally, in their pristine state) been identical. Hashes with very low collision rates can be computed by combining enough header information. However, such hashes only can be used to assure the equivalence of the header information, and not the content information. So, in the event that there are emails that have identical headers, but which do not have very similar content, we either have an improbable hash collision, or an instance where the content data has changed in some way after having been sent. By "very similar", we mean identical after one accounts for artifacts inserted by different email agents, such as different styles of quoted text marker, such as ">" or "|".

In one embodiment, text content that was successfully extracted from the messages in question also can be pairwise compared, specifically excluding consideration of the email agent artifacts, which can include but are not limited to: common strings that can be matched with regular expressions, such as "At 5:50 AM, Jim Quick wrote:" and non-standard alphanumeric characters, such as various quoted text markers that are email reader dependent. This is critically important, since such differences will invariably change the hash of the content.

Figure 59:
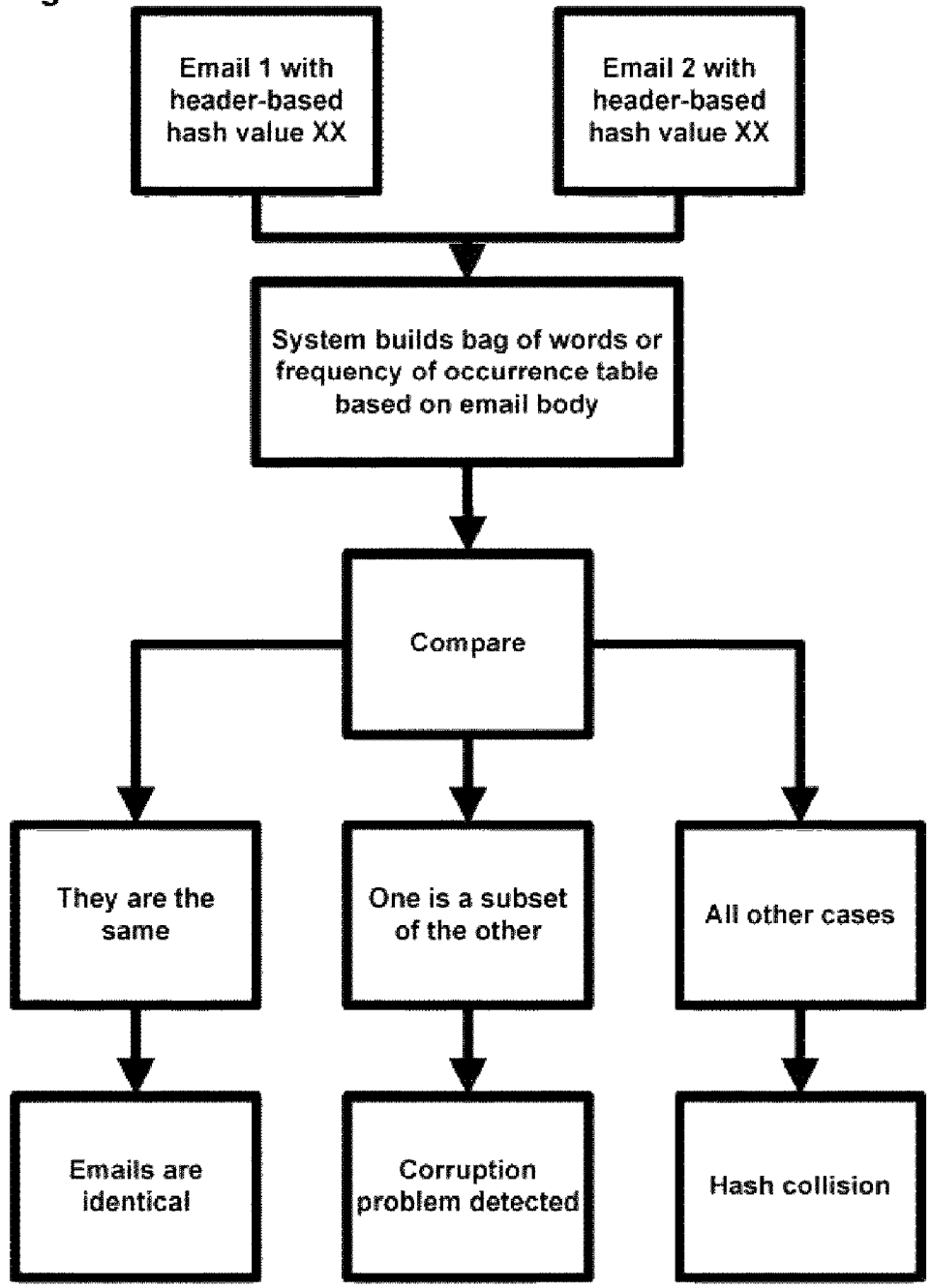
FIG. 59 is a diagram of one embodiment of how a corruption problem is handled by the system.

In different embodiments, this content comparison is done by creating a frequency table or bag of words for each item and diffing them. In one embodiment, this is done for each individual text block so as to make it more resilient in the face of larger amounts of corruption. When there appears to be a hash collision, because for example the two frequency tables look completely different from one another, the content is compared by contiguous text blocks to determine whether or not it actually is a hash collision, or rather a case in which one of the items has become corrupted in some fashion. In other words, the system attempts to see if any textblock in the first email matches any in the second. If this is not the case, either one copy is completely corrupted, or there is in fact a hash collision. In this scenario, the latter has the far greater likelihood of being true. In some embodiments, "words" that are not well known or acceptable strings in the context of the current encoding and language scheme are noted and presumed to be evidence of corruption. This is logically illustrated in FIG. 59.

In some embodiments, all emails with identical header-content-based hashes will have this content comparison done as a precautionary measure. In other embodiments, it will only be done when there is an explicit reason to suspect corruption, for example certain types of system exceptions thrown while endeavoring to parse the content.

Figure 60:
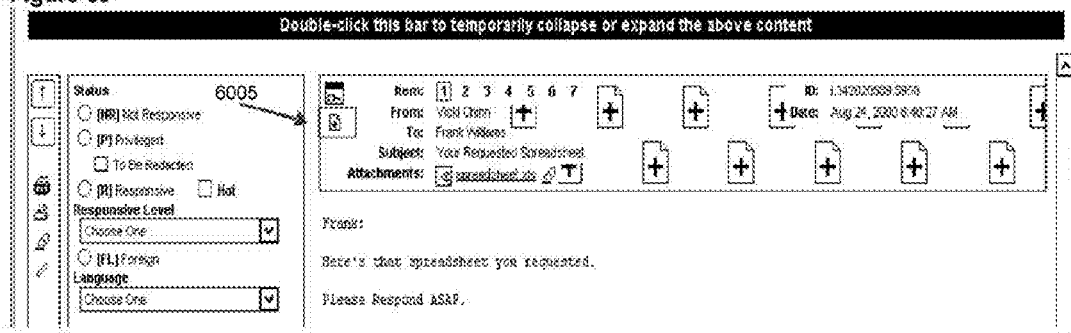
FIG. 60 is a screenshot of one embodiment illustrating a corrected item which was formerly corrupted.

In those instances where there is a confirmed corruption problem, and there is a fully pristine "good" copy available, the user will be given the option to substitute the "good" copy for the "bad" where display or production of the item is required. However, in any case where this is done, in one embodiment, the user interface clearly displays a warning message and or icon [6005] highlighted in a bright color to indicate that a substitution has been performed. An example of this is illustrated in FIG. 60. There are cases legally where such substitution might not be desirable. For example, if a defendant wants to claim that lie was unable to view a document because it was corrupted, it is important to note that a substitution was made. The user can then choose whether the good copy should be substituted for the bad when producing documents.

Correcting Custodian Information

When receiving custodial data, it is often the case that various incorrect spellings occur, especially for custodians with longer or more unusual names. Similarly, name changes due to marriage, divorce, or for any other reason, also may pose difficulties. This in turn makes it difficult to consistently correctly associate data with the right person. As a result, a company could fail to comply with a subpoena, or turn over data that it is not obligated to, or not give certain documents the amount of reviewer attention that they deserve.

To minimize these difficulties, the system in one embodiment provides a screen which utilizes a metric for determining the "distance" between two pieces of text in order to identify names that are suspiciously similar, and hence have a high likelihood of actually being the same person. The metric in some embodiments is a well known metric such as Levenshtein edit distance, also know as just "edit distance." The Levenshtein edit distance between two strings of text, the source string s and the target string t, is the minimum number of deletions, insertions, or substitutions required to transform s into t. Other embodiments may utilize a different metric instead, or employ multiple metrics.

Figure 61:
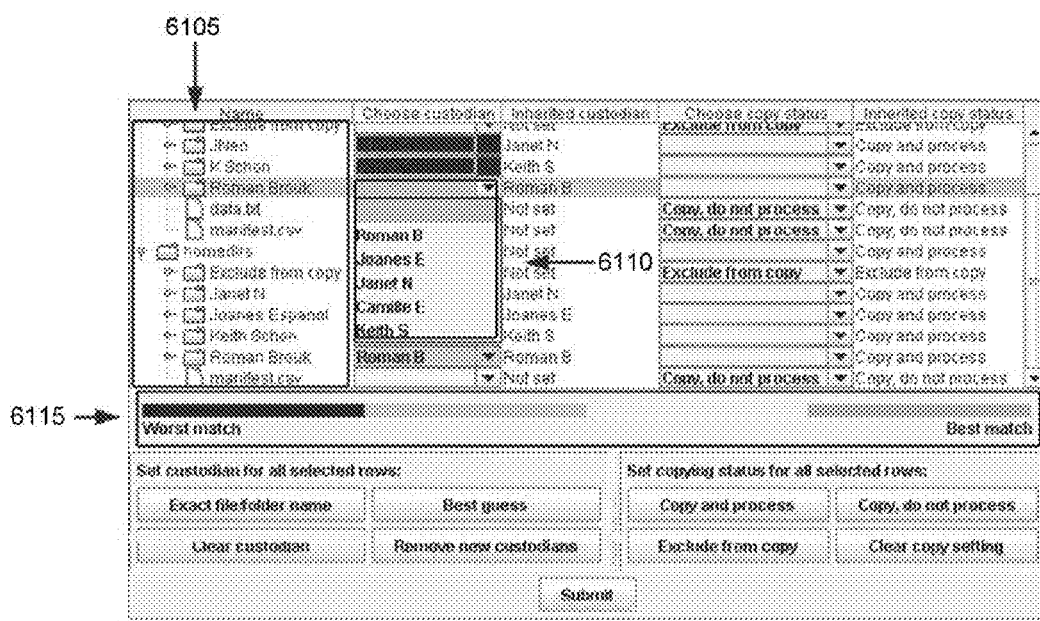
FIG. 61 is a screenshot of one embodiment of illustrating how to correct custodial information.
Figure 62:
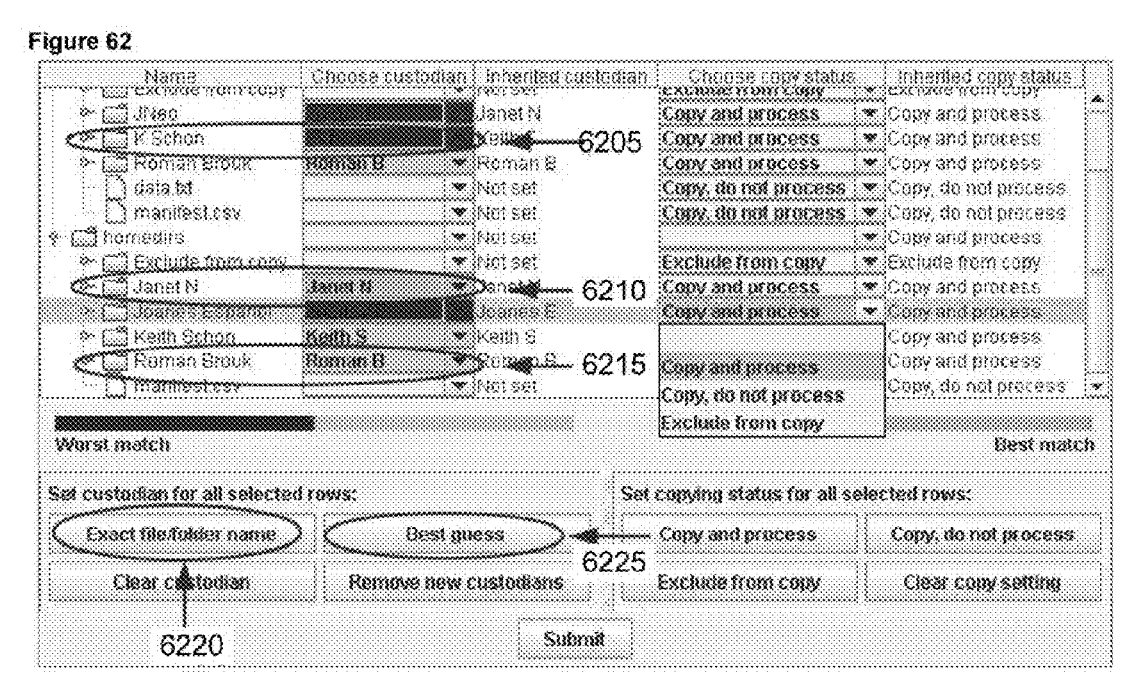

FIGS. 61 and 62 illustrate one embodiment of the user interface which may be used with this method.

In one embodiment, the user interface displays the files and folders of the custodial data in a tree structure as illustrated by FIG. 61. It allows the user to choose a custodian from a pre-existing list, associate a custodian with each folder or file, or add a new custodian, through the GUI. In one embodiment, the system sorts the custodians from which the user chooses edit in order by the "distance" from custodian's name to the name of the particular file or folder. For example, if the name of the folder is "kschon"; the custodian "Keith Schon" will be listed before "Roman Brouk" or "Joanes Espanol".

In some embodiments, the distance between the name of a file or folder and the chosen custodian may be indicated visually. As shown in FIGS. 61 & 62, the different degrees of matches [6115] are indicated by color—red, orange, yellow and green to illustrate the worst match to the best match. However, different embodiments could use other color or visualization schemes. The different levels of matches [6205-6215] between custodian name and the name of the file or folder is illustrated in FIG. 62. The "best guess" button [6225] will populate the custodian slot with the closest name for every selected file or folder. The "exact file or folder name" button [6220] will only populate the custodian slot with a name exactly matching the file or folder name for every selected file or folder.

Correcting Actor Information

One embodiment of identifying actors algorithmically assigns electronic identities to human individuals. Unfortunately, no algorithmic method (nor human method) can accomplish this task perfectly. Often there is no good way to establish the real identity of bluebear@yahoo.com for example, (other than being directly told in a witness interview). At other times, two actors with very similar names and behavior patterns may get understandably confused with one another. This is highly problematic in litigation, when the actor(s) involved with a document may determine whether or not it is responsive to the subpoena.

Figure 63:
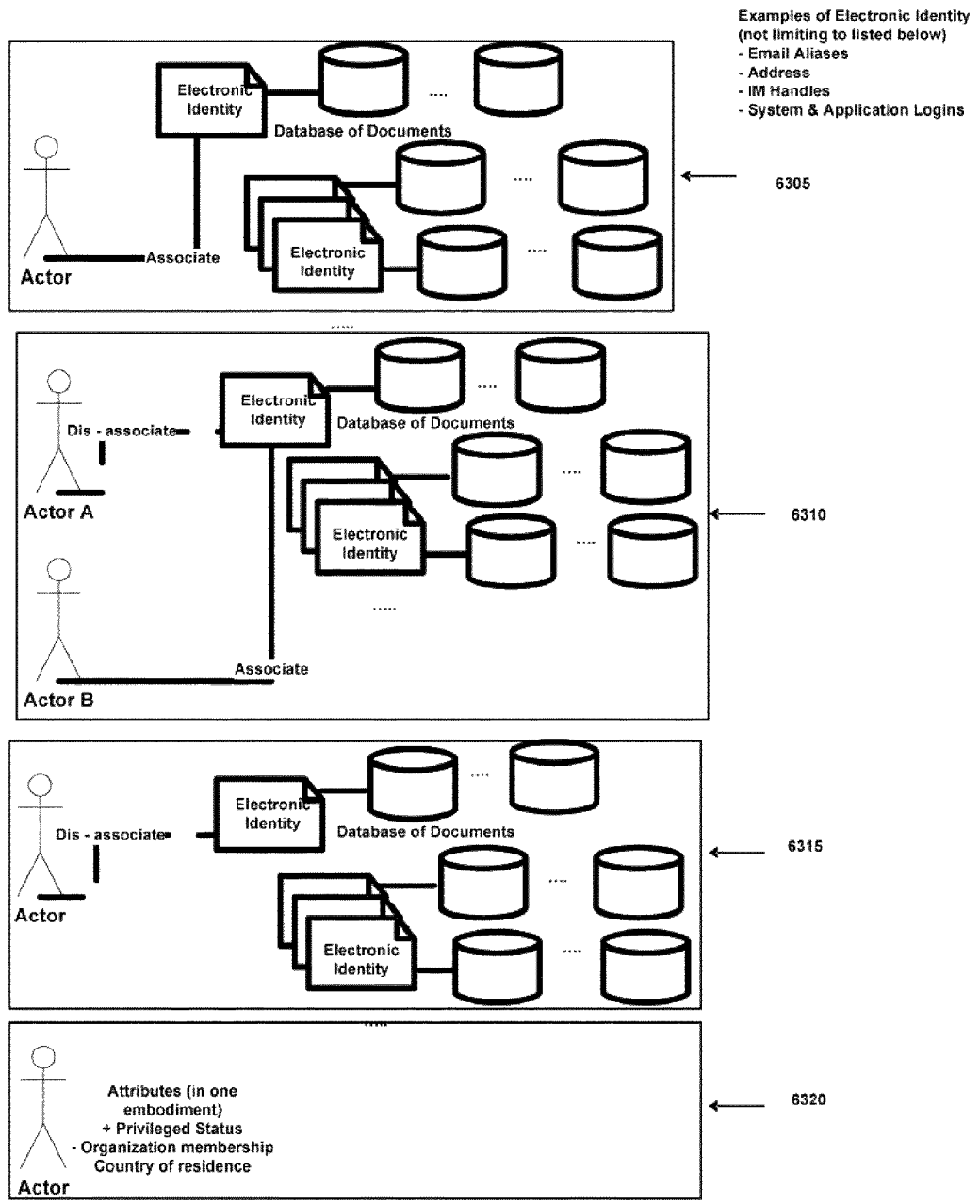
FIG. 63 is a diagram of one embodiment of correcting actor information.

To help remedy this problem, the system provides a user interface whereby a user may correct actor information based on their independent knowledge of the real world facts. With this user interface, the user may do any of the following tasks illustrated by FIG. 63:

Associate a previously unassigned electronic identity to an actor [6305]. As noted elsewhere, an electronic identity can include, but is not limited to: email aliases or addresses, IM handles, phone numbers.

Reassign an electronic identity from one actor to another [6310] (In some embodiments, this is the only case in which the user may add a new actor.) This could occur in the situation in which two identities were wrongly mapped to the same individual, leaving the system a distinct actor short.

Remove a previously assigned electronic identity from an actor, and leave it unassigned [6315].

Add or remove an attribute from the actor [6320]. Attributes include, but are not limited to: privileged status, organizational membership, and country of residence.

Modify the value of an attribute, such as organizational membership or citizenship.

In some embodiments, the system automatically presents lists of similar actor names that are associated with different identities, facilitating the identification of possible issues, verification of correct mappings, and where needed, correction. Some embodiments may use Levenshtein edit distance as was discussed in a prior section on correcting custodial information. For example, in a large enough corpus, one might have many J. Smiths, and even several "John Smith"'s. Both human reviewers and algorithmic approaches may understandably confound such similarly named actors.

In one embodiment, any user actions performed through this user interface are automatically sanity checked before the new information is integrated into the system. This is to prevent a case of user error doing substantial harm to the system—and a resulting failure to respond properly to a subpoena if this mapping is done in a litigation context. Sanity checks may include, but are not limited to, one or more of the following:

If a privileged actor attribute is changed by the user, the system checks to see if the change is generally consistent with human reviewer decisions involving this actor. Specifically, if documents authored by this actor were not generally reviewed by reviewers as being privileged in nature, in most embodiments, the system will provide a warning message, since presumably if the actor were in fact a privileged one, one or more of the reviewers would have realized this. In some embodiments, a threshold number of such conflicting reviewer decisions could be set by the user to determine when a warning message should appear.

In the case of changing the identities associated with an actor, a linguistic fingerprinting check is done to verify the correctness of the request. More simplistic methods may also be utilized by some embodiments. For example, if there were a request to reassign an identity from actor "Bob Jones" to actor "Roberta Jones," but the emails of this identity were all signed "Bob", this would raise a red flag. (This can easily be accomplished with a lookup table which maps common nicknames to full names.)

If the change results in a significant number of documents that had already been reviewed or viewed changing hands a red flag is raised. This is based on the presumption that if the actor identification were incorrect, it would have been caught by human reviewers over a large enough number of documents reviewed.

In the case of litigation and related scenarios, consistency with custodial assignments.

If a sanity check fails, in many embodiments an alert is sent to one or more administrative users of the system. In one embodiment, the change will not be processed unless an administrative user verifies it. Alternately, the as-yet-unapproved change may be indicated as pending during this interim period. Once approved, the changes may include, but not be limited to:

Change of designation of privilege status for an arbitrary number of items

Items that had not previously been considered as responsive may now be

Changes in which actors are associated with which items.

Changes in discussion topology. This is because in order to form items into a discussion, at least some overlap of actors is required. This in turn is determined by the system's mapping of electronic identities or aliases into human individuals, so any change to this mapping is likely to affect discussion structure. Configurable Highlighting of Actor Names Often during a large document review, it is highly useful to highlight actor names according to certain color schemes. Examples include highlighting all privileged actors in a particular color, so as to make it easier to quickly detect privileged items, indicating key litigants, or indicating actors with a particular job. Similarly—and optionally—all text attributed to these actors may be displayed in the same color as the highlight. For example, in an email or IM exchange between an attorney and two non-attorneys, if green were the highlight color selected for privileged actor, any text originated by the attorney would be rendered in a green color. In one embodiment, this includes quoted text in other emails. The same highlighting could be applied to different document types to capture the edits made by different actors. In one embodiment, when all of the text in an item is from only one actor, this color scheme would not be applied.

Figure 64:
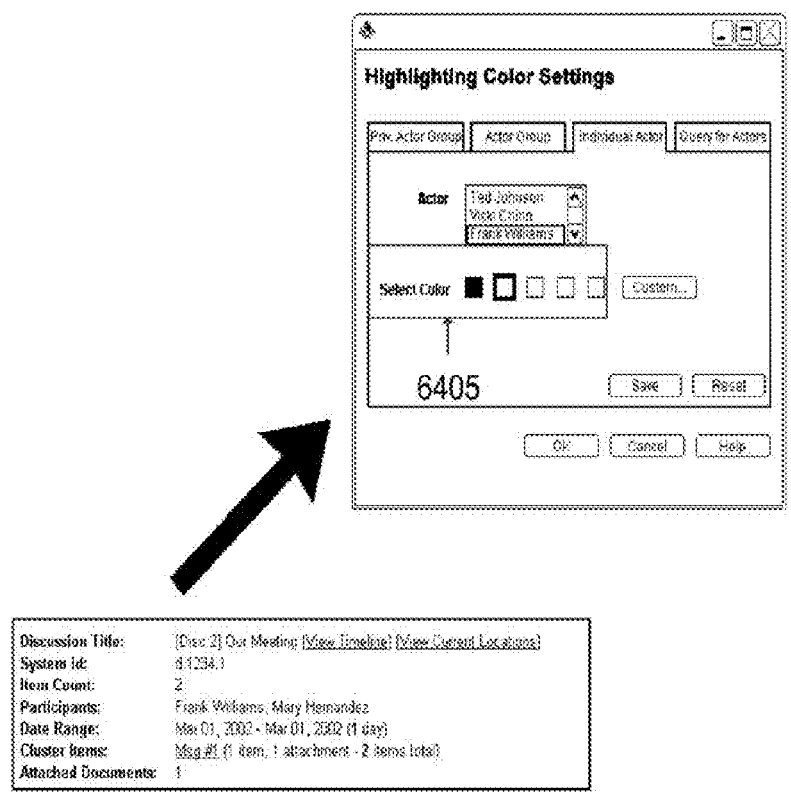
FIG. 64 is a screenshot of one embodiment of actor highlighting.

In one embodiment, a simple user interface allows the user to specify highlighting scheme by:
  Privileged actor group
  Other actor group as defined in the system
  Actor(s) returned by a query
  By individual actor
  One embodiment of this is illustrated in FIG. 64.

Comprehensive View of Who has Seen which Items

In the course of a document review effort, it is often very valuable information to know both which reviewers (or other related people including but not limited to review administrators or investigators) have seen a particular thing or kind of thing, and similarly which actors saw—or at least received—the particular thing or kind of thing. The former type of information is very useful tool in helping to assess human reviewer performance.

Figure 65:
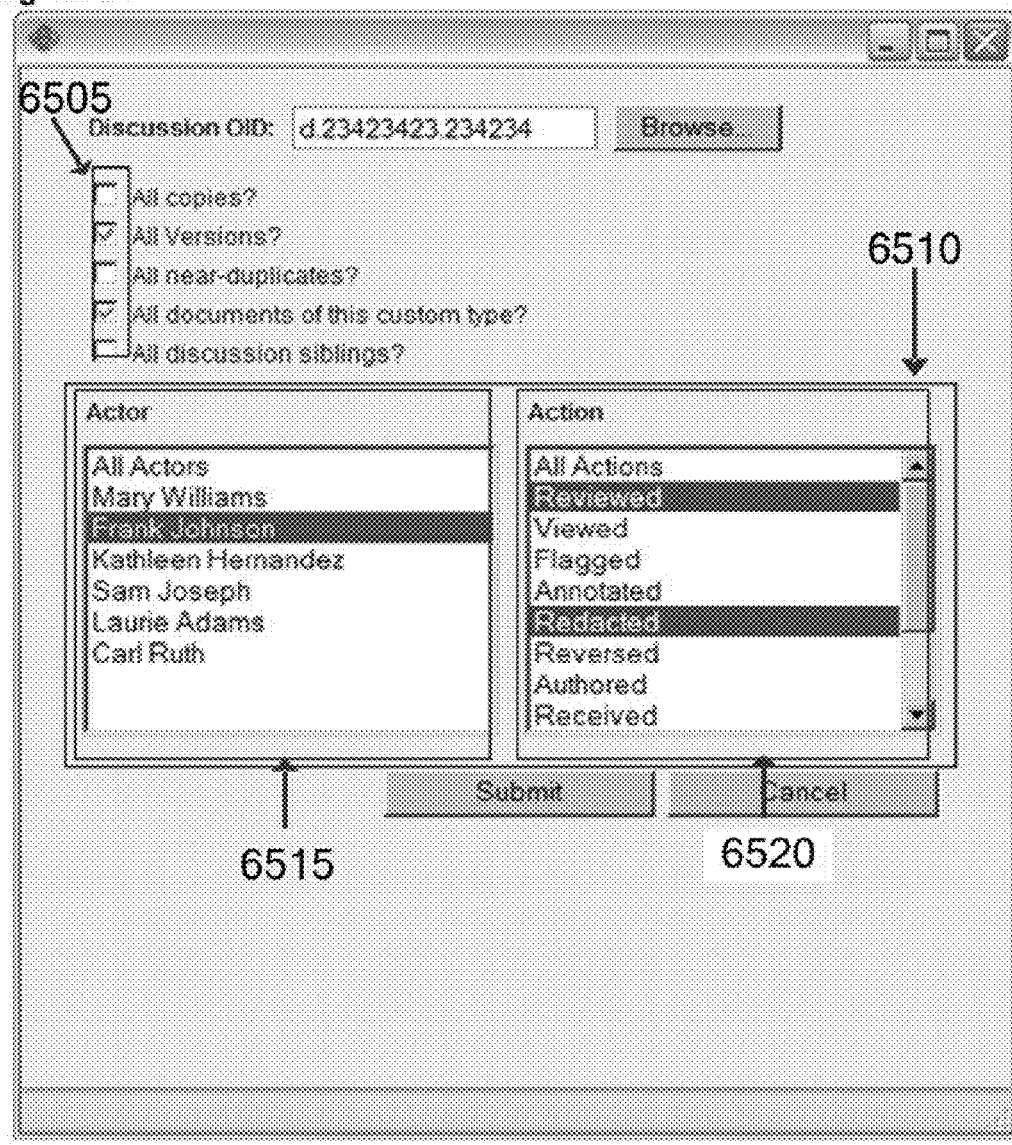
FIG. 65 is a screenshot of one embodiment of query controls used to determine who has seen which items.

To this end, in one embodiment, the system provides a special query screen that focuses on people—both system users and actors from the corpus—and the actions that they may have performed with respect to specific items in the corpus. As pictured in FIG. 65, in one embodiment this query screen offers a joint pick list which combines both system users and actors from the corpus, a picklist with a set of actions, and a set of options for content selection. Both pick lists include an all-inclusive entry; "anyone" in the case of the system users & actors pick list and "all" in the case of the "action" one. This allows the user to query for the full list of people—whatever their role—who have seen X or Y. In one embodiment, there may also be separate "any actor" or "any user" to enable separation between actors in the corpus and reviewers/users. Note that other embodiments might have different controls, or only offer a subset of these controls, for example, only show the two pick lists.

In one embodiment, the set of actions/choices includes, but is not limited to:
  Reviewed as [responsive|non-responsive|privileged] etc. (system users)
  Viewed (appropriate to both system users and actors)
  Flagged or foldered (system users)
  Annotated (system users)
  Redacted (system users)
  Reversed a workflow decision (system users)
  Authored (actors)
  Received (actors and system users)
  Modified (actors)
  Forwarded (actors)
  Replied (actors)
  Approved (actors)
  Rejected (actors)
  <All Actions>

In one embodiment, the set of content options includes, but is not limited to:
  A particular item
  Any version of a particular item
  Any statistically near-duplicate of a particular item
  Co-members of any discussions the item is in
  Any exemplar of a type of document as understood by the system; for example, a particular kind of report which is identified ontologically, by the use of clustering or any other method.
  Any text block
  Custom query (e.g. "any spreadsheet document created by Actor A that includes the word "turtle."")

In some embodiments, the results are displayed in a user-configurable view. In one embodiment, the data is presented in a tabular view format, which allows the user to see for each retrieved item all review-related actions as well as which actors operated upon the item in some way. Some embodiments may support direct use of a query language or other more sophisticated mechanism so as to allow the user to specify different actions associated with different persons in the same query.

In some embodiments, a tally of review decisions for both individual items and the group of items returned is also provided. For example, the user may perform a query to see all near-duplicate items for a particular item, and this may result in 100 items being retrieved. In this example, the 100 items may have been reviewed a collective total of 250 times (since it is generally true that more sensitive documents are reviewed more than once). The user interface, in one embodiment, will chart how many times these items were found to be responsive vs. privileged vs. non-responsive or how they were categorized with regard to any of the different categorization schemes. The system may further chart how often the documents were found to be in other categories, such as "hot." This reporting helps identify review consistency problems that are related to specific families of items.

One of the important use cases for this functionality is to identify any situations in which the system user is also an actor with respect to the corpus that is being reviewed. This is a situation that happens, for example, when outside counsel is reviewing a collection of their client's documents that includes documents and emails which originated at the outside law firm.

Targeted Auto-Batch-Dispensing/Bulk Batch Assignment

Information from reviewer reports can be used to create metrics to evaluate the quality of the reviewers—the good reviewers are the ones who make the desired decisions consistently in the least amount of time. The information derived from processing this data can also be used to assess the effectiveness of specific users reviewing documents with different characteristics. Such characteristics may include, but are not limited to: document type, amount of graphical or fielded content, topical content, length of document, or foreign language content. These characteristics could also include more litigation-oriented designations, such as responsiveness, or associated custodians.

Figure 66:
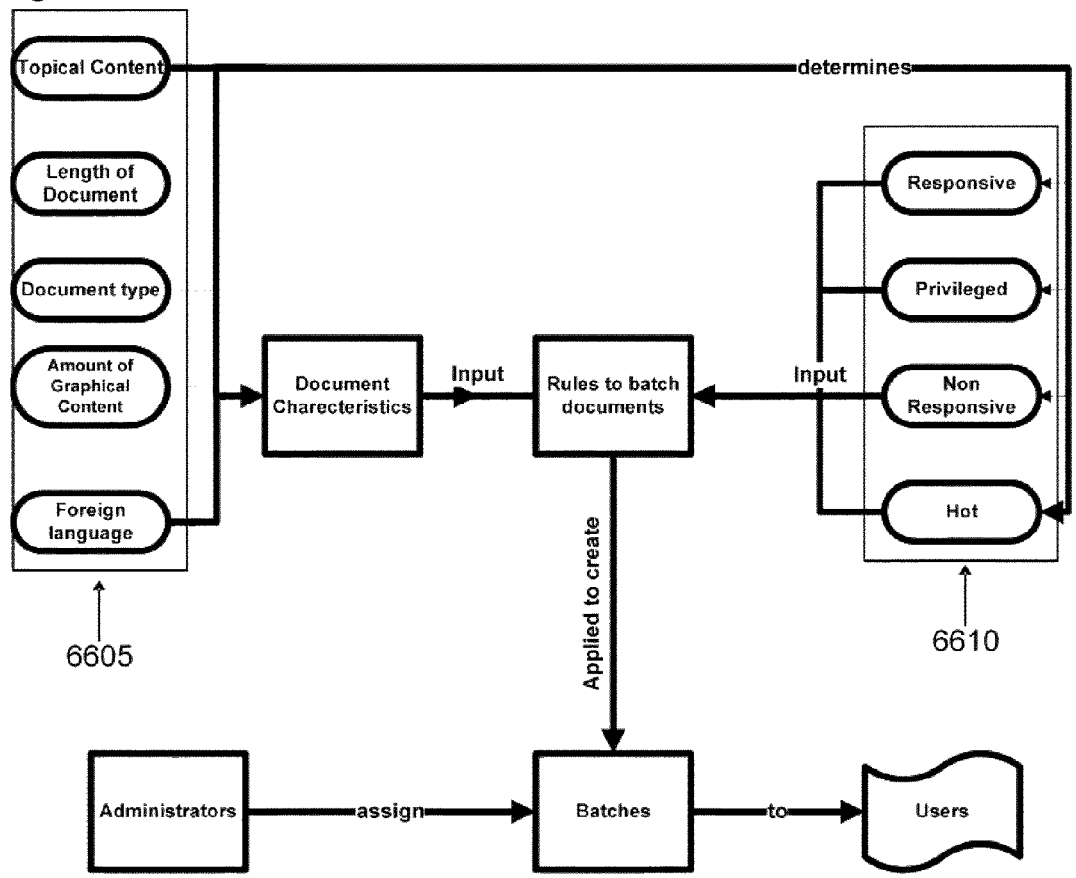
FIG. 66 is a diagram of one embodiment illustrating rules to batch documents.
Figure 67:
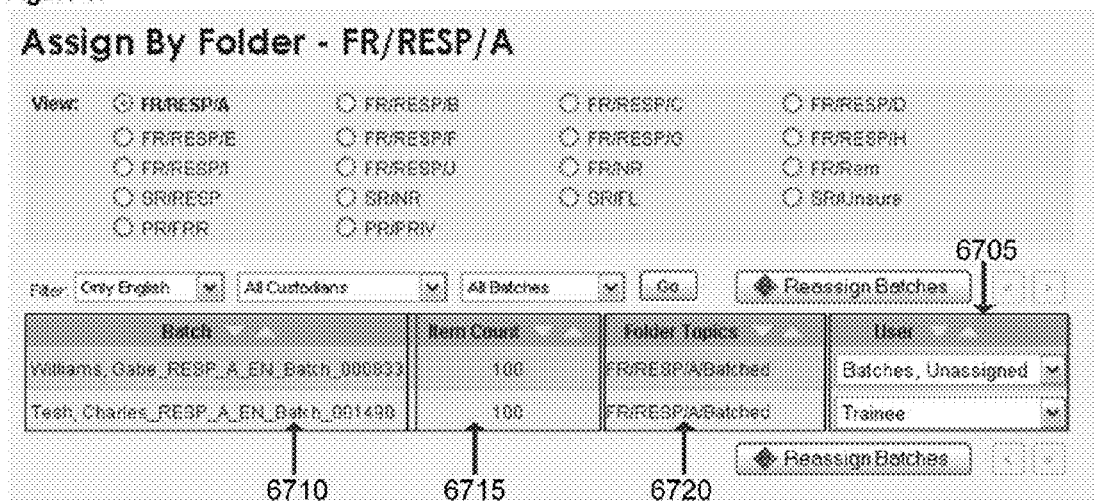
FIG. 67 is a screenshot of one embodiment of individual batch assignment.
Figure 68:
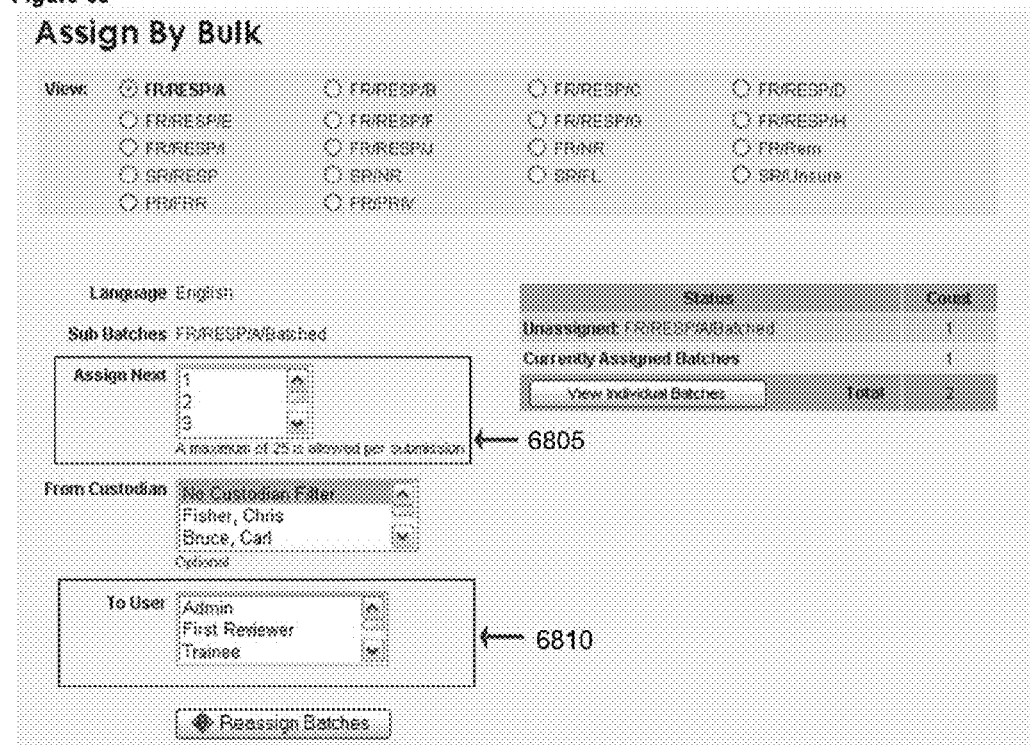
FIG. 68 is a screenshot of one embodiment of bulk batch assignment.

The system, in one embodiment, provides a user interface whereby a designated administrator may create batches of items (or collections of items such as discussions or clusters) that have one, or a combination of N of these properties. For example, a batch may be specified to contain only items that are in French and involve discussion of tax code issues. Having defined batches in whatever way corresponds to both the objectives of the review and the individual strengths of the reviewers, these batches may now be assigned to different individual reviewers as appropriate. This is logically illustrated in FIG. 66. An exemplary implementation of the user interface for assigning batches is depicted in FIGS. 67 and 68.

In order to facilitate the task of assigning batches and increase its efficiency, in some embodiments the system provides the user with two types of controls with which to perform batch assignments. The first of these allows the user to assign individual batches to other users. The second allows the simultaneous assignment of N many batches at once. As pictured in FIG. 67, the user is provided with a set of filters that she may use in order to limit the number of batches for which detailed information will be displayed, and which she may assign out. As pictured in FIG. 68, a control [6805] is provided which allows the user to specify how many batches should be assigned at once.

In addition, in order to increase efficiency, when a user logs into the system in the morning, prior bulk or individual batching assignment commands can be automatically rerun, resulting in the next N batches of the prior type becoming automatically assigned to this user. In one embodiment, the system makes a determination automatically of what kind of batches should best be assigned to a reviewer based on their track record for speed and accuracy of decisions.

Comparing Review Performance of Human Reviewers & Automated Methods

In one embodiment, the present system will use techniques including ontologies and topic clustering in order to determine the presence of specific topical content. On this basis, items and discussions can be initially slotted into different starting workflow areas. This allows items with more relevant content to be prioritized for earlier review, or review by more senior or trusted users. The use of automated categorization methods also allows for a sanity check on the human reviewers. Specifically, the sanity check verifies that human reviewers who are all reviewing items that were determined to contain a particular topic of interest, on average, all agree or disagree that this content is present roughly the same amount.

In one embodiment, there is a mode in which the reviewers are not made aware in the user interface that the documents have been pre-tagged for specific relevant topical content, so as to eliminate the possibility of skewing.

Figure 69:
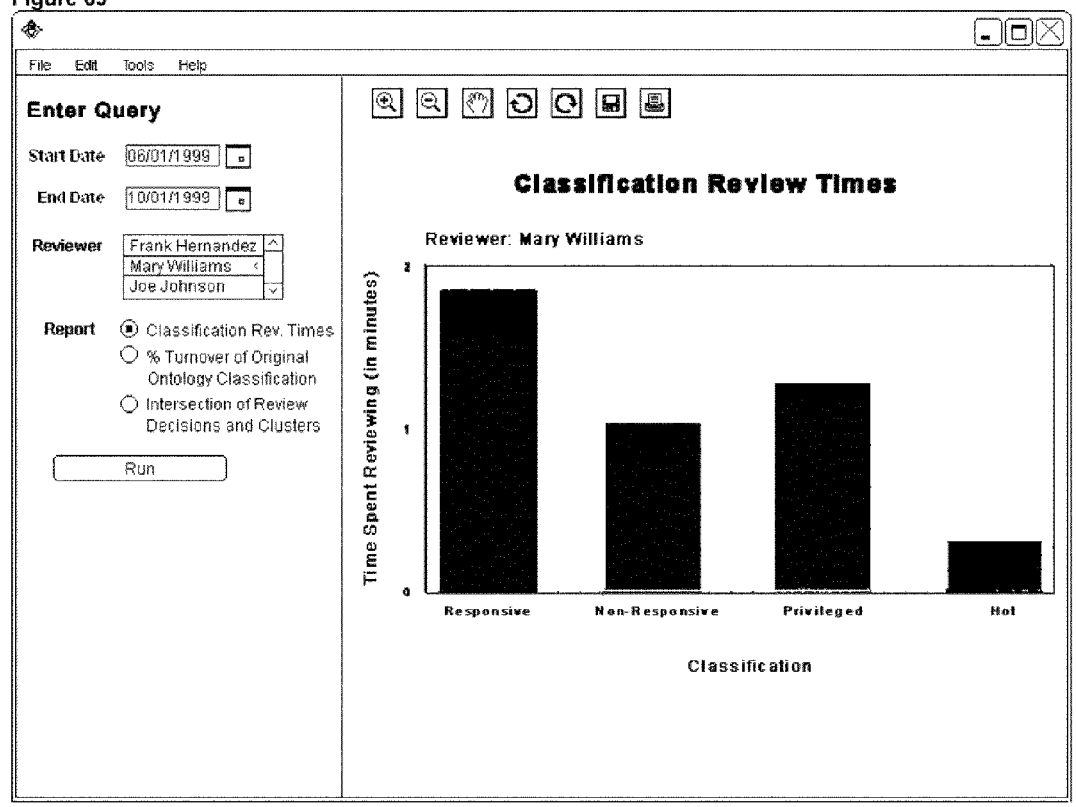
FIG. 69 is a screenshot of one embodiment of classification of review times.
Figure 70:
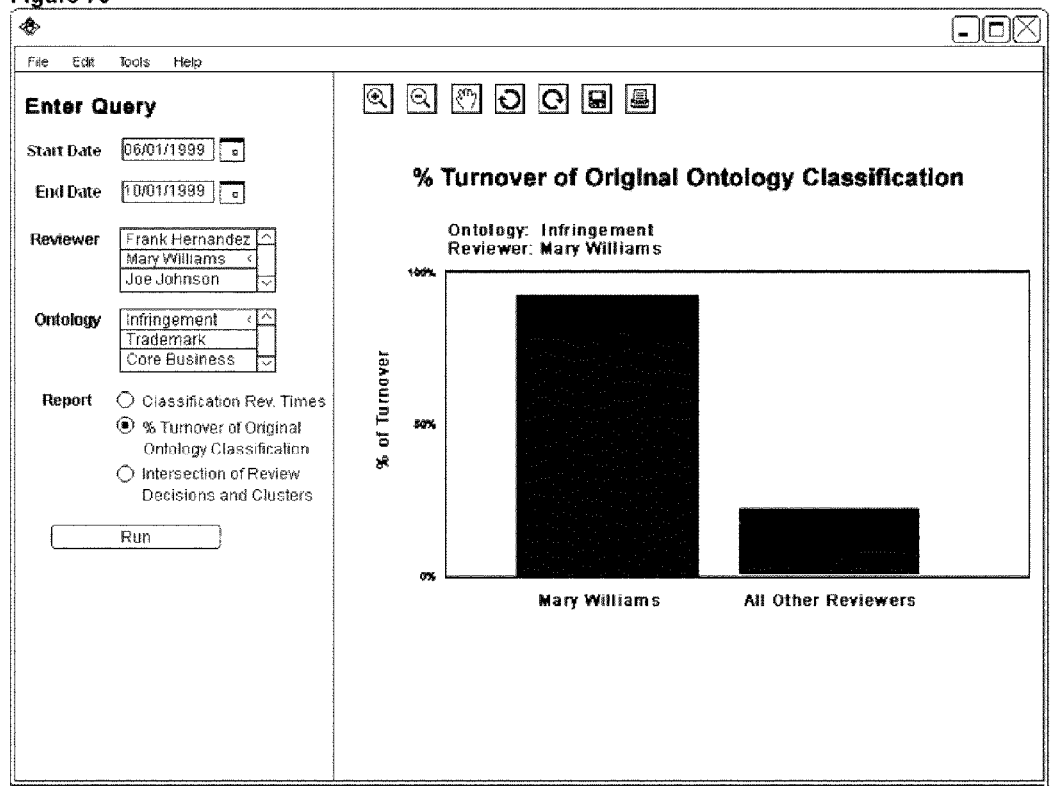
FIG. 70 is a screenshot of one embodiment illustrating percentage turnover of original ontology classification.
Figure 71:
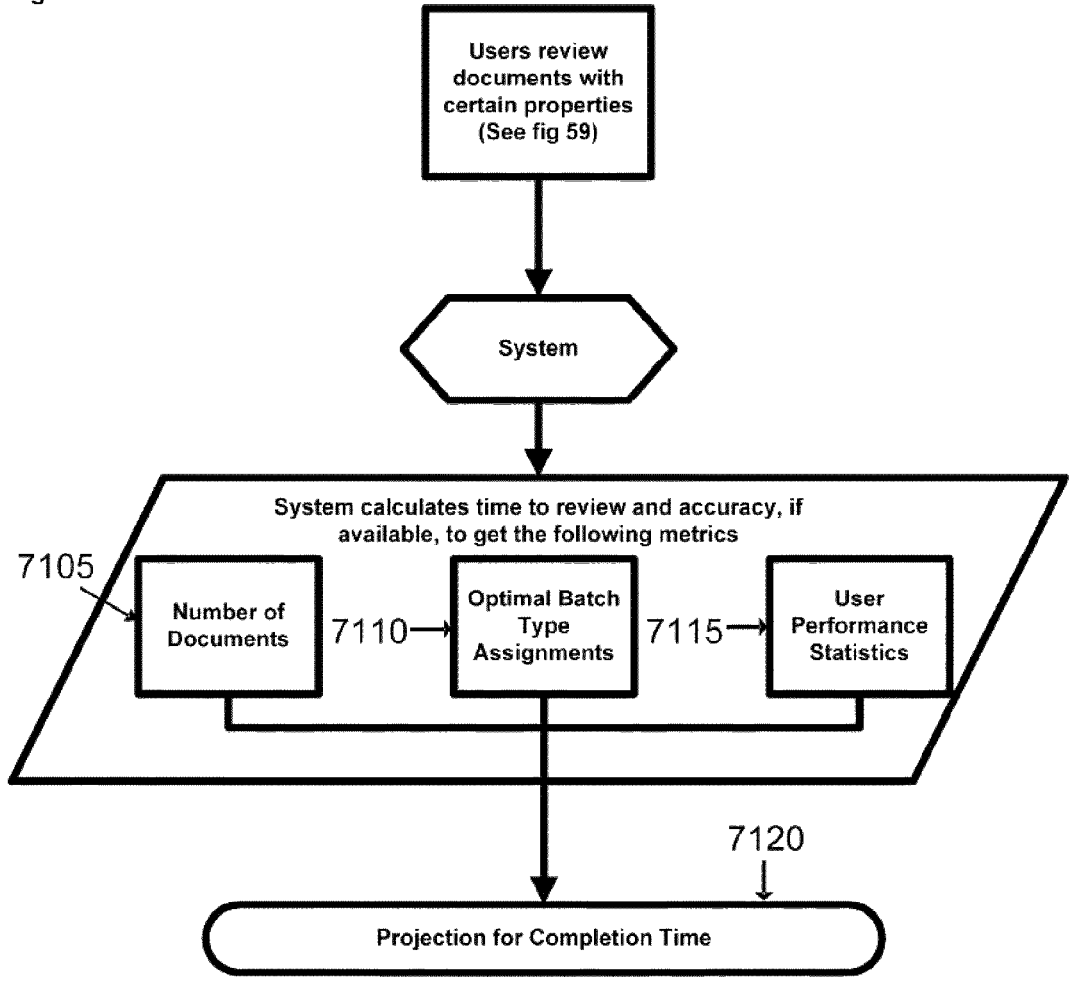
FIG. 71 is a diagram of one embodiment illustrating how a system projects for review completion time.

If the human reviewers do not agree with each other, or with the pre-tagging performed by the system, there is now a divergence of result that is measurable. This can be used to correct errors in human review, as well as to detect lazy or otherwise poor reviewers. Errors in the ontology or other categorization mechanism may also be identified and corrected using this system, if reviewer decisions consistently disagree with it. Further, if reviewers on average are spending the same amount of time on documents that are presumed to contain sensitive content as those that do not, this is interesting information that can point to a real problem, since potentially sensitive documents should be accorded much more scrutiny than relatively innocuous or irrelevant ones. By making this information available in easily digested formats, such as reports with pie charts to show the percentage of disagreement with the system by user, and in the aggregate, and bar charts to show the amount of time reviewers spend on documents with different topical content characteristics, administrators have the opportunity to detect and remedy inconsistencies in review much earlier and more effectively. Sample graphs and reports to this effect are shown in FIGS. 69 & 70. In some embodiments, the report options are made available through pull-down menus, rather than through radio buttons. Other types of review reports in addition to the embodiment illustrated in FIGS. 69-70 may also exist.

In some embodiments these metrics are used to project review completion times, based on the current number of documents, the currently available reviewers, optimal batch type assignments in which documents are assigned to the reviewer(s) who can most efficiently review them, and the maintenance of current performance characteristics. Some embodiments will perform load balancing calculations in their completion time estimates. For example, they will assume that documents with certain characteristics will be given to somewhat less efficient reviewers if this will result in an earlier completion time because the most efficient reviewer(s) for that document type are already overloaded.

In some embodiments, the user may provide input to the system through user interface controls (not shown) in order to dynamically model the review effort. For example, if the review must be completed by a certain date, how many more reviewers—and with which specific skills—would be needed? Or how many more hours a day must the currently available staff of reviews work in order to meet the desired deadline, if indeed this is still a possibility. Or how much eliminating a stage of review would advance the goal. Some embodiments may also allow the input of cost information in order to help the user determine the least expensive course of action as well as the fastest.

This method will yield much more accurate projections than a projection simply based on an average time per document, since some types of topical content take longer to review than others, and reviewers are likely to review much faster when given content that they feel comfortable with. For example, if we know that Jane Jones is the most efficient at reviewing Spanish documents relating to product defect issues, and we have assigned all such items to her, because we know how long on average it takes her to review each such document, and how many such documents there are, we can fairly accurately project when she will finish.

While clustering and other well-known techniques work well for determining which documents have highly similar content to one another, they may not work as well in determining responsiveness. For example, two emails might contain the identical attachment and similar introductory sentences. But one item might have been sent to an attorney, thus making it privileged, and the other might not have been, making it potentially responsive. To this end, in one embodiment the system enables the user to constrain the clustering by the objective constraints of responsiveness including, but not limited to, the date range, the relevant actors or custodians, and then generate a report of instances in which reviewers—or for that matter the categorization mechanism—differed in their decisions on items that were both very statistically similar in content and which are not precluded from being responsive in some way.

Automated Production

Due to the continued skyrocketing of the amount of electronic data that is commonly the subject of electronic discovery requests or investigations, there is an increasing acknowledgement that it will no longer be feasible to have every produced document manually reviewed by a human reviewer. However, a scientifically sound and legally defensible process will be required in order to gain acceptance over the traditional, but increasingly antiquated manual review.

What is needed is a process to verify the results of automated categorization in order to be able to safely perform automated production, without either violating the law, or unnecessarily producing excess, and even potentially damaging data. Note that in some instances, the validation of automated categorization may be desirable for reasons other than directly selecting a production set. For example, it may be done in order to determine documents that are of sufficient interest or sensitivity to be manually reviewed.

As previously noted, assessment of data in litigation typically requires that items be split into several categories. At a minimum, responsive items, and items that have responsive content but are privileged (and thus protected from having to be produced) have to be identified. However, there may be additional categories such as items which must be turned over but will be labeled confidential, or have a "do not copy" status.

Categories of responsive items are typically associated with one or more specific line items in the subpoena or similar request for information. The responsive categories may vary quite extensively, from very specific and detailed questions to broad requests for anything that is relevant to some topic. The items identified as privileged are generally withheld from turnover but must be identified, and an inventory of these items, a privilege log, must be presented. Because of the stakes generally involved in a legal matter or investigation, high levels of accuracy and comprehensiveness are necessary. The level of accuracy required is much higher than is generally acceptable for use of standard categorization methods in other domains (for example categorization in web search engine results). Obtaining the necessary performance requires a process that blends the results obtained by applying a potentially large number of disparate categorization techniques.

The automated production process described here includes an automated production system which generates rules for combining results from a heterogeneous collection of individual categorization techniques and then applies those rules to rapidly produce high quality categorizations of large datasets. The system is designed to work with a large number of approaches, including one or more of search engine style queries, general clustering techniques such as classifying items by topic, and custom techniques tailored specifically to a given data set. The invention described herein may be applied to any categorization task on large datasets, not just the primary one described in this application.

Figure 96:
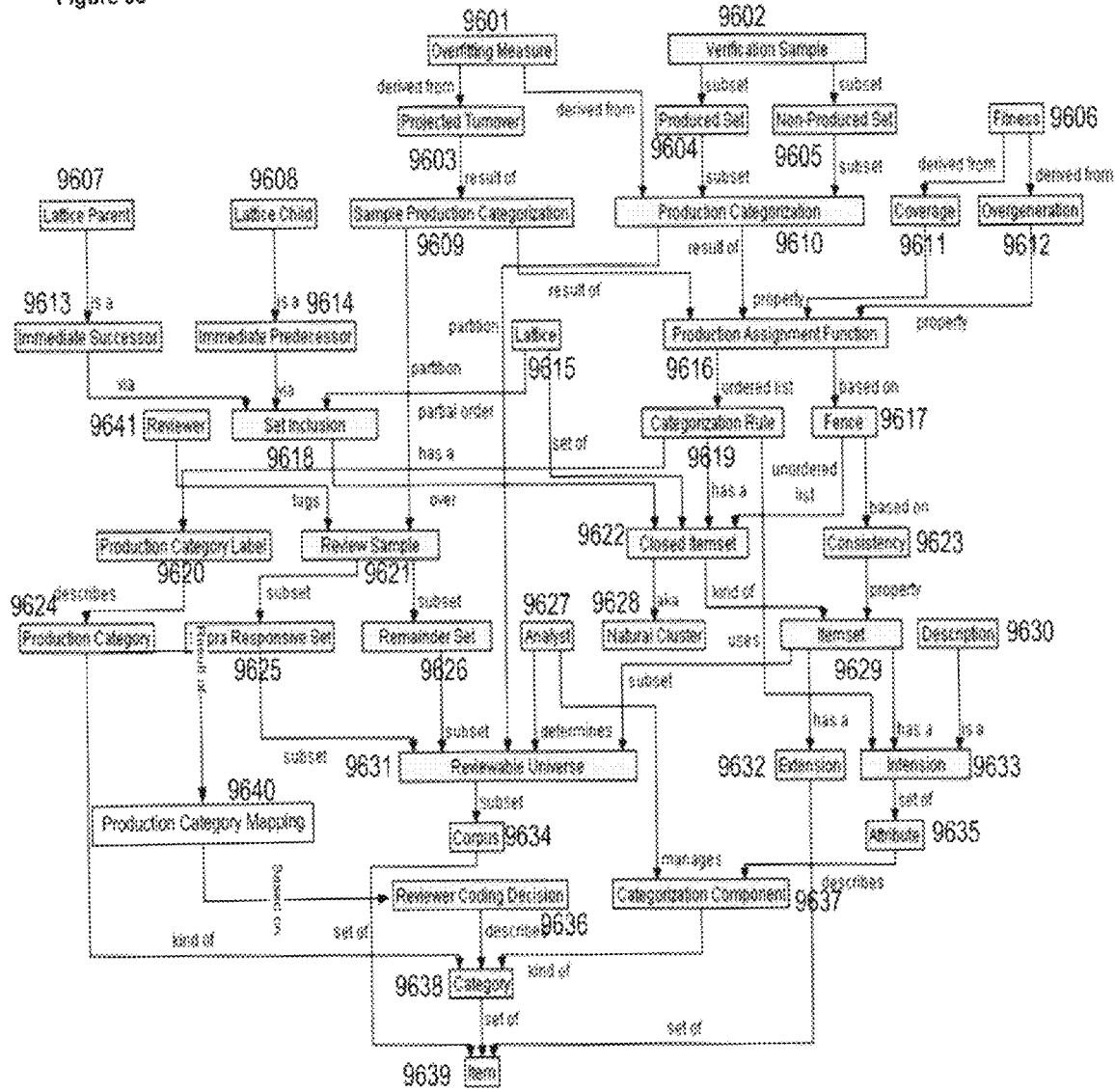
FIG. 96 is a diagram of one embodiment illustrating the relationships between concepts related to automated production.

FIG. 96 describes an overview of the elements in one embodiment of the automated production process. This process does not address the details of any of these categorization techniques individually, but rather focuses on a systematic method for combining the result sets derived from these techniques into simple container objects that we will call categorization components [9637], which may then be manipulated as homogeneous objects in order to achieve highly accurate categorization results. This method also makes it more practical to utilize pre-existing "off the shelf" work, for example libraries of generic ontology classes in an ontologically based categorization technique. Due to the difficulty and range of the different types of categorization tasks required to respond to electronic data discovery requests, implementers often have to "cheat" and build in fixes or specific knowledge for a particular corpus [9634], i.e. the set of all individual items [9639] in a dataset. This makes it extremely difficult to reuse implementations between corpuses. One important benefit of the method described here is that it becomes much more practical to reuse high performing categorization implementations because of the automatic discovery and visualization of the contexts in which the categorization implementations are working well, and in which contexts they are not. Finally, the method is supervised. It compares the results obtained on a sample subset of the data, which has been separately categorized, in order to measure the accuracy of the results obtained over the whole data set.

In order to work with the widest variety of categorization mechanisms or techniques possible, a categorization component is defined to be simply the set of items found to be in a category [9638], however generated or arrived at. This simple definition provides consistent grounds for comparison between very different techniques, whether a categorization technique such as an ontologically based query where results are assigned to a predetermined category or a technique such as a data clustering approach that discovers an unknown number of categories in the data.

In this process categorization components are not intended to ultimately categorize the data set. Rather, they are an intermediate set of categories that describe items in the data set.

The method formally defines the description [9630] of a member of the dataset as the set of categorization components containing it. The final category or categories assigned to an item, its production category [9624], will be a function of its description, called a production category mapping [9640]. That is, the method constructs a function mapping from descriptions to a final production category. By "production", we mean the act of ultimately turning over data to the opposing side and the court. However, the method is in no way limited to that use; the production category can be thought of as the category ultimately assigned through the use of the method.

Ideally, categorization components would capture distinct characteristics of an item that could then easily be mapped to a production category based on simple Boolean conditions. For example, in order for an item to be responsive to a subpoena it might require that the item have remediation language in it, refer to one or more of a specific set of companies, and mention certain types of products. With a set of three categorization components cleanly identifying the sets of items with each respective characteristic, the production assignment would simply be an "AND" over those three elements in the description of an item. However characteristics often have more subtle inter-relationships between them. This has the effect of creating correlations between components, i.e. the membership sets have non-empty intersections.

Complicating this further, in one embodiment, there will be subsets inside of a categorization component with different correlations. Therefore it is useful to identify which characteristics can be described completely independently of each other. For those categorization components that are not independent, it is useful to identify which subsets of items within them are independent from other categorization components and which subsets are not. Finally, the notion of independence/correlation can be relativized to particular sets of categorization components, i.e. component 1 and component 2 might be independent when considered in isolation, but overlap with other categorization components. In order to build the production assignment function [9616] the system implements algorithms to perform analyses which will be described in a subsequent section.

The system identifies the largest sets of items with independent characteristics in a particular context (i.e. the particular categorization components for which the characteristics are independent). This is balanced with a dual purpose of finding the smallest sets of items for which independent characteristics can't be found. Out of the resulting collection of sets, the system then finds those that are most consistent with reviewer results and generates a production assignment function based on them. This is one step in the overall process, which seeks to refine the categorization component set by identifying and modifying those components that contribute sets of items that are either too heavily correlated with other components or for which there are no useful subsets that are consistent with reviewer results. By modifying components to reduce these problems, a better and faster production assignment rule can be constructed.

In one embodiment, the overall process distinguishes the role of an analyst [9627], from that of a reviewer [9641]. The analyst will manage the overall process and they will directly implement or manage the application of categorization techniques to produce categorization components. Reviewers will make categorization decisions [9636] on review sample sets. This process may be combined with additional manual review of items which are deemed particularly sensitive or critical by dint of their content, author, or any other reason. In one embodiment, one or more of the production categories may be intended for additional manual review. In other embodiments, these items may have been separated out before the automated production process begins. In some cases a review effort may initially proceed with manual review, and then switch to the automated production. In the latter scenario, randomized samples can initially be drawn from the reviewed material so long as they are drawn in a way that respects a stratification of the corpus, described below. In all cases, however, random samples must be drawn in order to create the supervisor data set.

The process described, in one embodiment uses a statistical sampling technique called stratified sampling when drawing reviewer samples [9621]. Stratified sampling consists of splitting a dataset into subsets and drawing samples from each independently. The sizes of the samples are not scaled with respect to each other; rather they are determined by the normal statistical significance tests used to determine sample size. When producing any overall statistics then the results from each strata must be weighted to account for the size differences between strata.

In one embodiment, the reviewable universe [9631] is stratified in order to allow for more focused areas of review. This could be because there are reviewers with different areas of expertise and specialization, or because of special review requirements for certain types of items. However the consistent element for any project will be to separate out items that are "junk", in other words of no interest. For production in the litigation context, "junk" items are of no interest in the sense that there is really no chance for them to be responsive (for example spam email). Therefore, as an initial step, most embodiments seek to set aside a "remainder" set [9626] as quickly as possible. As the use of the term "remainder" suggests, in most embodiments, this set is defined as the complement of the set of items that are believed to have some positive probability of being responsive—or in other applications, of interest to examine. For our purposes, we will call this set the supra responsive set [9625].

Most embodiments will deliberately use a coarse, or broad, categorization technique in order to define the possibly responsive set, as it is desirable to direct most of the review effort to those items. In some embodiments this may be done by creating a simple, overly broad, keyword query. The query could be constructed only to remove clearly non-responsive material, or could be constructed under the broadest possible definition of relevance. Other embodiments may use different methods.

This initial query, or other equivalent coarse categorization method, will be called the Supra-Responsive Query. No preset level of precision is necessary for this query; the purpose is to minimize the time and effort spent. In some embodiments, a good target for the size of the supra responsive set is about 3-4 times the estimated size of the ultimate responsive set. The analyst's initial estimate of the size of the ultimate responsive set may be based on a combination of experience with prior corpuses, and initial surveys of the specific corpus. In one embodiment, the estimate may be refined as the sampling process moves forward.

It should be noted that early on in the process, the definitions of responsiveness, in one embodiment, are still fluid. Some parts of the information request may be open to renegotiation and the overall strategy of the case is less settled. The process of building up the initial separation into supra responsive and remainder strata provides an orderly method for performing an exploratory survey of the data while the definitions firm up. Additionally, focusing review within the supra responsive set allows for reasonable predictions of the number of items that will ultimately be assigned a responsive production category. Therefore in one embodiment, a sample size can be selected so as to result in a statistically significant number of items with positive responsive calls.

The related measures of coverage [9611] and over-generation [9612], are used for scoring the degree to which a production categorization fits [9606] reviewed samples. Coverage and over-generation are closely related to the precision and recall measures that are very commonly used in the field of information retrieval. Coverage is the percentage of cases for which the assigned production category agrees with the production category mapped from reviewer coding decisions. Over-generation is the ratio of total items erroneously assigned to a production category over the number of items found to be in that category, i.e. labeled/reviewed—1. It is the inverse of the precision measure used in information retrieval. In most embodiments, the user specifies the desired relative weighting of coverage versus over-generation in order to meet their specific current needs.

Sampling Review Process

Figure 97:
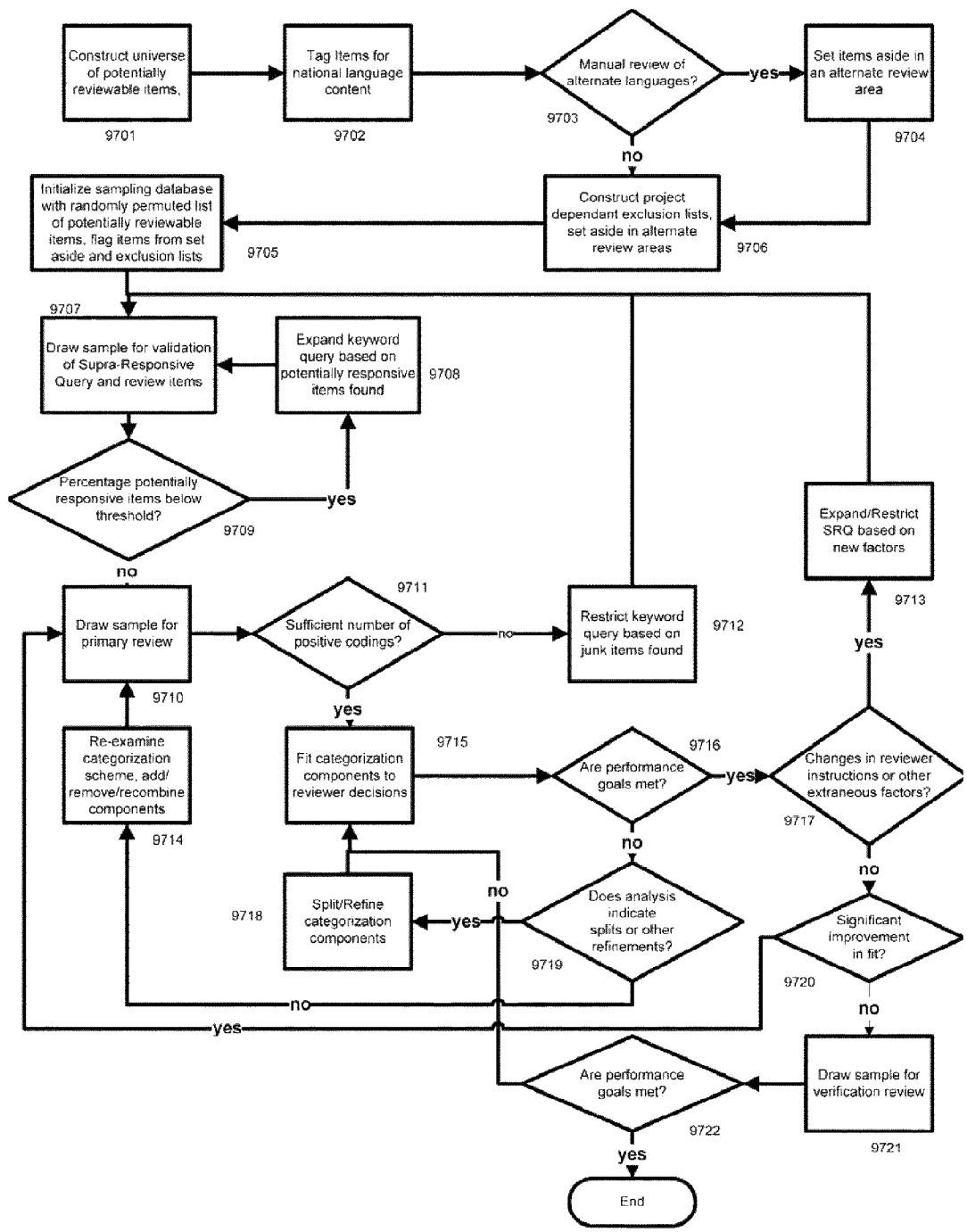
FIG. 97 is a flowchart of one embodiment of the automated production process.

FIG. 97 describes one embodiment of the decision steps involved in the process. To construct the universe of potentially reviewable items [9701], appropriate documents are identified and collected. Decisions such as how emails with attachments and other kinds of compound documents are to be handled will affect which items are considered to be independently reviewable. For example, a typical stance is that emails and their attachments should be reviewed as one item, therefore individual attachments are excluded from the reviewable universe unless they also appear as a standalone document. In one embodiment discussions are presented to reviewers in order to deal with the problem of correctly categorizing short format items into the proper production category.

The impact of the use of discussions in review is usually that the number of items reviewed as responsive increases to include some items which may have been at best marginally responsive when considered on their individual merits. From a legal perspective, in any given matter, extending the production set via the use of discussions may, or may not be preferable. However, in some embodiments that do use discussions, if one item in the discussion is considered to be responsive, all items in the discussion will be categorized responsive whether or not they independently would have merited the categorization. Of course, if the item is considered to be privileged, it would not be produced, even if considered responsive.

For example, consider the simple case of an email that in its entirety reads: "Yes, let's proceed", which could be an authorization to commit fraud or something that is completely innocuous. The only way such an item could be included as responsive—no matter how actually responsive or relevant it might be—would be via the use of discussions, since neither keyword culling, nor ontologies, nor statistical content analysis approaches could correctly trap such a message. Even a close human review would likely miss such an item as non-responsive in many cases. Thus by using discussions, one of the risks of producing by automated categorization—that of missing short format documents or those that do not happen to contain statistically uncommon words—may be removed or at least largely mitigated.

Returning to FIG. 97, there may often be other specific sets of items that are excluded from the sampling process, because they are deemed to be critical or interesting enough that manual review is warranted for them. For example, documents touching on certain key topics that were written by the CEO may be classified in this way. These items may be set aside for separate review [9704]. Items in the corpus will be analyzed and tagged to indicate what national languages they contain [9703]. If the number of items that contain content in languages not considered central to the case is small, in most instances they will also be set aside for separate review [9706]. However, if the numbers are large then a decision must be made as to whether or not to create separate and equivalent categorization components for them.

In most embodiments a permutation of the list of all items in the reviewable universe is constructed [9705]. In some embodiments this may be further restricted to a subset of the reviewable universe. In one embodiment, the permutation list is formed by randomly shuffling a list of item IDs. In one embodiment, this permutation list is stored in a database that keeps track of all samples drawn during the course of the process. In one embodiment, no item appears in more than one sample. Using a fixed, randomized permutation helps to protect against sampling biases, as parameters and sampling strategies are adjusted over the course of handling a particular corpus.

In some embodiments, the selection of N items from a particular strata is implemented by doing a sequential scan over the permutation list stored in the database and taking first n items that: a) have not been part of a previous sample, b) have not been marked as being excluded from review, and c) are a member of the set of items in the stratum. When a sample is drawn various details including the set of items in the stratum at the time of the sample, the set of items in the sample, a description, and the identity of the requesting user are logged. In most embodiments, samples from all strata in a stratification of the universe are drawn at the same time, and the entire set of changes to the database are updated atomically in one transaction in order to ensure that a set of samples are drawn from the same stratification. When the samples are selected, in some embodiments they are placed in batches to be assigned to reviewers. Since the order of sample items has already been randomized, in some embodiments batches are assigned by taking consecutive sequences of the desired batch size from the sample list.

In some embodiments, the initial samples are drawn only from the remainder set with instructions to reviewers to identify anything that may possibly be considered responsive [9707]. In one embodiment, if a significant number of items in the remainder set are marked as possibly responsive by reviewers [9709] the initial query is modified as appropriate [9708], and another round of sampling is performed. In one embodiment, this refinement is iterated until a satisfactory level of coverage is established, i.e. it is determined that very few responsive documents appear in the remainder set. At that point the reviewable universe is repartitioned into the Supra-Responsive and Remainder strata. The sampling process then enters a phase where samples are drawn from the Supra-Responsive set exclusively. As noted above, there may be several sampling strata within this set.

From this point onward in the text, we will refer to an example scenario constructed as follows. The reviewable universe is partitioned into two strata, a supra-responsive set and a remainder set. The items within the sets fall into one of three production categories, "Responsive Produced" (RP), "Privileged Withheld" (PW), and "Not Produced" (NP). The supra-responsive stratum is constricted to contain most (nearly all) of the responsive items. The leftover, or "remainder" set, conversely should contain only a very low number of potentially responsive items. It is straightforward to extend all of the techniques described below to a larger number of subdivisions or different production categories, as appropriate.

The steps referred to in the description of the process below are expanded on later in the text. In one embodiment the process is intended to be iterative at two levels. In an "outer loop" the analyst draws a sample for the primary categorization review [9710] and assigns batches out for reviewers. If after review the number of items with coding decisions that will be mapped to a responsive category are too low, further samples are drawn until a sufficient number are found [9711]. Then in the "inner loop" the system initially calculates a production rule assignment [9715] representing a "best fit" of the current categorization components to the sampling results generated on the current iteration of the outer loop. If performance goals have not been met [9716], the analyst uses analytic tools provided by the system to determine whether improvements can be made to the current categorization components [9719]. If no then a new set of categorization components are generated and another iteration of the inner loop starts [9718]. If at block [9719] it was determined that there are no useful splits or refinements to the current set of categorization components, then the categorization scheme must be re-examined and categorization components may be dropped, added or recombined with other categorization components [9714], before re-entering the outer loop.

If at block [9716] it is determined that performance goals have been met, and there have not been any other changes such as modifications to the subpoena or other extraneous factors [9717], then the process moves on to a verification step. In embodiments involving electronic discovery, this step allows the legal team to certify results in a turnover. In embodiments designed for electronic discovery, the final categorization is computed for the reviewable universe and the universe is then split into two strata, one for categories that are to be turned over and one for categories that are not.

Then samples are drawn for verification review [9720]. In other embodiments, the final categorization is computed for the reviewable universe and the same strata from earlier in the process are used. In one embodiment the quality of the final categorization is calculated using the same coverage and over-generation measures as discussed earlier. In some embodiments, a special coverage number is calculated for the non-produced set only. This coverage is based on what percentage of the sample from the non-produced set is determined to be non-responsive. In any case, if performance goals are not met, the process re-enters the inner loop at block [9715].

During the process it may become necessary or desirable to revisit and revise the supra-responsive query for any of several reasons: initial estimates of responsiveness rate may have been off significantly, the interpretation of responsiveness criteria will become more refined or in some cases renegotiated during the discovery process, an additional subpoena or altered subpoena may have been received, and so on. There is a cost to revising the query, since any cumulative statistics that have been kept over prior rounds of sampling will have to be discarded and the above process will have to be started anew, thus losing the ability to compare the performance of components to their performance in the next round.

The final sample drawn for verification of coverage and over-generation numbers is also stratified, but the split is between the produced and non-produced subsets of the corpus. In one embodiment, non-produced subsets of the corpus include non-responsive as well as privileged data. In one embodiment, the final sample is reviewed blindly. In one embodiment, items from the two strata are mixed randomly in reviewer batches with no indication in the user interface as to which strata an item belongs.

In most embodiments, sample sizes are determined by a statistical significance test. When choosing samples from the remainder strata in response to the Supra Responsive Query, a size is chosen so as to have an expectation of producing a large enough number of positively reviewed items in order to achieve statistical significance. In the initial round or two, the number achieved may be off because the responsive rate is simply higher or lower than expected. When the percentage of positive responses—i.e. produce or privileged—is high enough, it is in some embodiments advisable to go back to the first step and rebuild the supra responsive query. In most embodiments, it is a reasonable expectation that there might be 4 or 5 rounds of review of the results of the Supra Responsive Query, and a similar number of rounds of review of the more detailed categorization components, plus the final verification round.

In some embodiments, the options presented to reviewers in the user interface for document categorization purposes may not correspond directly to production categories; in those embodiments the production category is deduced or mapped from the coding decisions. In most embodiments, any mapping of the user's choosing may be used, so long as it maps each categorization option in the user interface to a production category. Therefore we will distinguish between categories used to produce categorization components, final production categories, and user interface categorizations. Some embodiments only offer reviewers a choice of responsive or non-responsive; in many of these embodiments, privileged items are handled in a separate, subsequent step. However other embodiments may provide additional options to reviewers.

In one embodiment, a user interface categorization such as "arguable" may be available. The "arguable" category can be presented to reviewers as an option for items that are in a gray area, or about which they are uncertain for some reason, or for which there are still unresolved issues. In other embodiments, a state of "arguable" may be assigned automatically by the system when an item is reviewed by more than one reviewer and the reviewers disagree. In some embodiments these items are reported for remediation and/or assigned to a more senior reviewer to adjudicate.

Continuing the example scenario from above, the three outcome categories RP, PW and NP typically result from decisions across two dimensions, Responsive v. Not Responsive and Privileged v. Not Privileged. The RP outcome is assigned to every item coded +Responsive and −Privileged, the PW outcome is assigned to every item coded +Responsive +Privileged and NP assigned for items that are −Responsive. To this, some embodiments add an arguable category; most often it is added only for the Responsive-Not Responsive dimension, as the Privileged decisions generally use more black and white criteria. We can then calculate different measures for the combinations where arguable results are evaluated as belonging to one pole or the other (for example, get counted as responsive or non-responsive.) For the purposes of the example, assume that an "arguable" code is only added for the responsive dimension. This means that two sets of results are to be computed when analyzing a categorization, {ARP, APW, NP} and {RP, PW, ANP}, for the cases where arguable calls are taken as responsive or not responsive respectively. In the general case this means that there will be an "envelope" of 2 n combinations for n arguable categories that are so added.

The addition of an "arguable" state is useful for at least two reasons. Coding decisions made earlier in the process may involve more uncertainty, and the use of the "arguable" code provides a means of quantifying the range of possible variation introduced by that uncertainty. As the review progresses, these items are, in one embodiment, revisited to see if any coding decisions should be overturned. In one embodiment, as the review progresses all of the reviewed items are revisited. Secondly, there will always be some items that are just difficult to categorize under any scheme. Providing the two options for how those items should be handled allows the litigation team to make a choice between the alternatives. Typically, if arguable items are considered responsive then the coverage scores improve and the over-generation scores get worse (i.e. higher). As previously noted, coverage is the percentage of actually responsive items that were produced, while over-generation is the ratio of total items erroneously assigned to a production category over the number of items reviewed to be in that category. Note that some embodiments may utilize more than one "arguable" state, and may assign a variety of user interface labels to them, for example: "responsive but opinions may differ" and "non-responsive but opinions may differ."

Component Analysis and Categorization

In some instances, the analyst will construct the initial set of categorization mechanisms during the determination of the supra-responsive query and the first round of sampling review. However, in some embodiments, existing categorization mechanisms from related prior work on the same corpus may be reused. As previously noted, the actual categorization mechanisms used may come from anywhere, be of any form, and may also be reused, both at a class and instance level.

Once the initial categorization mechanisms have been determined, categorization components are constructed over the entire reviewable universe. Upon completion of the first round of sampling review and the availability of the initial set of categorization components, the system will generate a set of rules that assign each item to a production category based on the categorization components which contain it. In one embodiment, the system implements algorithms that find a set of rules assigning production categories to items that are consistent with reviewer coding decisions. Since its not possible in general to find a categorization that is perfectly consistent with reviewer coding decisions, the system searches for rule sets that produce high levels of agreement while also protecting against a problem called "overfitting."

In one embodiment, consistency is measured by comparing the categories assigned by the rule set against the categories assigned by reviewers, using the over-generation and coverage measures. In the ideal case, the system will find groups of categorization components that, when intersected, result in a set of items which all share the same reviewer coding decision. If groups could be found that collectively contain all the items in the reviewable universe, one could then make a set of rules for categorizing the reviewable universe by extending the reviewer coding decisions given to the reviewed items in each of these intersection sets to the rest of the unreviewed items in each intersection set. Finding a group of intersection sets that are both consistent with reviewer decisions and collectively contain all the reviewed items is sufficiently unlikely that it can be considered a practical impossibility. It is also extremely unlikely to find intersection sets which don't overlap with each other. Thus there will be conflicts and a relative priority between intersection sets is needed. The method implemented in this invention finds a group of intersection sets that are highly consistent with reviewer decisions, resolves conflicts and balances against the problem of overfitting (i.e. categorizing based on features in an individual item instead of a class of items).

In one embodiment, the system builds a list of rules that assign a production category to items that occur in the intersection of categorization components. Continuing with the production example from above, if we had categorization components that identified items with "remediation language", "a specific set of companies", "a specific set of product" a rule might specify that any item contained in all 3 categorization components should be labeled as RP. Rules in the list are evaluated in sequential order, top to bottom. The first rule that succeeds determines which category is assigned. Using this scheme any Boolean condition on combinations of categories can be implemented by choosing a particular ordering on the sequence of rules. This ordered list of rules is called a production rule assignment, or simply a production assignment. The method defined below seeks to choose a production assignment that assigns production categories which are consistent with reviewer decisions while avoiding overfitting to the reviewed data.

Overfitting occurs when the production category assigned to a set of items agrees with the specific reviewer decisions, but the combination of components—or the combination of components when at that position in the rule list—does not accurately represent a significant number of items in the larger universe. Especially for rules that occur farther down in the list, many of the items they would normally have captured have already been filtered out and the chances of an arbitrary correlation to features of a specific set of items become more likely. In order to avoid overfitting, in one embodiment, the system's goal is to find the smallest number of rules which capture relatively large sets of items that are consistent with reviewer decisions. This is because the commonalities in a larger set of items are more likely to be meaningful. Suppose, for example, that a rule was created for a set of one item. That item may have been erroneously placed in one or more of its categorization components, as any categorization techniques will have exceptions. In general, that item may be better or worse representative of the categories into which it was placed. Therefore the confidence in the categorization decision is low for any of the unreviewed items that the rule captures. When a rule has been found valid for a large set of reviewed items, on a statistical basis the confidence in its decisions is much higher. In one embodiment, the system implements a measure for determining the likelihood that a production assignment has become over fitted.

The search space of all possible production assignments is rather large. Given a set P of production category labels and a set C of categorization components, the set of all possible rule conditions is simply the power set of C, which has size 2 |C|. Each set of conditions can be paired with any of the available production category labels. Thus for any subset of size n chosen from the set of possible rule conditions, the number of combinations is |P| n. In practice there may be some redundancy between the categorization components. If this is the case, it means that some part of the space of rule conditions can be pruned out of the search. The degree of redundancy is highly data-dependent, however, so in the general case the number of combinations is |P| (2 |C|). Since the rule ordering is significant, the search space includes all possible permutations of the rule order, thus the worst case upper bound is (|P| (2 |C|)).

Note that a set of categorization components that is efficient will be easier to fit to reviewer results. By "efficient" we mean that a high proportion of the possible combinations of categorization components yield relatively unique sets of items. This means that as the process of iterative improvements to a set of categorization components moves forward redundancy in the search space will be reduced.

In many embodiments, the consistency of a production assignment with reviewer decisions is measured via coverage and over-generation Figures, as these can be meaningfully projected to the turnover set.

Categorization by a System of Components

Returning to FIG. 96, remaining elements are related to a method for efficiently finding a near best fit of categorization components to review results. In one embodiment, the system uses a lattice structure [9615] in order to mathematically represent a partial ordering (via set inclusion [9618]) of groups of similar items, called itemsets [9629] from which categorization rules [9619] may be generated. However, other embodiments might instead select another type of mathematical structure which provides similar properties. The invention does not depend on the specific representation so much as the ability to efficiently exploit the partial order. A lattice representation is a straightforward representation of a partial order. Itemsets as represented in the lattice have a parent [9607], which is the "immediate successor" [9613] of the itemset. For an itemset x, an immediate successor is any itemset y>x for which there are no other itemsets z such that y>z>x. Similarly itemsets have an "immediate predecessors" [9614] which are considered children [9608] of the itemset. Itemsets have a consistency [9623] score which measures the degree to which reviewer coding decisions on their members are similar.

Figure 98:
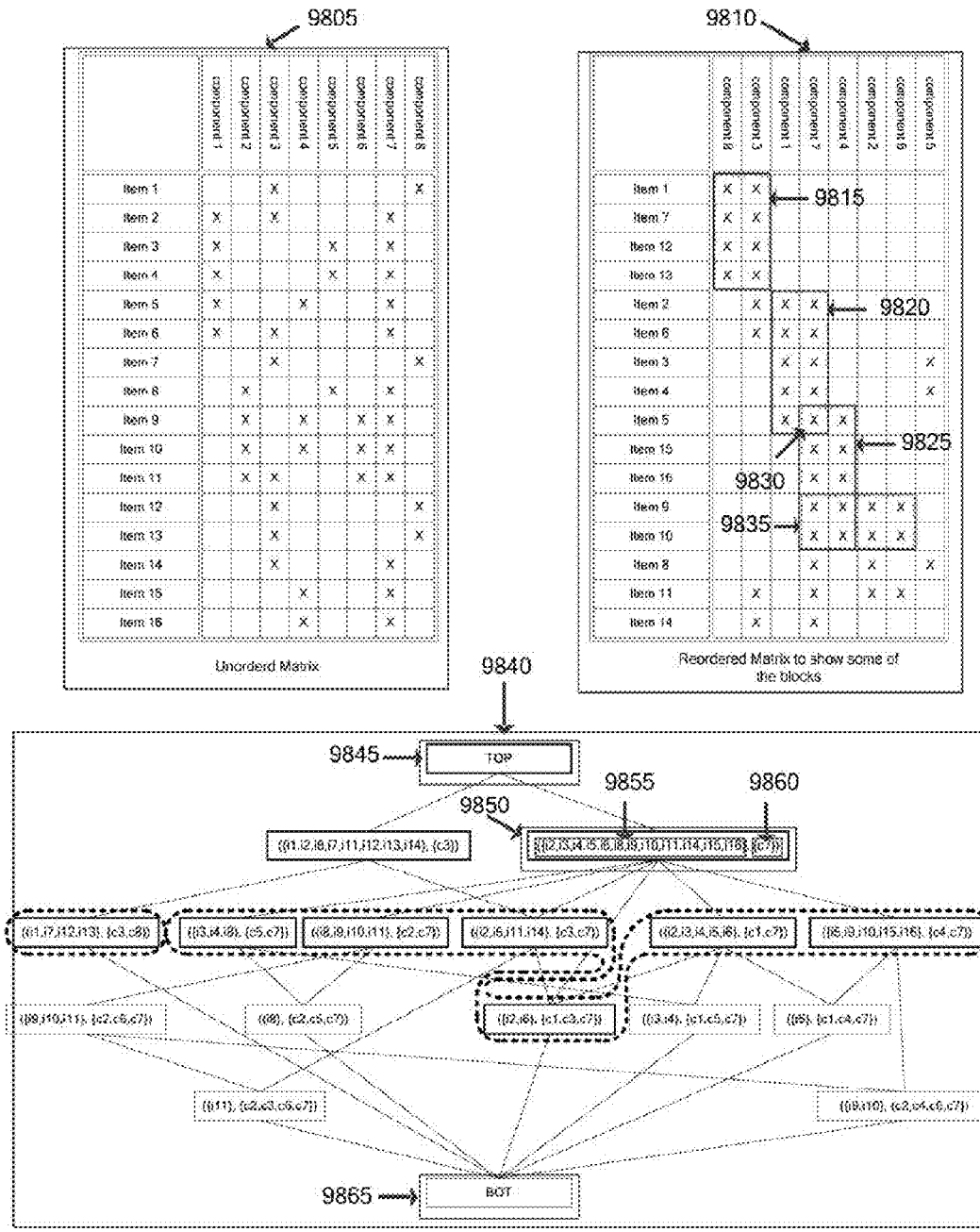
FIG. 98 is a diagram of one embodiment showing a lattice, and an unordered and reordered matrix.

In one embodiment, the system computes closed itemsets [9622] in a matrix consisting of items, the categorization components containing those items, and the reviewer coding decisions for each item. FIG. 98 depicts such a matrix in block [9805]. The computation of closed item sets is used in approaches such as Data Mining and Formal Concept Analysis. There are several widely known algorithms for doing this computation, which may be utilized by different embodiments.

We now present some basic definitions necessary to describe one embodiment of the new method. A formal context K consists of:
   a finite set of items I,
   a finite set of attributes A
   a binary relation R,
   a subset of A.times.I.

A pair (i, a) in R expresses that the object i has the attribute a. Returning to FIG. 98, a formal context is equivalent to the matrix [9805] mentioned above.

For our purposes the attributes will consist of the set of categorization components that are being fitted. This describes a matrix, which is augmented with an additional set of attributes representing the production category labels that are derived from reviewer coding decisions. As described previously, there may be more than one combination of production category labels for which the system computes results, i.e. the {ARP, APW, NP} and {RP, PW, ANP} sets described above. In some embodiments, these additional attributes are not used in the closed item set computation, but as described later are rather used to derive additional properties stored for item sets found during the computation.

As depicted in FIG. 98, an item set s is a pair (X, Y) [9850], for X a subset of I and Y a subset of A, such that for all items i in X and attributes a in Y, (i, a) are in R. X is called the extension [9855] of s and Y is called the intension [9860] of s. In the matrix view, this can be visualized by rearranging the rows in the matrix so that all rows in X are contiguous and all columns in Y are contiguous [9810], it can then be seen that all matrix elements in the region of their intersection are set to 1 [9815]. In order to specify the notion of a closed item set, first define a function, f, which maps from X to A as the following: f(X)={a in A|for all i in X, (i,a) in R}

It can be noted that f(X) defines an intersection of the set of all attributes that are shared in common between all items of X. Similarly, define a function, g, which maps from Y to I as the following: g(X)={i in I|for all a in Y, (i,a) in R}

Likewise, it can be noted that g(Y) defines an intersection of the set of all items shared in common between all attributes of Y. If we say that f(X)=X' and g(Y)=Y', a closed item set, c=(X, Y), is a set for which X'=Y and Y'=X, this can be alternatively stated as: g(f(X))=X These are the largest "blocks" that can be found in the matrix; they are also known as natural clusters. The blocks [9815, 9820, 9825, 9835] are examples of some of the closed itemsets in [9810].

The collection of all closed item sets form a lattice under the partial order $(X_1, Y_1) \leq (X_2, Y_2)$ if and only if $X_1$ is a subset of $X_2$ as depicted in FIG. 98 in block [9840]. Note also that when $X_1$ is a subset of $X_2$, it is necessarily true that $Y_1$ is a superset of $Y_2$ [9830, 9835]. In other words, to find a closed itemset $X_2$ as a subset of $X_1$, you have to add at least one attribute to $Y_2$. This follows from the fact that closed itemsets are maximal; all attributes common to the items in $X_1$ are members of $Y_1$. The properties of this lattice are used to enable the method described below. As depicted in FIG. 98, the elements TOP [9845], representing all items in the set, and BOT [9865], representing the empty set, are added as the greatest and least elements, respectively. These elements are required to make the structure a proper lattice. For purposes of the algorithms implemented TOP is used as a root node for traversing members of the lattice, BOT is used only in a visualization of the lattice. Additionally the system determines if TOP is itself a closed item set with a non-empty attribute set Y. If so, then the attributes in set Y of TOP are all underspecified, meaning that the presence or absence of those attributes cannot be used to subdivide the list of items into smaller categories. Thus these attributes can essentially be ignored for purposes of further analysis. This is equivalent to saying that a categorization component that captures everything is not very useful.

The problem of computing closed items is in general exponential, so one cannot expect any one algorithm to perform well for all data sets. However algorithms do exist which perform well under various specific assumptions. For example, an algorithm can be chosen that performs better on a sparse data set or a more heavily correlated data set. In some embodiments, the system will select an algorithm based on obvious properties of the current data set. At current levels of hardware performance and existing algorithms, 10 s of thousands of items with low hundreds of attributes are practical to search in reasonable amounts of time. The typical sample sizes and component sets are well within these limits. Once the closed item set lattice has been computed, the method described below is extremely fast. In the fastest embodiment, it simply involves one or more sorts over small lists of item sets. Therefore an initial solution can be found with an additional complexity of "n"log(n)" time over the closed item set computation, where n is the number of items that will be used in construction of the rule set. The size of the itemset is difficult to characterize as it completely depends on the data, however for sample sizes of a few thousand items and a few dozens of categorization components, a typical expectation might be that there are at most a few hundreds of item sets used if not much less.

In one embodiment, an implementation of the closed item set algorithm is augmented to associate additional values with each computed item set. Tallies of item counts in each production category mapped from the reviewer codes are computed during the phase in which the membership of an item set is determined. This has very little extra cost, as entries in the matrix of item attributes must anyway be scanned at some point in the normal course of the computation. An additional pair of flags is associated with each item set indicating whether or not the children of an item form a set cover over it and whether the item set is similarly a member of a group of children that form a set cover on their parent. If the union of a group of sets $C_1, C_2, \ldots, C_n$ contains a set P then the group of sets $C_1, C_2, \ldots, C_n$ is said to cover the set P. When an item set is covered, the system computes the intersection of the item lists of its children. As there must be a phase in the closed item set algorithm that finds the intersection of the item lists for combinations of components, this additional calculation can be added at that point with relatively minimal additional cost.

If the item set intersection is non-empty, as depicted in FIG. 98 in [9830], then necessarily the intersection of the attributes of those child item sets must also be non-empty. This follows directly from the definition of a closed item set. Any such attributes are underspecified, they do not add any information to the attributes that are not in the intersection. In FIG. 98, block [9810] the column "component 7" is underspecified relative to itemsets [9820] and [9825]. Depending on the algorithm used, there may be extra cost to computing these values. In the worst case, the calculation of the covering flag and the intersection set could be computed in an extra pass over the lattice (and in this case only a subset of the item sets need to be examined). In any case there are simple constraints that limit the number of cases to be checked. For example, if the sum of sizes of the children item sets is less than the size of the parent, then the parent cannot be covered by its children.

In order to fit components to reviewer decisions, in most embodiments, the system automatically selects a "fence" of item sets from the lattice, depicted in FIG. 98, block [9870]. The fence is a sequence of item sets that cover the space of sampled items. The intent is to find the largest item sets for which reviewer coding decisions are highly consistent. In some embodiments, the consistency of an item set is measured by tallying up the reviewer coding decisions and then taking the ratio of the largest tally to the total size of the item set. However other embodiments may opt for different measures. Some embodiments will calculate multiple ratios, or the best fit over all alternatives introduced by adding arguable categories.

The system selects items to be placed in the fence. In one embodiment, this is done during a (partial) depth-first traversal of the lattice. Starting with each child of TOP, the system takes any item set that is sufficiently consistent, (i.e. has a ratio of above a minimum threshold), places it in the fence, and stops traversal on that branch. Otherwise, if its children do not form a set cover over it, the system adds the item set to the fence and terminates the search on that branch. Otherwise, the system continues the search for each of the children. Note that when item sets have more than one parent in the lattice, it can create situations where both a parent and one of its children are in the fence; the parent being reachable on one path and the child reachable on a separate path. Since the system only considers children that form a cover over their parent, the fence as a whole must cover all the elements in TOP (that is, the full review sample). As a general rule, smaller item sets will be more consistent; however it may be that case that some children will be less consistent than their parent.

The system now computes an initial order on the items in the set. In the preferred embodiment the system simply sorts itemsets by their consistency scores. This may or may not produce the most optimal ordering for a particular choice of fence. However the extent to which it can be suboptimal is limited. This is because in general the largest changes to the categorization will come from the inconsistent item sets, which are already sorted to the end of the list. We can never gain anything by placing an inconsistent itemset before a more consistent itemset because as a general rule, placing a less consistent itemset before a more consistent one will result in the assignment of a larger number of inconsistent items. However there may be isolated cases in which placing the more inconsistent item earlier does result in a better overall categorization. This might happen if earlier rules in the list catch the sorts of items that cause inconsistency in that item set. For this reason the system provides further tools for analyzing and adjusting the ordering of itemsets in the fence, as described below.

The method described above provides a fast and efficient method for obtaining a good rule order, however the invention does not depend on a particular choice of ordering. The crucial issue for this part of the invention is the conversion of a search problem in a very large search space (i.e. finding a production rule assignment with good performance) into a representation that can be used to directly generate a specific and targeted set of rules. In some embodiments, closed item set representation is used. The method applies equally well to representations that are equivalent to closed item sets, and for that matter generalizations of closed item sets, such as clusters formed by relaxing the constraint that all attributes must be shared in common between items in an itemset (different data clustering techniques and block modeling from social networking theory fall in this category for example).

While closed itemsets are the preferred embodiment, any method that identifies subsets based on high similarity of their attributes is appropriate; all that is required is the ability to place a meaningful partial ordering on the result set. A partial order is meaningful in this context so long as there is an inverse relationship between the number of items in an itemset and the intension of the set. For the preferred embodiment the intension is directly measured as the set of attributes, and additional attributes in the intension implies more specificity. Other embodiments may have alternate representations of intension, so long as the representation used to measure similarity of items can be related to specificity of the description.

The method by which we take advantage of any partial ordering that has the characteristics described above utilizes a fence. The procedure for finding a fence involves an implicit balancing act between finding large itemsets that have been reviewed relatively consistently and are not prone to overfitting, against finding smaller itemsets that have higher consistency scores but are more prone to overfitting. The itemset/lattice representation allows us to find the largest consistent itemsets quickly as they appear high up in the lattice and the level-wise expansion of the fence enforces the other side of the tradeoff. As we expand the membership of the fence, the size of itemsets necessarily shrinks. Since we only expand the fence to children of the inconsistent itemsets, in general the most inconsistent itemsets in the fence will have been broken down to smaller sizes than the consistent sets. Since these itemsets have the highest likelihood of having problems such as overfitting, or simply the lack of describing anything significant about classes of items in the corpus, the overall categorization results benefit from the minimization of their size (that is, fewer items categorized by those itemsets the better) and their placement at the end of the rule list tends to limit their effect.

In one embodiment, the production rule assignment directly corresponds to the ordered fence of itemsets. The rule antecedents are based on the itemset intension. In the preferred embodiment the rule antecedents are simply a list of set membership tests for each of the categorization components represented by the attributes in the intension. Any item that is a member of all listed categorization components is matched by the rule. The rule consequent is the production category that will be assigned to the item. As noted above, the production category is mapped from the reviewer coding decisions that best represent the itemset. In order to produce the final production categorization, the system scans the list of rules for each item in the reviewable universe. At the first rule matching an item, the system assigns the production category stored as the consequent of the rule and moves on to the next item. If an item is not matched by any rule, it is placed in a remainder pool. In some embodiments, the pool may be separately reviewed in its entirety in order to determine the production categories for items contained in it. In other embodiments, the remainder is first sampled by the analyst to determine whether or not a new categorization component could be added to capture some part(s) of it. If new categorization components are added, the system performs additional rounds of analysis.

In order to determine the final quality of the fit metric, namely the coverage and over-generation scores, the system iterates through the list of sample items and evaluates the rule list as described above. In practice there are typically several variations of the score reported. If the review categories include "arguable" codes, then in most embodiments multiple scores will be calculated. In the example scenario described above, the overall measures would be calculated for the (ARP, APW, NP) and {RP, PW, ANP} sets. An additional option is presented, in one embodiment, which recalculates the consistency scores by counting only the items actually captured by a rule rather than the consistency scores for the components that the rule is based on. The tallies are not recounted for consistent item sets, because any subset of items captured by them is by definition consistent.

After tallies have been recounted, in one embodiment the production category label is set according to the highest frequency coding decision out of those captured by the rule. Doing this is very likely to cause overfitting, but there may be cases where the smaller set actually captured by a rule, successfully identifies a useful class of items. The option is primarily provided as an exploratory tool in some embodiments. The recalculation of consistency scores can be restricted to only those nodes currently selected in the lattice view, assuming they are currently included in the fence.

If the analyst does decide to search for a more optimal ordering of itemsets in the current fence, the system can in one embodiment generate permutations of the fence in order to score each of them and will update the fence to the best scoring alternative. The system does not need to explore the full combinatorial space however. The search space can be reduced, and in some cases quite drastically. In one embodiment, purely consistent components, components with a consistency at or above a threshold—which may in some embodiments be user-determined—do not need to be permuted with other nodes in the fence. The remaining item sets can be partitioned into non-overlapping subsets. Since there are no items that can be captured by rules in more than one of these partitions the system only evaluates permutations of item sets within each partition. There are various methods that can be used to partition the item sets, and different embodiments may utilize different ones.

A simple technique for finding the partitions is based on using the matrix as an inverted index that associates reviewed items to all the item sets that contain them. The algorithm will build a set of cluster nodes, each representing a potential partition in the fence. If two partitions are found to overlap, the clusters will be merged. A cluster node contains a reference to a parent cluster node, a list of children and a reference to an itemset. The algorithm uses a lookup table to keep track of whether nodes have been encountered previously and a set of root cluster nodes. The system scans through the remaining itemsets in the fence. For each item set, the system creates a cluster node with a reference to that itemset, adds it to the root set and then scans through the item set members. If an item set member is not currently in the table then the system adds an entry containing the cluster node for that item set. If an item set member does have an entry in the table then the system walks upwards through parent references until it finds a root cluster node, if the found root is not equal to the current node, it then adds the root cluster node to the current cluster node's child list, sets the parent reference for the found root node to the current node and removes the old root node from the root set. The parent of the cluster node retrieved from the table can also be updated at this time as a small optimization. After all item sets have been scanned, the remaining members of the root set each represent one partition, from which the member item sets can be recovered by walking through the child lists.

Analysis and Refinement of a Production Assignment

This method is meant to support an iterative process of development and refinement of categorization components. Additional properties can be derived from the lattice of item sets that are useful in guiding analyst decisions as to which categorization components should be refined or modified for the next iteration. In some embodiments, a visual analysis tool displays the item sets selected to be in the fence by drawing a literal fence over the respective nodes in the lattice view.

Figure 99:
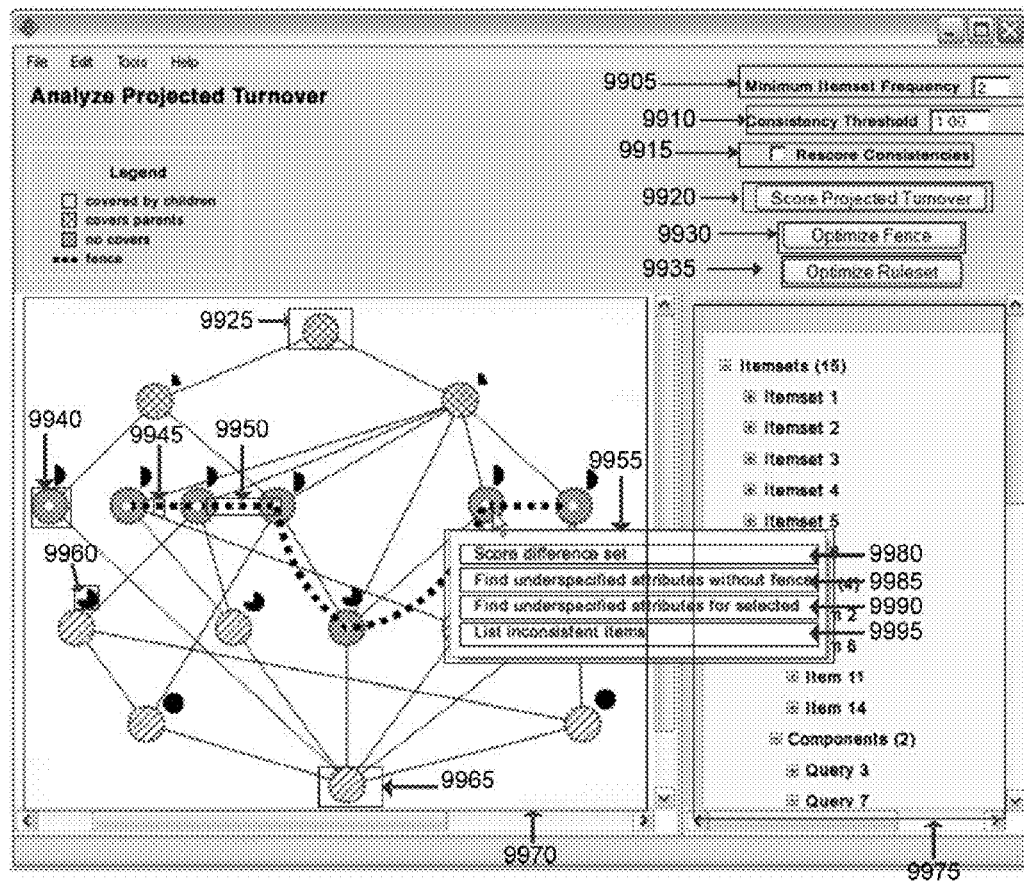
FIG. 99 is a screenshot of one embodiment of the automated production analytical tool.

An exemplary implementation of this is illustrated in FIG. 99. As pictured, it contains a visual representation of a lattice [9970], with the fence clearly indicated by a line [9950] whose style differs from the line style used to render the lattice. In one embodiment, whether or not an item set is covered—by its children or by its parents—is indicated via the different fill styles of the circle [9940] representing the item set. As pictured here, in one embodiment item sets are decorated with pie icons [9960] that represent the consistency score calculated for the items in this item set. In some embodiments, clicking on the icon for an item set brings up a floating menu [9955] with different options. Some embodiments may also include a tree or hierarchical parent-child view of the item sets in a detail list view [9975].

As will be noted later, in many embodiments the user may drag the icons representing fence posts [9945] on item sets upwards or downwards in order to change the membership of the current fence. The partitioning of this fence discussed above, namely the set of consistent item sets and the equivalence classes of overlapping subsets from the remaining elements in the fence, are shown in some embodiments by bounding boxes and color highlighting. Some embodiments may provide additional controls that allow interactive optimizations, or that control different aspects of the visualization of the lattice. Some of these controls have been referenced above, namely the options to:

optimize the order of itemsets in the current fence [9930]
   score the projected turnover [9920]
   rescore itemset consistencies based on which items are captured by their associated rules [9915]
   set a threshold at which itemsets are considered purely consistent [9910]

Additionally some embodiments allow a global setting whereby itemsets below a certain size are excluded from all calculations [9905], as a simple method for avoiding overfitting.

Categorization components represented by attributes contained in the intersection of all child item sets of a parent are underspecified with respect to the parent item set, as they cannot be combined with any other components to make any kind of categorization decision in the parent item set. Categorization components that are underspecified, particularly with respect to large item sets, are candidates to be broken out into subcomponents in subsequent iterations. The user can request a check to find underspecified attributes with respect to the selected itemsets [9990]. The intent is to split the list of items hit by that component so that the new sub-components cross with existing item sets to create new, potentially higher consistency item sets. In some embodiments, a check is also performed to see if the intersection of all item sets in each partition of the fence is non-empty [9985]. Any components so identified are the most likely candidates for removal in subsequent iterations. However as shown below there is an additional test that can help to determine whether it might be useful to attempt splitting the component as for the parent-child case.

Each child item set within the lattice adds at least one attribute over its parent; this follows from the definition of a closed item set. As a general rule, the consistency of children item sets will tend to be higher than that of its parent, though this is not always the case. The cases where children do become more inconsistent, or where the consistency of some children remains lower than those of other children of the same parent highlight areas for investigation when performing the next refinement round on categorization components. In one embodiment, itemsets that have a lower consistency than their parent are highlighted [9995], as well as itemsets that have a consistency similar to their parent but much lower than other children of that same parent. In one embodiment, "much lower" is defined to be one standard deviation less than the average consistency for all children of the parent. Embodiments may use various measures and heuristics for identifying these cases.

The set of attributes associated with one of these marked inconsistent sets are also of interest, particularly the additional attributes that appear in one of these child itemsets. In some embodiments, these attributes are listed in hover text that appears when the mouse icon is held over one of these highlighted item sets.

When such inconsistent item sets are relatively small, it may not be worth further splitting or refining the components that they fall into. This is because changes to the component as a whole many other item sets based on that component, and it will be difficult at best to predict the overall effect on the categorization. Rather, the analyst should focus their attention on the specific items in these itemsets, as those items may represent a natural class that is not handled well under the current categorization scheme. The implications of this analysis may lead to a reorganization of some components. This reorganization may involve recombining elements of existing components in new ways (for example a different logical combination of ontology classes from the inconsistent components), changing existing components and/or adding new ones. This last category is interesting in that a new component could be added in order to "patch" the scheme. This has the intent of producing higher consistency item sets derived from the new component in the next iteration. Therefore in one embodiment, itemsets generated from the "patched" component will be placed before the inconsistent item set in the fence constructed for the next iteration.

While the decisions in these cases will often be determined by examining these items directly, the ability to visually browse the lattice and see different properties of parent and child itemsets will provide the analyst with a sense of the potential impact of different strategies. One metric that is particularly useful for analyzing an inconsistent item set is based on the set of attributes it adds over its parent or multiple such sets of attributes if it has multiple parents. In some embodiments the system calculates the consistency score for the union of all item sets that differ from their parent by that same attribute set. On user request, a detail list view can be generated that lists all these item sets [9980], as well as their respective consistency scores and an overall score. When the overall consistency is similar to that of the inconsistent item set, and the union is large, the problem is likely to be an overall issue with the components. When the consistency of the items contained in the overall union is higher, then the problem is more likely to be associated with the specific items, and the analyst runs the risk of overfitting to those items when trying to develop a categorization component to fix the problem. While there is a general measure that can be used to guard against overfitting (discussed below), in some embodiments the tool also uses heuristics based on these observations to generate warnings and advice through the user interface. As the number of items involved in an item set decrease, the chances are greater that the characteristics common to those items are unique to those items rather than representative of characteristics common to a general class of items. The iterative nature of the categorization process will help to guard against this class of overfitting.

The procedure for selecting the fence is designed to pick a reasonably well fitted production assignment rule scheme while also protecting against overfitting to reviewed samples. The fence allows analysts to use a larger number of specifically focused categorization components. However there may be fences that produce a better fit. Therefore an analysis tool allows the analyst to modify the fence interactively. An analyst may want to modify the initial fence in order to find a better fit, or as an exploration tool with which to understand how components interact. Once the lattice has been determined, and initial values for the derived properties described above are computed, all of the subsequent changes described here can be incrementally recomputed. The minimum sample sizes required are typically a few thousand items in most embodiments, and dozens to a few hundreds of categorization components. While the number of item sets generated depends heavily on the datasets involved, experience shows that it will typically be small enough that it is entirely feasible to cache the lattice and secondary data in memory. Any of the incremental updates are low enough overhead that in one embodiment they can even be performed in an interactive interface.

In some embodiments, the tool allows an analyst to explore modifications to the fence by selecting a point in the fence, (a 'fence post'), and dragging it either upwards to the position of a parent or downwards to that of a child. Either action results in a modification to the fence, either the addition of a parent item set and the removal of its children item sets or the addition of children item sets and the removal of their parent item set as appropriate. When dragging a fence post downwards, in one embodiment the effects are determined by iteratively analyzing each successive level the post is moved through. For each child level, fence posts are added to all of the children of the parent at the previous level, and the parent fence post is removed. When a fencepost is moved downwards by more than one level, there may be multiple paths between the original item set and the new one, due to item sets with multiple parents. In this case, in one embodiment, one path is selected by the system. In one embodiment, the path followed through the expansions on each successive level is selected. In another embodiment, the user selects the path in this event.

The semantics of dragging a fencepost upwards, in one embodiment, also takes into account whether or not a node has multiple parents in the lattice. In some cases, an additional fence post may be left on the originally selected node after dragging upwards. This is done to ensure that no breaks are introduced into the fence. When dragging, the parent node is first added to the fence and then all paths leading upwards from the originally selected node (via parents) are checked to see if they all lead to a node in the fence. If at least one path does not contain an ancestor node in the fence, a fence post is left on the originally selected node. If the selected fence post is dragged upwards by more than one level, this process is applied iteratively on all paths leading from the original node upwards.

In one embodiment, the derived properties described in prior sections are also incrementally recalculated to conform to the new fence. In one embodiment, the regeneration of the assignment rule list is an exception. The rule list is updated, but the ordering of rules is only partially updated. When dragging a fence post downwards, new rules corresponding to the new child item sets added to the fence are placed in a sequence and sorted based on their consistency scores. In one embodiment, this sequence is then spliced into the rule list at the position of the rule they are replacing. In one embodiment, the user can request that permutations of the rule list are to be recomputed as a separate action, as this computation may take some time. When collapsing points upwards, the rules corresponding to the current children are removed. In one embodiment, a new rule is inserted at the lowest position in the set of rules removed. In one embodiment, a summary currently being reported will be updated if affected. In some embodiments, the user can also request an automated version of these procedures [9935], in which all alternate versions of the fence that can be formed by selecting one point in the original fence and moving it upwards or downwards by one level are computed. The fence is updated to the best scoring alternative, derived properties are recalculated as above and the detail list view is updated. In some embodiments, the automated search is constrained to only the single point variations in order to limit computation time. The tools are provided to help the analyst to explore the space in order to determine where best to make additional refinements to the categorization components. Unfortunately even within the vastly restricted search space provided by the item set lattice, an exhaustive search is still prohibitively computationally expensive.

In most embodiments, the system does not prohibit the analyst from dragging a fence post down from a parent which is not covered by its children. Since there are now items that may not appear in any of the itemsets in the fence, coverage numbers may fall. However, moving the fence downwards may be a way to identify more consistent subsets of a highly inconsistent parent and the new production rule assignment that results may also have a lower over-generation score. The improved over-generation score may be worth the trade off in reduced coverage.

Finally, in some embodiments, the system provides a measure for determining whether the set of categorization rules is overfitted to the reviewed data. A projection of the final categorization based on the results of applying the categorization rules to the sample is compared to the results of applying the categorization rules to the dataset as a whole. In one embodiment, the projection is based on fairly straightforward arithmetic, and takes into account the stratification of the universe from which the samples were drawn. For each of the original strata the system collects tallies for each of the possible reviewer calls consisting of the number of cases where the categorization agrees with the reviewer call, versus the number of disagreements. The reviewer calls map to a result category in a natural way. For the sake of simplicity here, we assume that the reviewer calls map one to one onto the result categories. For a stratum $S_n$ with counts $S_n.ac_m$ and $S_n.dc_m$ for the mth reviewer call and a total count $c_m$ for the mth call, the projected categorization is $|S_n|*S_n.ac_m/c_m$. The total projected turnover is the sum over all strata and all reviewer calls. When compared against the actual counts obtained from running the categorization against the universe we expect the counts to be very close together. If components have been too closely fitted, (i.e. they reflect the characteristics of a specific set of items rather than a class of items), the actual counts will typically be lower than what is projected. For greater confidence, the same sort of projections can be run for individual components or rules. Additionally, attaining high levels of agreement on subsequent rounds of sampling indicates higher levels of confidence in the result. In most embodiments, this statistic is not re-computed interactively as it typically involves scanning through a large database of items, however it can be requested as a separate action in most embodiments.

Resolving Conflicting Reviewer Decisions

Each matter is assumed to have a set of objective qualifications for responsiveness—for example, that the items in question are associated with certain individuals, and fall within a certain date range, or contain certain words. As previously noted, sometimes very similar documents, or indeed even different versions of the same document, may be correctly classified differently because they differ with respect to one or more of these qualifications. In one embodiment, a report may be generated noting differences in reviewer decisions when similar documents do not differ with respect to objective qualifications, since these are the review decisions which may deserve a bit more scrutiny.

A more difficult version of this problem involves attachments, as the responsiveness state of an attachment may be governed by its parent email rather than its own content. Since attachments may or may not be coded separately from their parent emails, a separate decision in each case on the basis of the individual attachment may not always be directly inferable. However, in order to speed up the review (or sampling) process, and to save the effort of reviewers having to potentially re-read very large documents multiple times, in one embodiment the system provides the reviewer-user with information about how this item and any proper subset of it that is contained elsewhere has been reviewed. In this way, the reviewer or the administrative user can decide when a document no longer needs to be re-read for the Nth time.

Figure 72:
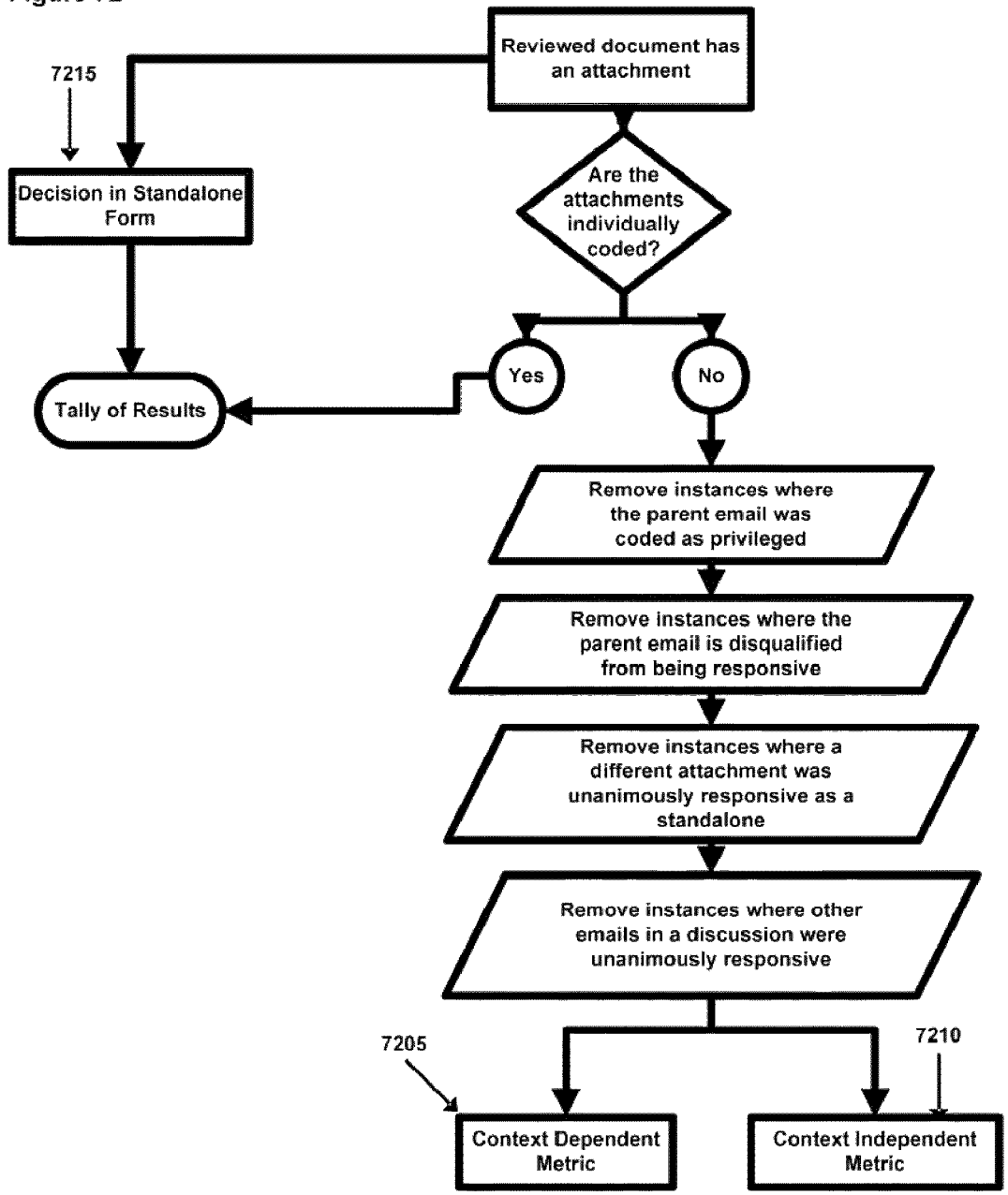
FIG. 72 is a diagram of one embodiment illustrating how an attachment is coded.

In one embodiment, this is done in the following manner, as shown in FIG. 72:

If the item as a stand-alone document (that is, it exists in a form that is wholly independent of other documents) has been reviewed one or more times, the system displays a tally of the results. In one embodiment, this display is available form the main review menu, and the existence of such a tally is visually indicated to the reviewer. In one embodiment, the names of the reviewers who made the review decisions are also displayed, or are directly available from this tally.

If a stand-alone version of an item that is believed to be a different version or near-duplicate (such as the OCR'd version of an original electronic document) or a document that is a proper subset of the item that has been individually reviewed as a standalone document, and it is not precluded from being responsive for objective reasons such as those listed above, it one embodiment the system likewise shows a tally of the review decisions.

If this is a user interface configuration in which attachments are individually coded, in one embodiment, these review decisions are treated in the same way as is the standalone case.

For each time it, or one of the above-described variations occurs as an attachment, if attachments were not coded separately, the following process is used:

Discard instances where the parent email was designated as privileged on the basis of actor (e.g. an attorney sent the mail.) "Discard" means that the review cannot be considered a context-free decision.

Discard instances where the parent email has one or more attributes that would disqualify it from being responsive, such as falling outside the date range.

Discard instances in which a different attachment to the email was found to be responsive as a standalone item. In one embodiment, a unanimous decision of prior reviewers is needed to discard. In other embodiments, the behavior may be configured by the user.

Discard instances where other emails in the same discussion as the parent email were found to be responsive. In one embodiment, a unanimous decision of prior reviewers is needed to discard. In other embodiments, the behavior may be configured by the user.

Tally and display the review decisions for all remaining instances. This is referred to as the context-dependent metric [7205].

Tally and display the context-independent result [7210] of all review decisions that involved the item, including those that were discarded.

This provides in total three different metrics that can be used either separately or in combination to determine whether the predominant decision as offered up by any one or all of the above metrics should just be adopted. Further, in some embodiments, all items that contain items (including themselves) that have passed a certain threshold of unanimity in one or more of these metrics can be specified for removal from the review pool. For example, an administrator could decide that if a particular item had a) never been reviewed as responsive in any kind of standalone form, and b) had similarly not been reviewed as responsive in the context-dependent metric, and had been reviewed a total of 10 times within these two measures, this item could be clearly labeled in the UI display as being "NR" so that reviewers would not waste more time re-reading it. Alternatively, the prior decisions could be considered as a "hint." One possible embodiment of displaying such a hint [334] is illustrated in FIG. 3F. The display of the tally allows reviewers to use their own judgment whether to invest the time to re-read the item. In one embodiment, whether or not the "hint" icon [334] is displayed is user-configurable. In one embodiment, the hint icon [334] may be hidden when the document involved is particularly sensitive in terms of topical content, or actor (such as the CEO), and there is therefore a desire to ensure a full and thorough contextual review. In one embodiment, the administrative user may determine that only some groups of reviewers, or individual reviewers may be allowed to see such hint icons [334].

In its native format quoted text from message A in message B may be displayed inline or as an attachment, depending on the settings of the email reader. In either case, the "proper subset" logic noted above applies to emails as well. This is to say that if message A was found to be responsive, message B must also be found to be responsive, unless precluded from being so by objective factors, such as falling outside the prescribed date range, or being associated with a privileged actor.

In some embodiments, if there were changes to the corpus—for example, changes to actor identity information that impact the particular document in question—a warning indicator is present that, when clicked on, displays the nature and date of the change.

Some embodiments will also note directly conflicting human reviewer decisions on the same item at different stages in the workflow. In some embodiments, this is done via one or more of: an email alert, a reports of such items, a special icon, and in still others, any such "reversed" or disputed items are automatically placed in a special area in workflow for further examination by a more senior user. In some of these embodiments, different behaviors may be established by the user based on the properties of the item.

User Interface for Organizing Investigative Research

Figure 73:
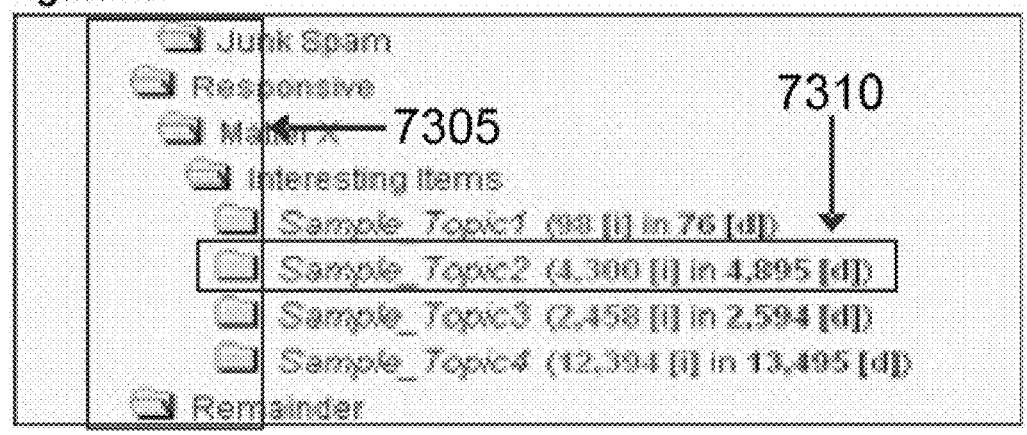
FIG. 73 is a screenshot of one embodiment of folder tree view structure.

In the process of doing investigative work, large amounts of electronic data that is relevant to various individual topics of interest will often be stored by users in a user-determined hierarchy of folders. One embodiment of such folders is illustrated in FIG. 73.

Items may be placed in these folders either individually, by some sort of bulk copy (such as copying the members of one folder into another), by performing a query, or otherwise selecting items, and depositing the results in a particular folder.

While such a scheme has the advantage of simplicity, it starts to break down in the face of complex investigations in which a large number of users may be investigating a large number of potentially related issues. For example, an investigation may start with the analysis of the activities of a set of individuals who, as the investigation really gets underway, are likely to be found to be highly interconnected. Thus, the same pieces of evidence are likely to be uncovered again and again by different users investigating different topics.

Because of this, unless the system places constraints on the use of such folders, the number of different folders will proliferate in an unchecked way over time. Further, some of the same interesting pieces of data will appear again and again. This will have the undesirable result of causing a large amount of unnecessary and redundant work.

Figure 74:
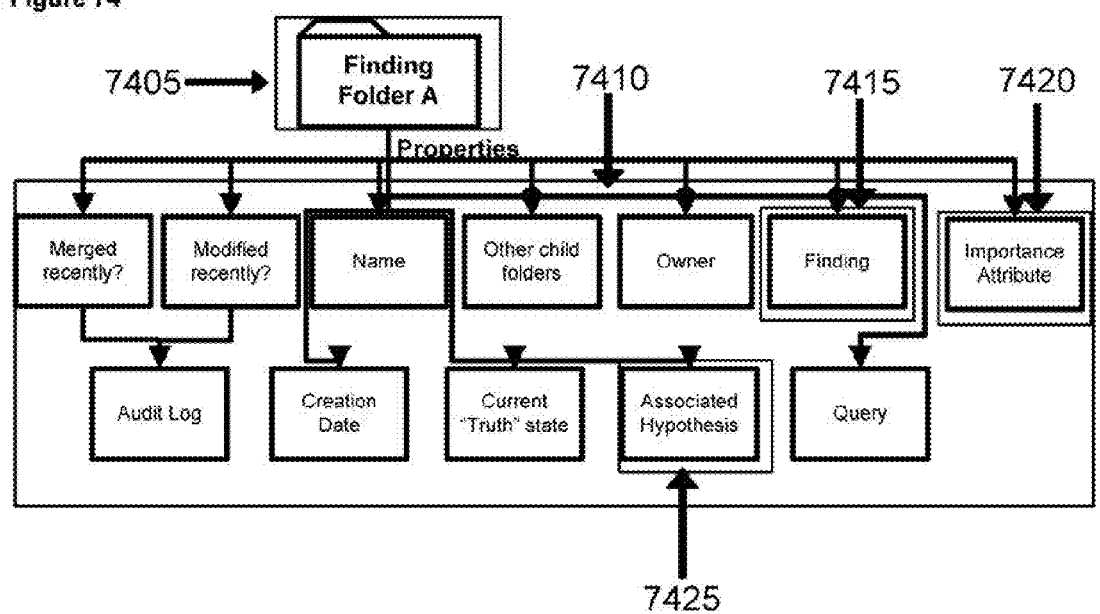
FIG. 74 is a diagram of one embodiment of attributes of finding folders.

These difficulties in efficient data organization may be overcome by specifying certain folders as being associated with a finding [7415]. Such folders are known as findings folders [7405] as illustrated in FIG. 74. In some embodiments, a "inding" [7415] is a folder whose contents have been (or will be) determined by a user to be pertinent or useful to the specific topic or topics that are associated with the finding [7415]. In others, the semantics of the findings folder [7405] are such that it is expected to contain at least one critical item or result that supports a definitive conclusion. In one embodiment, this determination may be made by a user, the system, or both. In many embodiments, a findings folder [7405] requires an explicit hypothesis [7425] to be associated with it whose truth or falsity can be established.

As illustrated in FIG. 74, findings folders may have a number of different properties associated with them, including but not limited to, the following: name, associated hypothesis, query, creation date, owner, one or more queries, current "truth" state, set of possible truth states, other folders it contains or has been merged with, and an audit log of all additions, deletions, and modifications to both the structure and contents of the folder. Some embodiments may have additional system attributes such as the user permissions that are associated with the folder [7405.]

Figure 75:
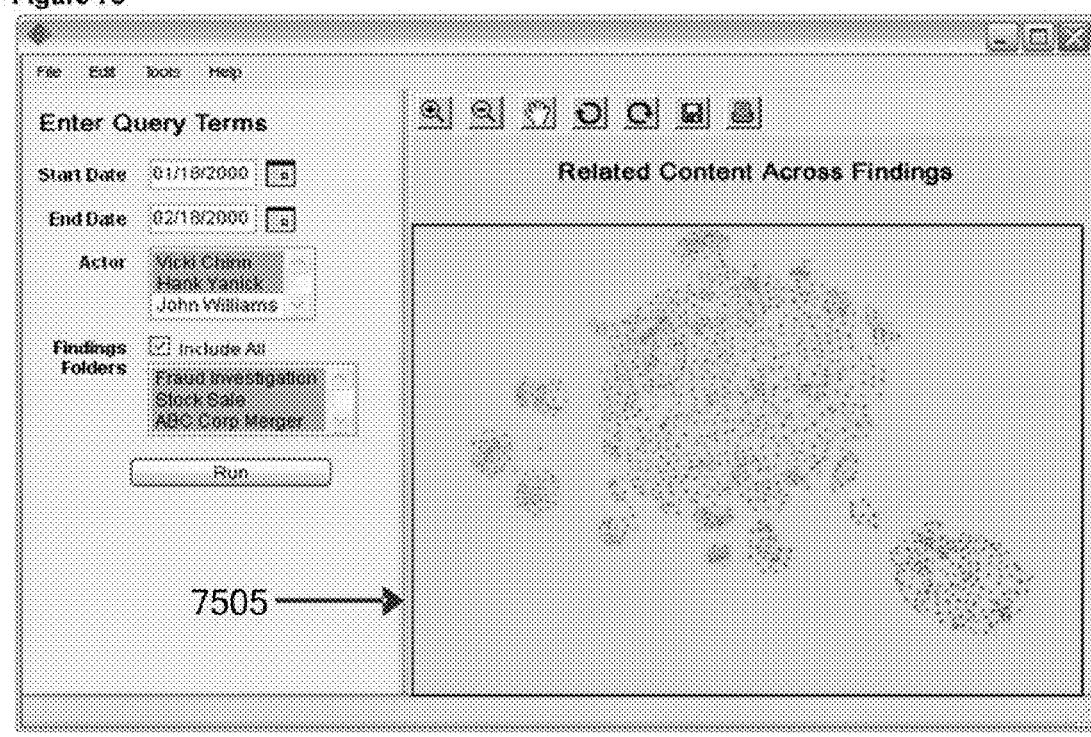
FIG. 75 is a screenshot of one embodiment illustrating related content across findings.

A findings folder [7405] differs from all other folders since it is designed to contain only items that relate to proving or disproving a particular hypothesis. This differs from other folders that may be serving as temporary holding areas for items which are to be reviewed later, or that exist for some specific reason other than proving or disproving a hypothesis. However, once the items that are assuredly relevant (because they are in one or more finding folders [7405]), have been identified, Venn diagrams and other comparisons that relate the contents of the different findings folders [7405] together can be automatically generated. This may yield important and non-obvious insights about the relationship of different aspects of the investigation. For example, "finding" items can be clustered in different dimensions (using a multidimensional scaling model or otherwise) to determine previously unsuspected similarities between the items in different findings folders [7405]. One embodiment of this is illustrated in FIG. 75. In this type of way, algorithmic and/or statistical post-processing can be used to further extend the work performed by the human investigators.

Figure 76:
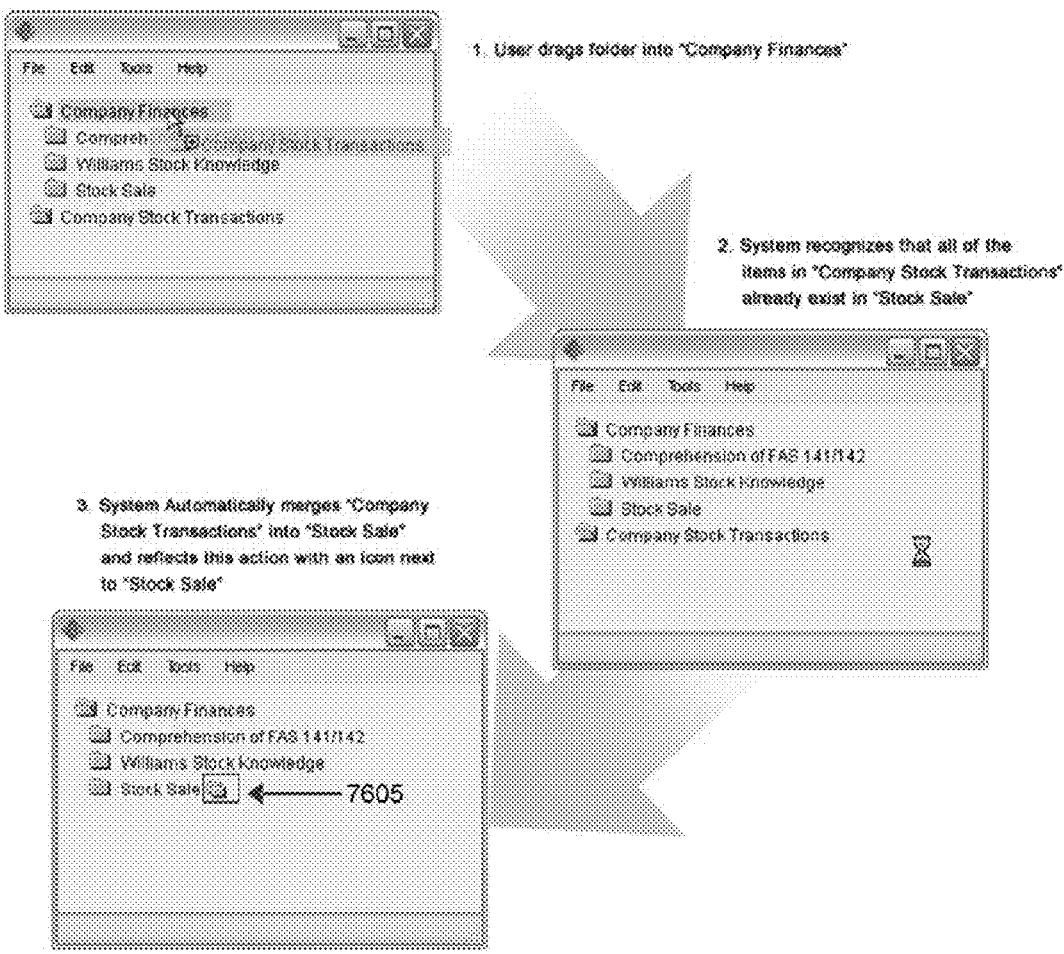
FIG. 76 is a diagram of one embodiment of how findings folders can be merged.
Figure 77:
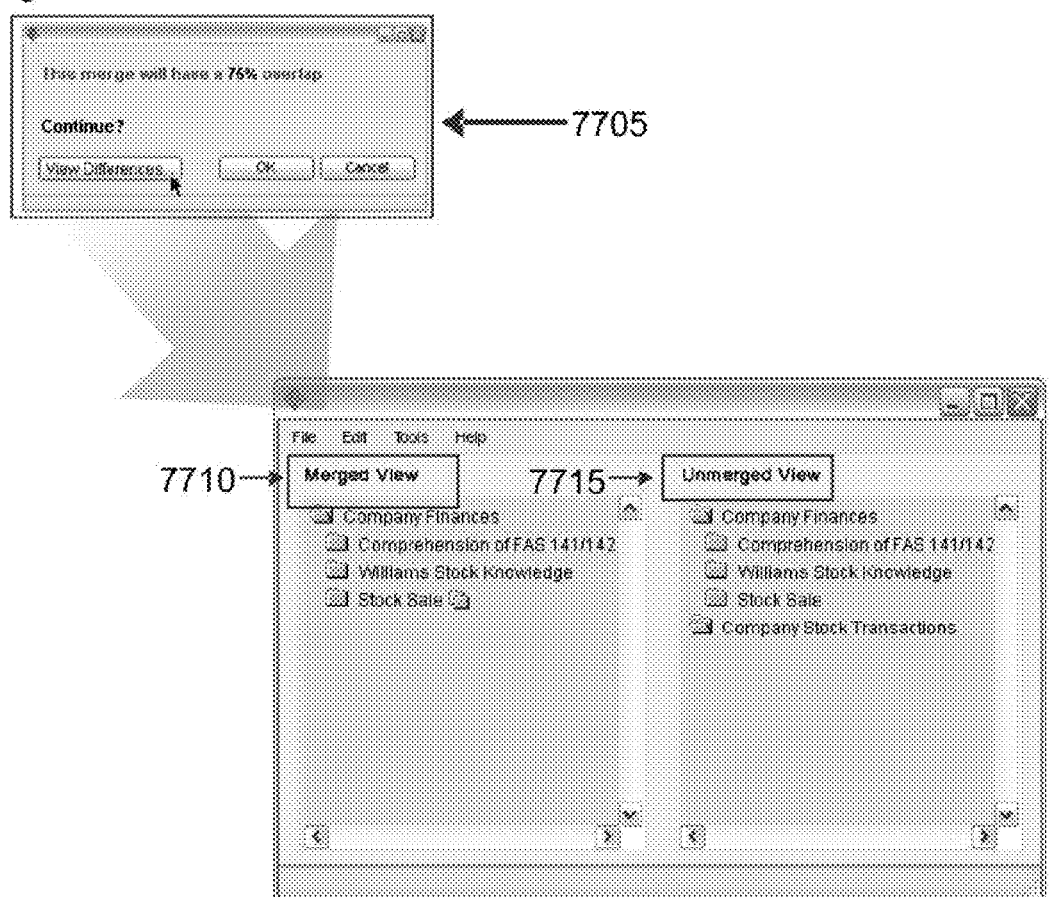
FIG. 77 is a diagram of one embodiment of a system prompt to merge folders containing overlapping data.

Similarly, the system in one embodiment may reorganize the findings folders into a hierarchical representation that reflects literal data containment relationships (as caused, for example, by a user dragging a large number of items into a findings folder that makes it highly duplicative with another findings folder.) In some embodiments, the user specifies the degree of overlap that triggers this. This is illustrated in FIG. 76. In some embodiments, strict containment may not be enforced. In many embodiments, the destination folder is augmented with an icon [7605] to indicate that another folder has been merged into it; in some of these embodiments, this icon [7605] is only displayed for a user-configured period of time, as at some point, the merge becomes old news. In some embodiments, the system may automatically query the user, asking whether two or more findings folders should be merged into one based on the degree of overlap of contents. In some embodiments, there may be more than one view available of the folder structure; for example, one with such merges and one without [7710, 7715] as illustrated in FIG. 77.

In some embodiments, a user can indicate that she wishes to merge two folders by dragging one folder on top of the other.

In some embodiments, there exists the notion of an administrative user who has oversight responsibility over other users, and whose job is to oversee the investigative research as well as the use of the specific software. In these embodiments, administrative users can sign up for alerts related to specific events, including but not limited to: user attempts to merge folders that do not obey the configured parameters for merges, administrator-configured overlap of items among different users, items being removed by one user from a findings folder set up by another user (if this is allowed).

Figure 78:
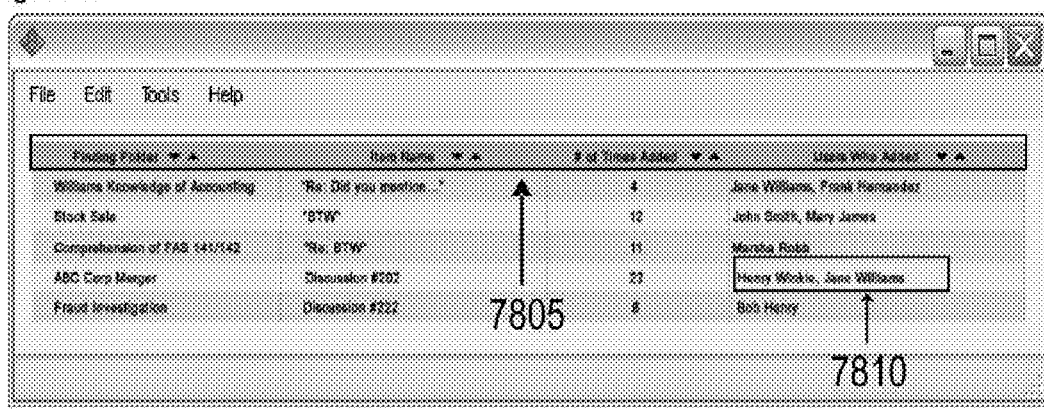
FIG. 78 is a screenshot of one embodiment of tabular reports of items in findings folders.

In this fashion, the work of different researchers pursuing similar lines of inquiry in the data may be compared for thoroughness while redundancies or overlap can be easily detected and avoided. In some embodiments, as shown in FIG. 78, tabular reports with user configurable header columns [7805] are generated, which visually indicate which different users [7810] filed the same items in their findings folders. Note, however, that other embodiments or configurations may display additional or different data.

Figure 79:
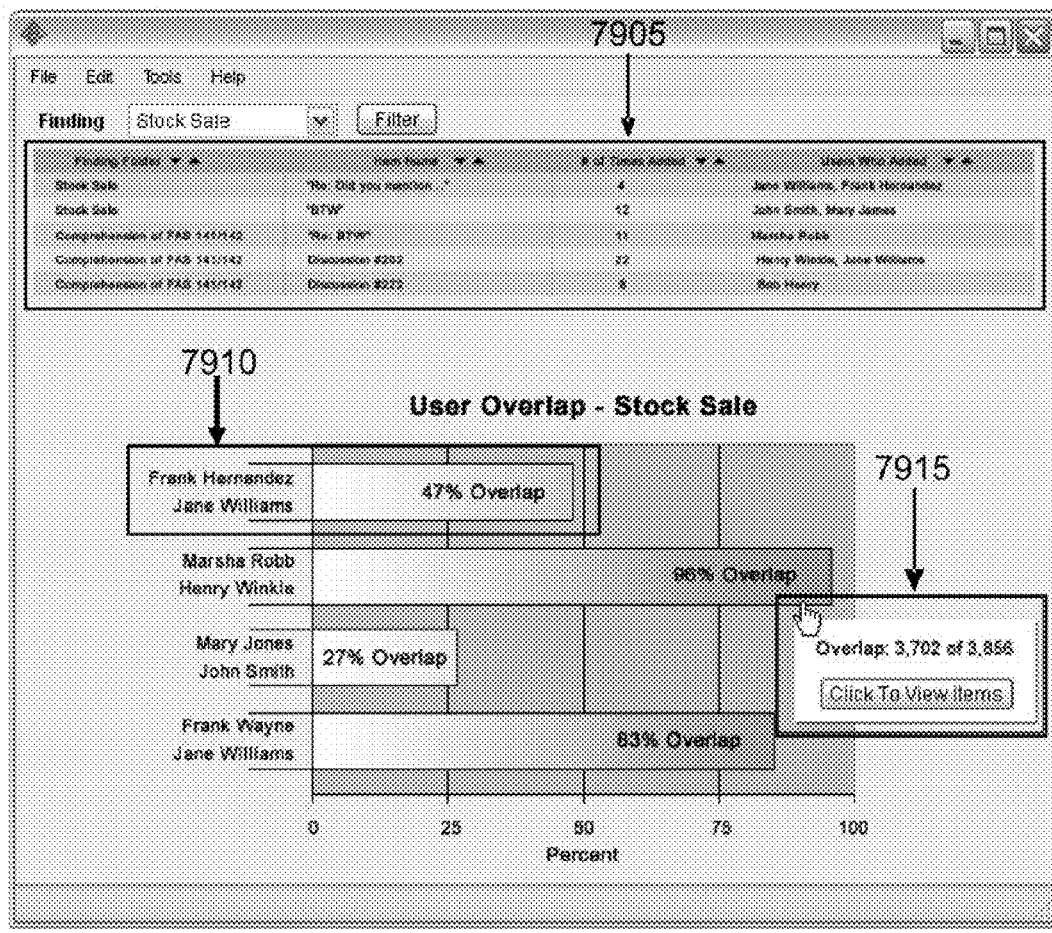
FIG. 79 is a screenshot of one embodiment illustrating user overlap in findings folders.

In some embodiments, individual pairs or sets of users who are foldering very similar sets of items are explicitly called out and/or represented in a graphical form for the purpose of calling this fact to the attention of the lead investigator, so that she can change individual assignments or take some other kind of action. FIG. 79 illustrates one embodiment of this that uses a bar chart visualization to indicate the overlap between users. In this particular embodiment, mousing over one of the bars [7910] will bring up a count of the items in question in a display [7915]. Some embodiments may only offer pairwise comparisons of users, while others will group as many different users as appropriate together in a single bar, based on degree of overlap.

Figure 80:
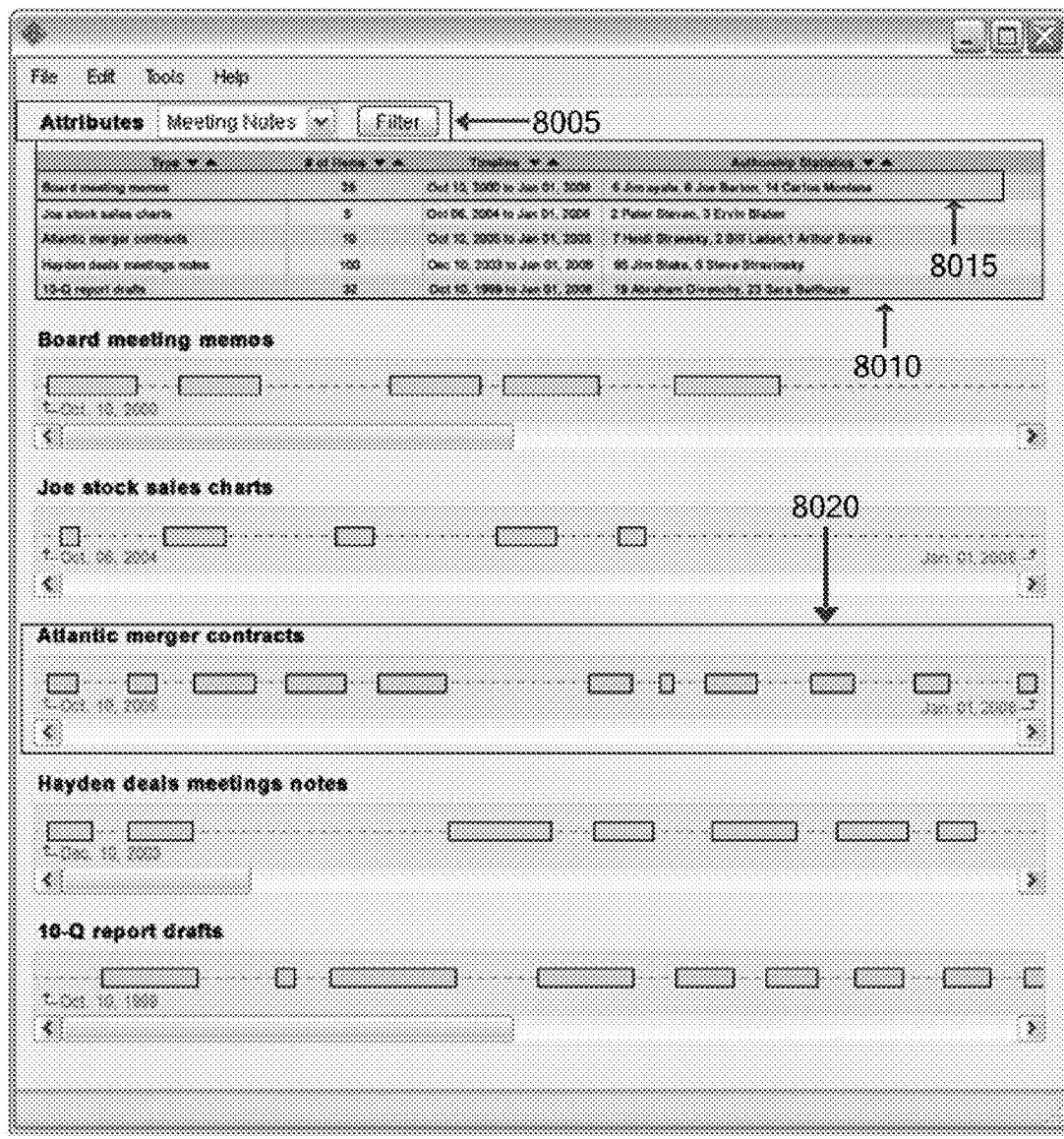
FIG. 80 is a screenshot of one embodiment of timeline view of items in findings folders.

In some embodiments, higher level reports [8010] on the contents of findings folders are available which provide information on groups of items based on a queryable set of attributes rather than just on individual items. (Note that the same report format may also be used for other purposes as well in some embodiments.) Such groupings may include, but are not limited to: items in the same discussion, in the same cluster, or of the same specific type, such as a particular type of periodically issued report. In one embodiment, the method described in the SOCIOLOGICAL DATA MINING APPLICATION is used to identify and name of each group; in some embodiments such groups may also be queried. As shown in FIG. 80, each row [8015] of information indicates a set of documents, rather than an individual document; all information after the first column contains aggregate information for all documents of the described type. Providing this information at a higher level allows the user to see the bigger picture, as opposed to getting mired in a sea of individual documents. This style of report may be used to assess findings folders contents, or as part of any more general query.

As also pictured in FIG. 80, some embodiments may also contain a visual timeline [8020] to help illustrate to the user the period of time that is collectively covered by each set of documents [8015]. In some embodiments, the timelines [8020] also includes all discussions involving the items in question. In other embodiments, the timelines [8020] may only display the items themselves. In some embodiments, timelines [8020] appear in the table instead of the spelled out dates. Different embodiments may employ different embodiments or styles of the timeline [8020] view. Some embodiments may provide grouping and sorting controls to control the display of the timelines [8020]. In some embodiments, the actor names may be replaced with photographs or other images to represent the individual actor. In other embodiments, there may be a graphic that indicates the total number of authors, or the total number of actors associated with the item, depending on the configuration.

In some embodiments, in order to handle very large sets of documents, a filter may be provided. A filter [8005] is a control used to further refine the query, or limit the documents that will be displayed.

Figure 81:
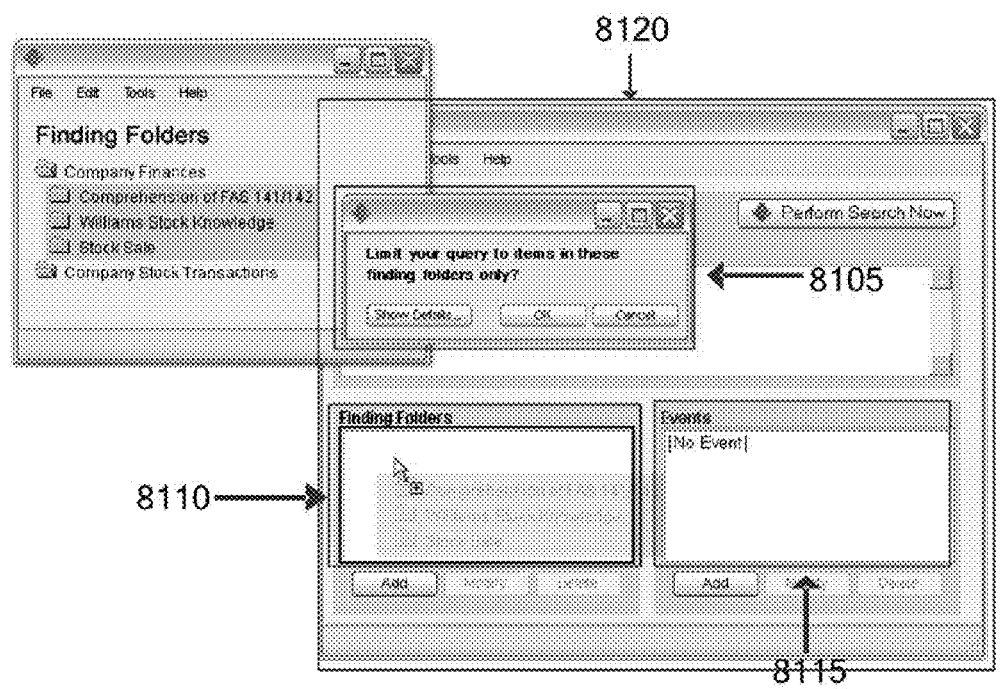
FIG. 81 is a screenshot of one embodiment of a system prompt to limit query to items in findings folders.

In some embodiments, by dragging a folder into a "dock" [8110] (that is, a specified area for receipt of dragged objects) within a query window [8120], the user may indicate that she wishes to limit the query to items in this finding folder (and others that have likewise been specified.) One embodiment of this is shown in FIG. 81.

New relationships between actors may be inferred on the basis of the presence of items related to them that appear in different findings folders. For example, visualizations of actor communication could be limited to either the items that are currently in finding folders, or extended to include other items similar to those currently in one or more findings folders. Similarity may be judged by a number of different metrics, such as topic clustering, actor clustering (clustering on the basis of the actors involved) or membership in the same discussion.

Figure 82:
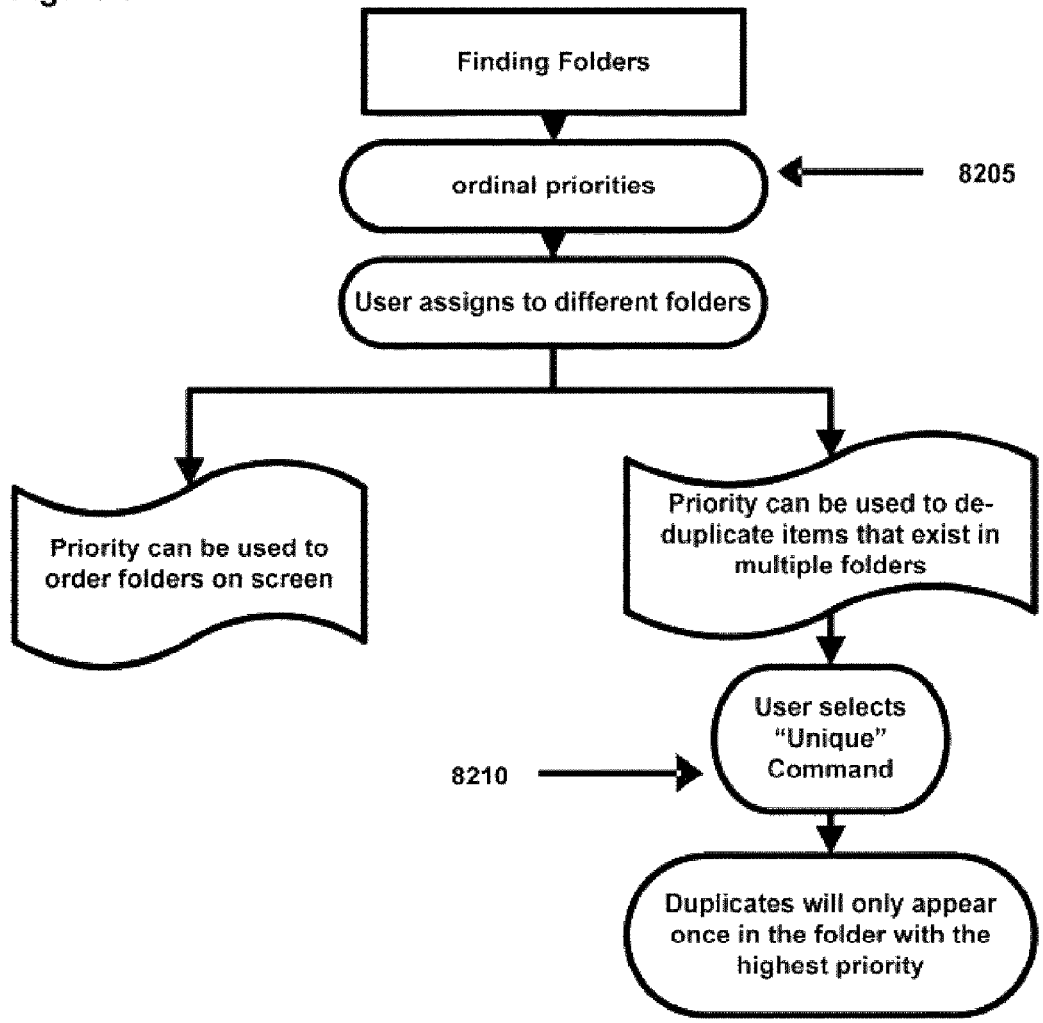
FIG. 82 is a diagram of one embodiment of prioritizing findings folders using user-assigned ordinal priorities.

In some embodiments, finding folders may also be assigned ordinal priorities [8205] by the user. This information can be used both to order the display of folders on screen, and to de-duplicate items that may appear in multiple folders. This is logically illustrated in FIG. 82. For example, if a particular item of interest appeared in 18 findings folders, if the user were to select the "unique" command [8210], the item will only show up once, in the findings folder that had been assigned the highest priority [8205] by the user. In one embodiment, the item is completely removed from any other folders. This is useful because without such a feature, the same item may be looked at again and again.

Figure 83:
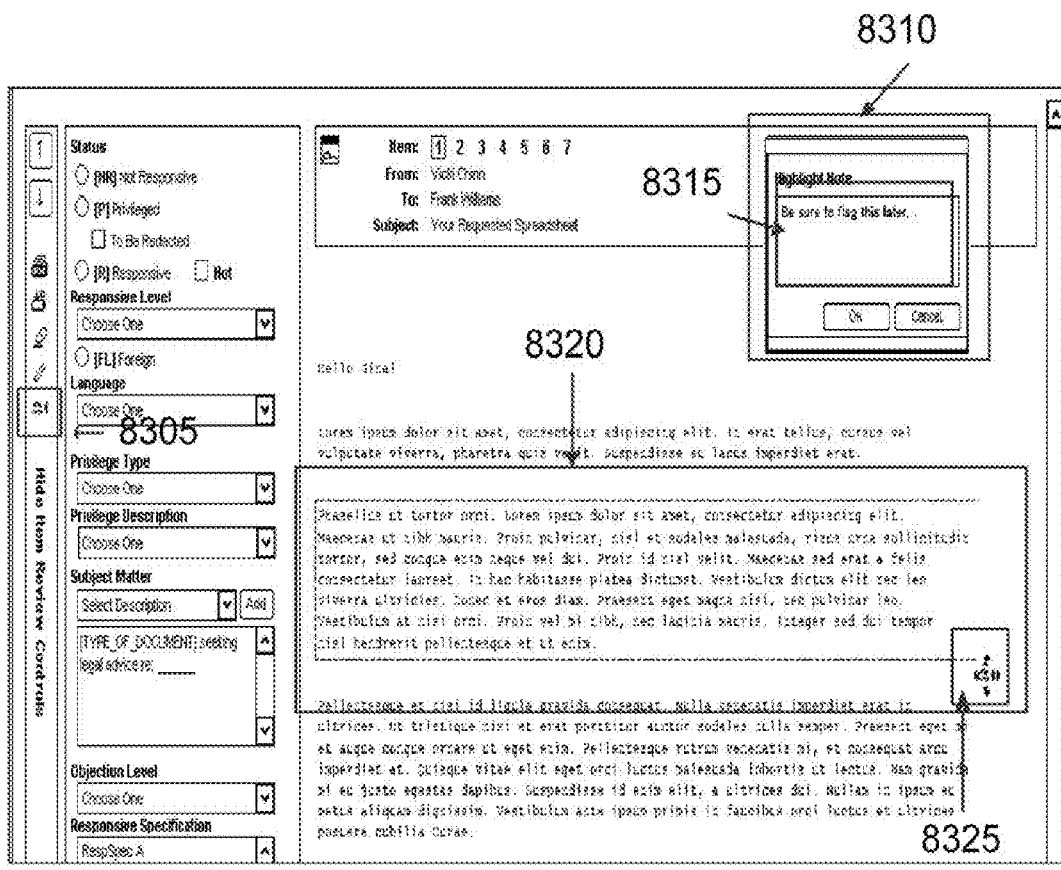
FIG. 83 is a screenshot of one embodiment of a highlighter notes panel.

In some embodiments, the user may designate specific items in a discussion or particular text in a document as being of especially high interest by selecting this text with the highlighter button [8305], thus creating an instance of highlighted text [8320], as illustrated in FIG. 83. In many embodiments, this is done through a highlighter metaphor.

In some embodiments the system allows the creation of notes
that are associated with the highlight selection [8320]. In some embodiments, a highlighter "notes" panel [8315] may automatically pop up when the user selects text with the highlighter cursor [8325]. In one embodiment, the highlighter "notes"[8310] will appear upon mouseover of the highlighted text.

This information is used to both help prevent false unifications as well as to determine similarities that might otherwise stay buried. For example, if two entirely different passages are considered relevant to completely different topics in a 200 page document, the presence of the document in the two different folders should not necessarily be considered overlap. The highlighting also provides the user with a means of realizing that, for example, the same paragraph in the 200 page document was material to resolving two apparently unrelated issues. Without such a mechanism, there is no way to identify which portion(s) of the item are the relevant ones.

Figure 84:
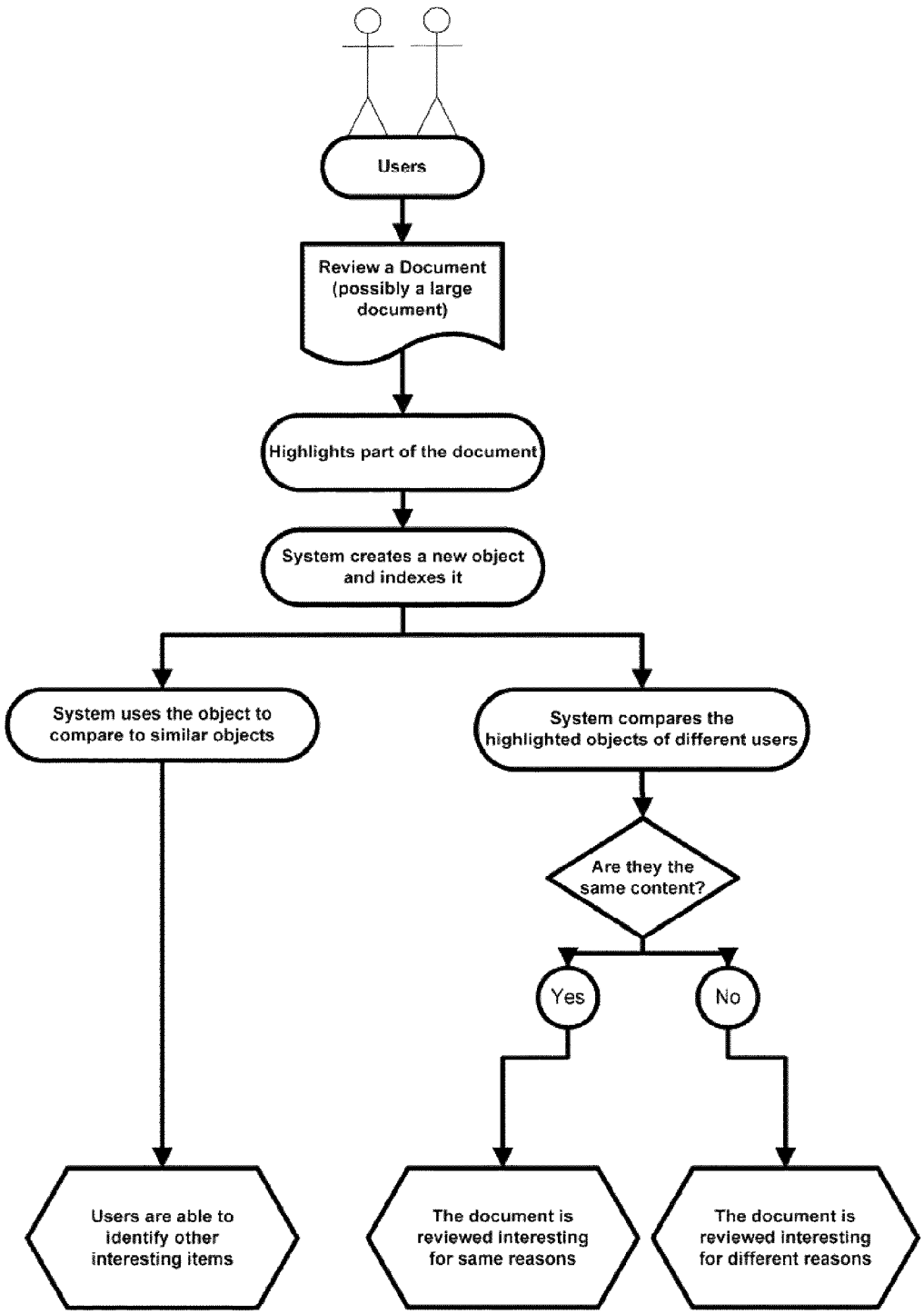
FIG. 84 is a flow chart of one embodiment of a mechanism to determine whether a document is reviewed "interesting" for the same reasons or different reasons.

In one embodiment, whether or not to consider each instance of highlighted information as a separate object for user review (albeit one that retains a link back to its "parent") is a configurable setting. If such highlighted information is to be considered distinct, in some embodiments, any highlighted text in a document will be separately indexed as a new object in the index so that it may be correctly compared to other potentially relevant items in clustering and other analysis. If the highlighted text is a simply an item in a discussion, only the item and not its parent discussion will be similarly treated. This is illustrated in FIG. 84.

Figure 85:
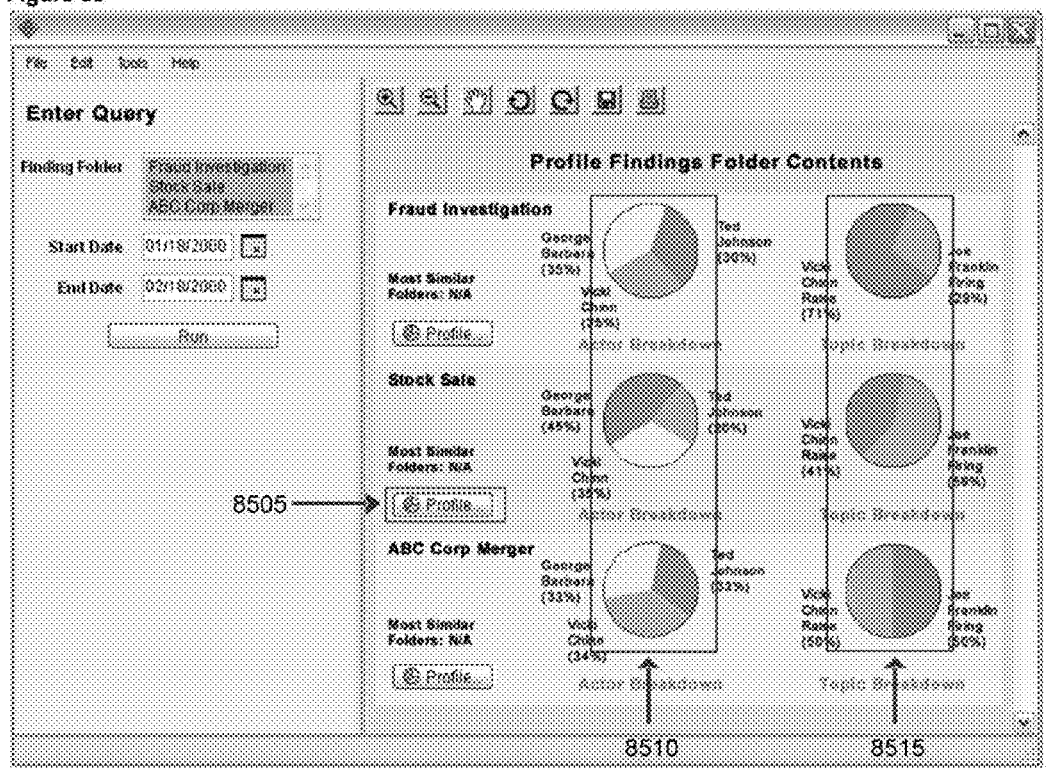
FIG. 85 is a screenshot of one embodiment of profiling findings folder contents.

Findings folders may be profiled along different dimensions with a single click, using the profile button [8505], as shown in FIG. 85. Different embodiments, however, may have additional or different dimensions. Some of the dimensions which may be available include, but are not limited to: date ranges of the items, topics present, foreign languages present, named entities referred to, types of individual activities documented. Note that different combinations of dimensions may also be used. Different embodiments may employ different visualizations to convey similarity, and dissimilarity of data contents. Once the desired dimension(s) and visualization(s) have been specified by the user, profiling can be done with a single click.

Figure 94:
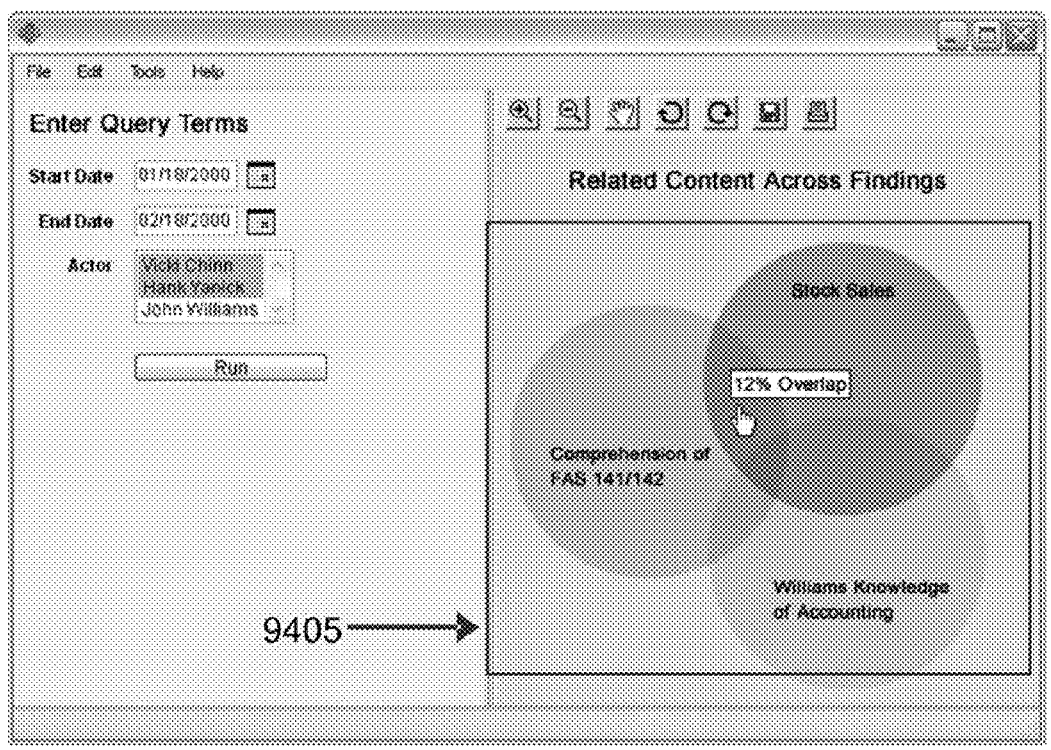
FIG. 94 is a screenshot of one embodiment in which search results across findings are displayed in a Venn diagram.
Figure 95:
FIG. 95 is a diagram of one embodiment of options for display of quoted text.

Also, as can be seen in FIG. 94, in one embodiment direct visual content comparisons can be made, in this instance a Venn diagram [9405] based on a degree of overlap. In this embodiment, graphical querying is supported, as shown in FIG. 94. In one embodiment, clicking on any part of the Venn diagram [9405] selects or de-selects items that are represented by that portion of the diagram, for the purposes of a query.

Figure 86:
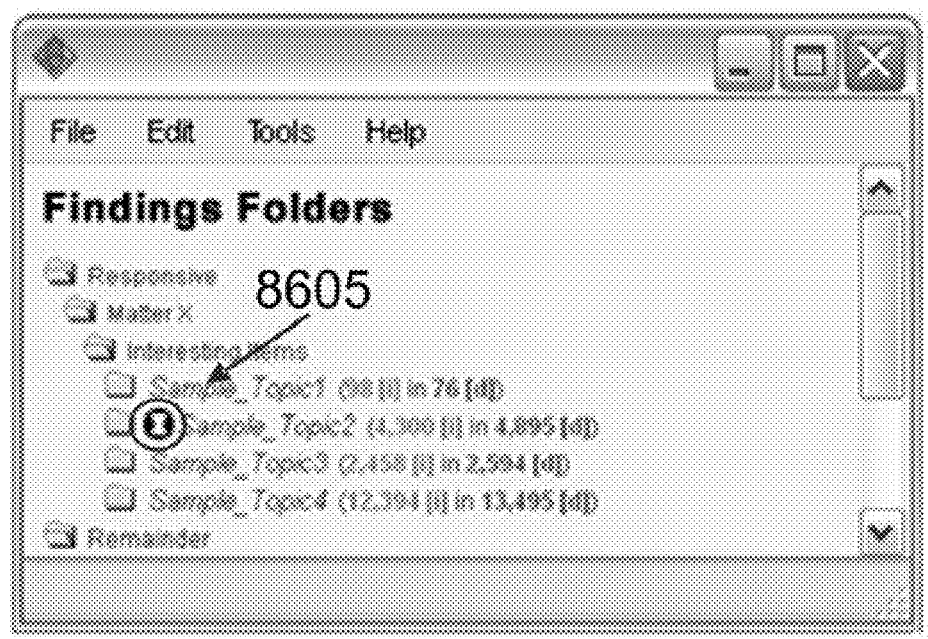
FIG. 86 is a screenshot of one embodiment of "is important" attribute of a findings folder.

In most embodiments, once an item has been placed in a findings folder, it retains an "is important" attribute [8605] that will only be removed if the user explicitly modifies this attribute. This modification should only occur in the event of a mistake in placing an item in a finding folder. In most embodiments, such "important" items are decorated with a user-selected icon [8605] to indicate their special status elsewhere in the system—that is, everywhere outside the context of the findings folders, including in responses queries. One embodiment of such a flag is illustrated in FIG. 86. The "is important" attribute [8605] is queryable, so with a single click, users can easily indicate that they want to limit their search to only such items.

Note that the specific query controls available for any of these views will vary with both the embodiment and the specific user configuration.

Mapping of Findings to Decision Trees

Figure 87:
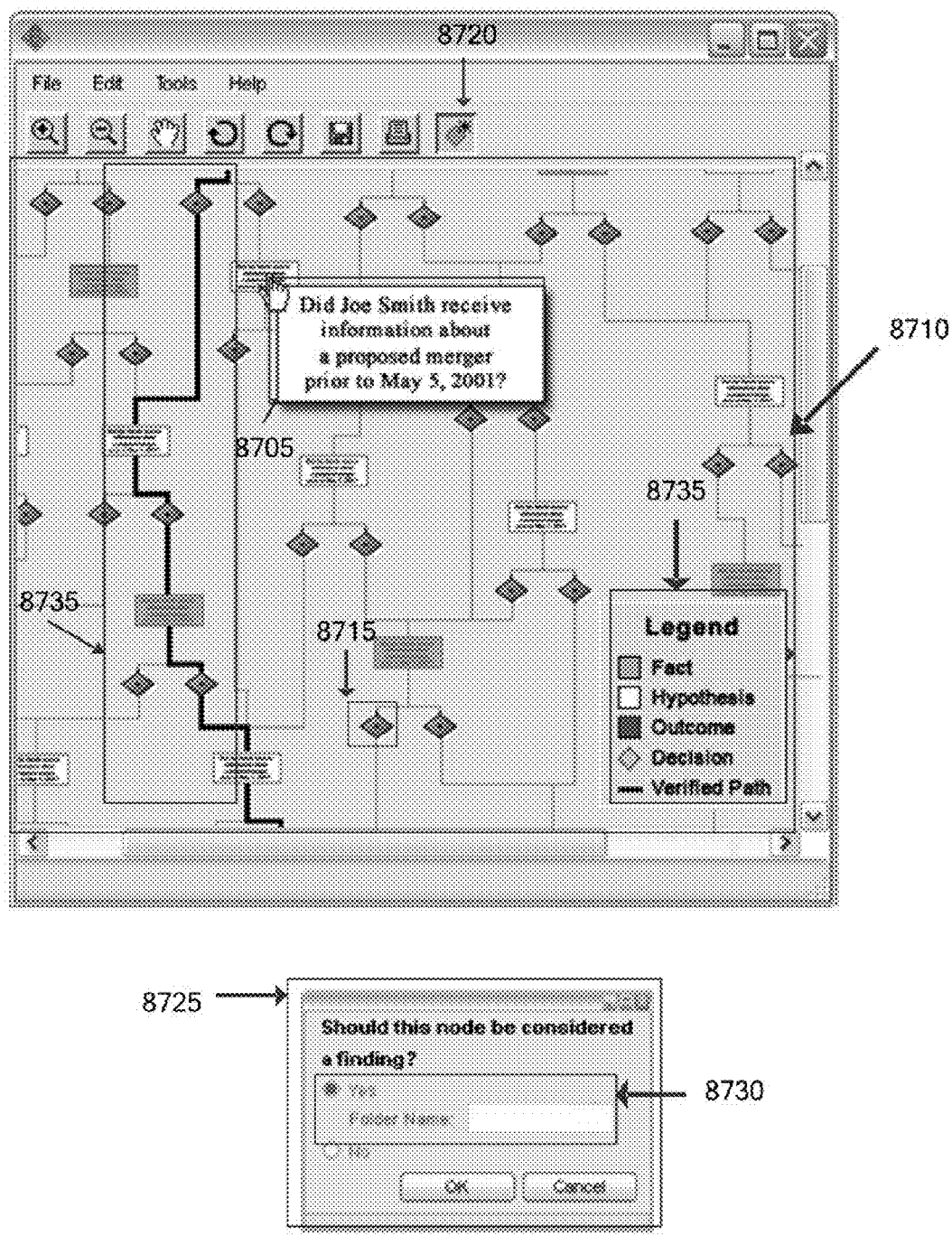
FIG. 87 is a screenshot of one embodiment of mapping the findings to a decision tree.

In some embodiments of the invention, a finding posed as a yes/no question (for example, "Did Joe Smith receive information about a proposed merger prior to May 5, 2001?") may be linked to a graphical visualization tool which allows users to both create and view decision trees, as shown in FIG. 87. In one embodiment, the user starts this process by creating one or more "question" nodes [8705], with the desired names, and then dropping them on the canvas [8710]. He also drops decision nodes [8715] onto the canvas [8710] and connects the different kinds of nodes together with the connector tool [8720] which results in the rendering of lines between the selected nodes. In most embodiments, the basic mechanics of this are very similar to commonly used graphics packages.

A simple example of a decision tree in this context, is one in which if the answer to the above sample question is "yes", the action is to try to plead out the case, but if the answer is "no", then proceed to trial. However, in real world usage, such decision trees, as shown in FIG. 87, may be, and often are, arbitrarily complex.

In such embodiments, a finding may have the property of being one of: true, false, or as yet unknown. All findings start off by definition in this last state. However, as information is added to the folder, the state may change for any of the following reasons, depending on the exact embodiment of the invention:

One or more items are returned in response to a specific query, thus satisfying either the "yes" or "no". For example, if the question associated with the finding folder is: "Did Joe Smith receive information about a proposed merger prior to May 5, 2001?" and evidence of at least one such email is discovered, the answer is "yes."

The results of some kind of analysis other than queries have returned a definitive result—for example, a statistical analysis that definitively suggests that evidence has been tampered with. One example of statistical analysis, based on back-up data, is shown in FIG. 50.

The user himself manually changes the state of the finding to one of "true" or "false." In some embodiments, the system may allow for additional states, such as "probably true" or "probably false.". Note that in some embodiments, only users with the appropriate permissions may make such changes.

The decision tree may be visualized using any graphing tool. Not all nodes in the tree must correspond to yes/no findings, However, when the user drops a new node on the canvas [8710], in some embodiments, a dialog [8725] will pop up asking the user whether the node should be considered a finding, and thus have a related findings folder [8730] created for it.

Once such a finding has been changed to either a "yes" or "no" state, in one embodiment its graphical state will change [8735] in the decision tree. Using the above example (but not pictured), if a query returns evidence that Joe Smith did receive an email with a deal document relating to the proposed merger in May of 2001, both the node representing this finding, the "try to plead" (which would be the next action after the state "yes") node, and the arc connecting them would change in color. In some embodiments, the color would turn green; in others, the color settings are user-configurable. In some embodiments, the false path may also turn a different color in order to help make it visually clearer that it is not a valid path, as opposed to something that is still unknown. In some embodiments, any such state change may be accompanied by an email or other alert to a pre-configured set of users.

In some embodiments, double clicking on a question node [8705] in the decision tree [8705] view will bring up the contents of the associated findings folder.

Querying Tools

Figure 88:
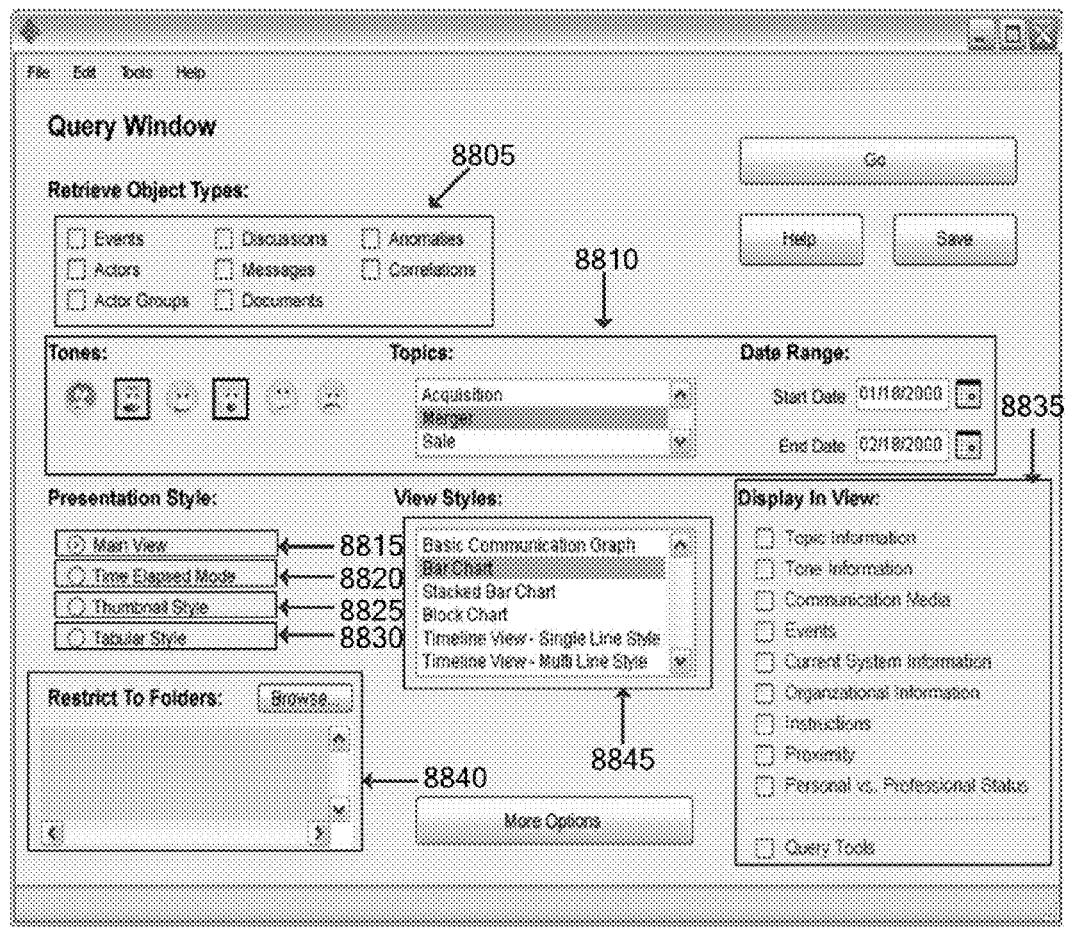
FIG. 88 is a screenshot of one embodiment of query controls.

In some embodiments, a query window is available that allows the user to specify all available properties of a query, including all of the characteristics of the returned view(s.) In most embodiments, the administrator can configure query windows with reduced or specialized functionality for different types of users. One embodiment of a more complex query window is depicted in FIG. 88. As pictured, it allows the user to select all of the following:

Which types of objects are to be retrieved by the query [8805]. Depending on which object type(s) have been selected, other controls in the query window will be disabled, if they are not applicable to the object type(s) that are currently selected.

The actual query to be performed on the relevant objects [8810]. Specifications include, but are not limited to, topic, tone, date range, and (not pictured) document type, specific keyword content, and various kinds of metadata.

The presentation style that is to be used in presenting the data [8815-8830]. As depicted here, choices include:

Main View with Query Controls. This option provides query controls in the generated window so as to facilitate query refinement, and one large view which contains the query results in whatever results format.

Main View. This will generate a full screen window, no query controls.

Time Elapsed Style. This will divide the interval of time selected in the query into equal time slices, providing both individual snapshots of each interval of time and a mechanism for "playing" the slides in sequential fashion. In most embodiments, a default time slicing is provided, however the user may configure it globally and/or in the context of a specific query in most embodiments.

Thumbnail Style. This is somewhat similar, but displays small "thumbnail" images of different time slices in a grid formation.

Tabular: Brings up the query results in a table widget that allows different kinds of sorting View Styles [8825]. Most types of objects in the system—and in some cases even their properties—have a variety of possible ways in which they can be visualized. The options available for the user to select depend on the current selection state of other controls in the window. As pictured, sample styles range from basic charts to different visual styles of timeline, and different styles of communication graphs.

Figure 90:
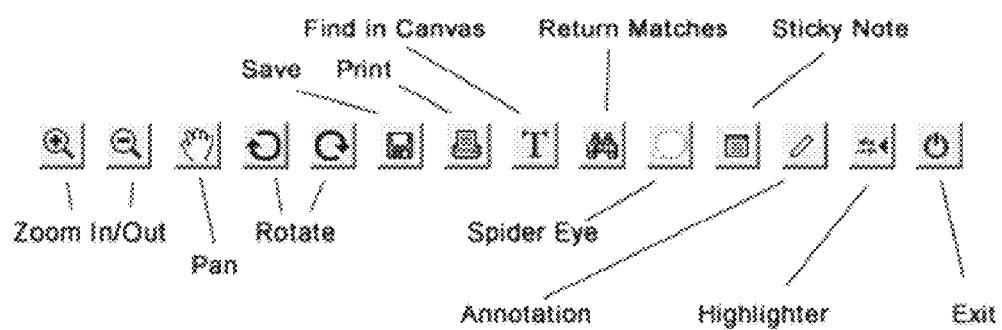
FIG. 90 is one embodiment of a panel of user interface icons.

The "Display in View" [8835] section indicates what types of information should be displayed in the query results, presuming that it is available. For example, a user could select a basic communication graph as the style of view [8825] that she wants, and then decide that she wishes to see personal vs. professional communication separately delineated from one another. In addition, this section may contain controls that allow the user to specify which of the available query controls should be brought up (and be associated with this particular query, if saved for reuse.) It may also include a control to specify the canvas tools are present. FIG. 90 illustrates the set of canvas tools that are available in one embodiment. To summarize, the options made available to the user in this section are capable of generating the different variations in controls, styles and layouts of the different visualization windows depicted in this application.

The "Restrict to Folders" [8840] controls can be used in order to limit the query to folders, which may be selected through a folder browser or dragged and dropped into the "dock" provided.

The "More options" button if clicked offers still further options, including but not limited to how the returned results should be sorted and grouped, and what line styles, fill characteristics, icons and other visual representations are to be used to represent the different types of objects that will be visualized in the returned result. Note therefore that in most embodiments, the legends for the visualizations are dynamically generated.

The "save" button allows the query to be saved for future use.

Figure 89:
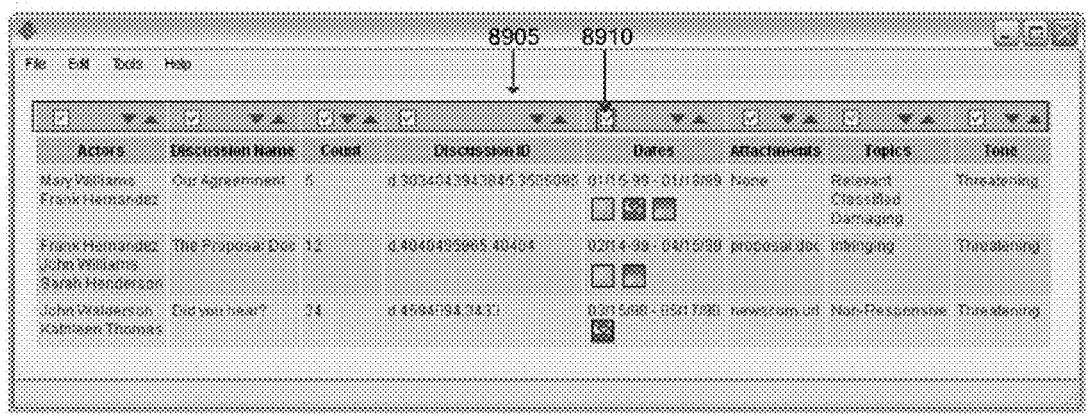
FIG. 89 is a screenshot of one embodiment of displaying discussion information in a tabular report form.

In some embodiments, the information from these communication graphs can be presented in a tabular report form [8905], which lists each discussion that meets the requested criteria, and allows sorting on all columns. FIG. 89 illustrates one embodiment of a tabular view. Some embodiments may have a variety of columns, which may include, but is not limited to, one or more of the following: actors participating, discussion name, item count, discussion unique ID, day/night indicators for each item in the discussion, number of attachments, topics, foreign language content, and tonal content. Some embodiments may allow the columns to be user-configurable, including providing controls [8910] with which to hide those columns which are not currently of interest.

In some embodiments and configurations, the response to a query is some type of graphical depiction of all discussions that conform to the conditions of the query, each rendered in chronological sequence. Some embodiments may provide sorting controls, including but not limited to actor, topic, tone—or any combination of these—and ascending or descending sort over time.

Figure 91:
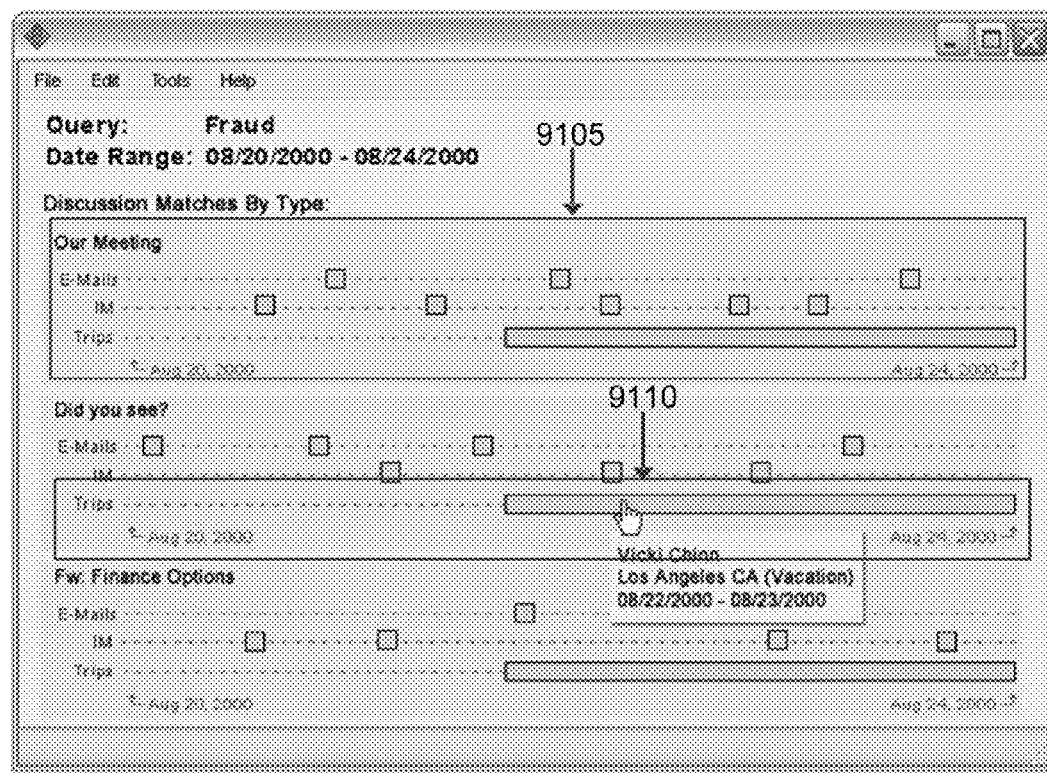
FIG. 91 is a screenshot of one embodiment of a timeline within a date range.

Many of these graphical depictions are timeline views of one form or another, one style of which is illustrated in FIG. 91. As pictured in FIG. 91, each type of communication medium is portrayed on its own separate line. As noted elsewhere in this application, since in some configurations, the notion of discussion membership can be extended to other events or items of interest that occurred during the lifespan of the discussion, the travel of a particular actor [9110] in the discussion is illustrated. As illustrated, mousing over any of the boxes will, in this embodiment, bring up a floating box that provides more information about the relevant item or event.

Figure 92:
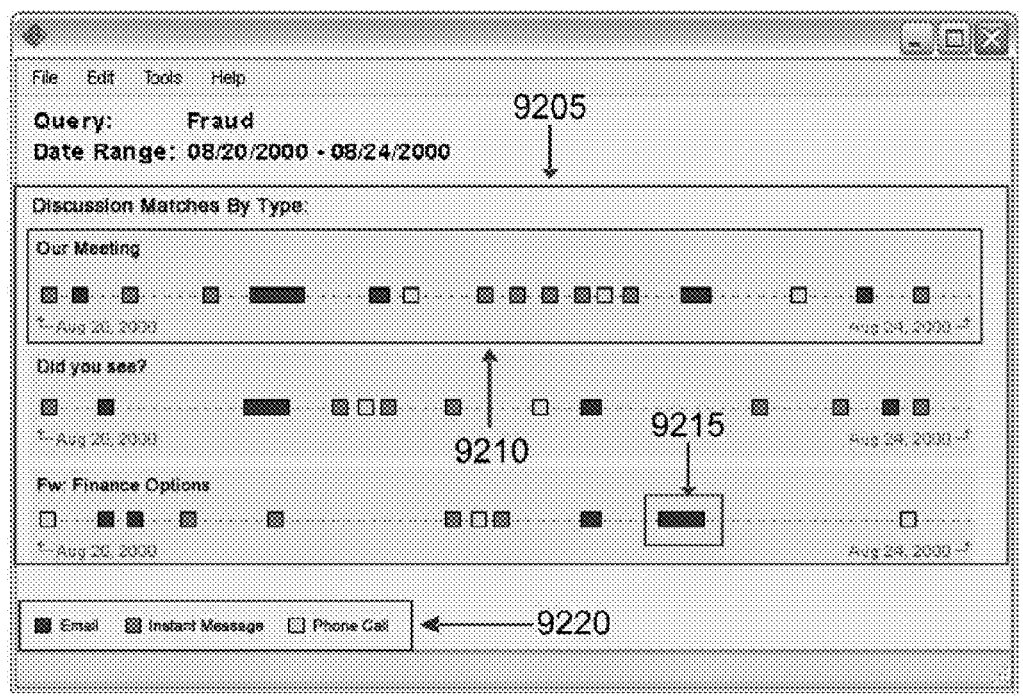
FIG. 92 is a screenshot of one embodiment of a timeline within a date range depicting when communications via email, instant message and phone call occurred.
Figure 93:
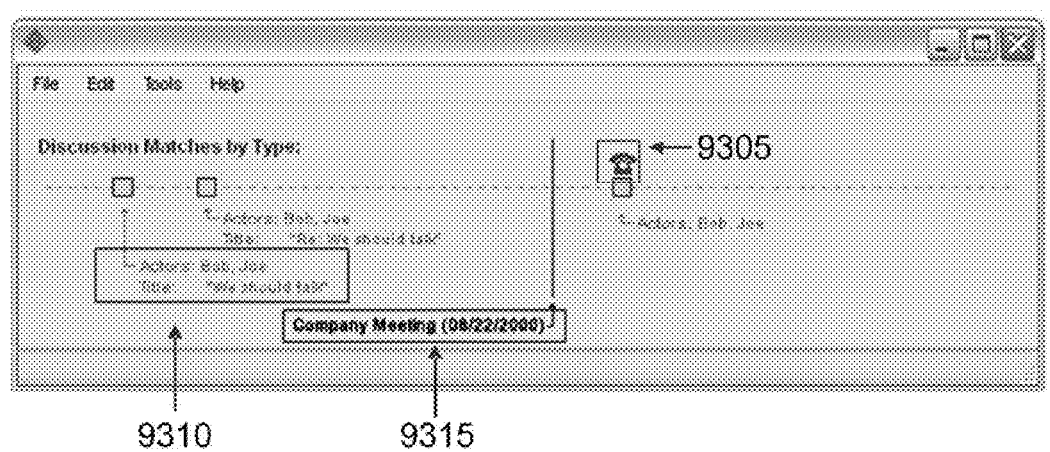
FIG. 93 is a screenshot of one embodiment of timeline depicting discussion matches by type.

In some other embodiments, such as that pictured in FIG. 92, each item in the discussion is colored by media type [9220], for example, email vs. IM vs. phone call, and all types are displayed on the same line [9210] in order to conserve screen real estate. This representation is especially desirable when large numbers of discussion objects are retrieved, and will need to be displayed. As illustrated by FIG. 93, still other embodiments may label the blocks with appropriate icons [9305] or other indicators instead of just relying on coloration to initially distinguish the different types of items. Some embodiments may provide additional labeling or indicators [9310], including but not limited to displaying the primary actors for each discussion, and indicating key external events with vertical lines and labels [9305].

In some embodiments, each discussion object is labeled with the names of the primary actors and the name of the discussion, one embodiment of the determination of which is described in the SOCIOLOGICAL DATA MINING APPLICATION. In this way, it becomes much easier to see that, for example, no more than 3 emails are exchanged between actors Bob and Joe on a particular topic before the discussion appears to shift away from the written form. Or, for example, that this became the case after a particular date of interest. Some embodiments also may group discussions together visually by user-specified properties, including but not limited to, topical content, the actors involved, the item or document types contained in the discussion.

Note that some embodiments may visualize different kinds of meeting related objects with different icons or other differentiating visualizations. For example, some embodiments may differentiate between requests for a call embedded in an email, versus a calendar event, versus an actual record of a phone call.

Note that some visualizations of discussions are intended to indicate literally calendar time while others may take the approach of trying to center discussions around key events, and still others merely are trying to indicate the sequencing of events, rather than the span of time. In the case of the former, some embodiments may group discussion results according to which key events they can center them around.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method to enable improved analysis and use of sociological data, the method comprising:
   identifying causal relationships between a plurality of documents;
   identifying a plurality of characteristics of a communication, including a modality used, actors involved, proximate events of relevance, and a tone used by an actor in the communication; and
   enabling a user to query based on available characteristics.

2. The method of claim 1, wherein the plurality of characteristics further comprises a predominant tone used in a discussion.

3. The method of claim 1, further comprising:
   determining a percentage of communication with respect to a topic which utilizes a tone; and
   tagging the communication with an appropriate indicator to illustrate a predominant tone.

4. The method of claim 1, further comprising:
   identifying a pattern of tonal usage on the part of an individual actor with respect to other actors;
   identifying deviations from the pattern of tonal usage; and
   associating specific topics, actors, events of importance, or changes in communications patterns associated with the deviation.

5. The method of claim 4, further comprising:
   identifying unusual quotes or capitalization as indications of sarcasm.

6. The method of claim 4, further comprising:
classifying an item as hot or worthy of special examination, based on a tone associated with the item.

7. The method of claim 4, further comprising:
displaying overall tonal content per time period for an actor, to identify anomalies.

8. The method of claim 7, wherein the display is a matrix, with years displayed along the Y-axis, to enable a comparison on a seasonal basis.

9. The method of claim 1, further comprising:
identifying, for a particular actor, divergence in tones in communications with different actors on a particular topic within a given timeframe.

10. The method of claim 1, further comprising:
illustrating a range of tones used in communications between two actors over time, for sending and receiving messages.

11. A method comprising:
identifying causal relationships between a plurality of documents;
identifying a plurality of characteristics of a communication, including a modality used, actors involved, and proximate events of relevance;
enabling a user to query based on available characteristics; and
identifying the modality of the communication when displaying a discussion.

12. The method of claim 11, further comprising:
establishing an actor heartbeat based on an activity level, the activity level differentiated between the modalities of communication.

13. The method of claim 12, further comprising:
utilizing the actor heartbeat to identify periods of vacation, illness, or business travel.

14. The method of claim 12, further comprising:
utilizing the actor heartbeat to identify missing activities or abnormally low activities to identify deletions.

15. The method of claim 12, wherein the modalities include:
telephone, instant messaging, calendar, in-person meetings, creation of documents, and editing of documents.

16. A method comprising:
identifying causal relationships between a plurality of documents;
identifying a plurality of characteristics of a communication, including a modality used, actors involved, and proximate events of relevance;
enabling a user to query based on available characteristics;
evaluating actor behavior over time, to create a threshold behavior for the actor; and
identifying deviations from the threshold behavior.

17. The method of claim 16, further comprising:
relating the deviation from the threshold behavior to relevant events.

18. The method of claim 16, wherein the behavior includes one or more of the following: a reply cycle to communications, tone used, communications modality used.

19. The method of claim 16, further comprising:
displaying an average length and a total number of discussions for a topic selected by a user, as well as the number of discussions that ended in a meeting event.

20. The method of claim 19, further comprising:
highlighting deviations from a normal number of such interactions for a particular occurrence of the topic.

* * * * *